Jan. 2, 1968 D. MACKIE ET AL 3,362,015

COMMUNICATION SWITCHING ADAPTER

Filed June 30, 1964 99 Sheets-Sheet 1

INVENTORS
DAVID MACKIE
LEO T. O'CONNOR, JR.

BY Owen L. Lamb
AGENT

Jan. 2, 1968 D. MACKIE ET AL 3,362,015

COMMUNICATION SWITCHING ADAPTER

Filed June 30, 1964 99 Sheets-Sheet 4

COMMUNICATION SWITCHING ADAPTER

Filed June 30, 1964

COMMUNICATION SWITCHING ADAPTER

Jan. 2, 1968 D. MACKIE ET AL 3,362,015

COMMUNICATION SWITCHING ADAPTER

Filed June 30, 1964 99 Sheets-Sheet 8

LINE CONTROL WORD FORMAT

Jan. 2, 1968 D. MACKIE ET AL 3,362,015

COMMUNICATION SWITCHING ADAPTER

Filed June 30, 1964 99 Sheets-Sheet 9

Jan. 2, 1968 D. MACKIE ET AL 3,362,015

COMMUNICATION SWITCHING ADAPTER

Filed June 30, 1964 99 Sheets-Sheet 11

Jan. 2, 1968 D. MACKIE ET AL 3,362,015

COMMUNICATION SWITCHING ADAPTER

Filed June 30, 1964

09 Sheets-Sheet 14

Jan. 2, 1968 D. MACKIE ET AL 3,362,015

COMMUNICATION SWITCHING ADAPTER

Filed June 30, 1964 99 Sheets-Sheet 18

Jan. 2, 1968 D. MACKIE ET AL 3,362,015

COMMUNICATION SWITCHING ADAPTER

Filed June 30, 1964 99 Sheets-Sheet 20

Jan. 2, 1968 D. MACKIE ET AL 3,362,015

COMMUNICATION SWITCHING ADAPTER

Filed June 30, 1964 99 Sheets-Sheet 23

FIG 32

SET R1 POS 0

| FROM FIG. | LINE TITLE |
|---|---|
| 47 | SET STROBE CT 5 |
| 66 | EQ'PT ECHO |

RESET R1 POS 0

| FROM FIG. | LINE TITLE |
|---|---|
| 46 | RST STR BIT P ADD & ADD |
| 47 | RST PREP ADD & STR COUNT |
| 62 | RST STR CT PREP ADD |
| 46 | INITIATE RECEIVE |
| 26 | RESET SENSE FIELD |
| 56 | RST SENSE-REC. CHAR SVC |
| 56 | RST OVERRUN |

SET R1 POS 1

| FROM FIG. | LINE TITLE |
|---|---|
| 21 | SET BUS OUT P CHK |
| 46 | INITIATE RECEIVE |

RESET R1 POS 1

| FROM FIG. | LINE TITLE |
|---|---|
| 46 | RST STR BIT P ADD & ADD |
| 47 | RST PREP ADD & STR COUNT |
| 47 | SET STROBE COUNT 5 |
| 52 | RST STROBE CT BIT 2 |
| 62 | RST STROBE CT PREP ADD |
| 26 | RST SENSE FIELD |
| 56 | RST SENSE-REC. CHAR SVC |

SET R1 POS 2

| FROM FIG. | LINE TITLE |
|---|---|
| 46 | INITIATE RECEIVE |
| 47 | SET STROBE COUNT 5 |
| 62 | SET TIME OUT COMPLETE |
| 55 | WRITE BREAK |

RESET R1 POS 2

| FROM FIG. | LINE TITLE |
|---|---|
| 46 | RST STR BIT P ADD & ADD |
| 46 | RST TIME OUT |
| 47 | RST PREP ADD & STR COUNT |
| 62 | RST STR CT PREP ADD |
| 55 | NOT WRT BRK |
| 26 | RST SENSE FIELD |
| 56 | RST SENSE-REC. CHAR SVC |

FIG. 33

SET R1 POS 3

| FROM FIG. | LINE TITLE |
|---|---|
| 47 | SET STROBE CT 8 |
| 56 | SET OVERRUN |
| 96 | SET R1 POS 3 |

RESET R1 POS 3

| FROM FIG. | LINE TITLE |
|---|---|
| 26 | RESET SENSE FIELD |
| 46 | RST STR BIT P ADD & ADD |
| 46 | INITIATE RECEIVE |
| 47 | RST PREP ADD & STR COUNT |
| 47 | SET STROBE COUNT 5 |
| 56 | RESET SENSE-REC. CHAR SVC |
| 56 | RST OVERRUN |

SET R1 POS 4

| FROM FIG. | LINE TITLE |
|---|---|
| 21 | SET CMD REJECT |

RESET R1 POS 4

| FROM FIG. | LINE TITLE |
|---|---|
| 26 | RESET SENSE FIELD |
| 46 | RESET STR BIT P ADD & ADD |
| 46 | INITIATE RECEIVE |
| 56 | RESET SENSE-REC. CHAR SVC |
| 62 | RST BIT CT (FIELD) |

SET R1 POS 5

| FROM FIG. | LINE TITLE |
|---|---|
| 56 | SET NOT OPER, SET R1 POS 5 |
| 62 | SET NOT OP'NL |

RESET R1 POS 5

| FROM FIG. | LINE TITLE |
|---|---|
| 26 | RESET SENSE FIELD |
| 46 | RST STR BIT P ADD & ADD |
| 46 | INITIATE RECEIVE |
| 56 | RESET SENSE-REC. CHAR SVC |
| 62 | RST BIT CT (FIELD) |

SET R1 POS 6

| FROM FIG. | LINE TITLE |
|---|---|

RESET R1 POS 6

| FROM FIG. | LINE TITLE |
|---|---|
| 46 | RST STR BIT P ADD & ADD |
| 46 | INITIATE RECEIVE |
| 47 | RST BIT COUNT |
| 62 | RST BIT CT (FIELD) |

FIG. 34

SET R1 POS 7

| FROM FIG. | LINE TITLE |
|---|---|

RESET R1 POS 7

| FROM FIG. | LINE TITLE |
|---|---|
| 46 | RST STR BIT P ADD & ADD |
| 46 | INITIATE RECEIVE |
| 47 | RST BIT COUNT |
| 62 | RST BIT CT (FIELD) |

SET R1 POS 8

| FROM FIG. | LINE TITLE |
|---|---|
| 46 | SET SERIAL DATA |
| 56 | SET R1 POS 8, 9, 10 |

RESET R1 POS 8

| FROM FIG. | LINE TITLE |
|---|---|
| 46 | RST SERIAL DATA |

SET R1 POS 9

| FROM FIG. | LINE TITLE |
|---|---|
| 46 | SET SERIAL DATA |
| 56 | SET R1 POS 8, 9, 10 |

RESET R1 POS 9

| FROM FIG. | LINE TITLE |
|---|---|
| 46 | RST SERIAL DATA |

SET R1 POS 10

| FROM FIG. | LINE TITLE |
|---|---|
| 46 | SET SERIAL DATA |
| 56 | SET R1 POS 8, 9, 10 |

RESET R1 POS 10

| FROM FIG. | LINE TITLE |
|---|---|
| 46 | RST SERIAL DATA |

FIG. 35

SET R1 POS 11

| FROM FIG. | LINE TITLE |
|---|---|
| 46 | SET SERIAL DATA |
| 79 | R1 POS 11 (SER DATA 3) |

RESET R1 POS 11

| FROM FIG. | LINE TITLE |
|---|---|
| 46 | RST SERIAL DATA |

SET R1 POS 12

| FROM FIG. | LINE TITLE |
|---|---|
| 46 | SET SERIAL DATA |
| 79 | SET SER DATA 4, 6, 7 |

RESET R1 POS 12

| FROM FIG. | LINE TITLE |
|---|---|
| 46 | RST SERIAL DATA |

SET R1 POS 13

| FROM FIG. | LINE TITLE |
|---|---|
| 46 | SET SERIAL DATA |
| 79 | SET LETTERS MODE ON WR R1 POS 13 (SER DATA 5) |

RESET R1 POS 13

| FROM FIG. | LINE TITLE |
|---|---|
| 46 | RST SERIAL DATA |
| 46 | RST SERIAL DATA & SET SEQ |
| 79 | SET LETTERS MODE ON WR R1 POS 13 (SER DATA 5) |

SET R1 POS 14

| FROM FIG. | LINE TITLE |
|---|---|
| 46 | SET SERIAL DATA |
| 79 | SET SER DATA 4, 6, 7 |

RESET R1 POS 14

| FROM FIG. | LINE TITLE |
|---|---|
| 46 | RST SERIAL DATA |
| 46 | RST SERIAL DATA & SET SEQ |

SET R1 POS 15

| FROM FIG. | LINE TITLE |
|---|---|
| 46 | SET SERIAL DATA |
| 79 | SET SER DATA 4, 6, 7 |

RESET R1 POS 15

| FROM FIG. | LINE TITLE |
|---|---|
| 46 | RST SERIAL DATA |
| 46 | RST SERIAL DATA & SET SEQ |

FIG. 36

SET R2 POS 0

| FROM FIG. | LINE TITLE |
|---|---|
| 51 | SET LOSC |

RESET R2 POS 0

| FROM FIG. | LINE TITLE |
|---|---|
| 51 | RESET LOSC |

SET R2 POS 1

| FROM FIG. | LINE TITLE |
|---|---|
| 28 | SET TC 1 |
| 56 | SET DATA CHECK (STOP BIT ERROR) |
| 66 | LINE ECHO |
| 72 | R2 POS 1 (DATA CHK) |
| 83 | T/C 1 PARITY CHK SET DTA CHK |
| 75 | T/C 1 LRC SET DTA CHK |

RESET R2 POS 1

| FROM FIG. | LINE TITLE |
|---|---|
| 26 | RESET TC FIELD |
| 56 | RST SENSE-REC CHAR SVC |
| 26 | RESET SENSE FIELD |

SET R2 POS 2

| FROM FIG. | LINE TITLE |
|---|---|
| 62 | SET SEQ END & END |
| 29B | SET END |
| 28 | SET TC 2 |
| 29B | SET END & UNIT CHK |

RESET R2 POS 2

| FROM FIG. | LINE TITLE |
|---|---|
| 26 | RST TC FIELD |
| 26 | RST STATUS FIELD |

SET R2 POS 3

| FROM FIG. | LINE TITLE |
|---|---|
| 54 | SET TIME BIT |
| 21 | SET UNIT CHK |

RESET R2 POS 3

| FROM FIG. | LINE TITLE |
|---|---|
| 26 | RST STATUS FIELD |
| 46 | RST P OSC & TIME BIT |
| 62 | RST TIME BIT (END) |
| 46 | RST TIME BIT |

FIG. 37

SET R2 POS 4

| FROM FIG. | LINE TITLE |
|---|---|
| 62 | SET UNIT EXCEPTION |
| 28 | SET CMD BIT 7 |
| 48 | WRAP INIT WRITE |
| 72 | UNIT EXC (T/C 1) |
| 77 | UNIT EXC (T/C 2) |

RESET R2 POS 4

| FROM FIG. | LINE TITLE |
|---|---|
| 26 | RST STATUS FIELD |
| 29B | LOAD PSEUDO CMD |
| 31 | RST CMD FIELD |

SET R2 POS 5

| FROM FIG. | LINE TITLE |
|---|---|
| 28 | SET CMD BIT 6 |
| 21 | SET R2 POS 5 (STACK) |
| 26 | SET STACK |
| 48 | WRAP INIT READ |

RESET R2 POS 5

| FROM FIG. | LINE TITLE |
|---|---|
| 31 | RST CMD FIELD |
| 26 | RST STACK STATUS |

SET R2 POS 6

| FROM FIG. | LINE TITLE |
|---|---|
| 28 | SET CMD BIT 5 |
| 48 | WRAP INIT WRITE |
| 10A | SET R2 POS 6 (I/O POS 0 TO BFR) |
| 26 | LOAD CONTROL CMD |

RESET R2 POS 6

| FROM FIG. | LINE TITLE |
|---|---|
| 47 | RST DATA BUFFER |
| 31 | RST CMD FIELD |

SET R2 POS 7

| FROM FIG. | LINE TITLE |
|---|---|
| 28 | SET CMD BIT 4 |
| 10A | SET R2 POS 7 (BFR) |
| 26 | LOAD CONTROL CMD |

RESET R2 POS 7

| FROM FIG. | LINE TITLE |
|---|---|
| 47 | RST DATA BUFFER |
| 31 | RST CMD FIELD |

FIG. 38

SET R2 POS 8

| FROM FIG. | LINE TITLE |
|---|---|
| 10A | SET R2 POS 8 (BFR) |
| 62 | INITIATE RECEIVE |
| 91 | SET RCV (R2 POS 8) |

RESET R2 POS 8

| FROM FIG. | LINE TITLE |
|---|---|
| 46 | FALSE START RST RECEIVING |
| 47 | INITIATE TRANSMIT (RST REC LA) |
| 56 | RST SENSE-REC. CHAR SVC |
| 62 | RST RECEIVING |
| 47 | RST DATA BUFFER |

SET R2 POS 9

| FROM FIG. | LINE TITLE |
|---|---|
| 47 | SET SEQ BIT 1 (R2 POS 9) |
| 62 | SET SEQ END & END |
| 54 | SET PREP END SEQ |
| 10A | SET R2 POS 9 (I/O POS 3) |
| 80 | SET R2 POS 9 (T/C 2 SEQ) |
| 73 | T/C 1 SET PREP END SEQ |
| 101 | SET SEQ BIT 1 (R2 POS 9) |

RESET R2 POS 9

| FROM FIG. | LINE TITLE |
|---|---|
| 31 | RST SEQ FIELD |
| 74 | RST ON BREAK ENABLE DISABLE |
| 47 | RST DATA BUFFER |
| 80 | RESET R2 POS 9 (T/C 2 SEQ) |

SET R2 POS 10

| FROM FIG. | LINE TITLE |
|---|---|
| 46 | RST SERIAL DATA & SET SEQ |
| 54 | SET HALT SEQ |
| 10A | SET R2 POS 10 (BFR) |
| 54 | SET PREP END SEQ |
| 62 | SET SEQ END & END |
| 80 | SET R2 POS 10 (T/C 1 SEQ) |
| 101 | SET SEQ BIT 2 (R2 POS 10) |
| 73 | T/C 1 SET PREP END SEQ |

RESET R2 POS 10

| FROM FIG. | LINE TITLE |
|---|---|
| 31 | RST SEQ FIELD |
| 47 | RST DATA BUFFER |
| 80 | RESET R2 POS 10 (T/C 1 SEQ) |

FIG. 39

SET R2 POS 11

| FROM FIG. | LINE TITLE |
|---|---|
| 10A | SET R2 POS 11 (I/O POS 5 TO BFR) |
| 80 | SET R2 POS 11 (T/C I SEQ) |

RESET R2 POS 11

| FROM FIG. | LINE TITLE |
|---|---|
| 31 | RST SEQ FIELD |
| 47 | RST DATA BUFFER |
| 80 | RESET R2 POS 11 (T/C 2 SEQ) |
| 73 | T/C 1 SET PREP END SEQ |

SET R2 POS 12

| FROM FIG. | LINE TITLE |
|---|---|
| 101 | SET CHAR SVC (R2 POS 12) |
| 10A | SET R2 POS 12 (BFR) |
| 25B | SET CHAR SVC ON POLL |
| 47 | SET CHAR SVC |
| 73 | T/C 1 SET (CHAR SVC) |

RESET R2 POS 12

| FROM FIG. | LINE TITLE |
|---|---|
| 54 | RST CHAR SVC |
| 25A | RST R2 POS 12 (CHAR SVC) |
| 56 | RST SENSE-REC. CHAR SVC |
| 47 | RST DATA BUFFER |
| 31 | RST CHAR SVC ON BREAK |
| 26 | RST R2 POS 12 (CHAR SVC) |

SET R2 POS 13

| FROM FIG. | LINE TITLE |
|---|---|
| 28 | SET MODE BIT 1 |
| 10A | SET R2 POS 13 (BFR) |
| 80 | SET R2 POS 13 (FIGS MODE) |
| 72 | SET TEXT IN MODE |

RESET R2 POS 13

| FROM FIG. | LINE TITLE |
|---|---|
| 26 | RST MODE FIELD |
| 72 | SET CONTROL MODE (T/C 1) |
| 47 | RST DATA BUFFER |
| 80 | RST R2 POS 13 (LETTERS MODE) |
| 72 | SET LRC SEQ (T/C 1) |

SET R2 POS 14

| FROM FIG. | LINE TITLE |
|---|---|
| 28 | SET MODE BIT 2 |
| 72 | SET LRC SEQ (T/C 1) |

RESET R2 POS 14

| FROM FIG. | LINE TITLE |
|---|---|
| 26 | RST MODE |
| 72 | SET CONTROL MODE (T/C 1) |
| 72 | SET TEXT IN MODE |

SET R2 POS 15

| FROM FIG. | LINE TITLE |
|---|---|
| 28 | SET MODE BIT 4 |

RESET R2 POS 15

| FROM FIG. | LINE TITLE |
|---|---|
| 26 | RST MODE |
| 72 | SET CONTROL MODE (T/C 1) |
| 72 | SET LRC SEQ (T/C 1) |
| 72 | SET TEXT IN MODE |

Jan. 2, 1968 D MACKIE ET AL 3,362,015

COMMUNICATION SWITCHING ADAPTER

Filed June 30, 1964 30 Sheets-Sheet 40

Jan. 2, 1968 D MACKIE ET AL 3,362,015

COMMUNICATION SWITCHING ADAPTER

Filed June 30, 1964 99 Sheets-Sheet 42

Jan. 2, 1968 D. MACKIE ET AL 3,362,015

COMMUNICATION SWITCHING ADAPTER

Filed June 30, 1964

93 Sheets-Sheet 44

Jan. 2, 1968 D MACKIE ET AL 3,362,015

COMMUNICATION SWITCHING ADAPTER

Filed June 30, 1964 99 Sheets-Sheet 46

Jan. 2, 1968 D MACKIE ET AL 3,362,015

COMMUNICATION SWITCHING ADAPTER

Filed June 30, 1964 90 Sheets-Sheet 55

Jan. 2, 1968 D. MACKIE ET AL 3,362,015

COMMUNICATION SWITCHING ADAPTER

Filed June 30, 1964 90 Sheets-Sheet 58

Jan. 2, 1968 D MACKIE ET AL 3,362,015

COMMUNICATION SWITCHING ADAPTER

Filed June 30, 1964

99 Sheets-Sheet 64

Jan. 2, 1968 D. MACKIE ET AL 3,362,015

COMMUNICATION SWITCHING ADAPTER

Filed June 30, 1964 99 Sheets-Sheet 68

Jan. 2, 1968 D MACKIE ET AL 3,362,015

COMMUNICATION SWITCHING ADAPTER

Filed June 30, 1964

99 Sheets-Sheet 74

Jan. 2, 1968 D MACKIE ET AL 3,362,015

COMMUNICATION SWITCHING ADAPTER

Filed June 30, 1964

99 Sheets-Sheet 85

Jan. 2, 1968 D. MACKIE ET AL 3,362,015

COMMUNICATION SWITCHING ADAPTER

Filed June 30, 1964 99 Sheets-Sheet 86

Jan. 2, 1968 D MACKIE ET AL 3,362,015

COMMUNICATION SWITCHING ADAPTER

Filed June 30, 1964 99 Sheets-Sheet 87

Jan. 2, 1968 D MACKIE ET AL 3,362,015

COMMUNICATION SWITCHING ADAPTER

Filed June 30, 1964 99 Sheets-Sheet 88

Jan. 2, 1968 D. MACKIE ET AL 3,362,015

COMMUNICATION SWITCHING ADAPTER

Filed June 30, 1964 99 Sheets-Sheet 89

Jan. 2, 1968 D. MACKIE ET AL 3,362,015

COMMUNICATION SWITCHING ADAPTER

Filed June 30, 1964 99 Sheets-Sheet 91

Jan. 2, 1968 D. MACKIE ET AL 3,362,015

COMMUNICATION SWITCHING ADAPTER

Filed June 30, 1964 99 Sheets-Sheet 97

Jan. 2, 1968 D MACKIE ET AL 3,362,015

COMMUNICATION SWITCHING ADAPTER

Filed June 30, 1964 99 Sheets-Sheet 98

LINE ADAPTER FOR LINE ADDRESS 2 (DIAL)

3,362,015
COMMUNICATION SWITCHING ADAPTER

David Mackie, Woodstock, and Leo T. O'Connor, Jr., Hyde Park, N.Y., assignors to International Business Machines Corporation, New York, N.Y., a corporation of New York Filed June 30, 1964, Ser. No. 379,290
11 Claims. (Cl. 340—172.5)

ABSTRACT OF THE DISCLOSURE

Apparatus for buffering between a plurality of telegraph lines and a computer in which the lines are scanned by a multiplexer operating in synchronism with two parallel recirculating memories. The memories contain line control words, one assigned to each telegraph line. Common control logic is allocated to each telegraph line in turn as they are scanned. Terminal control logic is provided such that different data rates, character lengths, and other characteristics of different terminals may be accommodated. The correct terminal control logic is selected by coded bits stored in each line control word, thus allowing the intermixing of terminal types.

An added stage of buffering is provided in the form of an auxiliary recirculating memory, which recirculates at a faster rate than the parallel memories. The auxiliary memory provides for a much faster scanning of the lines so that more lines can be attached to the apparatus.

Automatic dialing apparatus is provided such that the computer, through the control apparatus, can dial a particular telephone subscriber, obtain a connection and then transfer data via the connection. The dialing apparatus also operates on a multiplex basis.

CROSS REFERENCES TO RELATED APPLICATIONS

Co-pending patent application Ser No. 379,177, D. Mackie et al., filed June 30, 1964, and patent application Ser. No. 379,091, J. Carthew et al., filed June 30, 1964, have drawings and specifications substantially identical to this specification and drawings.

The computer system in which the present invention may be used is more fully described in U.S. patent application, Ser. No. 357,372, G. M. Amdahl et al., filed Apr. 6, 1964, and U.S. patent application Ser. No. 357,369, L. E. King et al., filed Apr. 6, 1964.

FIELD OF THE INVENTION

This invention relates to data transmission apparatus. More specifically, the invention relates to means for electronically connecting a data processing system to a communication switching system.

SUMMARY OF PREVIOUS STATE OF THE ART

A telephone service which makes use of the capabilities of a switched telephone network to transport data has been developed by communications carriers. In this service, a customer's data processing unit is coupled to a telephone network through a telephone data set. The customer originates a call in the same manner as a voice telephone call is placed. After receiving a voice answer from an attendant at the called station or upon recognizing an answer signal from an unattended station, data is transmitted over the telephone line through the data set.

Prior equipment adapting data processing systems to communication networks require either a full-time connection with each remote user, or manual dialing whenever the connection is necessary. Therefore, each customer must either lease a telephone line continuously connected to the central computer, or an operator must establish the connection whenever communication is desired.

Prior automatic dialing apparatus for use with data processing systems operate in the following illustrative manner. Each one of a number of remote users is assigned a telephone number. The total number of remote users may be larger than the number of telephone lines available to the data processing system. The number of lines only limits the number of users which may simultaneously communicate with the central processor. Each telephone line has at the computer location a data telephone set (permitting use of voice telephone lines for computer signals) and an automatic calling unit ACU (permitting electronic "dialing" of telephone numbers). Each data telephone set, and thus each associated telephone line, is connected to a different data channel of the data processor. Each automatic calling unit is also connected to a data channel as well as to a communication switching adapter. The adapter is connected to a special dialing channel of the processor.

When a data processing system data channel is prepared to communicate with a remote user, a message identifying a selected automatic calling unit and the telephone number of the user is supplied by the data processing system on the dialing channel. The apparatus reacts to the information on the dialing channel by testing the selected ACU, and if it is idle, initiating dialing of the desired remote user's telephone number. Once the telephone equipment establishes a connection, the remote user communicates directly with the data processing system via the data channel and the data set associated with the selected automatic calling unit. The apparatus is then free to connect another data channel with another user immediately after completion of the dialing of the user's telephone number. Completion of the communication by the user is recognized by the adapter which in turn notifies the processor.

In prior art systems substantial control of the dialing and connecting functions is carried on by the processor itself, thus tying up valuable computing time. In prior apparatus control lines from a particular automatic calling unit are gated through the dial apparatus. This allows the computer to monitor the lines from only one out of a plurality of automatic calling units. Thus the progress of each call during the time a connection is being set up can be monitored for only one line until the call has been established. Then the computer may go on to establish the next connection. Since making a telephone connection involves milliseconds and a computer operates in fractions of a microsecond, valuable time is lost.

STATEMENT OF THE OBJECTS OF THE PRESENT INVENTION

It is an object of this invention to provide apparatus for automatically establishing a connection, via available communication networks, between a centrally located data processing system and remotely located communication devices.

Another object of this invention is to provide improved apparatus for allowing a data processing system to automatically communicate with distant locations for the transfer of data information between the distant locations and the computer via communication paths which are established as needed under control of the computer.

A further object is to provide apparatus adapting a data processor to automatic operation of switching equipment associated with a communication network connecting the processor with a plurality of geographically remote data sources.

An additional object of this invention is to provide apparatus to be utilized by a computer to operate telephone switching equipment in order to establish telephone line connections between remotely located equipment and the computer for data transfer over the telephone lines.

It is also an object of this invention to provide for automatically establishing a data path between a computer and telephone equipment which will operate relatively independently of the central processing unit.

It is still another object of this invention to provide control apparatus which will continuously monitor the control lines from switching apparatus and take appropriate action in response thereto.

A further object of this invention is to provide a dial telephone adapter which will automatically detect error conditions on a plurality of switching paths and communicate the error conditions to the central processing unit.

SUMMARY OF THE INVENTION AND ITS ADVANTAGES

Briefly stated, the above objects are achieved by a communication control unit including a dial control section for passing dial information and establishing a telephone connection between the control unit and a telephone line. The communication control unit contains a recirculating memory having a line control word (LCW) available for control and storage of dialing information for a plurality of telephone lines. Once the computer has established connection with the control unit, it transfers the address of a desired automatic calling unit along with the dial command. The address selects the correct LCW and the command is stored in the line control word associated with that address. Now the control unit handles the entire dialing sequence by presenting the dialing digits at the request of the automatic calling unit and determines when and if the connection is established. When the connection is made the dial command is terminated and the line control word is available to service the data communication line via the associated data set. If the connection was not made the control unit trys to make the call again.

In accordance with a further aspect of the invention, the control unit has the ability to monitor the progress of all calls being performed every revolution of the recirculating memory, which relieves the main stored program in the central computer of the burden of monitoring the procedure for establishing a connection.

The invention has the advantage that the recirculating memory acts as both a control and a data transfer path. It passes dial information directly and monitors the sequence of operations for connecting the telephone line with the computer. Once the data path is connected the recirculating memory performs the normal data communication transfer functions by passing data from the computer to the data set. Thus, the control unit acts as a small computer with its own stored program to relieve the main computer program of the burden of monitoring step by step the connection of the data path.

The invention has the further advantage that the dialing and disconnect commands are very simple.

The invention also has the advantage that when dial digits are being passed to one automatic calling unit, the remaining calling units are monitored for control responses.

The foregoing and other objects, features, and advantages of the invention will be apparent from the following more particular description of a preferred embodiment of the invention, as illustrated in the accompanying drawings.

Figure 1:
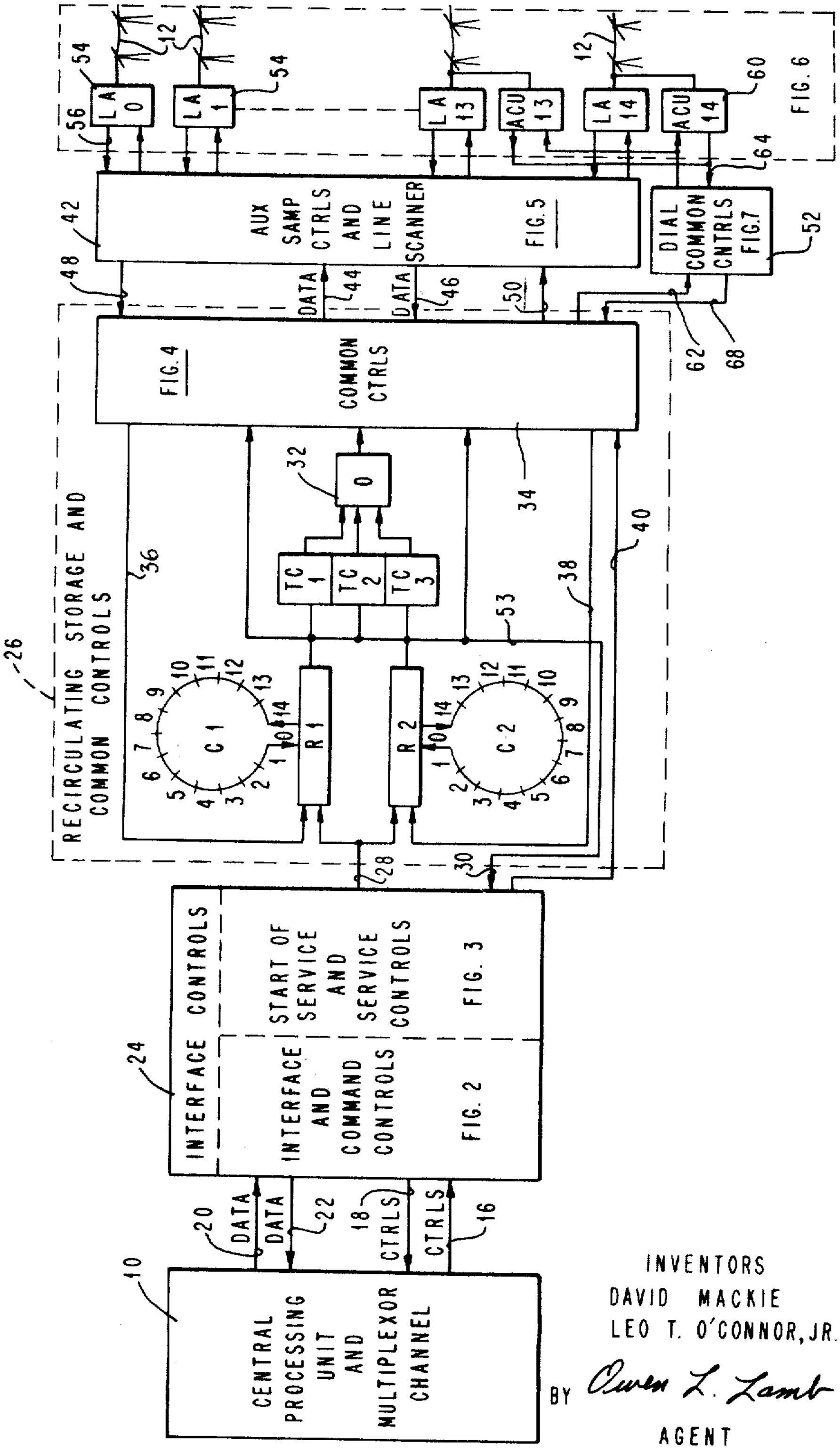
FIG. 1 is a simplified block diagram of a transmission control unit in which the invention is embodied.
Figures 2, 6A:
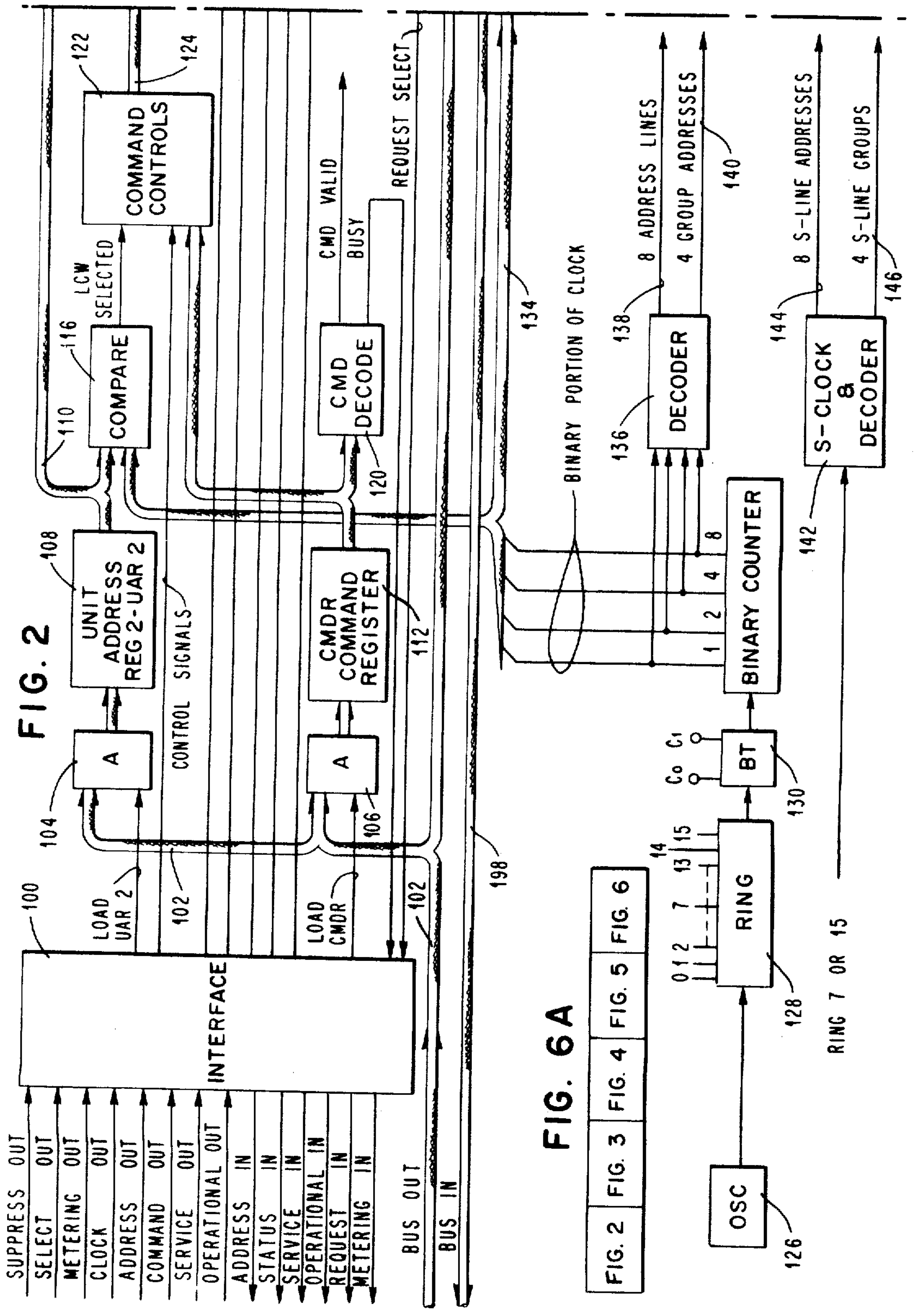
FIGS. 2 through 6 when placed as illustrated by FIG. 6A comprise a more detailed block diagram of the transmission control unit shown in FIG. 6.

The following figures are schematic block diagrams of the various portions of the embodiment of the present invention which is shown in FIG. 1 and in FIGS. 2 thru 7, or are illustrative drawings when so designated. A number preceding each line designates the figure number from which the line originates. The designation "IF" preceding an input line indicates that that line comes from the computer-transmission control unit interface. A chart of outputs of the figures follows the description of figures and shows to which figures a given line goes.

| Figure No. | Title | Sheet No. |
|---|---|---|
| 8 | Line Control Word Format (Illus.) | 8 |
| 9 | Chart Showing Relative Timing of S-Line and C-Line (Illus.). | 9 |
| 10A & B | Input/Output (I/O) Register | 10, 11 |
| 11 | Command Controls | 12 |
| 12 | Reset Controls | 12 |
| 13 | Unit Address Register 1 (UAR 1) | 13 |
| 14 | Unit Address Register 2 (UAR 2) and Address Decoder. | 14 |
| 15 | OR To Bus In 4, 5, 6, and 7 | 15 |
| 16 | OR To Bus In 0, 1, 2, and 3 | 15 |
| 17 | Interface Control Details | 16 |
| 18 | Command Out Delayed Trigger and Parity Check on Command Byte Trigger. | 17 |
| 19 | Command Register (CMDR) | 18 |
| 20 | Status In, XCU Busy, and XCU Busy Reset Control Triggers. | 19 |
| 21 | Stack Service Cycle Trigger | 20 |
| 22 | Write Trigger and Control Details | 21 |
| 23 | Service Cycle and Reset Service Op Triggers | 22 |
| 24 | "Select Line Control Word on UAR 1 & Clock Compare" and Other Control Details. | 23 |
| 25A & B | Request Select, In Path Busy, and Character service triggers. | 24, 25 |
| 26 | Controls for Loading a Command Into the Line Control Word. | 26 |
| 27 | Halt I/O and Selective Reset Trigger | 27 |
| 28 | Controls for Setting TC Bits, Mode Bits, and Command Bits into the Line Control Word. | 27 |
| 29A & B | Command Controls | 28, 29 |
| 30 | Service In Trigger and "Gate I/O to Buffer" Line. | 30 |
| 31 | Control Details | 31 |
| 32 | Lines that Set or Reset R1 Position 0, 1, and 2 | 32 |
| 33 | Lines that Set or Reset R1 Position 3, 4, 5, and 6. | 33 |
| 34 | Lines that Set or Reset R1 Position 7, 8, 9, and 10. | 34 |
| 35 | Lines that Set or Reset R1 Position 11, 12, 13, 14, and 15. | 35 |
| 36 | Lines that Set or Reset R2 Position 0, 1, 2, and 3. | 36 |
| 37 | Lines that Set or Reset R2 Position 4, 5, 6, and 7. | 37 |
| 38 | Lines that Set or Reset R2 Position 8, 9, and 10 | 38 |
| 39 | Lines that Set or Reset R2 Position 11, 12, 13, 14, and 15. | 39 |
| 40 | Access Register R1 | 40 |
| 41 | Access Register R2 | 40 |
| 42 | C1 Delay Line, and C1 Shift Cells 1 & 2 | 41 |
| 43 | C2 Delay Line, and C2 Shift Cells 1 & 2 | 42 |
| 44A | Bit Shifting, Strobe Time, Start Time, and Stop Time Triggers. | 43 |
| 44B | Serial Data to Data Buffer, and Data Buffer to Serial Data Triggers. | 43 |
| 45 | Control Details for C1 and C2 | 44 |
| 46 | Initiate Receive Trigger and Other Control Logic. | 45 |
| 47 | Initiate Transmit Trigger and Other Control Logic. | 46 |
| 48 | Auto Wrap, Wrap TC 1, and Wrap TC 2 Triggers | 47 |
| 49 | Basic Oscillator, Clock Ring, and Timing Pulses C0, C1, and T0–T15. | 48 |
| 50 | Timeout Oscillator, Present Oscillator Sample, Timeout and Prep Add Triggers. | 49 |
| 51 | Oscillator Change Exclusive OR | 50 |
| 52 | Add Trigger and First and Last One-Half Bit Timing Lines. | 50 |
| 53 | Binary Counter, Line Address 0–7, and Group Address 0, 1, 2, and 3. | 51 |
| 54 | Logic to Set Halt Sequence and Prep End Sequence and Reset Character Service. | 52 |
| 55 | Command Decoding and Receive Base Latch | 53 |
| 56 | Line Break and Overrun Trigger | 54 |
| 57 | Sequence Decoding | 55 |
| 58 | Terminal Address Bit 1 and 2 Triggers and Receiving Triggers. | 56 |
| 59 | Strobe Count Decode | 56 |
| 60 | Bit Count Decode | 56 |
| 61 | Mode Field Decode | 56 |
| 62 | Sequence Control Logic | 57 |
| 63A & B | Wrap Data Trigger, Space, and Mark OR Circuits. | 58, 59 |
| 64 | Serial Data Line | 59 |
| 65 | Receive Operation, Transmit Operation Triggers. | 60 |
| 66 | Equipment and Line Echo Logic | 61 |
| 67 | Transmit and Receive Timing Oscillators | 62 |
| 68 | Dual Line Speed Oscillator | 62 |
| 69 | T/C 1 Stop Strobe Time | 63 |
| 70 | Auto Wrap Logic and Select Dual Line Speed | 63 |
| 71 | Terminal Oscillator Lines and Change Oscillator Lines. | 64 |
| 72 | Terminal Control TC 1 Logic-Character Decoder and Bit Count Decoder. | 65 |
| 73 | Terminal Control TC 1 Control Logic | 66 |
| 74 | Terminal Control TC 1 Logic, LRC Gen. Trigger. | 67 |
| 75 | Terminal Control TC 1 LRC Logic | 68 |
| 76 | Terminal Control TC 2 Selection Logic | 69 |
| 77 | Terminal Control TC 2 Control Logic | 69 |
| 78 | Terminal Control TC 2 Control Logic | 70 |
| 79 | Terminal Control TC 2 Control Logic | 71 |
| 80 | Set Sequence and Set Mode Logic (TC 2) | 72 |
| 81 | Character Decoder for Terminal Control 2 (TC 2). | 72 |
| 82 | TC Bit Decoder for Terminal 1 | 73 |

| Figure No. | Title | Sheet No. |
|---|---|---|
| 83 | Parity Check Logic for Terminal 1 | 73 |
| 84 | Common OR Circuits for Line Adapter Output Lines. | 74 |
| 85 | Line Adapter for Line Address 0 | 75 |
| 86 | Auxiliary Line Ring Clock Drive | 76 |
| 87 | Auxiliary Sampling Line Clock | 77 |
| 88 | Auxiliary Sampling Line Timing Pulses (TS0-TS7). | 78 |
| 89 | Auxiliary Sampling Line Oscillator Gate | 79 |
| 90 | Auxiliary Sampling Line Address Decoder | 80 |
| 91 | Auxiliary Sampling Line Control Logic | 81 |
| 92 | Auxiliary Sampling Line Oscillator Gating to Line Adapters. | 82 |
| 93 | Logic for Gated Oscillator to LOS Register | 82 |
| 94 | Auxiliary Sampling Line Transmit Buffer and Transmit Receive Trigger. | 83 |
| 95 | Auxiliary Sampling Line Bit Service Buffer and Bit Service Trigger. | 84 |
| 96 | Auxiliary Sampling Line Control Logic | 85 |
| 97 | Auxiliary Sampling Delay Line, Data Buffer and Data Bit Trigger. | 86 |
| 98 | Auxiliary Sampling Line, Sample Time, Prep Add and Add Triggers. | 87 |
| 99A & B | Auxiliary Sampling Line Access Register | 88, 89 |
| 100 | Auxiliary Sampling Delay Line | 90 |
| 101 | Automatic Dialing Unit, Logic for Setting R2 Positions. | 91 |
| 102 | Automatic Dialing Unit, Dial Address Register | 92 |
| 103 | Dial Address Decoding | 93 |
| 104 | Dial Digit Register | 93 |
| 105 | Automatic Dialing Unit Control Logic and DP Trigger. | 94 |
| 106 | Dial Busy and DS Triggers | 95 |
| 107 | Automatic Dialing Unit, Common OR Circuit for Lines from Automatic Calling Unit. | 96 |
| 108 | Automatic Dialing Unit Gated Lines to and from Automatic Calling Unit. | 97 |
| 109 | Dial-Digit Leads to Automatic Calling Unit | 97 |
| 110 | Line Adapter for Line Address 2 (Dial) | 98 |
| 111 | Automatic Calling Unit, Data Sets and Automatic Calling Unit for Addresses 2-7. | 99 |

CHART OF OUTPUTS OF THE FIGURES

| FIG. # | Line Title | Goes to FIG. # |
|---|---|---|
| Interface (1F). | Suppress out | 23, 25B, 27, 31 |
| | Select out | 27 |
| | Hold out | 17 |
| | Address out | 17, 27, 31 |
| | Command out | 18, 21, 30, 31 |
| | Service out | 20, 22, 31 |
| | Operational out | 12, 17, 27, 31 |
| | Bus out 0 | 10A |
| | Bus out 1 | 10A |
| | Bus out 2 | 10A |
| | Bus out 3 | 10A |
| | Bus out 4 | 10A, 10B |
| | Bus out 5 | 10A, 10B |
| | Bus out 6 | 10A, 10B |
| | Bus out 7 | 10A, 10B |
| | Bus out 8 (Parity) bit | 10A |
| 10A | I/O POS 0 to Bus in | 16 |
| 10A | Set R2 POS 6 (BFR) | 37 |
| 10A | Parity check | 18 |
| 10A | Not Bus out Parity Check | 17 |
| 10A | I/O POS 1 to Bus in | 16 |
| 10A | Set R2 POS 7 (BFR) | 37 |
| 10A | I/O POS 2 to Bus in | 16 |
| 10A | Set R2 POS 8 (BFR) | 38 |
| 10A | I/O POS 3 to Bus in | 16 |
| 10A | Set R2 POS 2 (BFR) | 38 |
| 10B | I/O REG POS 4 | 25B |
| 10B | I/O POS 4 to Bus in | 15 |
| 10B | Set R2 POS 10 (BFR) | 38 |
| 10B | I/O POS 5 to Bus in | 15 |
| 10B | Set R2 POS 11 (BFR) | 39 |
| 10B | I/O POS 6 to Bus in | 15 |
| 10B | Set R2 POS 12 (BFR) | 39 |
| 10B | I/O POS 7 to Bus in | 15 |
| 10B | Set R2 POS 13 (BFR) | 39 |
| 11 | LCW Selected | 29A, 30, 31, 45, 21, 26 |
| 11 | CMD Present in LCW | 22, 45 |
| 11 | Rec-reject CMD | 29B |
| 11 | Command accepted | 29A, 29B, 26 |
| 12 | Reset XCU | 19, 31, 21, 24, 25A, 63B, 105, 108 |
| 12 | Block Input to MEM on Reset | 42, 43 |
| 12 | Not reset XCU | 53, 17 |
| 13 | UAR 1 & UAR 2 Compare | 24 |
| 13 | UAR 1 POS 1 to Bus in | 15 |
| 13 | UAR 1 POS 2 to Bus in | 15 |
| 13 | UAR 1 POS 4 to Bus in | 15 |
| 13 | UAR 1 POS 8 to Bus in | 15 |
| 13 | UAR 1 POS 16 to Bus in | 16 |
| 13 | Not UAR 1 POS 16 to Bus in | 16 |
| 13 | CLK & UAR 1 Compare | 23 |
| 14 | UAR 2 POS 1 to Bus in | 15 |
| 14 | UAR 2 POS 2 to Bus in | 15 |
| 14 | UAR 2 POS 4 to Bus in | 15 |
| 14 | UAR 2 POS 8 to Bus in | 15 |

CHART OF OUTPUTS OF THE FIGURES—Continued

| FIG. # | Line Title | Goes to FIG. # |
|---|---|---|
| 14 | UAR 2 POS 16 to Bus in | 16 |
| 14 | Not UAR 2 POS 16 to Bus in | 16 |
| 14 | UAR 2 & CLK Compare | 11 |
| 14 | Not ADR Limit | 17 |
| 14 | Our Address | 17 |
| 15 | Bus in 7 | IF |
| 15 | Bus in 6 | IF |
| 15 | Bus in 5 | IF |
| 15 | Bus in 4 | IF |
| 16 | Bus in 3 | IF |
| 16 | Bus in 2 | IF |
| 16 | Bus in 1 | IF |
| 16 | Bus in 0 | IF |
| 17 | Not address out | 20, 23 |
| 17 | Request in | IF |
| 17 | Selected | 23 |
| 17 | False ADR | 19 |
| 17 | Gate Bus out to UAR 2 | 14 |
| 17 | CU Busy | 30 |
| 17 | Command cycle | 27, 22, 20, 18, 21 |
| 17 | Not Command cycle | 23 |
| 17 | Select out | IF |
| 18 | CMD Out Delayed TGR | 20 |
| 18 | Not CMD Out Dlyd | 20 |
| 18 | Not CMD Out | 20 |
| 18 | Gate Bus Out to CMDR | 19 |
| 18 | Parity Chk On CMD Byte | 20, 21 |
| 19 | CMD Reg 2 | 29A |
| 19 | Not CMD Reg 2 | 29A |
| 19 | CMD Reg 3 | 28, 29A |
| 19 | Not CMD Reg 3 | 29A |
| 19 | CMD Reg 4 | 28, 29A |
| 19 | Not CMD Reg 4 | 29A |
| 19 | CMD Reg 5 | 28, 29A |
| 19 | Not CMD Reg 5 | 29A |
| 19 | CMD Reg 6 | 28, 29A |
| 19 | Not CMD Reg 6 | 29A |
| 19 | CMD Reg 7 | 28, 29A |
| 19 | Not CMD Reg 7 | 29A |
| 19 | Reset UAR 2 | 14 |
| 20 | Gate UAR 1 to Bus in | 13 |
| 20 | Gate UAR 2 to Bus in | 14 |
| 20 | ADR in 30 | IF |
| 20 | Status In TGR | 23, 30, 31 |
| 20 | Set Service in TGR | 30 |
| 20 | Unit Check Command Parity Check | 15 |
| 20 | Unit Check Invalid Command | 15 |
| 20 | Not Valid Test or No OP | 21 |
| 20 | XCU Busy | 22, 23, 17, 11 |
| 20 | XCU Not Busy | 17, 25A, 27 |
| 20 | XCU Busy Rst Ctrl TGR | 24 |
| 21 | Set Bus out P CHK | 32 |
| 21 | Normal CMD Op | 31, 26 |
| 21 | Set R2 POS 5 (Stack) | 37 |
| 21 | Set Unit Check | 36, 25A |
| 21 | Set CMD Reject | 33 |
| 21 | Set XCU Busy (Stack) | 20 |
| 21 | Stack Service Cycle | 26 |
| 21 | Not Stack Service Cycle | 31, 11 |
| 22 | Stacked Status | 23 |
| 22 | Gate Bus Out to I/O | 10A |
| 22 | In Service | 24, 25A, 23 |
| 22 | Metering In | IF |
| 22 | Operational In | 30 |
| 22 | Not Operational In | 17, 54 |
| 23 | Service Cycle | 18, 20, 22, 31, 21 |
| 23 | Gate I/O To Bus In | 10B, 21 |
| 23 | Reset Service Op (Sup Status) | 24 |
| 23 | Not Inhibit Select | 17 |
| 23 | Request Select | 17 |
| 23 | Not Suppress Out | 12 |
| 24 | Set Inhibit Sel TGR | 23 |
| 24 | RST REQ Sel UAR 1 & UAR 2 Comp. | 25A |
| 24 | Not BLK REQ Sel | 25A |
| 24 | RST SVC OP | 10B, 25B, 30, 31, 21, 25A, 22, 13 |
| 24 | Sel LCW on UAR 1 & CLK Comp | 11, 26, 30, 31, 25B, 45 |
| 25A | REQ Sel | 23 |
| 25A | In Path Busy | 24 |
| 25A | Gate CLK to UAR 1 | 13, 46 |
| 25A | RST R2 POS 12 Char SVC | 39 |
| 25A | Sample Status | 22 |
| 25A | Set CH End & DEV End | 10B |
| 25B | Set Unit EXC in I/O REG | 10B |
| 25B | Signal Zero Status | 25A |
| 25B | Set Unit CHK into I/O REG | 10B, 25A |
| 25B | Set CHAR SVC on Poll | 39 |
| 25B | Set CHAR SVC TGR | 25A |
| 25B | CHAR SVC TGR | 24, 30, 25A, 46, 20, 22 |
| 25B | Not CHAR SVC TGR | 23, 11, 26, 20 |
| 25B | Set End on Sense | 29B |
| 25B | Suppress Out Sample | IF |
| 26 | Reset Sense Field | 32, 33, 36 |
| 26 | Gate CMDR to LCW | 28 |
| 26 | Reset TC Field | 36 |
| 26 | Gate CMDR to TC Field | 28 |
| 26 | Reset Mode Field | 39 |
| 26 | Gate CMDR to Mode Field | 28 |
| 26 | Load Control CMD | 37 |
| 26 | Reset XCU Busy | 21, 11, 27, 20, 19, 18 |
| 26 | RST R2 POS 12 (CHAR SVC) | 39 |
| 26 | Set Bus Out P CHK | 21 |
| 26 | Set Stack | 37 |
| 26 | RST Status Field | 36, 37 |

CHART OF OUTPUTS OF THE FIGURES—Continued

| FIG. # | Line Title | Goes to FIG. # |
|---|---|---|
| 26 | RST Stack Status | 37 |
| 27 | Set Busy (Halt) | 20 |
| 27 | Halt I/O TGR | 30, 31, 21, 29B, 62 |
| 27 | Not Halt I/O TGR | 45, 62 |
| 27 | Select Reset TGR | 31, 45, 21 |
| 27 | Not Select Reset TGR | 45 |
| 27 | Reset CR & UAR 2 | 19 |
| 27 | Set Busy (Sel-Reset) | 20 |
| 28 | Set TC 2 | 36 |
| 28 | Set TC 1 | 36 |
| 28 | Set Mode Bit 4 | 39 |
| 28 | Set Mode Bit 2 | 39 |
| 28 | Set Mode Bit 1 | 39 |
| 28 | Set Command Bit 4 | 37 |
| 28 | Set Command Bit 5 | 37 |
| 28 | Set Command Bit 6 | 37 |
| 28 | Set Command Bit 7 | 37 |
| 29A | Load CMD FLD | 26 |
| 29A | Load Mode FLD | 26 |
| 29A | Load TC FLD | 26 |
| 29A | Write Function at CMDR | 47 |
| 29A | Not Read Type CMD | 11 |
| 29A | No OP CMD At CR | 20 |
| 29A | Test I/O CMD | 20 |
| 29A | Not Sense At CR | 26 |
| 29A | Valid CMD At CR | 21 |
| 29A | Invalid CMD | 21, 20 |
| 29A | Sad CMD At CR | 29B |
| 29A | Break Type CMD at CR | 31 |
| 29A | Not Test I/O CMD | 11 |
| 29A | Enable or Disable at CR | 31 |
| 29A | Not En/Dis-able CMD | 11 |
| 29B | Load Psudo CMD | 37 |
| 29B | Set End & Unit Check | 36 |
| 29B | Halt | 73, 54 |
| 29B | Not Halt | 79 |
| 29B | Set End | 36 |
| 30 | Address In | IF |
| 30 | Status In | IF |
| 30 | Service In | IF |
| 30 | Service in TGR | 22, 23, 31 |
| 30 | Not Stop TGR | 24 |
| 30 | Gate I/O To BFR | 10B |
| 30 | Set BLK LD SEQ BFR TGR | 31 |
| 30 | Set Prep End SEQ on Stop | 54 |
| 30 | Set Prep End in SEQ BFR | 57 |
| 31 | RST Seq Field | 38, 39 |
| 31 | RST CMD Field | 37 |
| 31 | Not Block Load Seq BFR | 57 |
| 31 | Halt Sig'd on SVC CYC | 45, 24 |
| 31 | Op in During RST | 22 |
| 31 | Not Halt Sig'd on SVC Cyc | 25A, 24 |
| 31 | Sel RST SVC Cyc | 24 |
| 31 | Not Sel RST SVC Cyc | 24 |
| 31 | Reset Op'n In | 17, 20, 23, 30 |
| 31 | RST Req Sel | 25A, 45, 24 |
| 31 | Reset on Break En/Dis-Able | 31, 46, 44A |
| 31 | Reset Mode on Break | 26 |
| 31 | Reset CHAR SVC on Break | 39 |
| 32 | Set R1 POS 0 | 40 |
| 32 | Reset R1 POS 0 | 40 |
| 32 | Set R1 POS 1 | 40 |
| 32 | Reset R1 POS 1 | 40 |
| 32 | Set R1 POS 2 | 40 |
| 32 | Reset R1 POS 2 | 40 |
| 33 | Set R1 POS 3 | 40 |
| 33 | Reset R1 POS 3 | 40 |
| 33 | Set R1 POS 4 | 40 |
| 33 | Reset R1 POS 4 | 40 |
| 33 | Set R1 POS 5 | 40 |
| 33 | Reset R1 POS 5 | 40 |
| 33 | Set R1 POS 6 | 40 |
| 33 | Reset R1 POS 6 | 40 |
| 34 | Set R1 POS 7 | 40 |
| 34 | Reset R1 POS 7 | 40 |
| 34 | Set R1 POS 8 | 40 |
| 34 | Reset R1 POS 8 | 40 |
| 34 | Set R1 POS 9 | 40 |
| 34 | Reset R1 POS 9 | 40 |
| 34 | Set R1 POS 10 | 40 |
| 34 | Reset R1 POS 10 | 40 |
| 35 | Set R1 POS 11 | 40 |
| 35 | Reset R1 POS 11 | 40 |
| 35 | Set R1 POS 12 | 40 |
| 35 | Reset R1 POS 12 | 40 |
| 35 | Set R1 POS 13 | 40 |
| 35 | Reset R1 POS 13 | 40 |
| 35 | Set R1 POS 14 | 40 |
| 35 | Reset R1 POS 14 | 40 |
| 35 | Set R1 POS 15 | 40 |
| 35 | Reset R1 POS 15 | 40 |
| 36 | Set R2 POS 0 | 41 |
| 36 | Reset R2 POS 0 | 41 |
| 36 | Set R2 POS 1 | 41 |
| 36 | Reset R2 POS 1 | 41 |
| 36 | Set R2 POS 2 | 41 |
| 36 | Reset R2 POS 2 | 41 |
| 36 | Set R2 POS 3 | 41 |
| 36 | Reset R2 POS 3 | 41 |
| 37 | Set R2 POS 4 | 41 |
| 37 | Reset R2 POS 4 | 41 |
| 37 | Set R2 POS 5 | 41 |
| 37 | Reset R2 POS 5 | 41 |
| 37 | Set R2 POS 6 | 41 |
| 37 | Reset R2 POS 6 | 41 |
| 37 | Set R2 POS 7 | 41 |
| 37 | Reset R2 POS 7 | 41 |

CHART OF OUTPUTS OF THE FIGURES—Continued

| FIG. # | Line Title | Goes to FIG. # |
|---|---|---|
| 38 | Set R2 POS 8 | 41 |
| 38 | Reset R2 POS 8 | 41 |
| 38 | Set R2 POS 9 | 41 |
| 38 | Reset R2 POS 9 | 41 |
| 38 | Set R2 POS 10 | 41 |
| 38 | Reset R2 POS 10 | 41 |
| 39 | Set R2 POS 11 | 41 |
| 39 | Reset R2 POS 11 | 41 |
| 39 | Set R2 POS 12 | 41 |
| 39 | Reset R2 POS 12 | 41 |
| 39 | Set R2 POS 13 | 41 |
| 39 | Reset R2 POS 13 | 41 |
| 39 | Set R2 POS 14 | 41 |
| 39 | Reset R2 POS 14 | 41 |
| 39 | Set R2 POS 15 | 41 |
| 39 | Reset R2 POS 15 | 41 |
| 40 | R1 POS 0 & T0 | 42, 10A |
| 40 | R1 POS 0 | 25B |
| 40 | Not R1 POS 0 | 42 |
| 40 | R1 POS 1 & T1 | 42 |
| 40 | R1 POS 1 | 25B |
| 40 | Not R1 POS 1 | 42 |
| 40 | R1 POS 2 | 10B, 25B, 79, 72 |
| 40 | Not R1 POS 2 | 42 |
| 40 | R1 POS 3 | 10B, 44A, 25B, 56 |
| 40 | Not R1 POS 3 | 79, 47, 72, 83 |
| 40 | R1 POS 4 | 25B, 78, 79, 72, 10A |
| 40 | Not R1 POS 4 | 78, 72 |
| 40 | R1 POS 5 | 22, 25B, 78, 10A |
| 40 | Not R1 POS 5 | 78, 72 |
| 40 | R1 POS 6 | 78, 62 |
| 40 | Not R1 POS 6 | 78, 72 |
| 40 | R1 POS 7 | 75, 78, 62, 72 |
| 40 | Not R1 POS 7 | 78 |
| 40 | R1 POS 8 | 75, 63A, 63B |
| 40 | Not R1 POS 8 | 56, 63A |
| 40 | R1 POS 9 | 75, 63A, 63B, 72, 83 |
| 40 | Not R1 POS 9 | 63A |
| 40 | R1 POS 10 | 75 |
| 40 | Not R1 POS 10 | 42 |
| 40 | R1 POS 11 | 75, 63A, 63B, 81 |
| 40 | Not R1 POS 11 | 42 |
| 40 | R1 POS 12 | 75, 81 |
| 40 | Not R1 POS 12 | 42 |
| 40 | R1 POS 13 | 75, 81 |
| 40 | Not R1 POS 13 | 42 |
| 40 | R1 POS 14 | 81 |
| 40 | Not R1 POS 14 | 42 |
| 40 | R1 POS 15 & T15 | 42 |
| 40 | R1 POS 15 | 72, 81, 83 |
| 40 | Not R1 POS 15 | 56 |
| 41 | R2 POS 0 & T0 | 43 |
| 41 | R2 POS 0 | 51, 102 |
| 41 | Not R2 POS 0 | 51, 106 |
| 41 | R2 POS 1 & T1 | 43 |
| 41 | R2 POS 1 | 25B, 10A |
| 41 | Not R2 POS 1 | 43 |
| 41 | R2 POS 2 | 25A, 58 |
| 41 | Not R2 POS 2 | 25B, 78, 25A |
| 41 | R2 POS 3 | 25B, 50 |
| 41 | Not R2 POS 3 | 43 |
| 41 | R2 POS 4 | 25B, 55, 11 |
| 41 | Not R2 POS 4 | 43 |
| 41 | R2 POS 5 | 25B, 55, 11 |
| 41 | Not R2 POS 5 | 43 |
| 41 | R2 POS 6 | 55, 79, 11, 10A |
| 41 | Not R2 POS 6 | 79 |
| 41 | R2 POS 7 | 55, 11, 10A |
| 41 | Not R2 POS 7 | 43 |
| 41 | R2 POS 8 | 79, 11, 58, 46, 10A |
| 41 | Not R2 POS 8 | 43 |
| 41 | R2 POS 9 | 57, 10A |
| 41 | Not R2 POS 9 | 43 |
| 41 | R2 POS 10 | 10B, 57 |
| 41 | Not R2 POS 10 | 43 |
| 41 | R2 POS 11 | 10B, 57 |
| 41 | Not R2 POS 11 | 43 |
| 41 | R2 POS 12 | 10B, 25B, 54, 56, 104 |
| 41 | Not R2 POS 12 | 79, 54, 56, 47 |
| 41 | R2 POS 13 | 10B, 104, 105 |
| 41 | Not R2 POS 13 | 43 |
| 41 | R2 POS 14 | 78, 104 |
| 41 | Not R2 POS 14 | 105 |
| 41 | R2 POS 15 & T15 | 43 |
| 41 | R2 POS 15 | 104, 105 |
| 41 | Not R2 POS 15 | 43 |
| 42 | R1 Out | 74 |
| 42 | Not R1 Out | 52 |
| 42 | C1 Shift Cell 2 | 75, 74 |
| 42 | R1 In | 40 |
| 43 | C2 Shift Cell 2 | 42, 74 |
| 43 | R2 In | 41 |
| 44A | Bit Shifting | 42 |
| 44 | Not Bit Shifting | 42 |
| 44 | Bit Count Stop | 91, 62, 96 |
| 44 | Strobe Time | 95, 78, 97, 52, 62 |
| 44 | Start Time | 73, 75, 56, 46, 47, 72, 83 |
| 44 | Not Bit Count End | 56, 95, 66, 96 |
| 44A | Data Time | 63A, 46 |
| 44 | Bit Count End | 91, 62 |
| 44 | Stop Time | 69, 54, 56, 46, 47, 74, 77, 83 |
| 44B | Ser Data to Data Bufr | 43 |
| 44 | Not Ser Data to Data Bufr | 42 |
| 44 | Data Bufr to Ser Data | 42 |

CHART OF OUTPUTS OF THE FIGURES—Continued

| FIG. # | Line Title | Goes to FIG. # |
|---|---|---|
| 45 | Selective Rst Ctrl Tgr | 63B |
| 45 | Not Blks Line on Sel Rst | 100 |
| 45 | Not Block C2 on Sel Rst | 43 |
| 45 | Not Block C1 on Sel Rst | 42 |
| 45 | Force Bits Into C2 | 43 |
| 45 | Force Bits Into C1 | 42 |
| 46 | Gate Sense to I/O Reg | 10A |
| 46 | Gate Bfr to I/O Reg | 10A |
| 46 | Rst Str Bit P Add & Add | 32, 33, 34, 52, 50 |
| 46 | Rst Time Out | 36, 32 |
| 46 | Initiate Rcv Tgr | 50 |
| 46 | Initiate Receive (Set R1, Pos 1, 2, & Rst R1, Pos 0, 3, 4, 5, 6, 7). | 33, 34, 32 |
| 46 | False Start Rst Receiving | 38 |
| 46 | Rst Ser Data and Set Seq | 35, 38 |
| 46 | Reset Serial Data | 34, 35 |
| 46 | Set Serial Data | 34, 35 |
| 46 | Set Serial Data | 34, 35 |
| 46 | Not Rd Gen | 56 |
| 46 | Read General | 56, 62, 65, 83 |
| 46 | Rst P OSC & Prep Add | 46, 50 |
| 47 | Set Strobe Count 8 | 33 |
| 47 | Initiate Xmit | 38, 94, 99A, 63B |
| 47 | Reset Data Bfr | 37, 38, 39 |
| 47 | Write General | 22, 66, 73, 65, 72, 74, 83, 75, 78, 79, 54, 62, 63A, 50, 56 |
| 47 | Send Start | 63A |
| 47 | Rst Prep Add & Str Count | 32, 33, 50 |
| 47 | Rst Bit Count | 33, 34 |
| 47 | Set Strobe Count 5 | 32, 33 |
| 47 | Set Char Service | 39 |
| 47 | Not Write General | 56, 46 |
| 47 | Set Sequence Bit 1 | 38 |
| 47 | Send Stop | 63B |
| 48 | TC 1 | 69, 76, 82 |
| 48 | Not TC 1 | 82, 76 |
| 48 | Auto Wrap | 63A, 93 |
| 48 | Wrap TC 00 | 70 |
| 48 | TC2 | 69, 76, 82 |
| 48 | Not TC2 | 82, 76 |
| 49 | Clock A | 42, 52, 100, 43 |
| 49 | T0 | 86, 25A, 26, 52, 62, 46, 47, 74, 83, 49, 31, 40, 41, 44A, 45, 66, 75, 79 |
| 49 | T1 | 88, 40, 41, 45, 75, 78, 24, 25A, 56 |
| 49 | T2 | 24, 26, 56, 74, 103, 88, 25B, 31, 40, 41, 44A, 45, 79, 91, 95 |
| 49 | T3 | 56, 63A, 46, 47, 88, 40, 41, 45, 66, 91, 96, 24, 26, 52 |
| 49 | T4 | 88, 45, 91, 95, 93, 24, 25A, 62, 63B |
| 49 | T5 | 88, 45, 53, 97, 24, 72 |
| 49 | T6 | 88, 45, 53, 57, 24, 56, 47, 83 |
| 49 | T7 | 65, 88, 45, 55, 73, 24, 25A, 54, 56, 58, 49 |
| 49 | T8 | 52, 56, 62, 46, 50, 72, 74, 88, 53, 73, 75, 78, 79, 86, 24, 26, 29B |
| 49 | T9 | 54, 56, 62, 77, 88, 25B, 44A, 45, 73, 79, 11, 21, 24, 26 |
| 49 | T10 | 88, 22, 44A, 73, 79, 11, 54, 56, 65 |
| 49 | T11 | 88, 31, 78, 79, 11, 25A, 47 |
| 49 | T12 | 29B, 58, 46, 47, 50, 88, 22, 23, 30, 31, 44A, 55, 25A, 26 |
| 49 | T13 | 88, 23, 25B, 30, 57, 11, 46, 50 |
| 49 | T14 | 50, 88, 30, 31, 86, 24, 56, 62, 46, 47 |
| 49 | T15 | 46, 47, 88, 40, 41, 45, 79, 12, 26, 51, 62 |
| 49 | C0 | 91, 95, 96, 97, 11, 21, 25A, 26, 52, 54, 56, 47, 72, 74, 23, 25B, 45, 66, 73, 75, 78, 79, 86, 63A, 46, 50, 77, 83 |
| 49 | C1 | 22,30,31,44A,29B,45, 53,55,57,51,58,75, 79,86,11,62,46,12, 21,24,26,47,50,65 |
| 49 | C0 T1 | 105 |
| 49 | C0 T2 | 102, 106 |
| 49 | C0 T3 | 96, 105, 106 |
| 49 | C0 T6 | 102 |
| 49 | C0 T7 | 102, 106 |
| 49 | C0 T8 | 102, 104, 106 |
| 49 | C0 T9 | 102 |
| 49 | C1 T0 | 104 |
| 49 | C1 T1 | 105 |
| 50 | Present OSC Sample | 51 |
| 50 | Not P OSC Sample | 51 |
| 50 | Time Out | 62, 46 |
| 50 | Not Time Out | 44A, 66 |

CHART OF OUTPUTS OF THE FIGURES—Continued

| FIG. # | Line Title | Goes to FIG. # |
|---|---|---|
| 50 | Prep Add | 52 |
| 51 | Set L OSC | 36 |
| 51 | OSC Change | 44A, 50 |
| 51 | Reset L OSC | 36 |
| 52 | Reset Strobe CT Bit 2 | 32 |
| 52 | Add | 42 |
| 52 | Not Add | 42 |
| 52 | First ½ Bit Timing | 98 |
| 52 | Last ½ Bit Timing | 54, 98, 86, 89 |
| 53 | Clock POS 1 | 13, 14, 102 |
| 53 | Clock POS 2 | 13, 14, 102 |
| 53 | Clock POS 4 | 13, 14, 102 |
| 53 | Clock POS 8 | 13, 14 |
| 53 | Clock POS 16 | 13, 14 |
| 53 | Line Address 0 | 85 |
| 53 | Group Address | 108, 85, 110 |
| 53 | Wrap Address | 86 |
| 54 | Set Halt Seq | 38 |
| 54 | Set Prep End (Set R2 POS 9 & 10) | 38 |
| 54 | Reset Char Svc | 39 |
| 55 | Receive (Space) Latch | 66 |
| 55 | Not Control | 46 |
| 55 | Not Write Break | 32, 66, 63A, 47, 11 |
| 55 | Write Break | 32, 66 |
| 55 | Write Poll | 25B, 73, 62, 46, 47 |
| 55 | Read Search | 46, 77 |
| 55 | Read Inhibit | 62, 46 |
| 55 | Command Reset | 25A |
| 55 | Read Prepare | 78, 62, 46 |
| 55 | Command Dummy | 25A |
| 55 | Sense | 25B, 25A, 29B, 46 |
| 55 | Write Auto | 66, 63A, 47, 65 |
| 55 | Read | 79, 46, 72, 77 |
| 55 | Control | 105 |
| 55 | Write | 47 |
| 55 | Enable | 65, 85 |
| 55 | Disable | 85 |
| 55 | Not Sense | 11 |
| 55 | Not Write Auto | 50 |
| 55 | Not Read Prepare | 66, 56, 62 |
| 55 | Not Read Inhibit | 66 |
| 56 | Line Break Set End TGR | 62 |
| 56 | Set Not Oper Set R1 POS 5 | 33 |
| 56 | Set Data Check Stop Bit Error | 36 |
| 56 | Set Ovr'n | 33 |
| 56 | Set Prep End | 54 |
| 56 | Not Op'l Set End TGR | 62 |
| 56 | Set R1 POS 8, 9 & 10 | 34 |
| 56 | Reset Overrun | 32, 33 |
| 56 | Set Not Operational | 33, 62 |
| 56 | Reset Sense Rec Char Svc | 32, 33, 36, 38, 39 |
| 56 | Read or Write General | 62 |
| 57 | Sequence 0 | 91, 79, 54, 46, 47, 50, 72, 106 |
| 57 | Sequence 1 (Data) | 79, 73, 54, 74, 105 |
| 57 | Seq. 2 (Halt/Rcvg) | 73, 79, 78, 54, 72, 74, 77, 105, 106 |
| 57 | Seq. 3 (Prep End) | 75, 62, 77, 83, 106 |
| 57 | Seq. 5 (LRC) | 75, 77, 83 |
| 57 | Sequence 6 (A) | 78 |
| 57 | Not Seq 0 (Rcvg) | 66, 62, 63, 47, 65, 66 |
| 57 | Not Seq 7 (End) | 66, 56, 62, 47, 65, 66 |
| 57 | Not Seq 3 (Prep End) | 47, 50 |
| 57 | Slot Reset | 44A, 55, 52, 58, 47, 50, 74 |
| 58 | Terminal ADR Bit 1 | 48, 71 |
| 58 | Not Terminal ADR Bit 1 | 70, 48, 71 |
| 58 | Terminal ADR Bit 2 | 48, 71 |
| 58 | Not Terminal ADR Bit 2 | 70, 48, 71 |
| 58 | Receiving | 72, 74, 77, 10B, 73, 75, 78 |
| 58 | Not Receiving | 62, 47 |
| 58 | Strobe Count 0 | 66, 47, 46 |
| 58 | Strobe Count 10 | 66 |
| 58 | Strobe Count 15 | 44A |
| 58 | Not Strobe Count 0 | 59 |
| 58 | Bit Count 0 | 66, 91, 46, 47 |
| 58 | Not Bit Count 0 | 44A, 66, 56 |
| 58 | Not Bit Count 1 | 44A, 66 |
| 58 | Mode 0 | 72, 77 |
| 58 | Mode 1 | 72, 74, 77 |
| 58 | Mode 2 | 72, 74, 77 |
| 58 | Mode 3 | 77 |
| 62 | Set Time Out Complete | 32 |
| 62 | Reset Time Bit (End) | 36 |
| 62 | Set Sequence End & End | 36, 38 |
| 62 | Reset Strobe Count Prep Add | 32, 50 |
| 62 | Reset Bit Ct (Field) | 33, 34, 47 |
| 62 | Set Unit Exception | 37 |
| 62 | Reset Receiving | 33 |
| 62 | Set Not Op'nl | 33, 56 |
| 63A | Set Auto Wrap | 48 |
| 63B | Not Receive ADR Wrap | 48, 65, 70 |
| 63B | Receive ADR Wrap | 70 |
| 63B | Not Rec Space | 46 |
| 63B | Receive Space | 55, 78, 96, 46 |
| 63B | Send Space AUX | 97 |
| 63B | Send Space LA | 66, 85, 97 |
| 63B | Send Mark LA | 66, 85, 63A |
| 63B | AUX Line Not Attached | 50, 66, 46, 47 |
| 63B | Send Mark AUX | 97 |
| 63B | AUX Line Attached | 44A, 46, 50, 66 |
| 64 | Serial Data | 66 |
| 65 | Receive Oper | 55 |
| 65 | Not RCV Oper | 56 |
| 65 | Xmit Oper | 50 |
| 65 | Not Read Oper | 56 |
| 65 | Not Read or Write Oper | 56 |

CHART OF OUTPUTS OF THE FIGURES—Continued

| FIG. # | Line Title | Goes to FIG. # |
|---|---|---|
| 65 | Not Write Oper'l | 47 |
| 66 | Equipment Echo | 32, 54 |
| 66 | Set Time Bit | 36 |
| 66 | Line Echo | 36, 54 |
| 67 | OSC 01 | 71, 92 |
| 67 | OSC 10 | 71, 92 |
| 67 | OSC 11 | 71, 92 |
| 68 | OSC 00 | 70, 71, 92 |
| 69 | 1050 Terminal T/C 1 | 74 |
| 69 | TTY 28 Terminal T/C 2 | 77, 78 |
| 70 | T/C 1 No Wrap | 48 |
| 70 | T/C 1 on Wrap | 48 |
| 70 | T/C 2 No Wrap | 48 |
| 70 | T/C 2 on Wrap | 48 |
| 70 | Sel Dual Line Speed | 71 |
| 70 | Not Sel Dual Line Speed | 48 |
| 71 | Terminal OSC | 50 |
| 71 | Change Line OSC 11 | 110 |
| 71 | Change Line OSC 01 | 85 |
| 72 | Delete Char | 73 |
| 72 | Circle B | 73 |
| 72 | Prep End on N Ory | 73 |
| 72 | Rst LRC on Xmit | 75 |
| 72 | Set LRC Seq | 39 |
| 72 | Set LRC Seq 5 | 75 |
| 72 | Set Control Mode | 39 |
| 72 | Prep End On 1050 | 73 |
| 72 | Set R2 POS 13 | 39 |
| 72 | Set R2 POS 4 | 37 |
| 72 | Set R2 POS 1 (Data Chk) | 36 |
| 72 | Short Time Out | 62 |
| 72 | Bit Count 8 | 74 |
| 72 | Bit Count 9 | 74 |
| 73 | T/C 1 Set Ser Data to Data Buffer | 44A |
| 73 | T/C 1 Set R2 POS 12 (Char Svc) | 39 |
| 73 | T/C 1 Set Data Buffer to Serial Data | 44A |
| 73 | T/C 1 Set Prep End Seq | 38, 39 |
| 74 | LRC Gen | 75 |
| 74 | T/C 1 to R1 In | 42 |
| 74 | Inhibit Stop Causing P End Seq | 30 |
| 74 | 1050 Terminal (7 Bit Char) | 73, 75, 72 |
| 74 | 1050 Stop STR Time | 75, 72 |
| 74 | T/C 1 Bit Count Stop | 44A |
| 74 | T/C 1 Bit Count End | 44A |
| 75 | C1 Delay Line Input | 42 |
| 75 | Not LRC to SD | 42 |
| 75 | Not BLK C1 Output | 42 |
| 75 | Set LRC Sequence | 39 |
| 75 | T/C 1 LRC Set Data Check | 36 |
| 75 | Prepare End After LRC | 73 |
| 77 | TTY 28 Stop Strobe Time | 78, 79 |
| 77 | Set Letters Mode on Read | 80 |
| 77 | Receive Action Time | 78 |
| 77 | Set Time Out Seq on V or M | 78 |
| 77 | Set FIGS Mode on Read | 80 |
| 77 | Set Time Out Seq on FIGS H-LTR | 78 |
| 77 | Set FIGS H seq | 80 |
| 77 | (Unit Exc T/C 2) Set R2 POS 4 | 37 |
| 77 | Set Data Seq | 80 |
| 77 | FIGS Mode | 78, 79 |
| 77 | Letters Mode | 79, 81 |
| 78 | T/C 2 Set Serial Data to Data Buffer | 44A |
| 78 | T/C 2 Bit Count End | 44A |
| 78 | T/C 2 Bit Count Stop | 44A |
| 78 | Set 1st Xmit Stop Bit | 79 |
| 78 | Set Time Out Seq | 80 |
| 78 | Not Block on Read Prep | 77 |
| 78 | Set Data Sequence | 77 |
| 78 | Set A Sequence | 80 |
| 78 | Inhibit Read Prep End | 62 |
| 78 | Set R2 POS 12 (Char Service) | 39 |
| 78 | Set R2 POS 8 (Data BFR 2) | 38 |
| 79 | Not Inhibit Hald End | 54 |
| 79 | Set R1 POS 12, 14 & 15 Ser Data 4, 6, & 7 | 35 |
| 79 | Short Time Out (T/C 2) | 62 |
| 79 | Set Char Svc Write | 78 |
| 79 | Set FIGS Mode on WR R1 POS 13 (Ser Data 5) | 80 |
| 79 | Set Letters Mode on WR R1 POS 13 | 35, 80 |
| 79 | TC 2 Set Data Bufr to Ser Data | 44A |
| 79 | Set R1 POS 11 (Ser Data 3) | 35 |
| 79 | Set R2 POS 6 | 37 |
| 80 | Set R2 POS 11 (T/C 2 Seq) | 39 |
| 80 | Set R2 POS 10 (T/C 2 Seq) | 38 |
| 80 | Set R2 POS 9 (T/C 2 Seq) | 38 |
| 80 | Reset R2 POS 11 | 39 |
| 80 | Reset R2 POS 10 | 38 |
| 80 | Reset R2 POS 9 | 38 |
| 80 | Set R2 POS 13 (FIGS Mode) | 39 |
| 80 | Reset R2 POS 13 (Letters Mode) | 39 |
| 81 | Letters | 77 |
| 81 | Not Letters | 78, 77 |
| 81 | FIGS | 77 |
| 81 | Not FIGS | 78 |
| 81 | EOT TTY | 78, 77 |
| 81 | EOB W T TTY | 78, 77 |
| 81 | V or M | 77 |
| 81 | Not V or M | 77 |
| 81 | A | 78 |
| 81 | Not A | 77 |
| 81 | Z | 78 |
| 81 | Not Z | 78 |
| 82 | 1050 Stop STR Time | 73 |
| 82 | T/C 1 Parity CHK Set Data CHK | 36 |
| 84 | Receive Data | 65, 91 |
| 84 | Connected | 65 |
| 84 | Interlock | 106 |

CHART OF OUTPUTS OF THE FIGURES—Continued

| FIG. # | Line Title | Goes to FIG. # |
|---|---|---|
| 84 | Sub Set Type II | 65 |
| 84 | Sub Set Type III | 66 |
| 84 | Sub Set Type IV | 65 |
| 85 | Interlock ADR 0 | 84 |
| 85 | Connected ADR 0 | 84 |
| 85 | RCV Data ADR 0 | 84 |
| 85 | LA-0 Type I | 84 |
| 85 | LA-0 Type II | 84 |
| 85 | LA-0 Type III | 84 |
| 85 | LA-0 Type IV | 84 |
| 86 | Clock Drive A | 87 |
| 86 | Clock Drive B | 87 |
| 86 | Ring Reset | 87 |
| 87 | Slot 0 | 90 |
| 87 | Slot 3 | 90 |
| 87 | Slot 2 | 90 |
| 87 | Slot 5 | 90 |
| 87 | Slot 4 | 90 |
| 87 | Slot 7 | 90 |
| 87 | Slot 6 | 90 |
| 87 | Slot 1 | 90 |
| 87 | Group 1 | 90, 86 |
| 87 | Group 0 | 90 |
| 88 | TS 0 | 97, 95, 94, 89, 86 |
| 88 | TS 1 | 94, 97, 89, 99A |
| 88 | TS 2 | 97, 99A, 91, 99B, 89, 98 |
| 88 | TS 3 | 97, 99A, 91, 98, 89 |
| 88 | TS 4 | 99A, 91 |
| 88 | TS 5 | 98, 99A |
| 88 | TS 6 | 99A, 96, 98 |
| 88 | TS 7 | 95, 94, 98, 86, 99B |
| 89 | L OSC To Line | 100 |
| 89 | OSC Change | 95, 98 |
| 90 | Unit 0, 1, 2, 4 | 93 |
| 90 | Group 0 | 93 |
| 90 | Group 1 | 92 |
| 91 | Set Rcv (R2 POS 8) | 38 |
| 91 | Rcv Start | 97 |
| 91 | False St Rst | 99B |
| 91 | Set Mark | 97 |
| 91 | Set Space | 97 |
| 91 | Set Bit Svc | 95 |
| 91 | Stop Bit Reset | 95, 98, 99B |
| 91 | Rst Rcv (R2 POS 8) | 10A, 11, 58, 46 |
| 91 | Encode 11 Stop | 95, 97 |
| 91 | End Reset | 94, 95, 97 |
| 91 | End Transmit | 62 |
| 92 | Gated OSC | 93 |
| 93 | Gated OSC to LOS Reg | 89 |
| 94 | Xmit Bfr | 91, 96 |
| 94 | Not Xmit Bfr | 96 |
| 94 | Xmit/Rcv | 95, 97 |
| 94 | Not Xmit/Rcv | 97, 91, 95, 96 |
| 94 | Xmit/Rcv to Line | 100 |
| 95 | Bit Svc Bfr | 91, 99B |
| 95 | Not Bit Svc Bfr | 91 |
| 95 | Bit Svc | 66, 96 |
| 95 | Not Bit Svc | 91, 96 |
| 96 | Bit Svc Into Line | 100 |
| 96 | Set R1 POS 3 | 33 |
| 96 | Set Stop Bit Error (R2 POS 1) | 36 |
| 96 | Reset Strobe Counter | 99B |
| 97 | Data Bfr | 91, 99B |
| 97 | Data Bit | 66, 96 |
| 97 | Not Data Bit | 66, 96 |
| 97 | Data Bit Into Line | 100 |
| 97 | Mark | 63B |
| 97 | Space | 63B |
| 97 | Sample & Xmit | 99B |
| 98 | Sample Time | 91, 97 |
| 98 | Reset Str 2 | 99A |
| 98 | Into Delay Line | 100 |
| 99A | AUX Reg POS 0 | 63B |
| 99A | Strobe CTR 1 | 100 |
| 99A | Strobe CTR 2 | 100 |
| 99A | Strobe CTR 4 | 100 |
| 99A | Strobe CTR 8 | 100 |
| 99A | STR CTR 6 | 95 |
| 99B | Strobe Count 0 | 89, 91 |
| 99B | Not Strobe Count 0 | 46, 91, 66 |
| 99B | Strobe Count 15 | 98 |
| 100 | Reg Loop | 98 |
| 100 | Delay Line Output | 89, 94, 95, 97, 99A |
| 101 | Set Char Svc (R2 POS 12) | 39 |
| 101 | Set End UF Bit (R2 POS 10) | 33 |
| 101 | Set Seq Bit 1 (R2 POS 9) | 38 |
| 101 | Set Seq Bit 2 (R2 POS 10) | 38 |
| 101 | Set No Avail (R2 POS 8) | 105 |
| 101 | Set Sub Chan Chk (R2 POS 5) | 37 |
| 102 | Set Prep End D | 101 |
| 102 | Set End UF D | 101 |
| 102 | Set PI Failure | 33 |
| 102 | PI Fail Reset | 105 |
| 102 | Reset CR TGR B | 107 |
| 102 | Set Prep End E | 101 |
| 102 | Set End UF E | 101 |
| 102 | Set ACR Error | 32 |
| 102 | ACR Reset | 105 |
| 102 | Reset CR TGR C | 107 |
| 102 | Set Prep End F | 101 |
| 102 | Set End-UF F | 101 |
| 102 | Set Sup Chan Chk A | 101 |
| 102 | Sub Chan Chk Rst | 105 |
| 102 | Set Sub Chan Chk B | 101 |
| 102 | ADR Reg 1 | 103 |
| 102 | Not ADR Reg 1 | 103 |
| 102 | ADR Reg 2 | 103 |

CHART OF OUTPUTS OF THE FIGURES—Continued

| FIG. # | Line Title | Goes to FIG. # |
|---|---|---|
| 102 | Not ADR Reg 2 | 103 |
| 102 | ADR Reg 4 | 103 |
| 102 | Not ADR Reg 4 | 103 |
| 104 | Not Dial Digit 1 | 109 |
| 104 | Not Dial Digit 2 | 109 |
| 104 | Not Dial Digit 4 | 109 |
| 104 | Not Dial Digit 8 | 109 |
| 105 | Dial CMD | 22, 102, 106 |
| 105 | DP TGR | 106 |
| 105 | Not DP TGR | 104, 106 |
| 105 | Dialing or Stop Seq | 102, 106 |
| 105 | Line Dialing | 106 |
| 105 | Set Char Svc B | 101 |
| 105 | Dial Reset | 106 |
| 106 | Set No Available Error A | 101 |
| 106 | Set Prep End B | 101 |
| 106 | Set End UF A | 101 |
| 106 | No Available 1 | 105 |
| 106 | Set Cr Tgr | 108, 110 |
| 106 | Set Char Svc A | 101 |
| 106 | Set Dialing Seq | 101 |
| 106 | Gate Adr Into Adr Reg | 102 |
| 106 | DS Tgr | 105 |
| 106 | Not DS Tgr | 104, 105 |
| 106 | Dial Stop Reset | 105 |
| 106 | Set Prep End A | 101 |
| 106 | Dial Busy Tgr | 104, 105 |
| 106 | Not Dial Busy Tgr | 102 |
| 106 | DP Out | 108 |
| 106 | Dial Completed Set End-UF B | 101 |
| 106 | Rst Cr Tgr A | 107 |
| 106 | Set No Avail Error B | 101 |
| 106 | Set Prep End C | 101 |
| 106 | Set End-UF C | 101 |
| 106 | No Avail Rst 2 | 105 |
| 107 | Reset Cr | 108 |
| 107 | Not Cr Tgr | 102 |
| 107 | Cr Tgr | 102 |
| 107 | Not PND | 105 |
| 107 | PND | 107 |
| 107 | ACR | 102 |
| 107 | Not PI | 102 |
| 108 | DP Lead to ACU 2-7 | 111 |
| 108 | CR2 | 107 |
| 108 | CR Lead 2 | 111 |
| 108 | PND 2 | 107 |
| 108 | ACR 2 | 107 |
| 108 | PI 2 | 107 |
| 109 | D0 1 Lead | 111 |
| 109 | D0 2 Lead | 111 |
| 109 | D0 3 Lead | 111 |
| 109 | D0 4 Lead | 111 |
| 110 | Send Mark | 111 |
| 110 | Interlock Adr 2 | 84 |
| 110 | Connected Adr 2 | 84 |
| 110 | RCV Data Adr 2 | 84 |
| 110 | Data Terminal Ready | 111 |
| 110 | LA-2 Type I | 84 |
| 110 | LA-2 Type II | 84 |
| 110 | LA-2 Type III | 84 |
| 110 | LA-2 Type IV | 84 |
| 111 | Received Data 2 | 110 |
| 111 | Data Set 2 Ready | 110 |
| 111 | Data Carrier Detector | 110 |
| 111 | To Telephone Line | 108 |
| 111 | PND Lead 2 | 108 |
| 111 | ACR Lead 2 | 108 |
| 111 | PI Lead 2 | 108 |

TABLE OF CONTENTS

Figure 6:
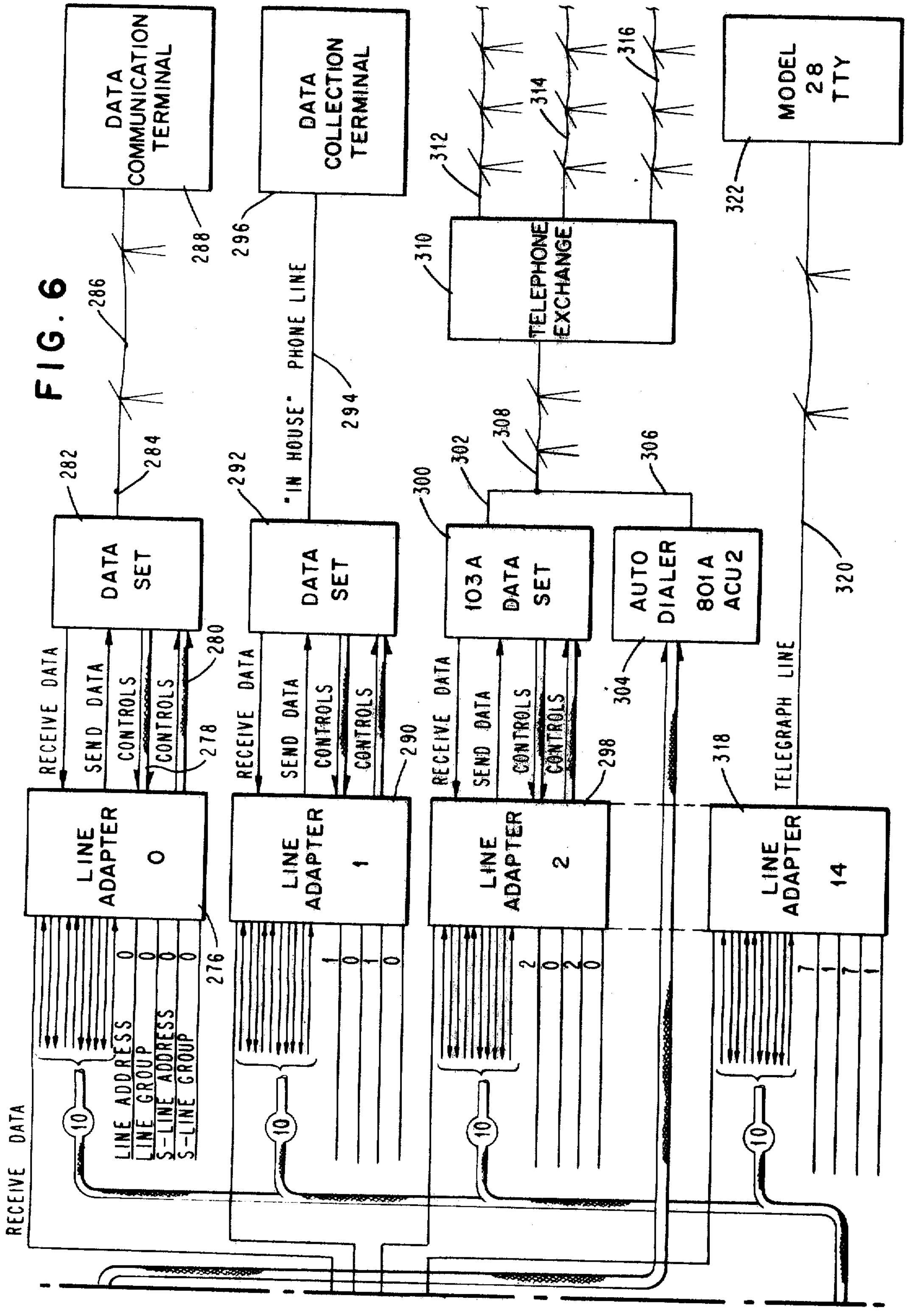

ABSTRACT of the Disclosure
Cross References to Related Applications
Summary of Previous State of the Art
Statement of Objects of the Present Invention
Summary of the Invention and Its Advantages
Brief Description of Figures of the Drawings I. Introduction
- 1.1 General Description of the Basic Transmission Control Unit (XCU)
- 1.2 General Description of the Auxiliary Sampling Recirculating Storage
- 1.3 General Description of Automatic Dialing II. General Description of the Various Sections of the Control Unit (FIGS. 2–6)
- 2.1 Interface Controls (FIGS. 2 and 3)
- 2.2 Recirculating Storage and Access Registers R1 and R2 (FIG. 4)
- 2.3 Common Controls (FIG. 4)
- 2.4 Terminal Controls (FIG. 4)
- 2.5 Line Adapter (FIG. 6)
- 2.6 Sampling Controls and Recirculating Storage (FIG. 5)
- 2.7 Dial Common Controls (FIG. 5)
- 2.8 Dial Adapters (FIG. 5)
- 2.9 Telephone Data Set (FIG. 6)
- 2.10 Automatic Calling Unit (FIG. 6)

III. Interface Controls
- 3.1 Interface Input/Output Lines
  - 3.1.1 From Computer Channel
  - 3.1.2 To Computer Channel
- 3.2 Control Unit Reset
- 3.3 Initial Selection
- 3.4 I/O Instructions
  - 3.4.1 Start I/O
  - 3.4.2 Halt I/O
  - 3.4.3 Test I/O
  - 3.4.4 I/O No-Op
  - 3.4.5 Stack
- 3.5 Commands
  - 3.5.1 Prepare
  - 3.5.2 Inhibit
  - 3.5.3 Search
  - 3.5.4 Sense
  - 3.5.5 Write
  - 3.5.6 Auto Wrap
  - 3.5.7 Dial
  - 3.5.8 Break
  - 3.5.9 Read
  - 3.5.10 Sadzero
  - 3.5.11 Sadone, Sadtwo, Sadthree
  - 3.5.12 Enable
  - 3.5.13 Disable IV. Recirculating Storage and Common Controls
- 4.1 Basic Timing
- 4.2 Recirculating Storage C1 and C2
  - 4.2.1 Access Registers R1 and R2
- 4.3 Common Controls
- 4.4 Line Control Word Format
  - 4.4.1 Strobe Count (4 bits)
  - 4.4.2 Bit Count (4 bits)
  - 4.4.3 Serial Data (8 bits)
  - 4.4.4 Equipment Check
  - 4.4.5 Bus Out Parity Check
  - 4.4.6 Time Out
  - 4.4.7 Overrun
  - 4.4.8 Command Reject
  - 4.4.9 Intervention Required
  - 4.4.10 Check Character Accumulator (8 bits)
  - 4.4.11 Check Bit A
  - 4.4.12 LOSC
  - 4.4.13 TC1 and TC2
  - 4.4.14 Time
  - 4.4.15 Command (4 bits)
  - 4.4.16 Receiving
  - 4.4.17 Sequence (3 bits)
  - 4.4.18 Character Service
  - 4.4.19 Mode (4 bits)
  - 4.4.20 Data Check
  - 4.4.21 End
  - 4.4.22 Unit Check
  - 4.4.23 Unit Exception
  - 4.4.24 Stack
  - 4.4.25 Data Buffer (8 bits)
  - 4.4.26 Check Bit B V. Terminal Controls
- 5.1 Basic Function
- 5.2 TC Field
  - 5.2.1 Sadone
  - 5.2.2 Sadtwo
  - 5.2.3 Sadthree
- 5.3 Dual Line Speed
  - 5.3.1 Sadzero
- 5.4 Terminal Control Logic (Terminal Type 1)
  - 5.4.1 Character Recognition Summary
  - 5.4.2 Mode Field
  - 5.4.3 Sequence Field
  - 5.4.4 Polling and Addressing 5.5 Terminal Control Logic (Terminal Type 2—T/C 2)
5.5.1 Character Recognition Summary
5.5.2 Mode Field
5.5.3 Sequence Field
VI. Auxiliary Sampling Line and Controls
6.1 S-Line Timing
6.1.1 S-Clock Line Address Decoder
6.2 Access Register (S-Register)
6.3 S-Line Control Word Format
6.3.1 LOSC
6.3.2 Strobe Count (4 bits)
6.3.3 Bit Service
6.3.4 Transmit/Receive
6.3.5 Data Bit
VII. Automatic Dialing Unit
7.1 Function
7.2 Data Set
7.3 Data Set Line Adapter
7.4 Automatic Calling Unit (ACU)
7.5 Dial Adapter
7.6 Sequence Field
7.7 Error Conditions
7.7.1 Not Operational
7.7.2 Receiving
7.7.3 Timeout
7.7.4 Equipment Check
7.8 Automatic Dialing
7.9 Automatic Answering Operation
VIII. Description of Data and Status Servicing
8.1 Output Data Servicing
8.2 Input Data Servicing
8.3 Stop Sequence
8.4 Status Servicing
8.4.1 Status Conditions During Initial Selection
8.4.1.1 All Zeros
8.4.1.2 Busy, Status Modifier, Control Unit End
8.4.1.3 Unit Check
8.4.1.4 Status Modifier
8.4.1.5 Channel End and Device End
8.4.2 Status Conditions at End of Command Execution
8.4.2.1 Channel End and Device End
8.4.2.2 Channel End, Device End, and Unit Exception
8.4.2.3 Channel End, Device End, Unit Exception, and Unit Check
8.4.2.4 Channel End, Device End, and Unit Check
8.4.3 Sense Command to Further Define Status
8.4.3.1 Sense Byte
IX. Functional Description of Transmit Operation
9.1 Write Command
9.2 Output Data Servicing
9.3 Sampling of Data
9.4 Transmit Echo Check
9.5 Write Marks
9.6 Transmitted Distortion
9.7 Auto Wrap
9.8 Ending Transmit Operation
X. Functional Description of Receive Operation
10.1 Read Command
10.2 Sampling of Data
10.3 Ending a Receive Operation (Line Time Out)
XI. Detailed Discussion of the Operation of the Transmission Control Unit
11.1 Initial Selection
11.1.1 Status Signalled
11.2 Command Cycle
11.2.1 Write Command
11.2.2 Gating Command Register to Mode Field or TC Field
11.2.3 Ending of Command Cycle
11.3 Transmit Operation 11.3.1 Transmission of All Marks (Seq. 0—Reset)
11.3.2 Transmission of First Character (Seq. 1—Data)
11.3.3 Sampling of Transmitted Data
11.3.4 Sampling of Transmitted Data with Auxiliary Sampling Line Attached
11.3.5 End Transmit (Sequence 3)
11.4 Receive Operation
11.4.1 Sampling of Received Data
11.4.2 Sampling of Received Data with Auxiliary Sampling Line Attached
11.4.3 End Receive Operation
11.5 Operation Performed by Terminal Controls
11.5.1 Sequencing and Character Recognition
11.5.2 Longitudinal Redundancy Check (LRC)
11.6 Autowrap Operation
11.7 Automatic Dialing Operation
11.7.1 Sequence 0—Reset
11.7.2 Sequence 1—Dialing
11.7.3 Sequence 2—Stop
11.7.4 Sequence 3—Prepare End
11.7.5 End of Dial Operation

I. INTRODUCTION

1.1 *General Description of the Basic Transmission Control Unit (XCU)*

The Transmission Control Unit will first be broadly described with reference to FIGURE 1. The overall problem is to provide means for communicating between a Central Processing Unit and Multiplexor Channel 10 and a plurality of remotely located and geographically distributed communication terminals (unshown) via Communication Line 12. Each telephone or telegraph Communication Line 12 is attached to a Line Adapter 54 and is assigned a specific address. For example, 0, 1 . . . 14. In the embodiment shown, 15 communication lines are attached and communicate with the Central Processing Unit 10. The Central Processing Unit communicates with its Input/Output Devices via a Multiplexor Channel. A typical Computer and Multiplexor Channel are more fully described in U.S. patent application Ser. No. 357,372, G. M. Amdahl et al., filed Apr. 6, 1964, and U.S. patent application Ser. No. 357,369, L. E. King et al., filed Apr. 6, 1964.

The Central Processing Unit and Multiplexor Channel 10 communicate control signals to the Transmission Control Unit via Control Line 16 and receive control responses from the Transmission Control Unit via Control Line 18. Data are transferred to the Control Unit via Data Lines 20 and data are received from the Control Unit via Data Line 22. The control and data lines from the Multiplexor Channel are terminated in the interface and Command Controls Section 24 of the Control Unit. This section of the Control Unit also contains Start of Service and Service Controls for performing further control functions. The entire Block 24 will be referred to generally as "Interface and Controls Section." The Interface and Controls Section 24 communicates with Recirculating Storage and Terminal Control Section 26 via lines 28 and 30.

The Recirculating Storage and Terminal Controls Section is comprised of two Recirculating Memories C1 and C2 which operate in synchronism. The contents of these registers are made available at Output Registers R1 and R2 respectively, under control of a basic timing circuit. Terminal Controls TC1, TC2 and TC3 communicate via an OR circuit 32 with a Section 34 referred to as Common Controls. The Common Controls are time-shared by the 15 communication lines under control of the basic timing circuit and line control words associated with each of the 15 channels and stored in Recirculating Memories C1 and C2. The Terminal Controls TC1, TC2, and TC3 are also time-shared under control of terminal control bits stored in the line control word in Memory C2. The Common Controls are connected to Registers R1 and R2 via lines 36, 38 respectively, and with the Interface Controls via line 40.

The final portion of the control unit is comprised of the Auxiliary Sampling Control and the Line Scanner Logic Block 42. Communication between this portion of the machine and the common controls is via Data Paths 44 and 46 and Control Paths 48 and 50. Also associated with this section of the control unit are the Dial Common Controls 52, discussed in Section 1.3. The Sampling Line Controls and Auxiliary Sampling Memory 42 are discussed in Section 1.2. The Line Scanner is attached to a plurality of Line Adapter Logic Blocks 54 via Input/Output Paths 56 and 58. The line adapter portions are attached to telephone or telegraph lines which communicate with external data communication networks which are not illustrated in this drawing. Automatic Calling Units 60 may also be attached to a telephone line.

The basic Transmission Control Unit functions in the following manner. The Central Processing Unit via its Multiplexor Channel 10 issues a control over Control Line 16 to the Interface 24 of the control unit. This control signal indicates that an address is being sent over the Data Bus 20. If this address corresponds to one of the addresses of a communication terminal attached to this control unit, the interface will give a responding control over line 18 indicating that the address has been stored in the interface control circuitry. The Multiplexor Channel then issues a command over the same Data Bus 20, and a control over the line 18 indicating that the command is being sent. The interface of the control unit then stores this command in a command register. The Start of Service and Service Controls initiate proper control signals over lines 28 and 40 to place the command in the proper Line Control Word (LCW) stored in Memory C1 and C2 corresponding to the LCW address sent previously by the Multiplexor Channel. If the command is a transmit command, for example, data characters will be requested sequentially via control of the addressed LCW and transmitted serially over the addressed Line Adapter 54 at the proper point in time when the Line Scanner 42 has selected the appropriate line adapter.

The Terminal Controls TC1, TC2, and TC3 communicate with the common controls via OR 32 and eventually with the line adapters to control the unique functions of different terminal types attached to the line adapter. Thus, in the embodiment shown three different types of terminals may be attached corresponding to the Terminal Controls TC1, TC2, and TC3. The Terminal Controls TC1, TC2, and TC3 perform such functions as controlling the number of bits that will comprise a coded character in a message transmitted over the respective terminal type. Thus, if Line Adapter 0 corresponds to a Terminal Control Type TC1 and its bit code length is eight, TC1 will indicate to the common controls and eventually to the line control word stored in C1 and C2 that after eight bits have been transmitted the proper end of character routine must be executed.

The Line Adapter Section 54 comprises termination logic for adapting the interface of the control unit to the particular Communication Line 12 attached thereto.

Data are received via a plurality of communication lines 12 and the respective line adapters address 0–14 on a time-division multiplexed basis by scanning the line adapter sequentially under control in the basic clock of the control unit, which drives the Line Scanner 42. The data and controls so scanned are transmitted serially via line 44, 46, 48, and 50 to the Common Control Section. Common controls are time-shared, therefore, by each of the 15 line adapter units. From the common control various control signals and data are transferred to the respective line control word stored in C1 and C2 via lines 36 and 38. Access to the line control words is gained by means of Registers R1 and R2. Data, controls, line control word status information, etc., are transferred from the line control word stored in C1 and C2 via Registers R1 and R2 and Output Line 30 therefrom to the Interface Control Section 24 for subsequent transfer via lines 18 and 22 to the Multiplexor Channel of the Central Processing Unit.

1.2 *General Description of the Auxiliary Sampling Recirculating Storage*

The auxiliary sampling storage is a recirculating storage similar to Recirculating Storage C1 and C2. The auxiliary storage is, however, only ¼ the length of C1 or C2. The auxiliary storage may be used to sample the Line Adapter 54 (LA 0 thru 14) at a much faster rate for data transfer than the Recirculating Storage C1 and C2. For this purpose, an additional clock called the S Clock is provided which synchronizes the auxiliary sampling line with line adapters. Thus, two separate scans are utilized. The S scan is used for sampling the data at a fast rate and for subsequent transfer to the Recirculating Memories C1 and C2. The second scanning is accomplished by the C Clock which operates at a much slower rate to sample the line adapters for control information which is not changing as rapidly as the data information. The auxiliary sampling may or may not be used depending upon the line speed of the communication terminal attached to the control unit. Use of the auxiliary sampling storage will, however, increase the speed of the overall data transfer approximately three times.

1.3 *General Description of Automatic Dialing*

A separate section containing Dial Common Control 52 is provided for receiving dial information over line 62 to establish a telephone line connection between one of the line adapters and the control unit. The central processing unit via the multiplexor channel may initiate a dial command to connect a remote terminal to the computer via the data path of the control unit. The computer establishes connection with the control unit, and transfers the address of the desired Automatic Calling Unit 60 along with a dial command. The address selects the correct line control word stored in C1 and C2 and the command is stored in the line control word associated with that address. The control unit now handles the entire dialing sequence by presenting the dial digits at the request of Automatic Calling Unit ACU 60, which signals the common controls via line 64 when a connection is made. This information is transmitted via line 68 to the common controls and eventually to the line control word stored in the recirculating memory. When a connection is made, the line adapter associated with the ACU 60 (in this case, Line Adapter 14) is connected to the Telephone Line 12. After the connection is made the dial command is terminated and the line control word is available to service the data communication line via an associated data set (not shown) within the Line Adapter 54. The control unit monitors the progress of all calls being performed every revolution of the recirculating memory. Data may now be transmitted or received from the remote user on Telephone Line 12 via Line Adapter 14 under control of the Transmission Control Unit in the same way any other data is transmitted or received.

The LCW stored in Recirculating Memories C1 and C2 operates as both a control and a data transfer path. It first operates to transfer dial digits to set up the call, monitor the sequence of operations for connecting the telephone line with the line adapter and then performs the normal data communication transfer functions by passing data from the computer to the connected telephone line.

II. GENERAL DESCRIPTION OF THE VARIOUS SECTIONS OF THE CONTROL UNIT (FIGS. 2–6)

2.1 *Interface Controls (FIGS. 2 and 3)*

The Interface Section 100 provides logic for connecting the input/output interface with the computer channel and controls signal sequences with the computer channel.

Unit Address Register 1 (UAR 1)–178 stores the unit address of the communication line being addressed.

Unit Address Register 2 (UAR 2)–108 stores the address sent by the computer on the Bus Out Channel 102. UAR 2 is often used by interface controls to address the proper line control word stored in the Recirculating Memory C1 and C2.

A Command Register (CMDR) 112 is provided to store a command received from the computer over "Bus Out."

Command Control Circuitry 122 is provided to perform such functions as clearing the line control word memory to start a new command, loading the new command into the memory, ending commands, and issuing various other control signals.

I/O Register 170 buffers data for subsequent transfer to and from the computer. This register is also used to transfer a status byte to the computer which indicates the status of an addressed terminal.

Controls for Start of Service 148 provide such controls as are necessary to obtain data from and transfer data to the computer.

The Service Controls 200 provide for control functions and data transfer between the interface section and the common controls for controlling various service functions.

2.2 *Recirculating Storage and Access Registers R1 and R2 (FIG. 4)*

Two delay lines, C1 and C2 (208, 214) operating in synchronism are provided in this section. These delay lines are divided up into 15 time slots of 32 bits each. The time slots are referred to throughout the specification as a Line Control Word (LCW). A line control word is comprised of 64 bits, 32 bits from each of the Delay Lines C1, C2. Each line control word has a unique address assigned to it corresponding to one of the 15 communication lines attached to the control unit. The recirculating delay lines communicate with Registers R1 and R2 (210, 216) for translating the serial data stored therein into a parallel form for subsequent alteration and transfer to the common controls section and to perform various control operations.

2.3 *Common Controls (FIG. 4)*

The Common Controls 232 contain various registers and logic which are shared in common by the fifteen line control words associated with the fifteen communication lines.

2.4 *Terminal Controls (FIG. 4)*

This section contains logic necessary to perform functions characteristic of a given terminal type. A terminal type refers to the type of communication line that is attached to the control unit by telegraph lines, a particular data set, modern or other apparatus and a line adapter. One of the three Terminal Controls 222 may service a number or all of the communication lines attached to the control unit. Up to three different types of terminals may be connected in the embodiment shown. The terminal control manipulates bits in the line control word of its associated communication line. Functions such as character length control, character recognition, character sequence recognition, longitudinal redundancy check (LRC), accumulation and checking or vertical parity checking of the transmisison code are provided by this function when required by the terminal type attached.

2.5 *Line Adapter (FIG. 6)*

A Line Adapter 276 is provided for each communication line attached to the control unit. Since 15 lines are shown attached, 15 corresponding line adapters are necessary. The line adapter matches the interface of the communication facility and also provides a bit buffer for the transmit data line. The bit buffering utilizes a sampling technique which allows for transmission with a minimum amount of distortion.

2.6 *Sampling Controls and Recirculating Storage (FIG. 5)*

The Sampling Controls 250 control a shorter delay line called the S or Sampling Line. The S line is ¼ the size of the larger lines C1 or C2, and therefore recirculates at a much faster rate. The S line transfers single data bits from the line adapter section of the machine to perform the data sampling at a fast rate. The only control functions performed by the S line controls are those which are necessary to control the transfer of data. The other control functions are performed by the Main Storage C1 and C2 and the Common Controls, at a slower rate.

2.7 *Dial Common Controls (FIG. 5)*

The Dial Common Controls 254 contain an address register and a digit register for storing the address of a particular automatic calling unit and for storing the digits received from the computer. The dial common controls carry out functions necessary to establish a connection to a telephone line via an automatic calling unit.

2.8 *Dial Adapters (FIG. 5)*

The Dial Adapters 258 contain apparatus necessary to provide the proper interface between the transmission control unit and an automatic calling unit.

2.9 *Telephone Data Set (FIG. 6)*

The Telephone Data Set 300 contains apparatus for receiving and sending data over a telephone line.

2.10 *Automatic Calling Unit (FIG. 6)*

The Automatic Calling Unit or Auto Dialer 304 provides an interface with the telephone line for receiving control information and dialing information for automatically dialing a remote data set.

III. INTERFACE CONTROLS 3.1 *Interface Input/Output Lines*

3.1.1 From computer channel:

- Suppress Out
- Select Out
- Metering Out
- Clock Out
- Address Out
- Command Out
- Service Out
- Operational Out
- Bus Out (8 parallel lines)

3.1.2 To computer channel:

- Address In
- Status In
- Service In
- Operational In
- Metering In
- Request In
- Bus In (8 parallel lines)

3.2 *Control Unit Reset*

The "Operational Out" line of the I/O interface is a line from the multiplexor channel which is attached to all transmission control units and is used for interlocking purposes. If "Operational Out" drops while "Suppress Out" is up (selective reset operation) the control unit registers and the line control word fields (except the TC1 and TC2 field) corresponding to the address in the address register are reset. If "Operational Out" drops while "Suppress Out" is up, but the control unit is not connected to the interface at that time, the control unit ignores the signal.

If "Operational Out" drops while "Suppress Out" is down (general reset) the control unit registers and all line control word fields are reset whether or not the control unit is connected to the interface at that time.

These resets will cause line control word storage (except for the check bits A and B) and all control unit registers to be reset.

3.3. *Initial Selection*

An initial selection sequence is started by the computer channel by issuing an I/O instruction described below. The control unit will signal "Control Unit Busy" by responding to an I/O instruction with the status "Busy," "Status Modifier," and "Control End" bits on "Bus In" energized along with a signal on "Status In." Busy may occur if the Command Register and Unit Address Register 2 are in use with a previous command cycle.

3.4. *I/O Instructions*

The computer communicates with the control unit by energizing the interface lines to signal the following instructions: Start I/O, Halt I/O, Test I/O, and I/O No-op.

3.4.1 Start I/O

Upon receiving "Select Out" on the I/O Interface 100 (FIG. 2) when the interface "Address Out" line is up, the control unit decodes the address on "Bus Out." If this address compares with one of this control unit's addresses, the control unit loads that address into Unit Address Register 2 (UAR 2) 108, and responds with "Operational In." At the same time UAR 2 is gated into "Bus In" 198 and the "Address In" line is raised to indicate that the address is being gated out. The channel then responds with a channel command on "Bus Out" 102 with "Command Out" line raised. This command is then loaded into the Command Register (CMDR) 112, and is checked for validity.

Figure 3:
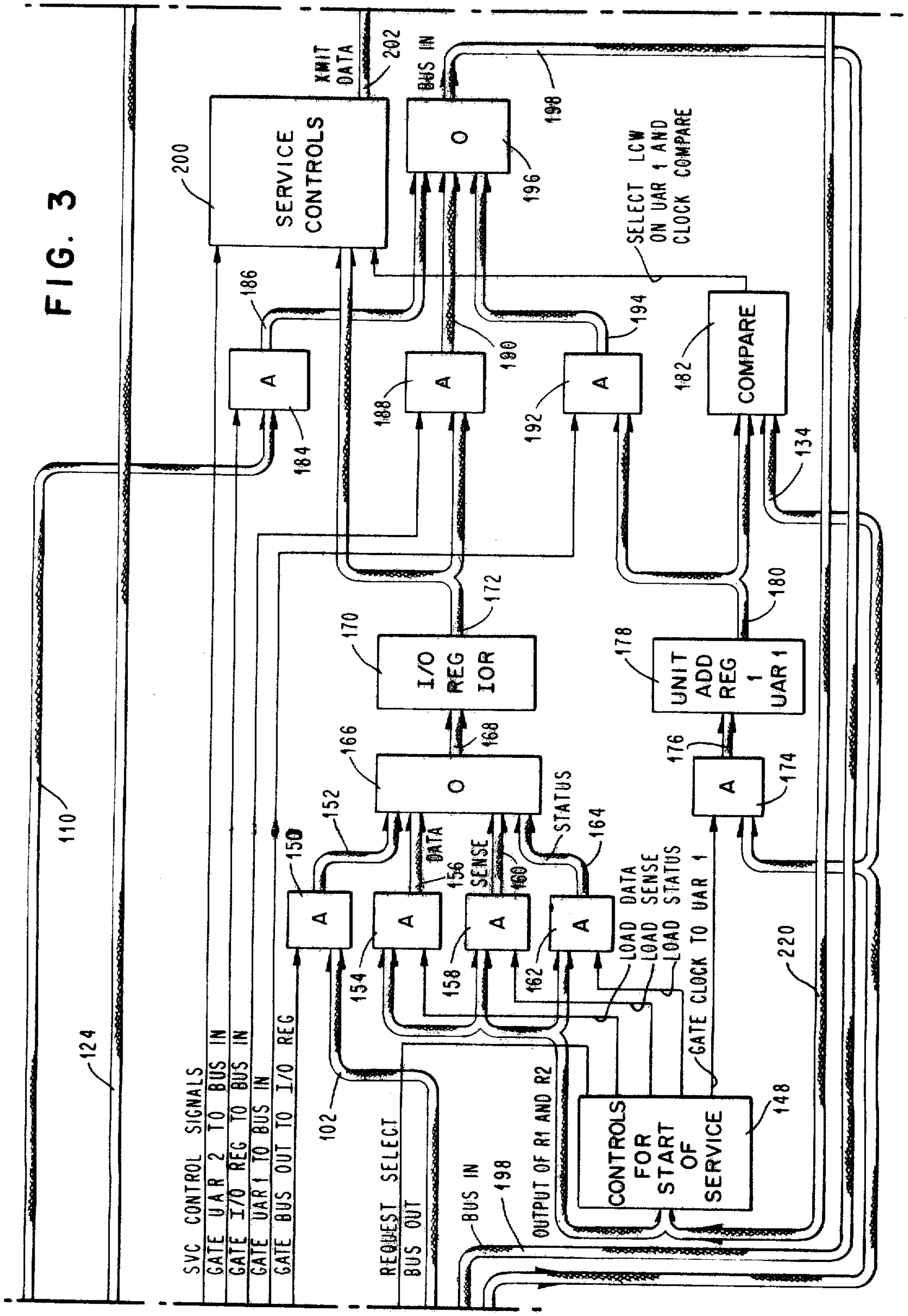

If this command is acceptable to the control unit, an all-zeros status byte is gated to "Bus In" and the "Status In" line is raised. The channel responds with "Service Out" to verify the validity of the transaction. The control unit then drops "Operational In." UAR 2 is compared in Compare 116 with the Clock Binary Counter Output 134 to determine the proper time for transfer of the contents of the command register to the storage and common controls section (FIG. 3).

If the command is not acceptable to the control unit, "Unit Check" byte is gated to "Bus In" and the "Status In" line is raised. A "Service Out" response by the computer to "Status In" verifies the validity of the transaction and the control unit drops "Operational In." Unit address UAR 2 is again compared with the binary counter to select the addressed line control word (LCW). When the addressed line control word is read from the Recirculating Storage 208, 214 (FIG. 4) a code representing the reason for responding with unit check (e.g. command reject or bus out parity check) is set into the sense field of the line control word.

3.4.2 Halt I/O

Once the control unit has responded to initial selection (e.g. Start I/O) by raising "Operational In," the channel may signal "Halt I/O" by raising "Address Out" without raising "Select Out." When the binary address indicated by the clock compares with UAR 2, the addressed line control word is directed to halt. After the present command in the addressed line control word is terminated, the interface controls regain the selection of the multiplexor channel and the proper status information is presented to the channel. If the present command is "Write," the character to be transmitted and the character buffered are sent to the proper terminal before the "Channel and Device End" signals, indicating response to "Halt I/O" are sent to the channel.

3.4.3 Test I/O

The control unit responds unconditionally to an all-zero command during initial selection (i.e. Start I/O) with the status modifier bit of the unit status byte. The all-zero command may result from either the execution of the "Test I/O" instruction or an error within the channel. No access is made to LCW storage unless the channel stacks the status response. In this case, all-zeros status is presented to the channel when the interface signal "Suppress Out" falls.

3.4.4 I/O No-Op

The "I/O No-op" instruction is treated differently from the other instructions. This instruction is treated as a control immediately so that "Channel End" and "Device End" are both signalled in the status response to the instruction. No access is made to line control word storage unless the channel stacks the status response. Thus, the control unit does no more than decode the instruction, send back the status byte, and disconnect from the channel.

3.4.5 Stack

Stack is signalled by the channel by raising the "Command Out" line instead of the "Service Out" line in response to the "Status In" response. This can occur during initial selection or when presenting unit status to terminate an operation. When a stack condition occurs, the stack bit is set in the addressed LCW and a unit status is reread into the proper line control word status field. Should an all-zero status response be stacked by the multiplexor channel, all-zero status is presented to the channel when the interface signal "Suppress Out" falls.

3.5 *Commands*

The following list is a summary of the various commands which may be given to the control unit.

3.5.1 Prepare

This command may be used in a contention type communications system to indicate to the processor that the data is arriving. When a valid start bit is detected, by a line in which this prepare instruction is stored, the command is terminated when the line returns to mark status. "Prepare" may be command chained to a normal "Read" Command. No data transfer occurs with this command, and line time out is not active during the execution of this command.

3.5.2 Inhibit

Upon acceptance of this command a normal "Read" operation is performed but line time out is inhibited.

3.5.3 Search

In response to this command the control unit causes the addressed line control word to receive data but does not allow data to be transferred to the computer channel. Instead, the data is monitored for end of transmission (EOT).

3.5.4 Sense

Upon acceptance of this command, the control unit returns a single byte to the channel from the sense field of the addressed line control word. This byte defines detailed status of the addressed communication line. The sense field itself is defined in section 8.4.3.1.

3.5.5 Write

Data are transferred from the channel to the addressed communication line at a rate equal to that of the communication line speed.

3.5.6 Auto Wrap

Upon acceptance of this command, the control unit "Wraps" the output of the addressed communication line to the input of line zero for test purposes. The addressed line is then given a "Write" command and data are transmitted to the addressed communication terminal. The transmitted data is also received at line address zero. If a "Read" command is given to line zero the received data may be inspected by the computer. Thusly, a check on the transmitted data and the transmit and receive paths may be made.

3.5.7 Dial

In response to this command, bytes are transferred through the auto call logic to dial equipment provided by a common carrier at a data rate which is consistent with the dial equipment.

3.5.8 Break

In response to this command the addressed line transmits a continuous space signal. Bytes containing all zeros are transferred from the channel to the addressed line to provide control over the length of the space signal.

3.5.9 Read

In response to this command, bytes are transferred from the addressed communication line to the channel at a data rate equal to the speed of the communication line.

3.5.10 Sadzer

Upon receipt of this control order the control unit sets the terminal control field (two bits) within the addressed line control word to zero. No data transfer occurs.

3.5.11 Sadone, Sadtwo, Sadthree

Upon acceptance of one of these control orders, the control unit sets the terminal control field (two bits) within the addressed line control word to binary one, two, or three, respectively, depending upon which order was given. The terminal control logic with the internal address equal to one, two, or three is then associated electronically with the addressed communication line. No data transfer occurs.

3.5.12 Enable

Upon receipt of this control order, the enable latch is set within the line adapter of the addressed communication line. No data transfer occurs. The different functions which are performed by the enable latch for each type of line adapter are discussed in a subsequent section.

3.5.13 Disable

Upon receipt of this order, the control unit resets the enable latch within the line adapter of the addressed communication line. No data transfer occurs.

IV. RECIRCULATING STORAGE AND COMMON CONTROLS

Figure 4:
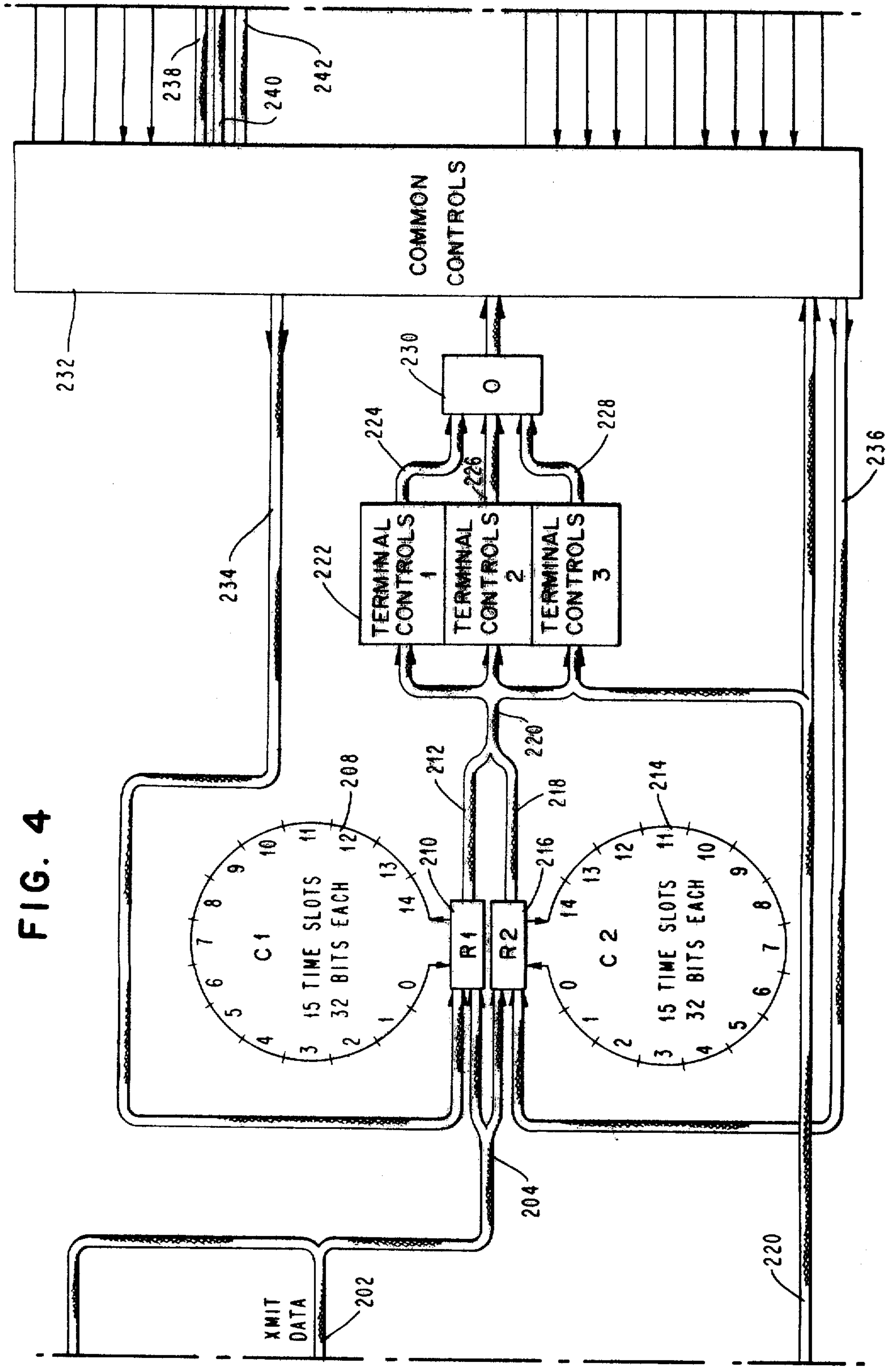
Figure 5:
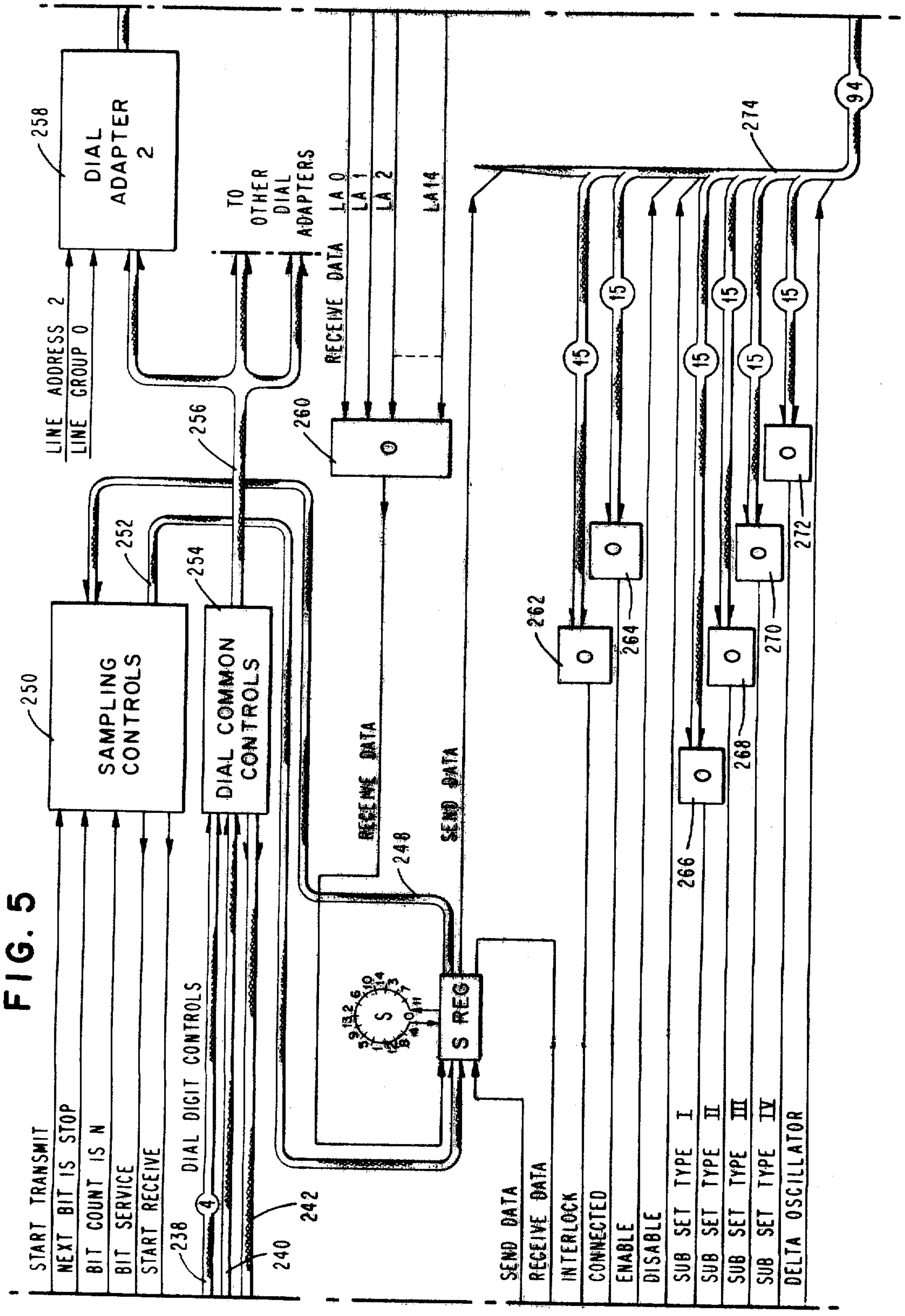
Figure 8:
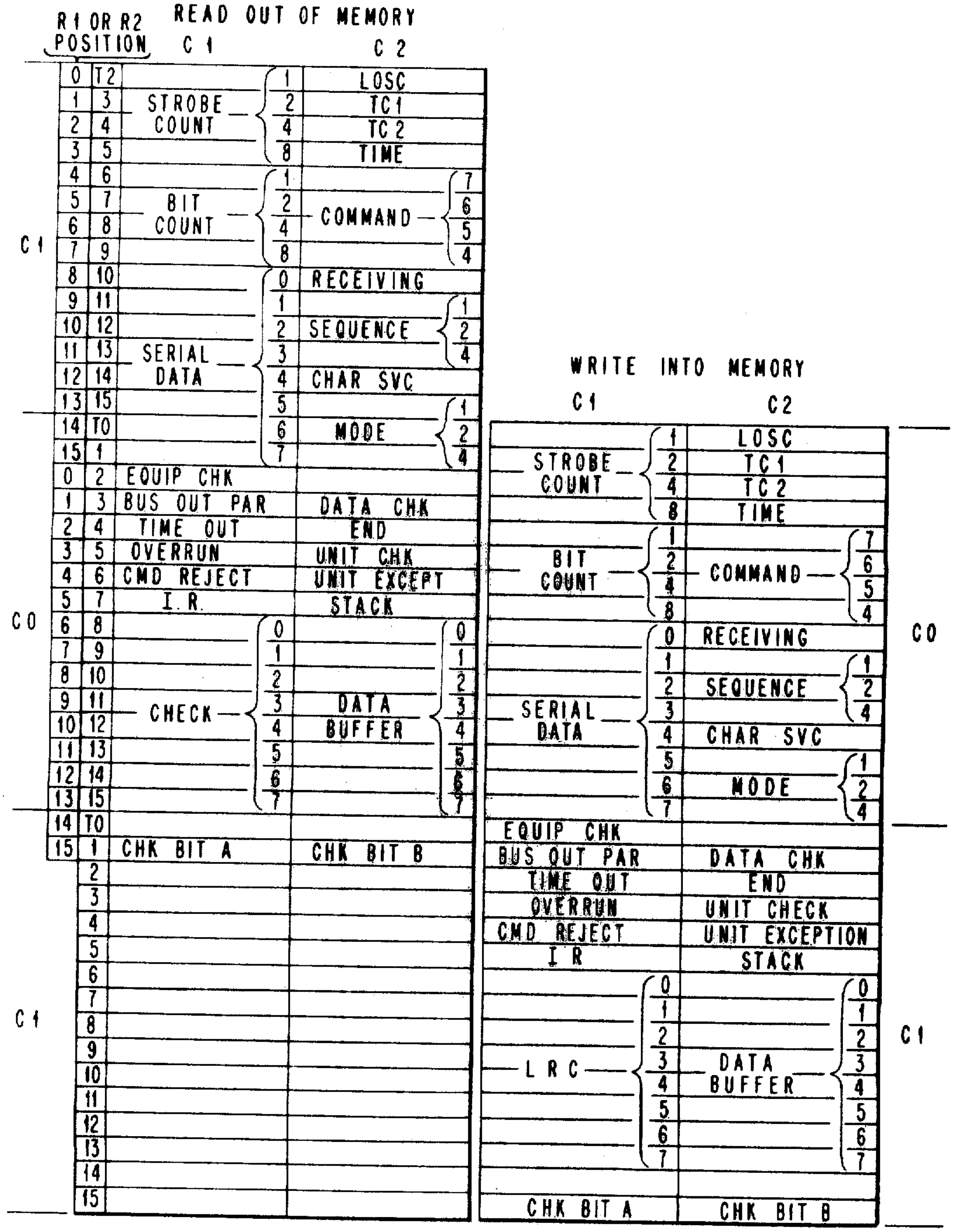

The basic storage of the transmission control unit is comprised of two Recirculating Delay Lines C1 and C2, 208, 214 (FIG. 4). A line control word (LCW) totalling 64 bit positions is associated with each communication terminal which may be attached to the control unit. In the embodiment shown, fifteen terminals are attached, therefore, there are fifteen line control words stored in the recirculating memories. The line control words are split in half, 32 bits are stored in C1 and 32 bits are stored in C2 providing a parallel operation. The LCW format is shown in FIG. 8 and the functions of the various fields are described in detail in section 4.4.

4.1 *Basic Timing*

Figure 49:
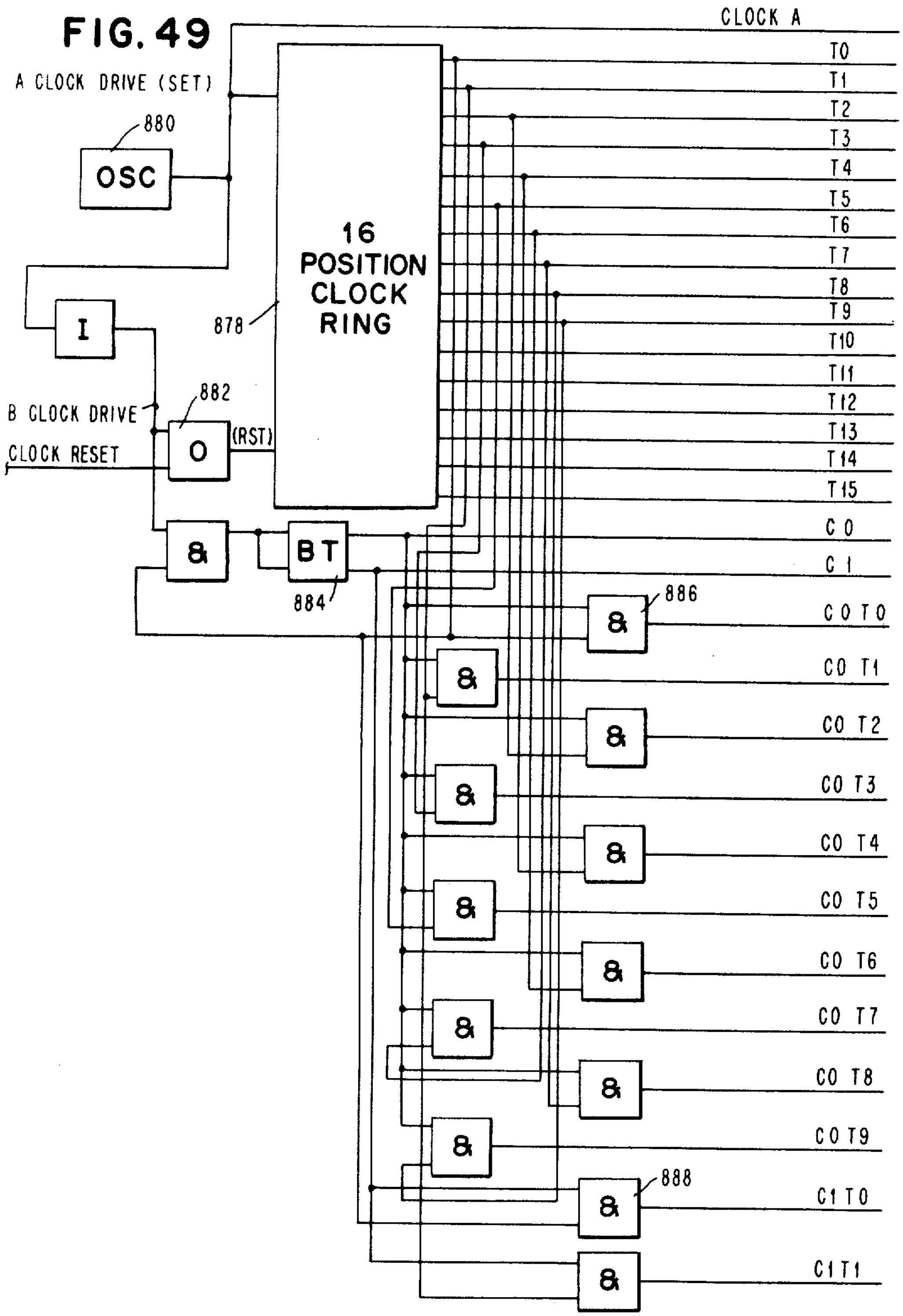
Figure 53:
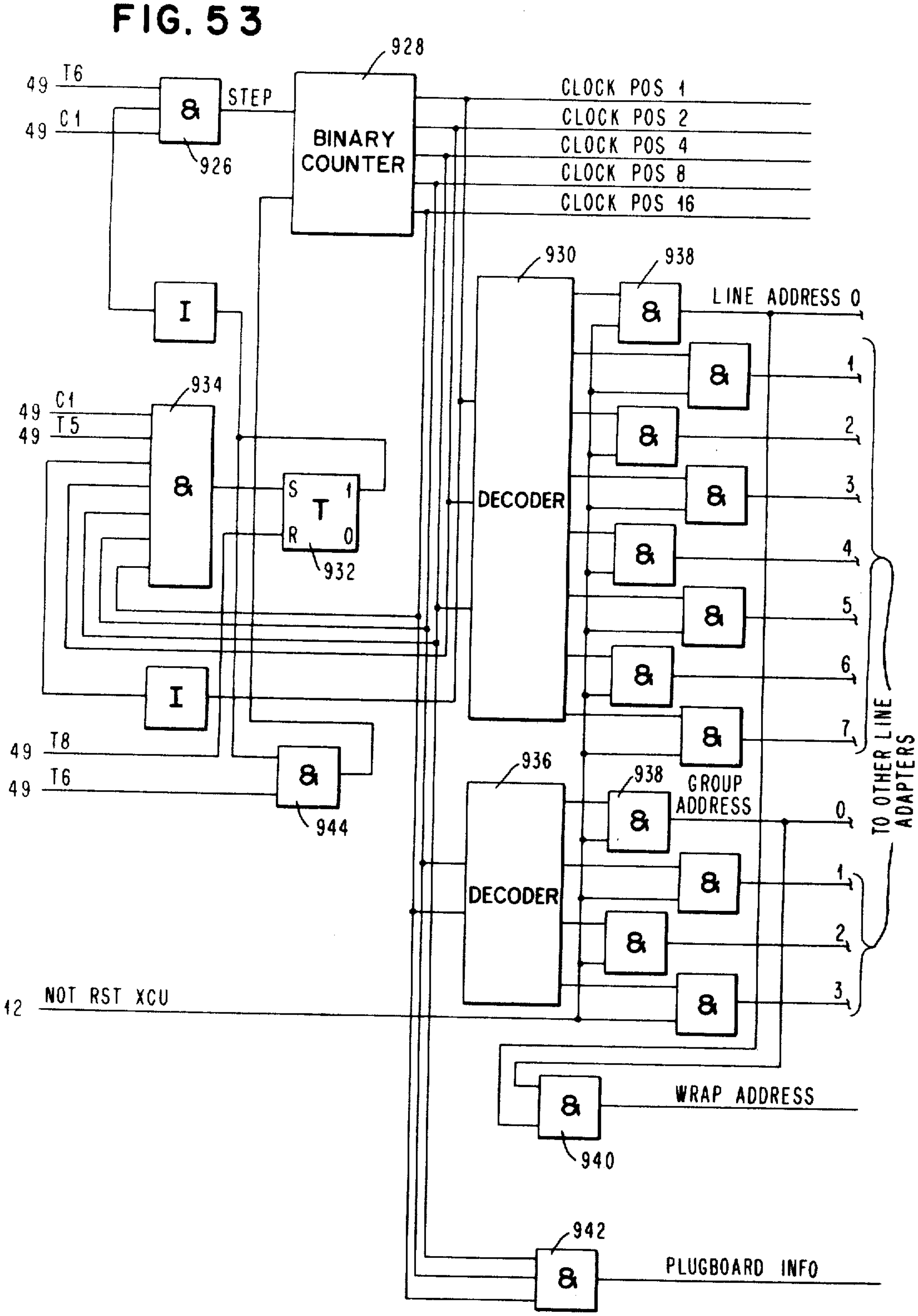
Figure 54:
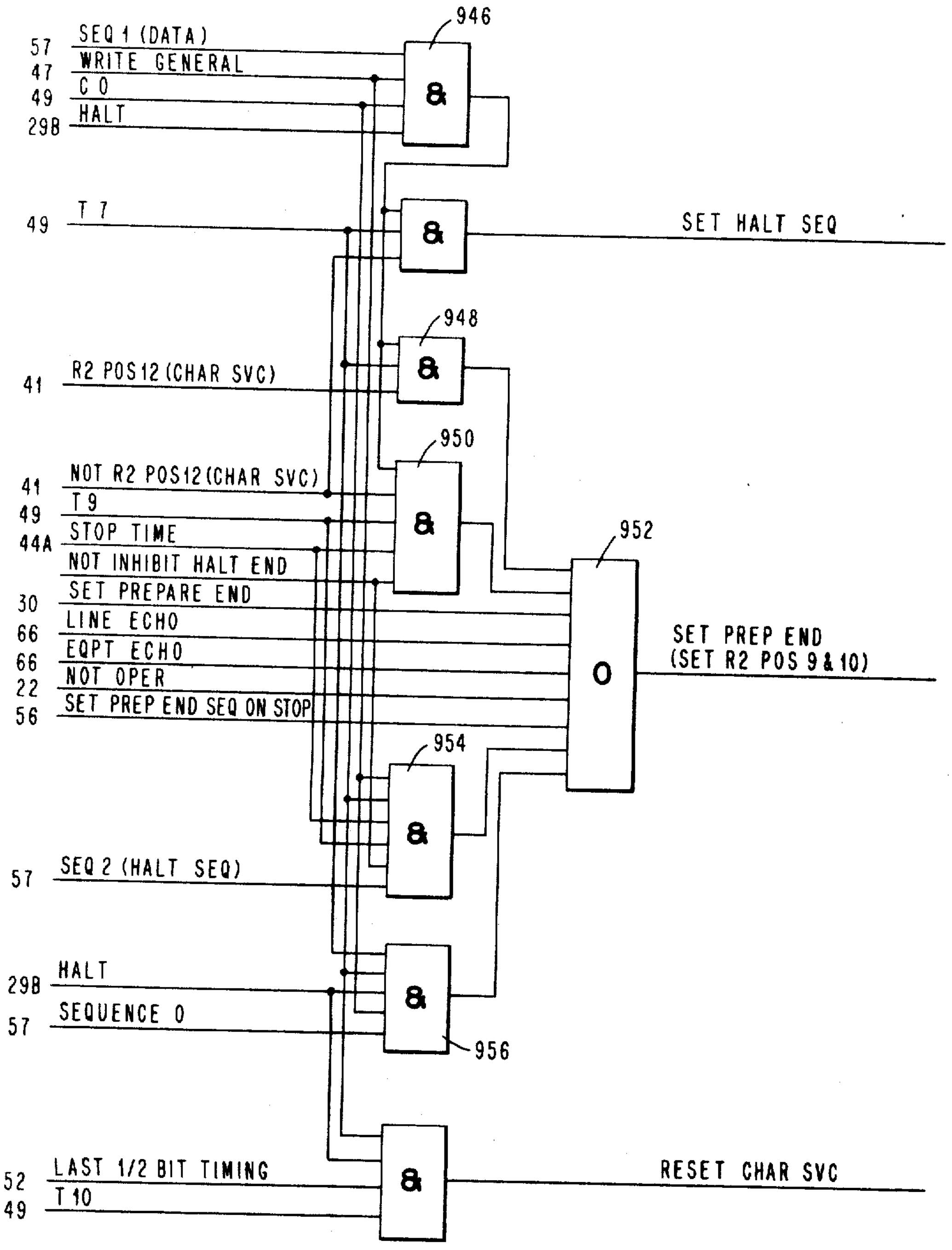

The storage and common controls operate from a clock providing the basic timing. The clock consists of two parts, a 16 position Clock Ring 878 (FIG. 49) and a Binary Counter 928 (FIG. 53).

The clock ring is driven by a one megacycle Oscillator 888. The output of the oscillator is called A-time and the inverted output is called B-time, alternating one microsecond pulses. During A-time, position $n$ is set if position $n-2$ is off and position $n-1$ is on. During B-time, position $n-1$ is reset if position $n$ is on and position $n+1$ is off. The ring advances forming 16 one-microsecond intervals $T_0$–$T_{15}$ by logic which combines the A- and B-time with the clock ring positions. Since 32 one-microsecond intervals are necessary to read out and recirculate the 64 bits of a given line control word (32 bits in each of the two recirculating memories C1 and C2) a further time division is necessary. This is accomplished by changing the state of a Binary Trigger 884 with the ring output which then forms two 16-microsecond intervals called $C_0$ and $C_1$. Throughout the logic clock timing pulses are formed by combining $C_0$ or $C_1$ outputs with appropriate $T_0$–$T_{15}$ pulses to obtain a desired timing pulse.

The Binary Counter 928 (FIG. 53) is provided to generate the unit address assigned to each communication Line Adapter 276 (FIG. 6) and thus each line control word stored in the Recirculating Memory C1 and C2. The binary counter has five stages and is incremented at T6 time during Binary Trigger C1 cycle by the output of AND 926. By this time, certain fields of the line control word are already read out of the Delay Line Memory C1 and C2 into the respective Delay Line Registers R1 and R2. Therefore modification of the line control word can begin immediately when the line adapter is selected.

After Binary Counter 928 has stepped to 15, all positions 1, 2, 4, 8, 16 are on. An output from AND 934 results at C1 T5 time thus turning on Trigger 932. The output from Trigger 932 degates AND 926 and energizes AND 944. At T6 time an output pulse from AND 944 resets Binary Counter 928. At T8 time Trigger 932 is reset which allows pulses to again step the counter.

Figure 85:
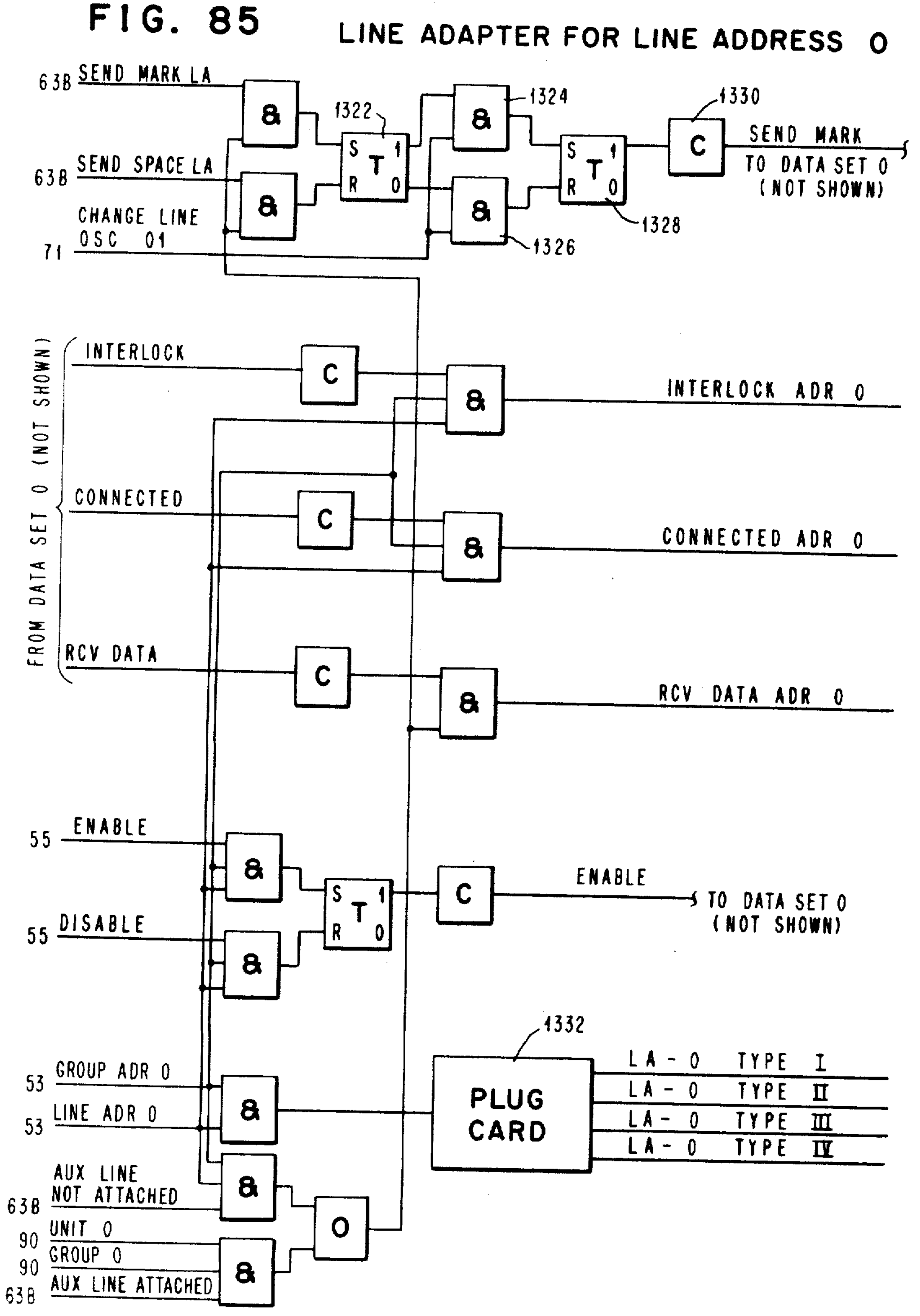
Figure 86:
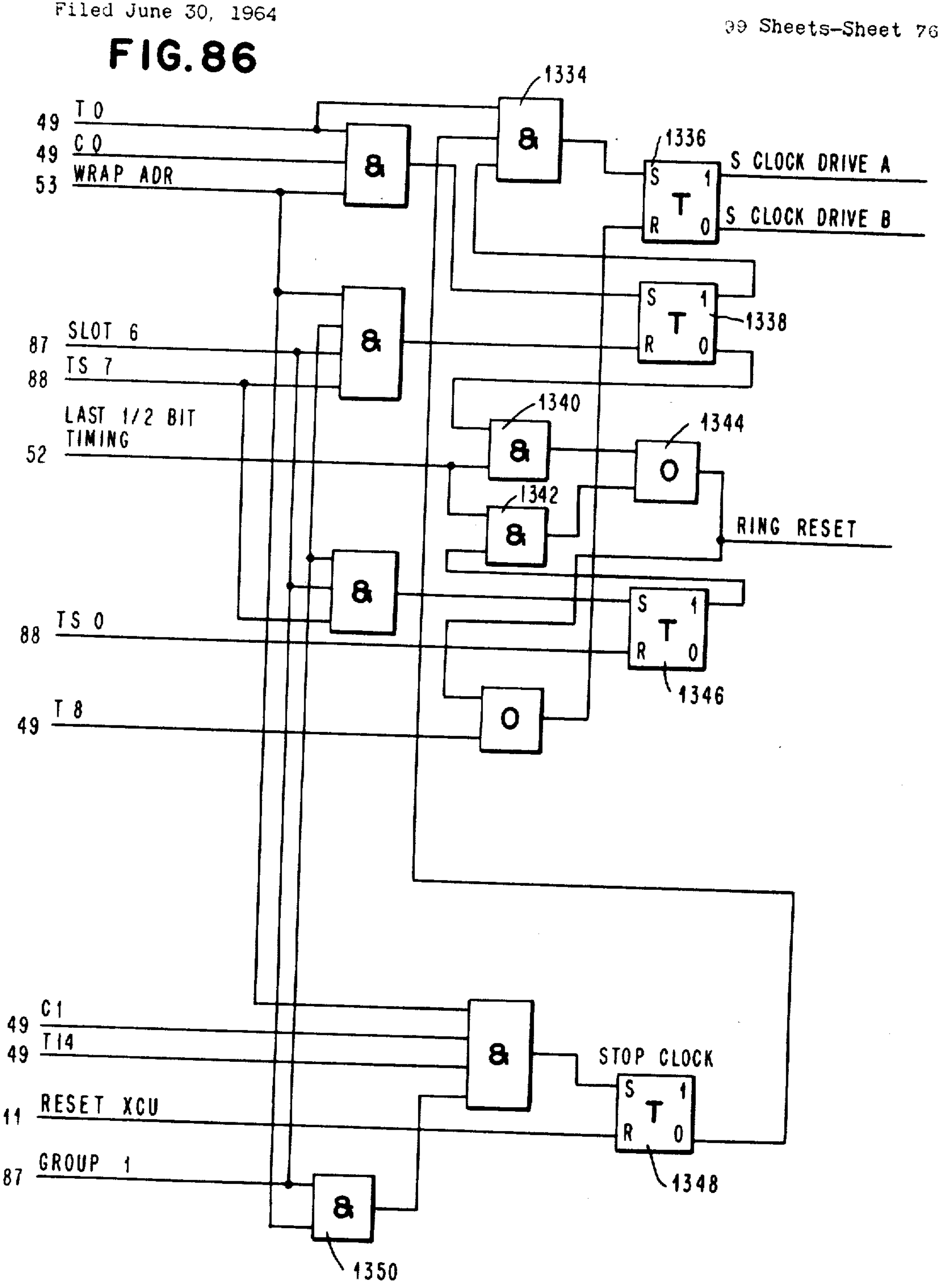

The counter shown in FIG. 53 allows the attachment of 31 terminals to the control unit although only 15 are illustrated. Each terminal is selected by a unique address. Decoder 930 generates 8 sequential outputs (Line Address 0–7) decoded from counter positions 1, 2, and 4. Decoder 936 generates four group addresses 0–3 from counter positions 8 and 16. Line Adapters 0–7 are selected by Group Address 0 combined with Line Addresses 0–7. Line Adapters 8–15 are selected by Group Address 1 combined with Line Addresses 0–7, and so forth for up to 32 line adapters. For example, in FIG. 85, the line adapter for Line Address 0 is selected by Group Address 0 and Line Address 0 which gates the group of AND circuits having inputs "Send M LA," "Send Space LA," "Interlock," "Connected," "Receive Data," "Enable," and "Disable."

4.2 *Recirculating Storage C1 and C2*

Two recirculating memories (FIG. 4), for example sonic delay lines, are provided, the length of which depends on the number of communication lines attached to the control unit. These recirculating memories provide storage for the line control words (LCW) associated with each terminal. For the 15 line embodiment shown, each delay line provides 32 bits of storage per communication line so that 64 bits are available comprising a line control word. Each delay line in the 15 line embodiment shown is 464 microseconds long. Added to each delay line length is 16 microseconds for the Storage Access Registers R1 and R2 (210, 216) which provide for examination and modification of bits stored in the line control word. The total delay is therefore 15 times 32 microseconds, or 480 microseconds.

4.2.1 Access Registers R1 and R2

As the bits are recirculated in the recirculating storage, they are serially read out of each delay line and sequentially set into the storage registers R1 and R2 for examination or modification. The bits are then written serially back into the associated delay line. The registers R1 and R2 are not conventional shift registers but provide for the stationary storage of a particular bit for 14 timing pulse periods.

Figure 40:
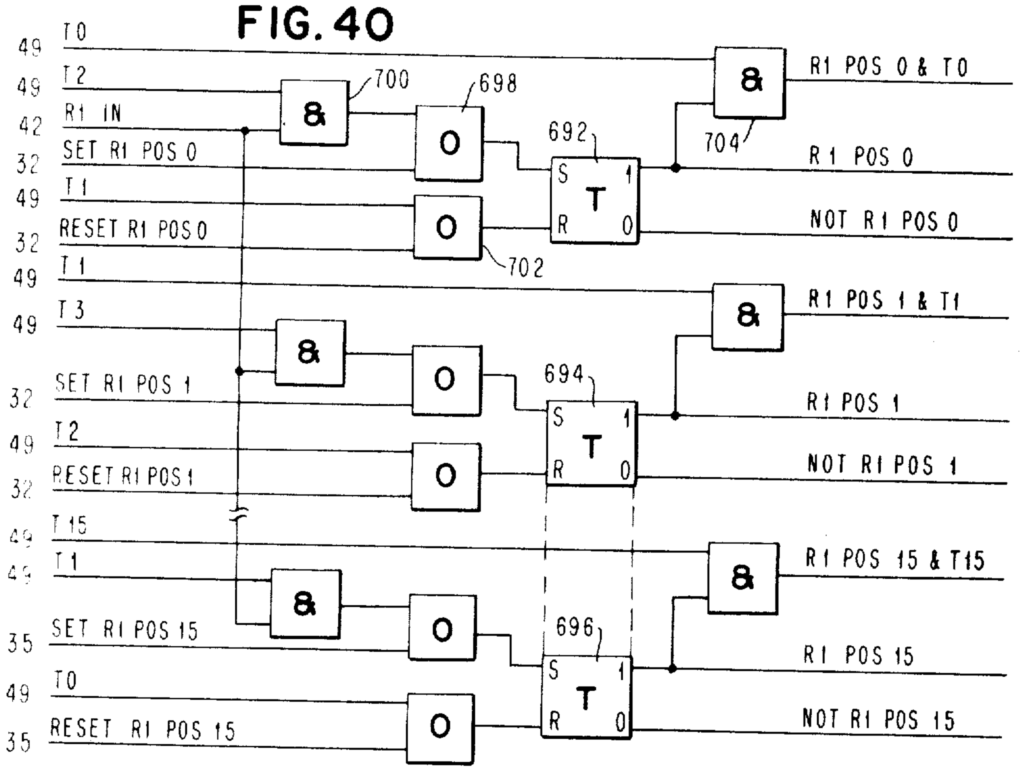
Figure 41:
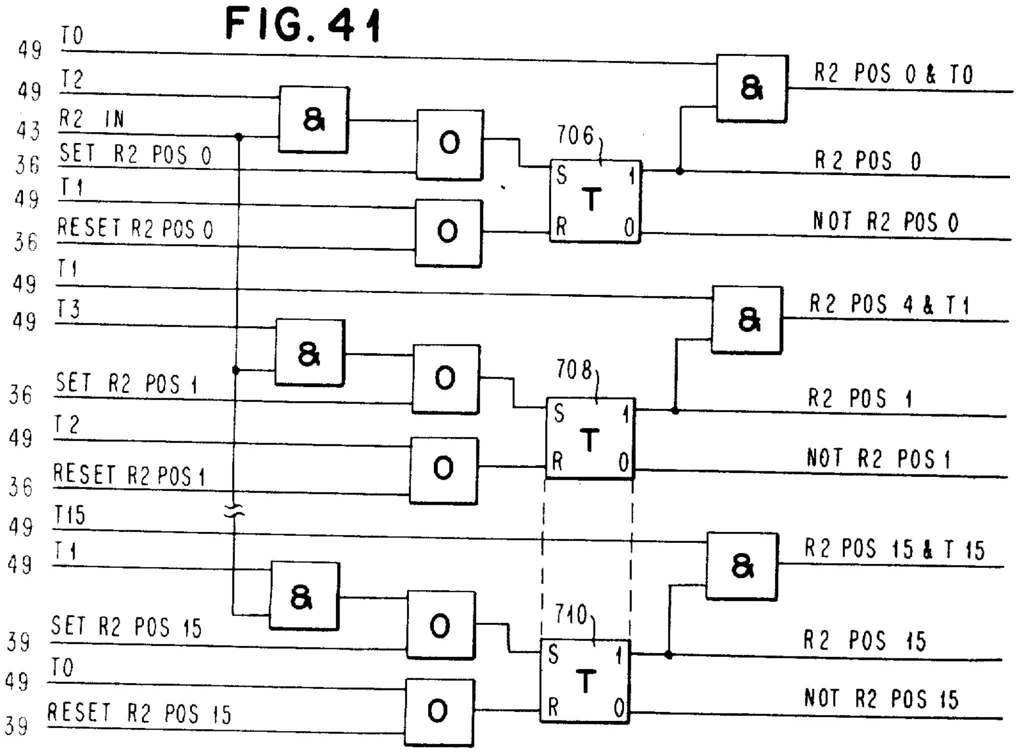
Figure 42:
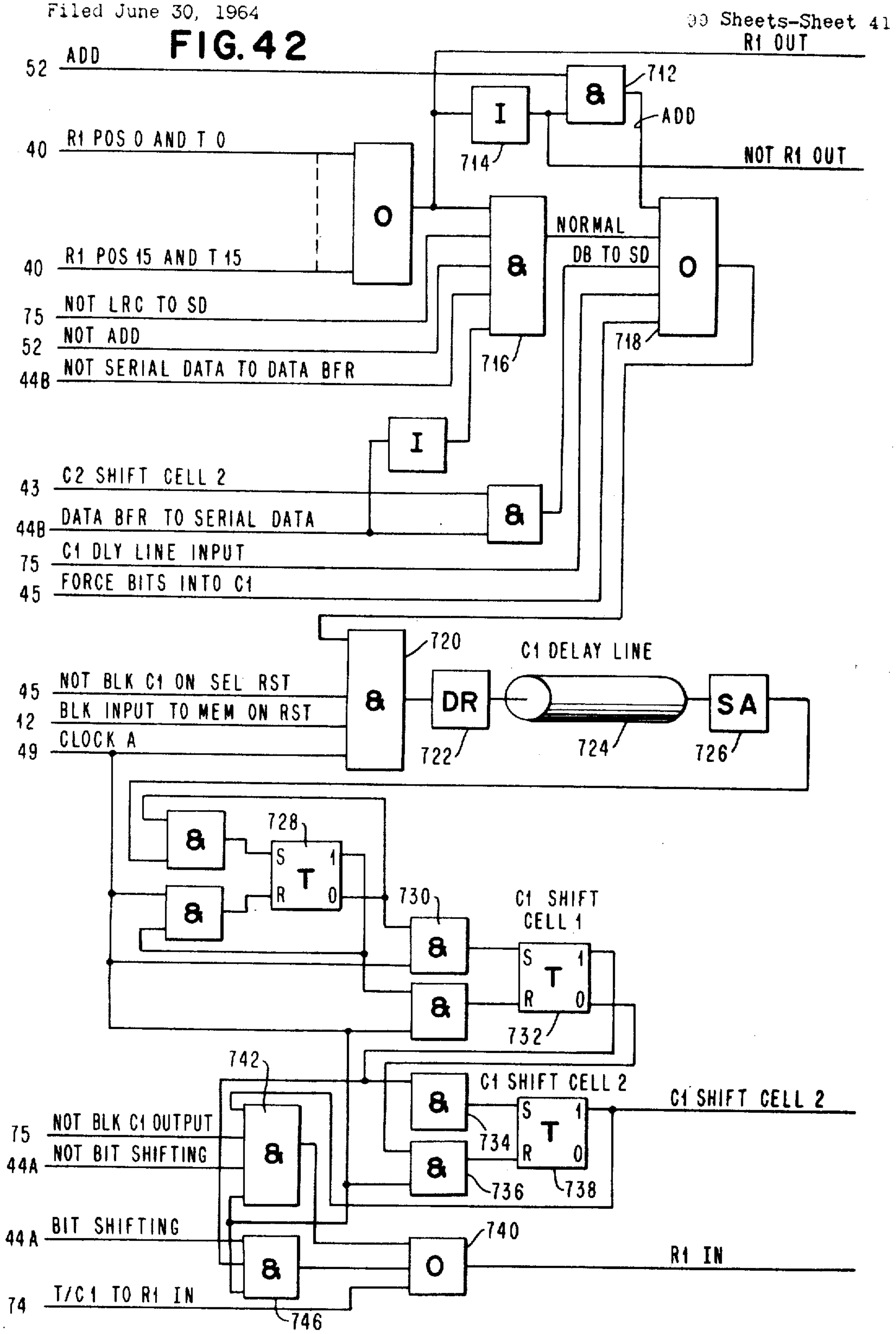
Figure 43:
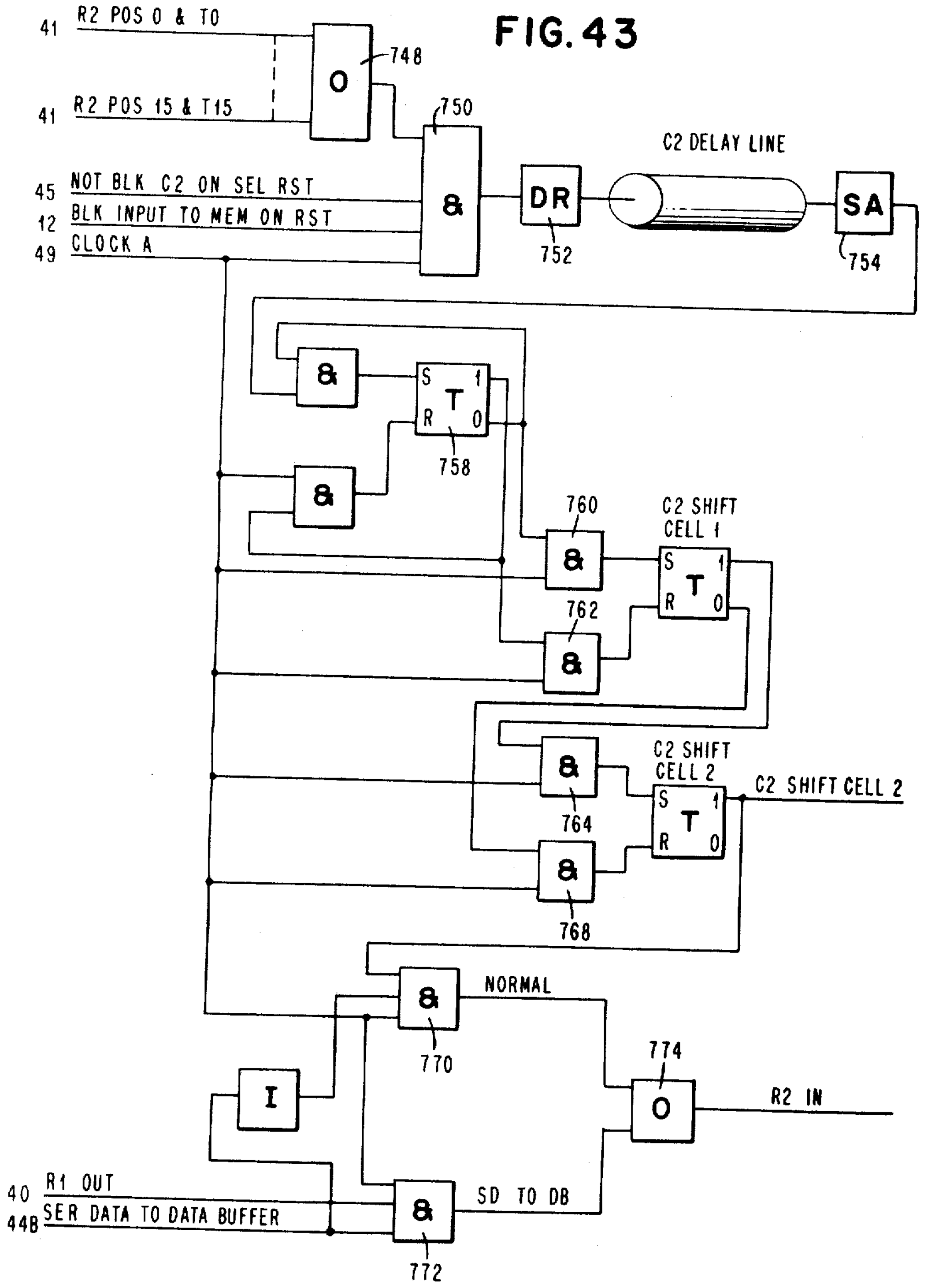

Access registers R1 and R2 are shown in detail in FIGS. 40 and 41. R1 will now be described in detail. "R1 In" is generated by the output of the recirculating memory C1. "R1 In" gates the AND input (e.g. 700) for the R1 register positions 0 thru 15. Data bits are gated into each of the R1 positions 692, 694, at a particular clock time T2, T3, etc. Prior to gating the information from the delay line into a register the register is reset. For example, register 692 is reset at time T1. At time T2 the output of the delay line (R1 in) is gated into the register 692. Prior to resetting the trigger (which will destroy the information stored therein), the contents of the trigger are read out at a time earlier than the reset time. For example at time T0, the output of register 692 (R1 Position 0) is gated via AND 704 by the timing pulse T0. The ouput "R1 Position 0 and T0" is ORed together in a 15 position OR, FIG. 42, the output of which is directed back into the recirculating delay line C1.

Thus the sequence of operation for the access register R1 is as follows. At T0 the contents of the first register R1 position 0 are gated into the delay line. At time T1 the register position is reset thus clearing it. At time T2 the output of the delay line (on "R1 In") is gated via AND 700 and OR 698 to set R1 register position 0 if the data in the delay line is a one. If the data is a zero, the register is not set. At time T1 the contents of the second register position, R1 position 1, trigger 694, are gated into the delay line. At time T2, R1 Position 1 is reset. At time T3 the contents of the delay line are gated into R1 position 1. Thus data is gated sequentially from the delay line into the R1 positions.

Referring now to FIG. 8 an example will be shown. Referring to the second column of the chart shown in FIG. 8, the timing pulses T2, T3, etc. are shown. The line control word field stored in C1 is illustrated in the column heading "Read Out of Memory." The column entitled "Write Into Memory" shows the same line control word being written back into the recirculating memory. Thus, at time T0 in cycle C0, R1 position 0, which is strobe count 1, is read back into the memory. At time C1, T1, R1 position 1 which corresponds to strobe count 2 is read back into memory. Also at time T1, R1 position 0 is reset. At time C1 T2 (referring to the "Read Out of Memory" column C1) strobe count 1 is read into R1 position 0. Also at time C1 T2, R1 position 1 is reset. At time T3 strobe count 2 is read out of the memory into R1 position 1. The sequence of operation is similar for the remaining 16 R1 positions. Thus, referring to FIG. 8, strobe count 1 is available in R1 position 0 for a period of 14 timing pulses. That is, strobe count one is set into R1 position 0 at time C1 T2 but is not read out of R1 position zero until time C0 T0 in the next timing cycle. This is a total of 14 timing pulses. Thus, each of the storage devices 692, 694 . . . 696 is capable of storing one bit each. Each of the storage devices is read out at a particular time. The storage devices are then reset and then the storage device is read into at a later time. Thus, for any given timing pulse K, information is read out of a store by gating the output with a K−1 pulse. At a time K the store is cleared. At a time K+1 the output of the recirculating memory is read into the K store. Each bit is thereby maintained stationary for a period of time which is $n-2$ bit times, where $n$ is a number of stores.

4.3 *Common Controls*

Each time the binary clock is incremented a new line adapter is selected for examination by the Common Controls 232 (FIG. 4). The Terminal Control Logic 222 associated with the selected line adapter is identified by two field bits TC1 and TC2 within the line control word associated with the selected address and stored in the memory. The binary decoded output of this field selects the correct Terminal Control 222 and line oscillator to match the transmission rate of the line attached to the addressed Line Adapter 276 (FIG. 6). During the 32 microsecond period when a line control word is read the following functions associated with one selected communication line may be accomplished: (1) transfer of information to and from the interface controls, (2) line time out, (3) bit sampling of data, (4) character assembly, (5) character buffering, (6) check character accumulation, (7) character recognition, (8) data set control, (9) sense field modification, and (10) channel servicing.

4.4 *Line Control Word Format*

The line control word format is defined below in terms of certain fields of bits. The time location of the bits is shown in FIG. 8. Each position is defined as follows:

4.4.1 Strobe Count (4 bits)

This field represents a binary counter which counts from five to fifteen (11 counts). The bit sample of a particular bit on a communication line is taken during a receive operation at strobe count 15. During a send operation a new bit is transferred to the selected communication line at strobe count 15.

4.4.2 Bit Count (4 bits)

This field maintains a count of the received or transmitted bits to signal when the number of bits equals the total number of bits in a particular code. This field provides the assembly-disassembly function for serializing or deserializing transmitted or received characters.

4.4.3 Serial Data (8 bits)

Sampled bits are stored in this field of the line control word for parallel transfer of a complete character to the computer channel. This field also stores characters to be transmitted.

4.4.4 Equipment Check

This bit is part of the sense field and is set when a hardware check within the control unit is detected such as: (1) discovering an active command in the line control word addressed by an initial selection sequence, (2) detecting an echo check within a control unit line adapter, or (3) detecting a hardware failure within an auto call adapter.

4.4.5 Bus Out Parity Check

This bit is part of the sense field and is set when a parity error has been detected on "Bus Out." Parity is always checked on "Bus Out," when it is connected to the interface and "Command Out" or "Service Out" are up. The control unit will not respond to initial selection (Section 3.4) unless the address on "Bus Out" has correct parity.

4.4.6 Time Out

This bit is part of the sense field and is set when the addressed communication line is idle for 20 seconds or a shorter time specified by the terminal control logic and the active command is "Read" or "Search." The auto-call logic will set this bit to indicate that a dial operation has not been successfully completed.

4.4.7 Overrun

This bit is also part of the sense field. It indicates that at least one character has been lost during a receive operation because the computer multiplexor channel has not kept up with the communication line character rate.

4.4.8 Command Reject

This bit is part of the sense field. It is set by the interface controls if the command transferred from the computer to the control unit during initial selection cannot be executed.

4.4.9 Intervention Required

This bit is part of the sense field. It is set by the common controls when (1) an attached data set has power off or is in test mode, (2) an attached automatic dialing unit has power off or is not attached, or (3) when continuous spacing signal has been received on a given communication line for more than a character time.

4.4.10 Check Character Accumulator (8 bits)

This field is comprised of eight bits and may be used by the terminal control to maintain a cyclic check character. Terminal control type 1 uses this field to maintain the longitudinal redundancy check character.

4.4.11 Check Bit A

This bit stored in C1 is used to detect clock and/or storage failures. The checking apparatus for utilizing Check Bit A and Check Bit B (section 4.4.26) is more fully described in U.S. patent application, Ser. No. 332,777, filed Dec. 23, 1963, by E. Loizides, entitled "Checking System."

4.4.12 LOSC

This bit represents the sample of the line oscillator corresponding to the addressed communication line taken during the previous delay line revolution. During a line timeout, this bit represents the last sample of the timeout oscillator.

4.4.13 TC1 and TC2

These two bit positions are encoded to address the proper terminal control and the proper line oscillator consistent with the speed of the selected transmission line. The relation between the bit configurations used and the physical terminal control location is described in section 5.1. The two bits are set by the sadzer, sadone, sadtwo, and sadthree control orders.

4.4.14 Time

The common controls set this bit whenever a timeout operation is in progress.

4.4.15 Command (4 bits)

Coded configurations of these bits are set by the interface controls at the time channel commands are loaded into line control word storage. The command is reduced to four bits from the interface command byte of eight bits stored in the command register. Descriptions of the various ten commands are given in section 3.5. The following are valid commands: sense, write, autowrap, break, poll, read, prepare, inhibit, search, and control order. A control order does not cause data transfer. The various control order commands are sadzer, sadone, sadtwo, and sadthree. Control order commands involve setting the TC field and the enable, disable, and dial commands which use the mode field (defined in section 4.4.19) to further define their actions.

4.4.16 Receiving

This bit is part of the sense field and is set whenever the addressed unit is engaged in receiving data. The autocall circuitry sets this bit when a dial command issued to a line that is currently "Off Hook" is completed.

4.4.17 Sequence (3 bits)

This field is used to control the sequence of transmit or receive operations. The field may be set or changed by the terminal controls, common controls, or by the interface controls. Full description of the sequence steps may be found under each terminal control description (Section V).

4.4.18 Character Service

This bit indicates that data servicing is required of the channel. Character service is set (1) at stop time following initiation of a "Write" operation, (2) during "Write" command when the data buffer is transferred to the serial data field, or (3) during "Read" command when serial data is transferred to the data buffer.

4.4.19 Mode (4 bits)

This field is a binary coded field. This field further defines the command field when the command field is set to a control order. This field is also used by the terminal controls. The following mode field positions are defined:

Reset
Enable
Dial
Disable 4.4.20 Data Check

This bit is part of the sense field and is set when a data error is detected that could have been caused by one of the communications lines. The following errors are detected: in receive mode when a communication line is in space status at stop time; in receive mode when a VRC or LRC check is detected; and in transmit mode when an echo check is detected.

4.4.21 End

This bit is part of the status field and is set when an operation has been terminated. This bit is then translated to the "Channel End" and "Device End" bit of the unit status byte.

4.4.22 Unit Check

This bit is also part of the status field and indicates that an error occurred during the execution of the last command. The error can be further defined by issuing a "Sense" command.

4.4.23 Unit Exception

This bit is part of the status field and indicates that the end of transmission (EOT) has been received.

4.4.24 Stack

This bit is set by the interface controls when status presented to the channel via "Bus In" has not been accepted. This is indicated by a "Command Out" response to "Status In" instead of a "Service Out" response. After "Suppress Out" drops, status will be presented again. When stack is set without other status field bits being set, status modifier will be presented as the status to the channel after "Suppress Out" drops.

4.4.25 Data Buffer (8 bits)

This field is used to buffer one character in both the receive and transmit modes of operation.

4.4.26 Check Bit B

This bit stored in C2 is used on conjunction with check bit A (section 4.4.11) to detect clock and/or storage failure.

V. TERMINAL CONTROLS

5.1 *Basic Function*

The Terminal Controls Section 222 (FIG. 4) is responsible for all controls which are unique to a *particular* terminal, whereas the common controls handle all controls which are common to *all* terminals. For instance, the assembly and disassembly of a data character is identical in operation regardless of which terminal is addressed. The variable is the character length. The particular terminal control determines what this character length should be and so informs the common controls. The common controls in turn ends the particular assembly or disassembly of data when the proper character length has been assembled.

Some of the conditions that are indicated to the common controls by the particular terminal control are: (1) bit count stop, which indicates when the stop bit has been reached, (2) the indication of whether a 5, 6, 7, or 8 bit character is being transmitted, (3) when a "Character Service" request should be issued, (4) the manipulation of the sequence field in the addressed LCW which sequences the control functions, or (5) the modification of the mode field in the addressed LCW which indicates which mode the operation is in (for instance on TTY 28 operation whether the controls are in the letters mode or the figures mode).

Special character recognition is decoded in the terminal controls. Upon this recognition, the proper bits are set in the LCW. These bits may indicate, for example, the ending of an operation, the fact that a longitudinal redundancy check (LRC) must be transmitted, or the fact that an LRC character must be checked.

The bit count field in the LCW is decoded in the terminal controls and sent back to the common controls to indicate stop time, when the count equals the number of bits in a character of the selected terminal type.

5.2 *TC Field*

Figure 67:
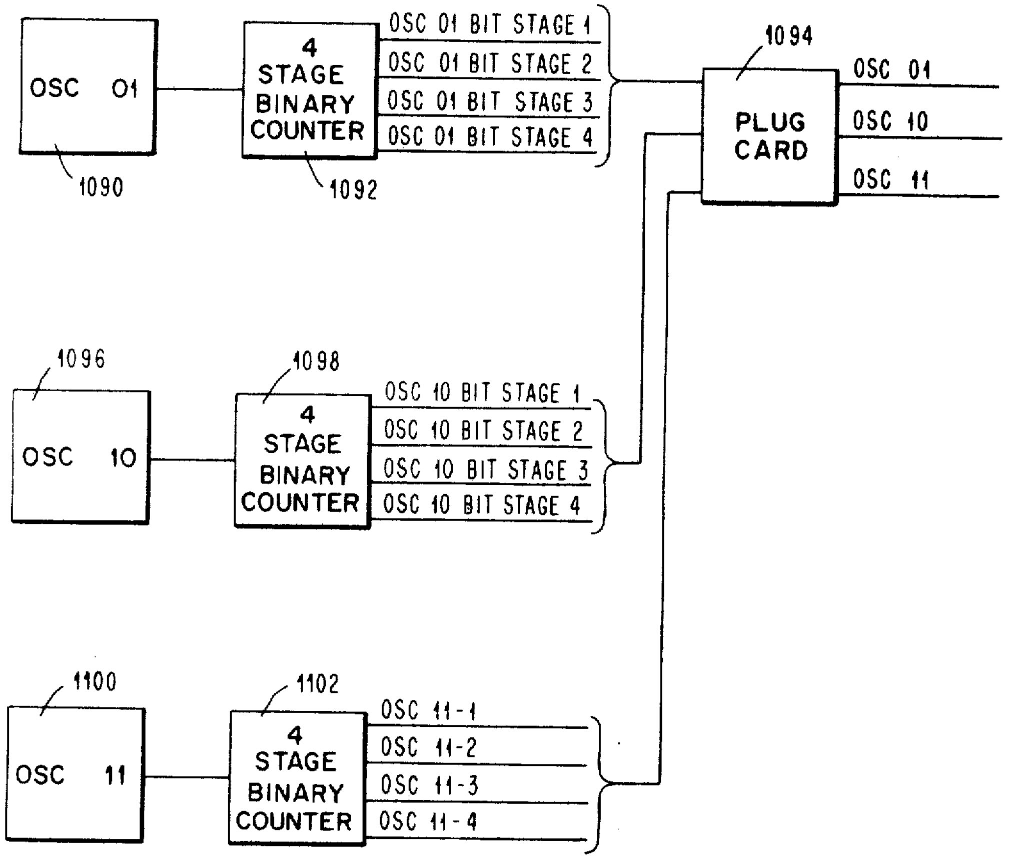
Figure 71:
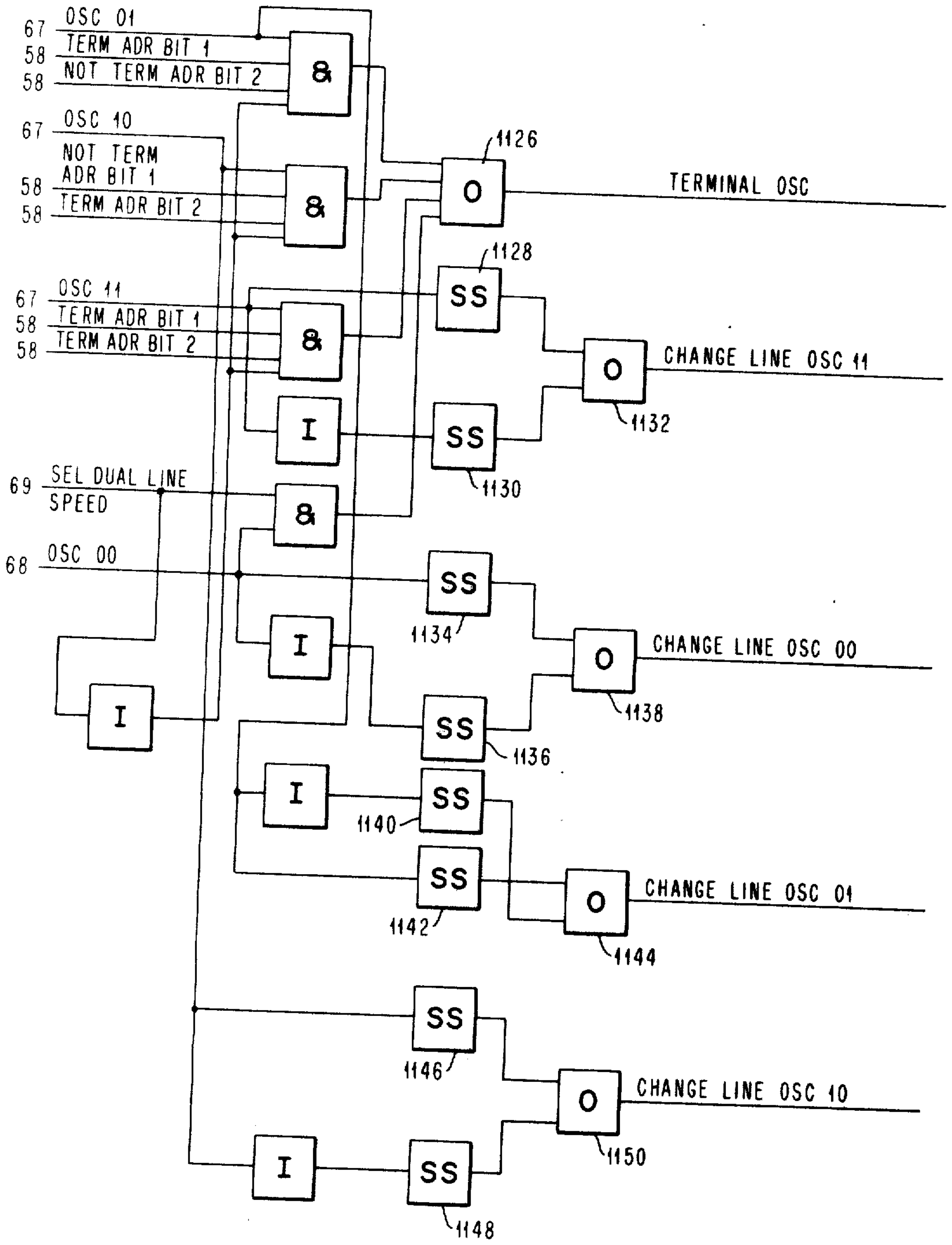

Two different terminal controls are provided in the embodiment shown. The proper terminal control logic is associated with a given transmission line during its scan time (e.g. when the group and line address lines select the terminal) by means of the TC 1 and TC 2 bit field within the line control word (FIG. 8) associated with the given transmission line. Thus in FIG. 58, R2 POS 1 and 2 (corresponding to TC bits 1 and 2) are gated by pulses C1 and T7 to a Storage Register 1010, 1012. The proper line oscillator consistent with the transmission line speed is gated for comparison with the LOSC bit field (which contains the last oscillator sample) by means of the circuitry in FIG. 71. For example OSC 01 is gated when Term. Address bit 1 is present but bit 2 is not present. A Count-Down Circuit (1092, 1098 or 1102 in FIG. 67) is provided for each terminal type to perform frequency dividing and shaping of the Line Oscillator 1090, 1096 or 1100. These circuits are assigned via a Plug Board 1094 to a particular TC field configuration.

From the countdown circuits, each oscillator output is routed through an oscillator change circuit to provide pulses at each transition of the line oscillator output. These pulses are wired directly to the line adapters on a per line basis independent of control by the TC bit field. For Line Address 0, for example, OSC 01 is fed directly to AND Gates 1324 and 1326, in FIG. 85. This allows the gating of the Transmit Buffer/Latch 1322 to the Line Latch 1328 on the line oscillator change. In this manner, the oscillator itself sends the data bit over the "Send Mark" line to Data Set 0. Without this extra buffer (Line Latch 1328) the data bit would have to be transmitted while the LCW is still addressed, which may actually be some time before the oscillator changes. Gating the data by the oscillator directly reduces this possibility of distortion to a minimum.

The sadone, sadtwo, and sadthree commands used to set the TC field are associated with the terminal controls as follows:

5.2.1 Sadone

This command codes the TC bits TC 1 and TC 2 to select a type one terminal control.

5.2.2 Sadtwo

This command codes the TC bits to select a type two terminal control.

5.2.3 Sadthree

This command codes the TC bits to select a terminal control type three.

5.3 *Dual Line Speed*

Figure 68:
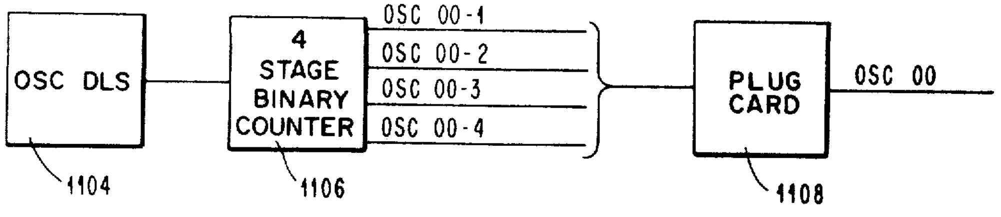

Provision is made for the TC bits to select a second speed for any given line. In FIG. 68 an Oscillator 1104 is provided with a Frequency Divider 1106. Any of four speeds shown can be wired via Plug Card 1108 to the output "OSC 00." In FIG. 71 OSC 00 speed is selected via energization of "SEL DUAL LINE SPEED," via OR 1126 to the "Terminal OSC" output. The dual line speed is selected by coding the TC bits of the LCW corresponding to the addressed terminal to be driven at that speed.

Figure 69:
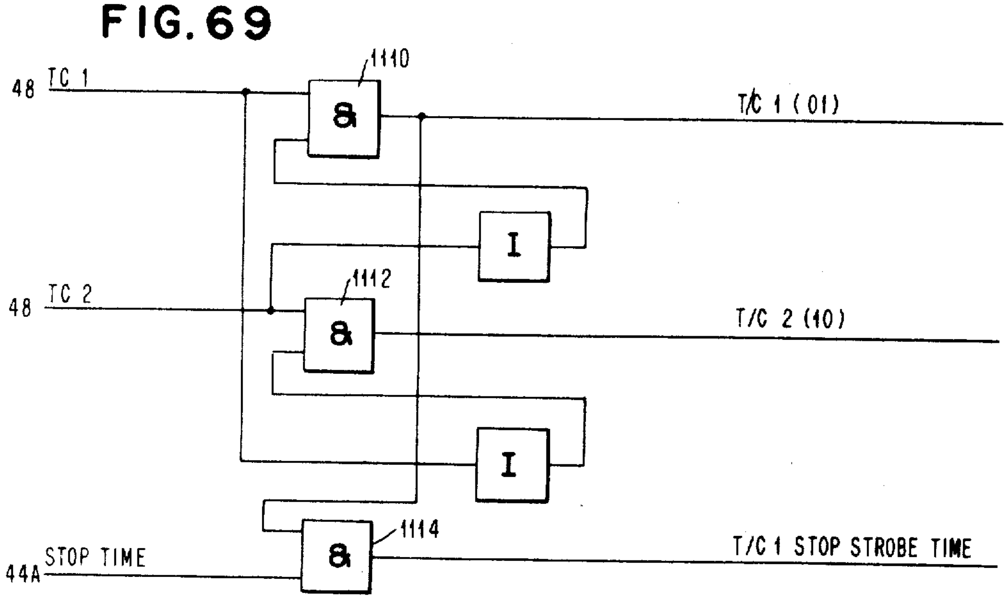
Figure 70:
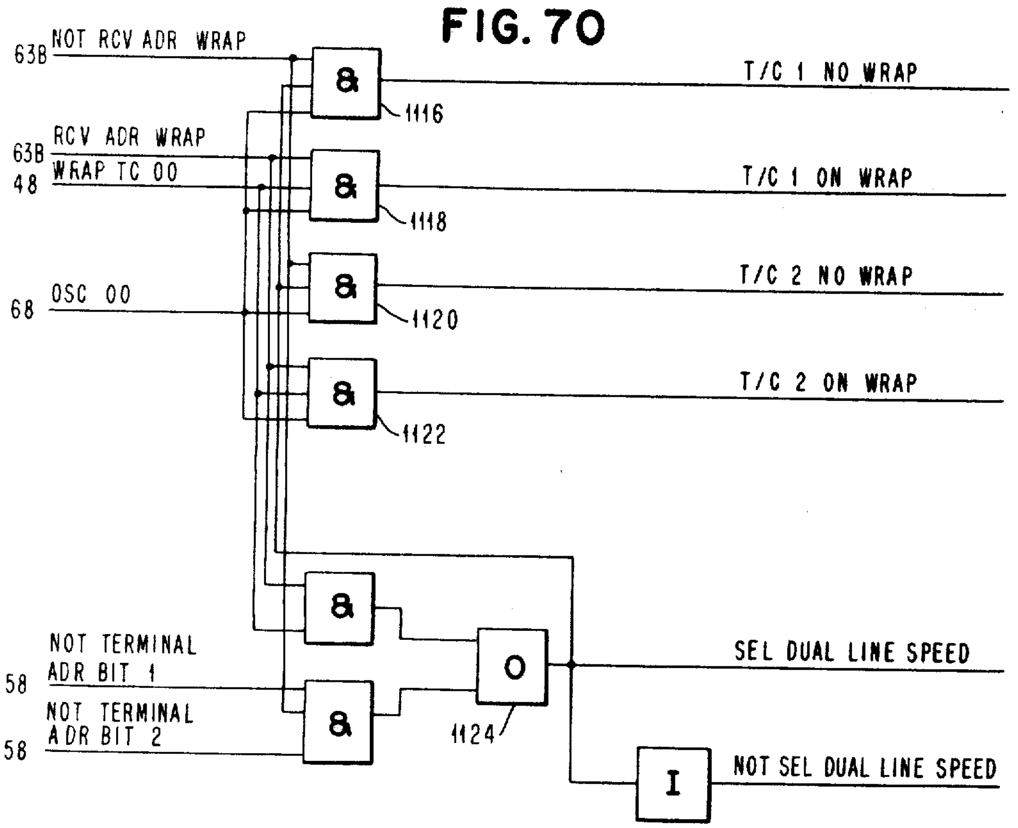

This selection circuitry is shown in FIG. 69. The TC field must be coded to 00 in the embodiment shown in order to select the dual line speed oscillator.

5.3.1 Sadzero

This command codes the TC bits to 00 to cause selection of the dual line speed oscillator by the LCW to which the command was issued.

5.4 *Terminal Control Logic (Terminal Type 1–T/C1)*

Terminal Type 1 corresponds to an IBM 1050 Data Communication Terminal. The transmission code is six bits plus parity. Each received and transmitted character is checked for odd vertical redundancy (parity). Vertical redundancy check (VRC) errors cause the "Data Check" bit to be set in the line control word sense field but will not cause a termination of the command. Longitudinal redundancy check (LRC) accumulation and checking is also done by this terminal control and detected errors also set the "Data Check" bit within the sense field.

5.4.1 Character Recognition Summary

The following characters transmitted over the transmission line are recognized (Character Decoder 1152, FIG. 72) by this terminal control during write operations:

Circle C which "Sets Control Mode" within the line control word mode field of the addressed line;

Circle D which sets "Text Out Mode" within the line control word mode field and initiates LRC accumulation;

Circle B which sets "LRC Sequence" within the line control word.

The following characters are recognized during read operation:

Circle C as "End of Transmission" which sets "End and Unit Exception";

Circle D which sets "Text in Mode" within the line control word mode field and initiates LRC accumulation;

Circle B which sets "LRC Sequence" within the line control word. This causes the next received character to be checked against the LRC field before the read command is terminated.

Circle N which sets "End and Unit Exception" when not in the text-out mode. "End and Data Check" are set when Circle N is received and the associated line control word is in text-out mode.

Circle Y is received which sets end.

5.4.2. Mode Field

The mode field of the line control word is encoded as follows for terminal control type one:

000 Control Mode
001 Text In Mode
010 Text Out Mode

5.4.3. Sequence Field

The sequence field of the line control word is encoded as follows for the terminal control type one during receive operations:

000 Reset
001 Not used
010 Receiving
011 Time Out
100 Not used
101 LRC
110 Not used
111 End

5.4.4. Polling and Addressing

Polling and addressing of the communication terminals are performed by "Write" and "Read" commands issued during a Start I/O instruction. When polling, command chaining is utilized so that the read command and the allocated memory in the computer is ready for incoming data. On sending out the polling characters chaining occurs to a read command and a timeout operation begins. At this point in time, the terminal control type 1 overrides the normal 20 second timeout provided for by the common controls with its own two second short timeout.

Interruption of the program will occur should end be received or a timeout occur. If end is received "Unit Exception" is turned on in the unit status byte. "Unit Check" will occur in the status byte if a timeout occurs and a timeout bit is set in the sense field.

When addressing, command chaining to a read command is utilized to provide for receiving the Circle N or Circle Y character. Circle N will set "Unit Exception" as in polling to interrupt the processor program and Circle Y will cause a normal end which may be used to command chain to the output message.

"Receiving Sequence" is set by the common control upon detecting a true start bit on the first received character.

"LRC Sequence" is set by the terminal control when it detects Circle B character.

"Timeout Sequence" is set after the LRC character is checked against the character accumulator or upon the reception of characters Circle Y, N, or C.

"End Sequence" is set by the common controls after the timeout sequence is complete.

The sequence field of the line control word is encoded as follows for terminal control type one during transmit operations:

000 Reset
001 Data
010 Halt
011 Prepare End
100 Not used
101 LRC
110 Not used
111 End "Data Sequence" is set by the common controls after the first character of all marks have been sent. All subsequent characters have start bits added at the beginning.

"LRC Sequence" is set if a Circle D character is transmitted on a line causing the LRC accumulator to be the next character transmitted.

"Prepare End Sequence" is set under the following conditions:

(1) When the LRC character has been transferred to the serial data field.

(2) When a stop signal is set by the channel during interface data servicing.

(3) When a halt I/O signal is received at the interface and the data buffer field is empty.

(4) At stop time when "Halt Sequence" is set.

"Halt Sequence" is set when a halt I/O instruction is received at the interface and there is a character ready for transmission in the data buffer.

"End Sequence" is set by the common controls at stop time (indicated by terminal controls) when a "Prepare End Sequence" is in progress.

*5.5 Terminal Control Logic (Terminal Type 2–T/C 2)*

This logic provides the necessary controls for telegraph terminals. For example, the TTY28 telegraph terminal. The transmission code shifted Baudot and its relationship to the serial data field positions is shown below:

| | | | | | | | | |
|---|---|---|---|---|---|---|---|---|
| Serial Data Field | 0 | 1 | 2 | 3 | 4 | 5 | 6 | 7 |
| TTY Code | | | C | 1 | 2 | 3 | 4 | 5 |

"C" represents the case. A logical one in position "C" identifies upper case; a logical zero represents lower case. The "1" bit is the first bit transmitted following the start bit.

Shifted character set conversion is provided. This means that the terminal controls will automatically delete "Letters" and "Figures" characters from the received data and will record the case (e.g. upper or lower case). A sixth bit is added to the code sent by the terminal controls to indicate the case (C) to the central processing unit when data is received. The data transferred from the computer channel is in six bit form. The terminal controls remove the sixth bit and record the case. A change in case will automatically cause the insertion of the proper shift character (letters or figures) into the outgoing data stream. The T/C 2 terminal control sends two stop bits and checks for the presence of one stop bit at the end of received data.

5.5.1 Character Recognition Summary

Figure 81:
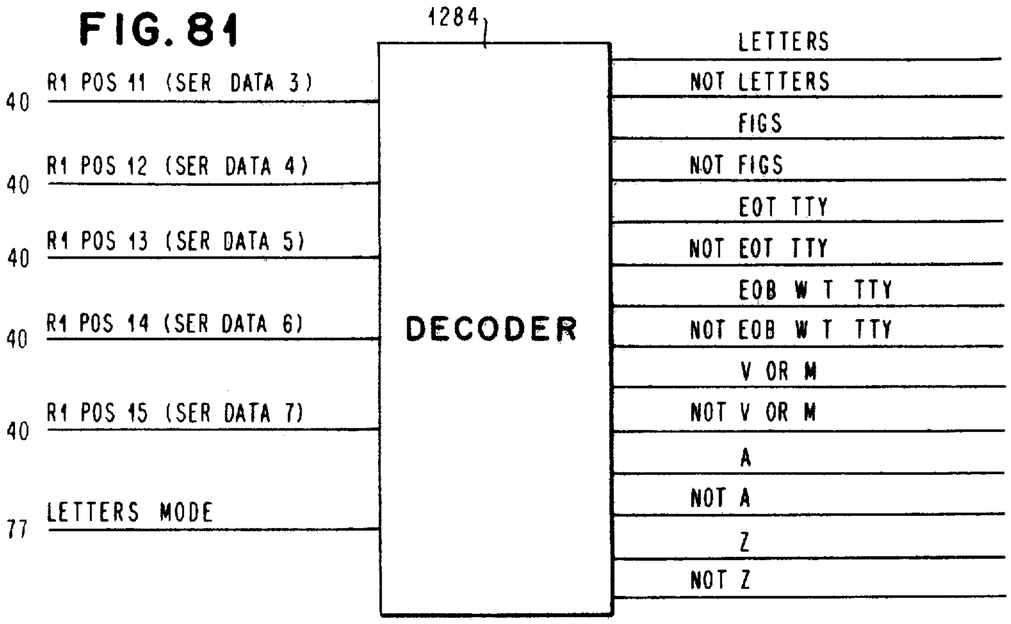
Figures 82, 83:
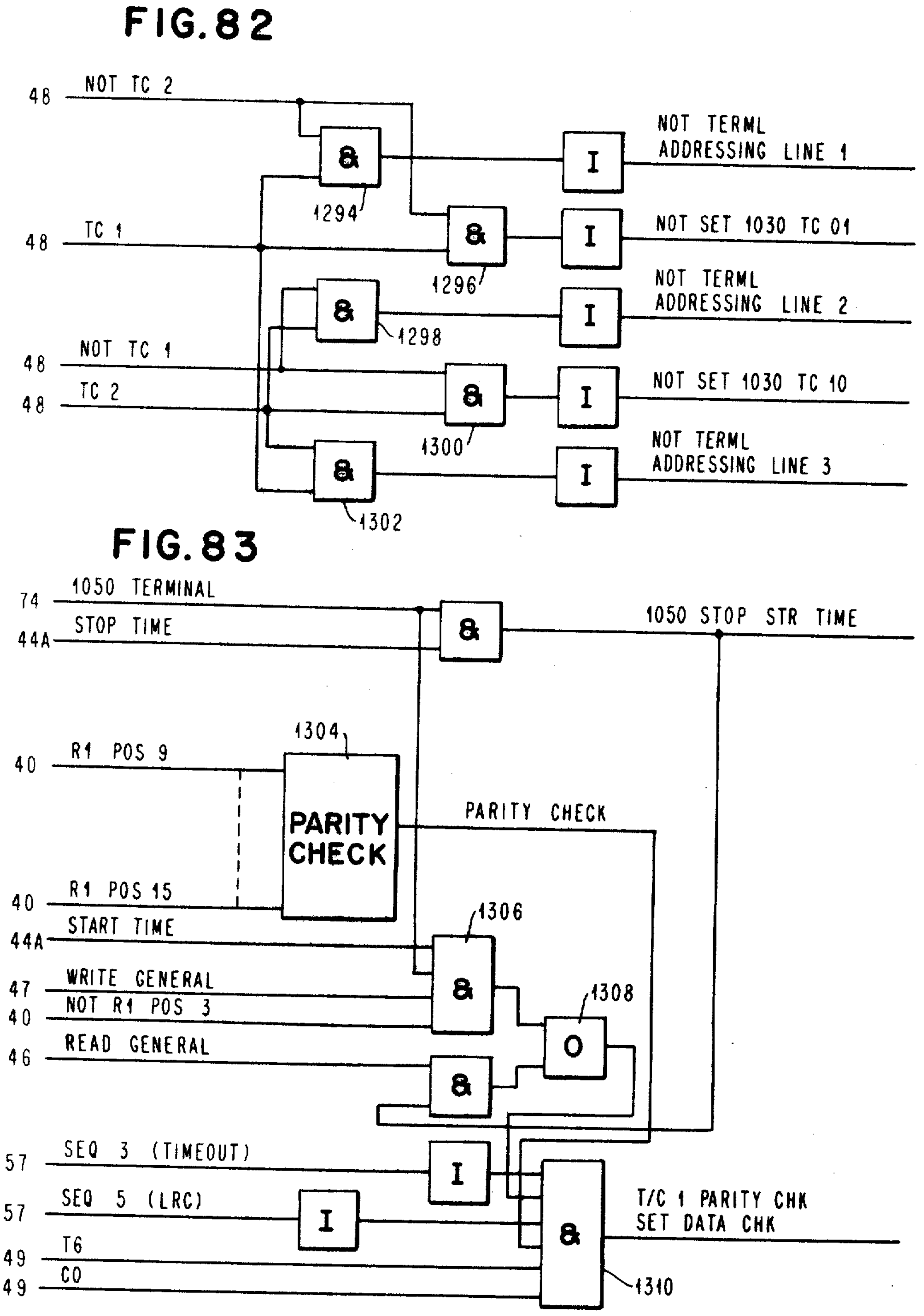

The character recognition decoder is shown in FIG. 81. The decoder decodes the serial data positions 3, 4, 5, 6, 7, corresponding to R1 positions 11, 12, 13, 14, 15. The following characters are recognized during a read operation:

A "V" or "M" received as the first character will set end status in the line control word;

FIG. H, LTRS received as end of transmission (EOT) will set "End" and "Unit Exception" status in the line control word.

The two character processor address AZ received as the first two characters of a message set "End" in the line control word status field.

5.5.2 Mode Field

The mode field of the addressed line control word is encoded as follows for this terminal control type:

000 LTRS Mode
001 FIGS Mode
010 LTRS—Search Mode
011 FIGS—Search Mode

Figure 77:
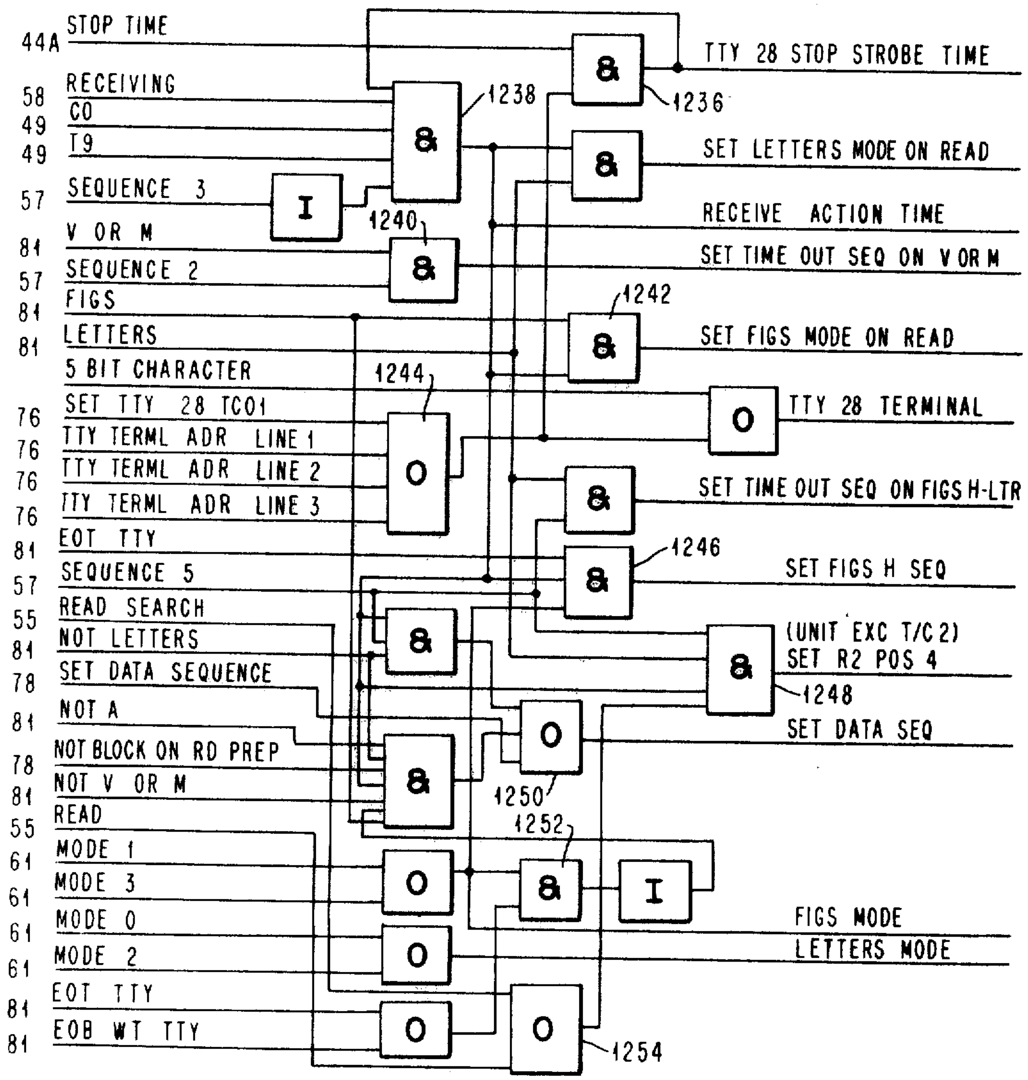

The logic responding to these modes is shown in FIG. 77.

5.5.3 Sequence Field

The sequence field of the line control word is encoded as follows for terminal control type 2 receive operations:

000 Reset
001 Data
010 Receiving
011 Time out
100 Not used
101 FIGS. H
110 A
111 End "Receiving Sequence" is set by the common controls after detecting a true start bit on the first received character.

"Data Sequence" is set by this terminal control (FIG. 77) if a character other than letters is received while in the FIG. H sequence 5. This is accomplished in the AND circuit combining sequence 5 and "Not Letters," via OR 1250.

Figure 78:
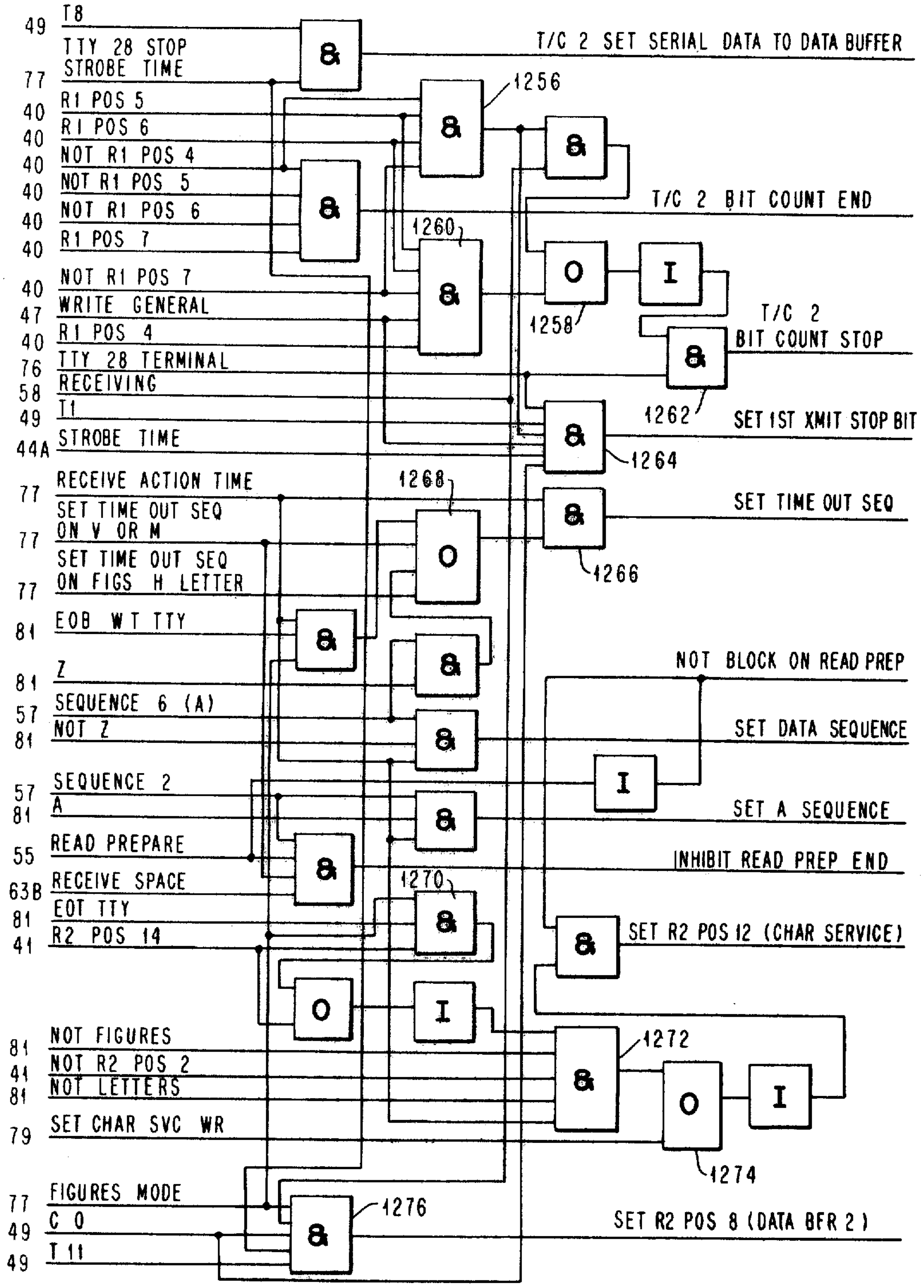
Figure 79:
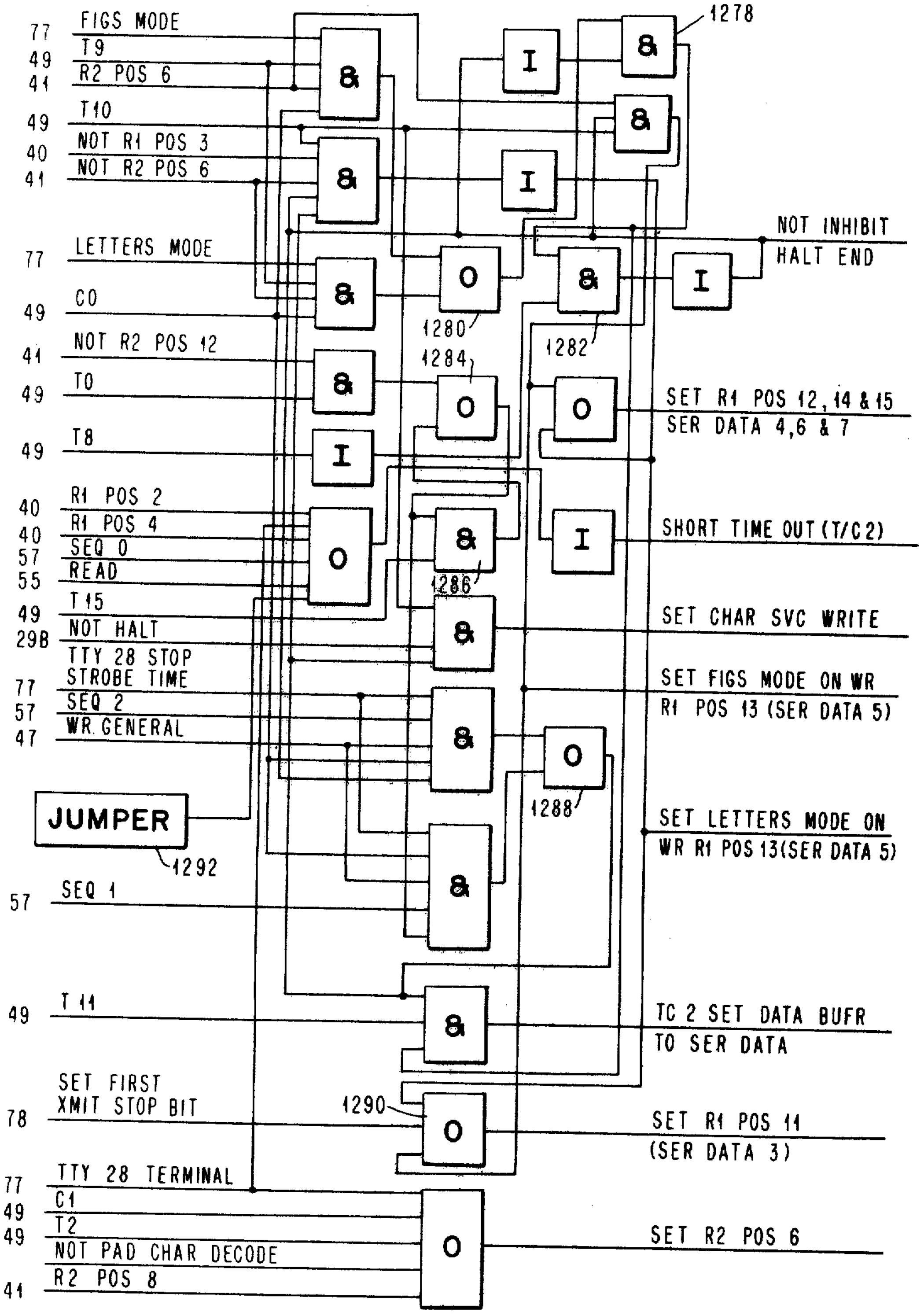
Figure 80:
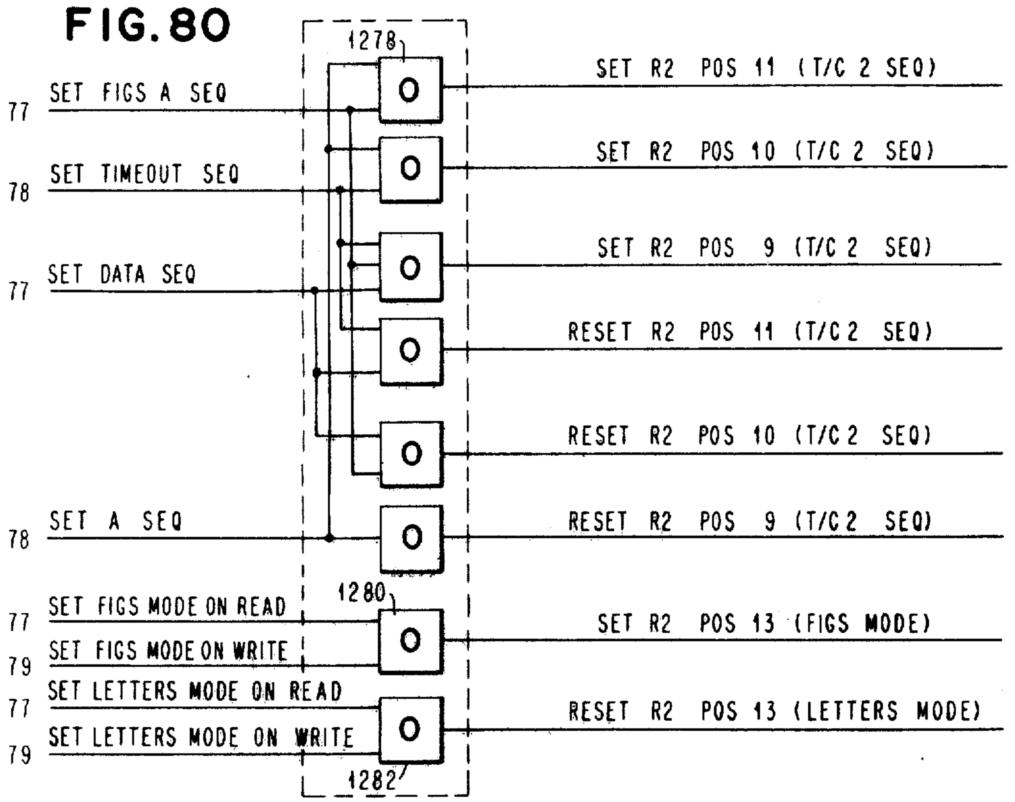

Data sequence is also set if the first character received is not an A, V, M, LTRS or FIGS character. "A" sequence 6 is set by the terminal controls if the first character is an A. This is accomplished in the AND which combines sequence 2 (receiving) "A" and receive action time (FIG. 78). The output of this AND sets A sequence in the LCW sequence field via the logic in FIG. 80.

"Time Out Sequence" is set if a V or M is detected while in Receiving Sequence 2. This is accomplished in FIG. 77 via the AND 1240 which ANDs Sequence 2 and V or M. The output of this line "Sets Time Out Sequence on V or M," passes thru OR 1268 in FIG. 78 where it is ANDed with receive action time in AND 1266. The output of AND 1266 goes to FIG. 80 to energize set time out sequence logic which sets R2 positions 9 and 10, and reset R2 Position 11. This sets a binary 3 into the sequence field of the LCW.

Time out sequence is also set if a "Z" is detected during "A" sequence. A one character time out is made after detecting Z to allow for a possible LTRS character following Z before end sequence is set.

The circuitry for causing a time out sequence when a Z is detected during sequence 6 is shown in FIG. 78.

"Z" and "Sequence 6" are ANDed in an AND circuit whose output drives the OR 1268. The output of OR 1268 is ANDed with "Receive Action Time" to cause an output "Set Time Out Sequence." Time out sequence is also set if a letters character is detected in FIGS. H sequence. The circuitry for this operation is shown in FIG. 77. "Sequence 5" and "Letters" are ANDed in an AND circuit causing an output "Set Time Out Sequence on FIGS. H-LTRS." This output passes thru the OR 1268 in FIG. 78 and is ANDed with receive action time in AND 1266 to cause an output "Set Time Out Sequence."

FIGS. H (Sequence 5) is set if an H is received while in the FIGS. or FIGS Search Mode. This is accomplished by ORing together (FIG. 77) Mode 1 and Mode 3. The output of the OR is ANDed in AND with receive action time and EOT TTY in AND 1246 to give an output "Set FIGS H Seq."

End Sequence 7 is set by the common controls after the completion of a time out sequence.

The sequence field of the line control word is encoded as follows for the terminal control type 2 during transmit operation.

000 Reset
001 Data
010 Halt
011 Prep End
100 Not used
101 Not used
110 Not used
111 End "Data Sequence" is set by the common controls after sending the first character of all marks. All subsequent characters have a start bit added at the beginning of the character.

"Prep End Sequence" is set by the common controls under the following circumstances:

(1) When a stop signal is given by the channel during interface data servicing.

(2) When a "Halt I/O" instruction is received at the interface and the data buffer field of the line control word is empty.

(3) At stop time when Halt Sequence 3 is set in the line control word.

"Halt Sequence" is set when a "Halt I/O" instruction is received at the interface and there is a character ready for transmission in the data buffer.

"End Sequence" is set by the common controls at stop time when the line control word sequence field is set to sequence 3 "Prep End."

VI. AUXILIARY SAMPLING LINE AND CONTROLS

An auxiliary recirculating memory called the auxiliary sampling line or "S Line" may be added to the basic control unit logic to increase the maximum line speed for all communication lines. The addition of this extra memory and its control circuitry provides for more than 3 times the data rate possible. The sampling line operates with the common controls and the C1 and C2 recirculating memories on a one-bit-at-a-time basis. The auxiliary line is attached by throwing switch 1041, FIG. 63B, to "+" position.

The S-line contains an 8 bit line control word (S–LCW) for each of the 15 communication lines in the embodiment shown. Thus, including the S-line data register which operates in the same manner as registers R1 and R2, the total delay is 8 times 15 or 120 microseconds. The timing between the S-line and lines C1 and C2 is arranged so that the S-line control word is read into the S register at the same time the line control word in C1, C2 corresponding to the S-line control word is read out of C1 and C2 into registers R1 and R2.

6.1 *S-Line Timing*

Figure 87:
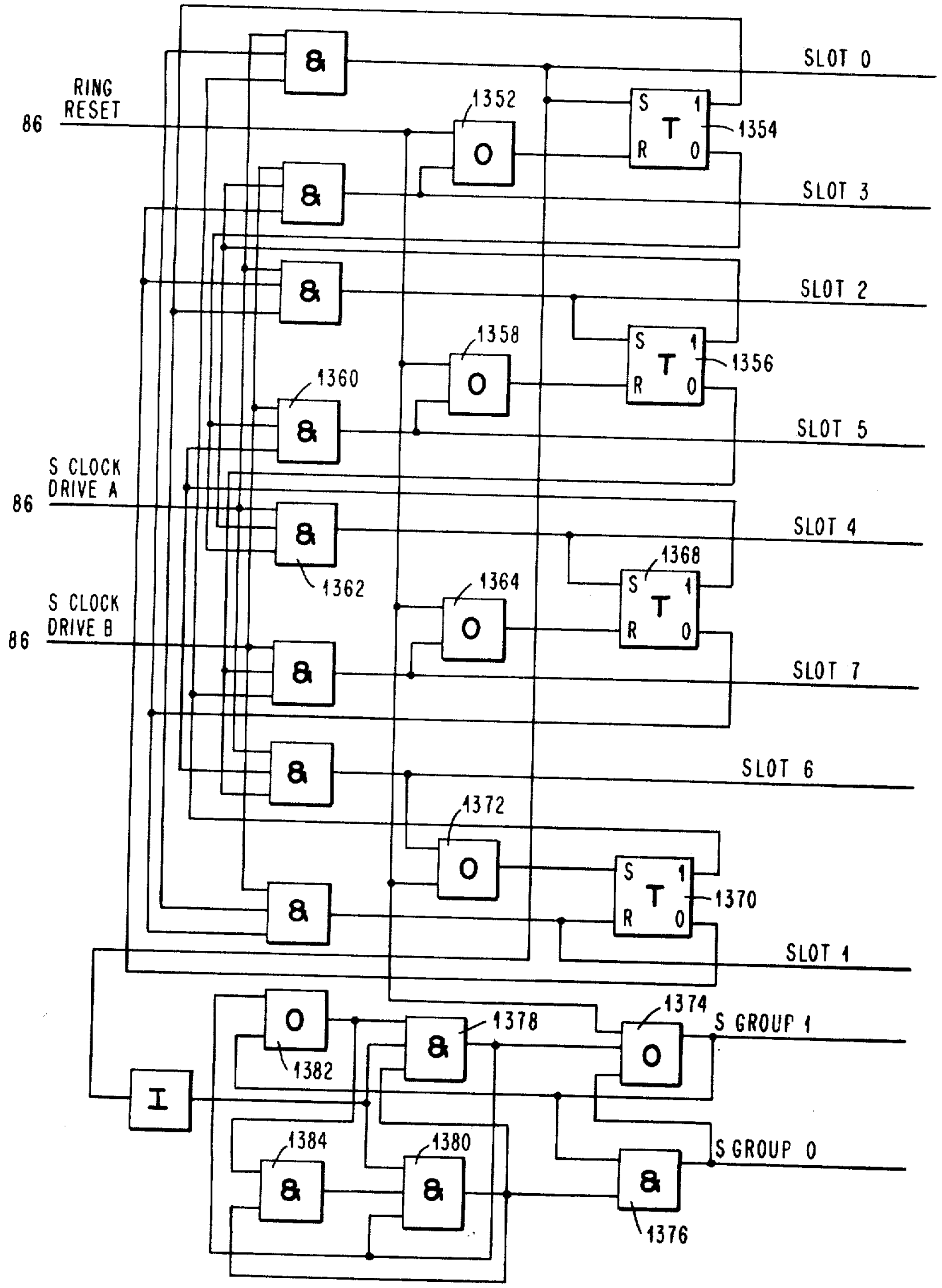
Figure 88:
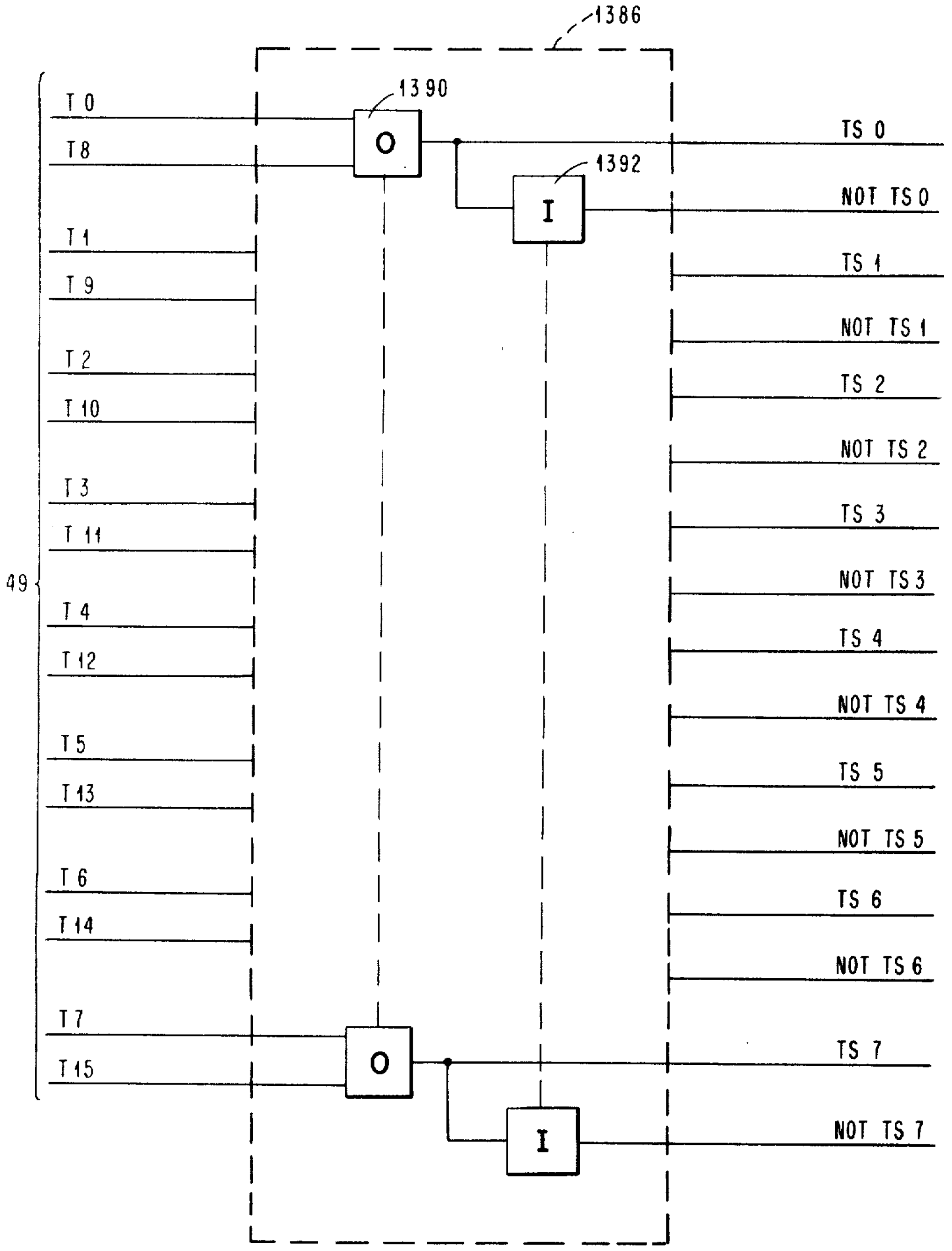
Figure 89:
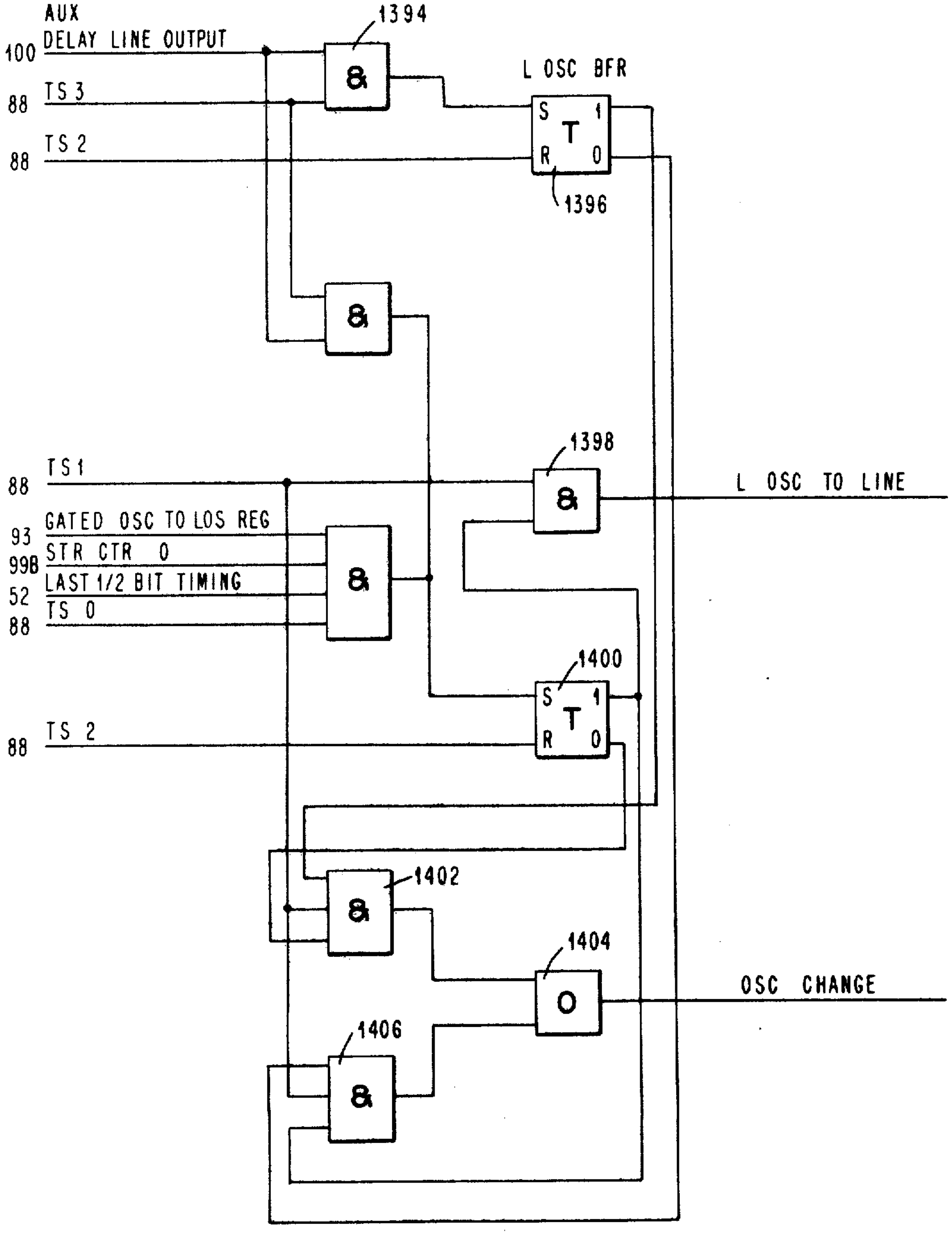

During an S-line cycle (TS0–TS7) pulses are derived by ORing $T_0$ and $T_8$, $T_1$ and $T_9$ etc. from the basic clock ring which controls recirculating memories C1 and C2. An S-clock ring (FIG. 87) driven by pulses provides 8 time intervals, slot 0–7, which are decoded (FIG. 90) to provide the line adapter selection addressing necessary for line scanning.

Figure 9:
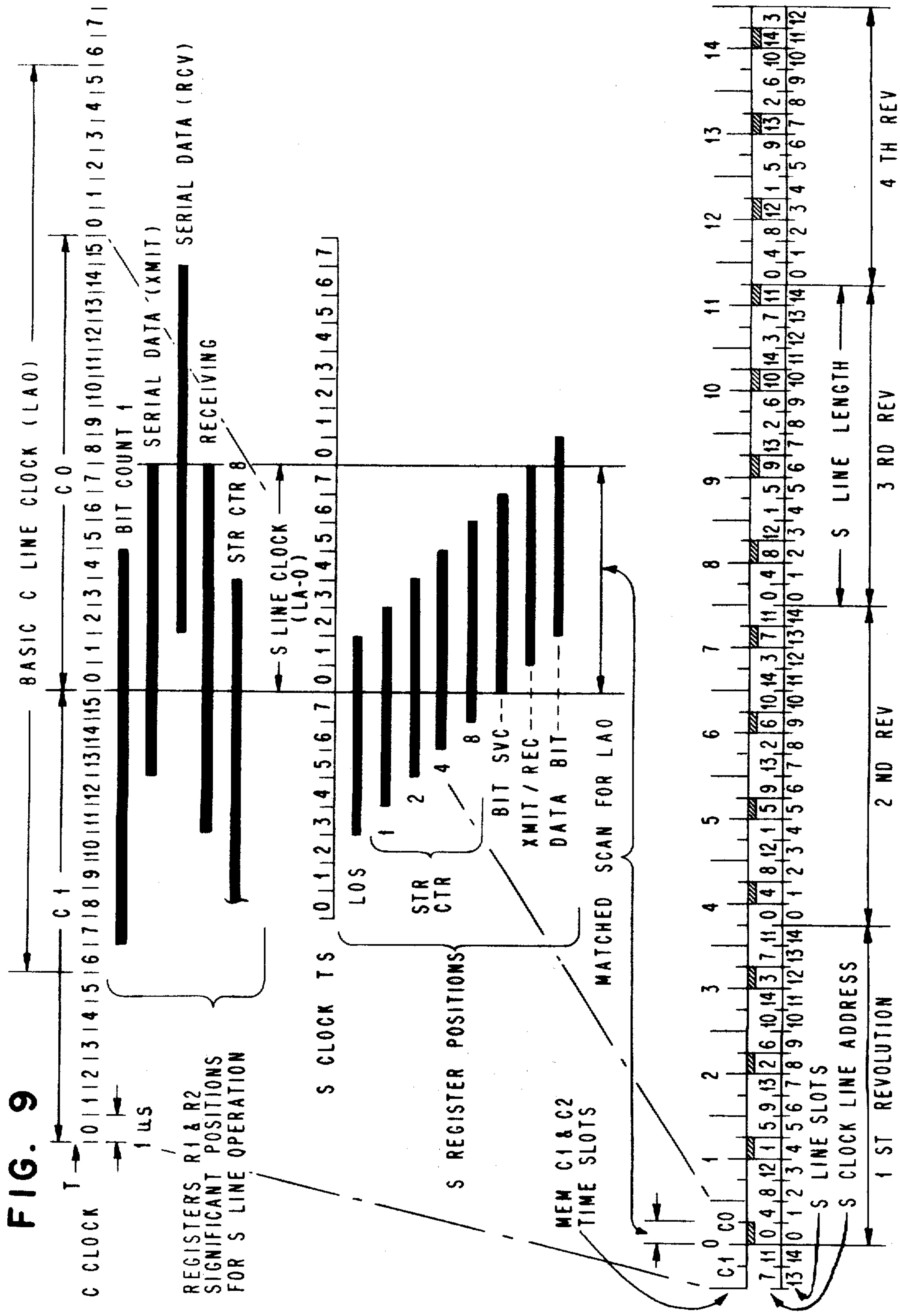

Referring now to FIG. 9, the relationship between the main recirculating storage C1 and C2 and the shorter S-line is shown. The basic C-line clock is divided into two cycles, C1 and C0. Cycle C1 is divided into 16 time positions from T0 thru T15. Cycle C0 is also divided into 16 time positions T0 thru T15. The main recirculating memory, comprised of the two delay lines operating in synchronism, is divided up into 15 time slots 0 thru 14. This is shown at the bottom of FIG. 9 labelled "MEM C1 & C2 TIME SLOTS." Line address 0 (LA0) is shown in expanded form at the top of FIG. 9. The S-line is also divided up into 15 time slots from 0 to 14. The synchronism between the S-line slots and the recirculating memory time slots is shown at the bottom of FIG. 9. It is necessary to assign communication line addresses to the S-line time slots so that the S-line addresses will coincide with the C-line addresses during the same position of the line control word for subsequent line control word addresses. Thus, the S-clock line address is assigned in the non-sequential manner shown at the bottom of FIG. 9.

The shaded area indicates a "Matched Scan" for a period of time when transfer between the S-line and the main recirculating memory may occur. Thus, after four revolutions of the S-line a matched scan has occurred at the same relative time position of each line control word. The matched scan for line control word address zero is shown in expanded form at the top of FIG. 9. Thus, it is seen that the S-clock timing TS is chosen so that TS0 time occurs at T0 in the C0 cycle of the basic C-line clock.

6.1.1 S-Clock Line Address Decoder

Figure 90:
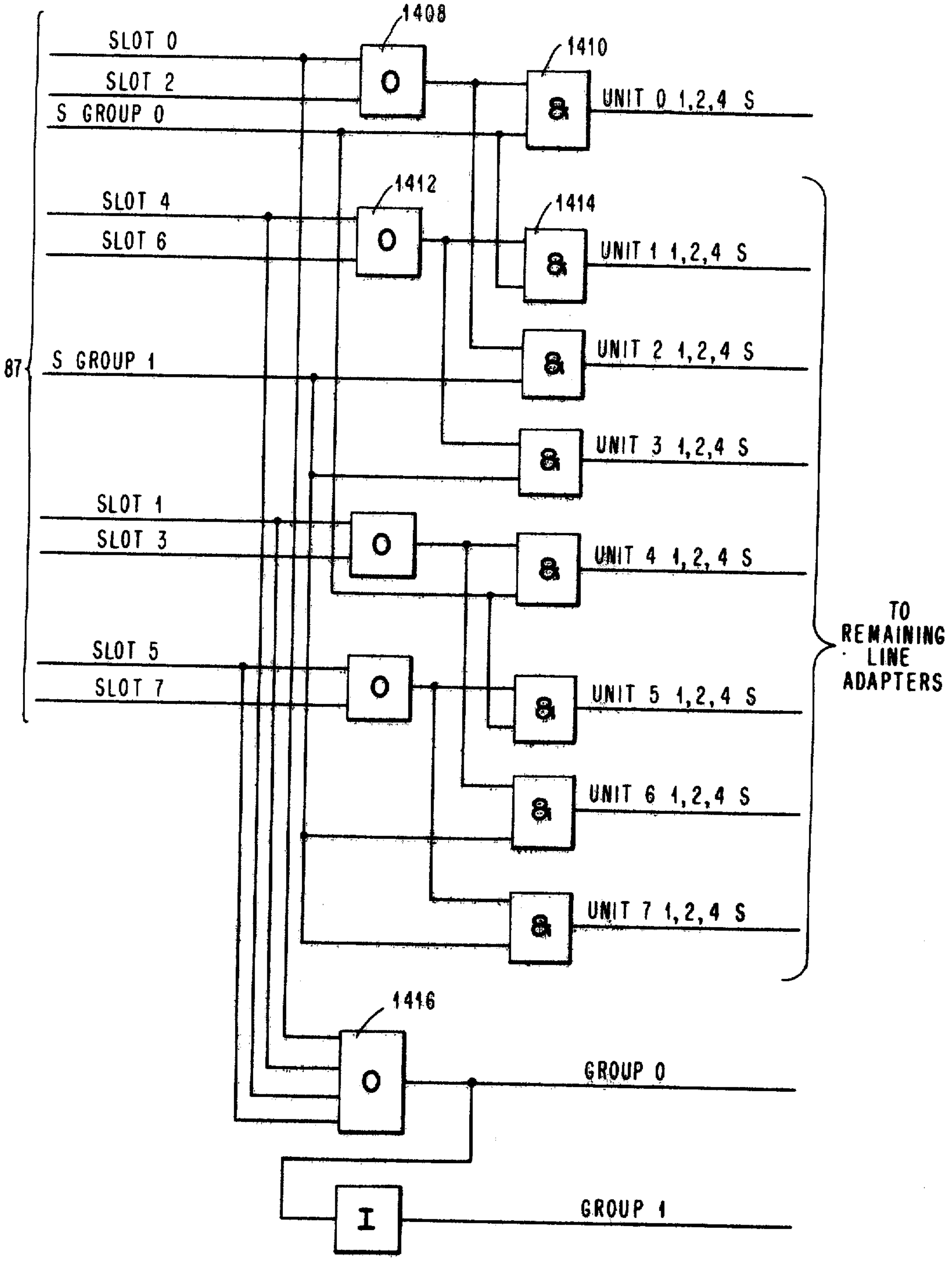

The non-sequential line adapter addressing pattern necessary for a "Matched Scan" for each LCW address shown in FIG. 9, is accomplished by the logic shown in FIG. 90. The ring in FIG. 87 produces 8 sequential pulses (slot 0-slot 7). The outputs from the logic in FIG. 90 are labeled "UNIT 0" thru "UNIT 7." These outputs combined with "S-Group 0" and "S-Group 1" lines provide 15 addresses for 15 line adapters served by the control unit. The unit address lines are not energized in sequential order. The following table illustrates the order of energization of the "Unit" lines for addressing the line adapters in the proper order for "Matched Scan" operation.

| Slot | S-Group | Unit | Group | Line Adapter Selected |
|---|---|---|---|---|
| 0 | 0 | 0 | 0 | 0 |
| 1 | 0 | 4 | 0 | 4 |
| 2 | 0 | 0 | 1 | 8 |
| 3 | 0 | 4 | 1 | 12 |
| 4 | 0 | 1 | 0 | 1 |
| 5 | 0 | 5 | 0 | 5 |
| 6 | 0 | 1 | 1 | 9 |
| 7 | 0 | 5 | 1 | 13 |
| 0 | 1 | 2 | 0 | 2 |
| 1 | 1 | 6 | 0 | 6 |
| 2 | 1 | 2 | 1 | 10 |
| 3 | 1 | 6 | 1 | 14 |
| 4 | 1 | 3 | 0 | 3 |
| 5 | 1 | 7 | 0 | 7 |
| 6 | 1 | 3 | 1 | 11 |

Figure 92:
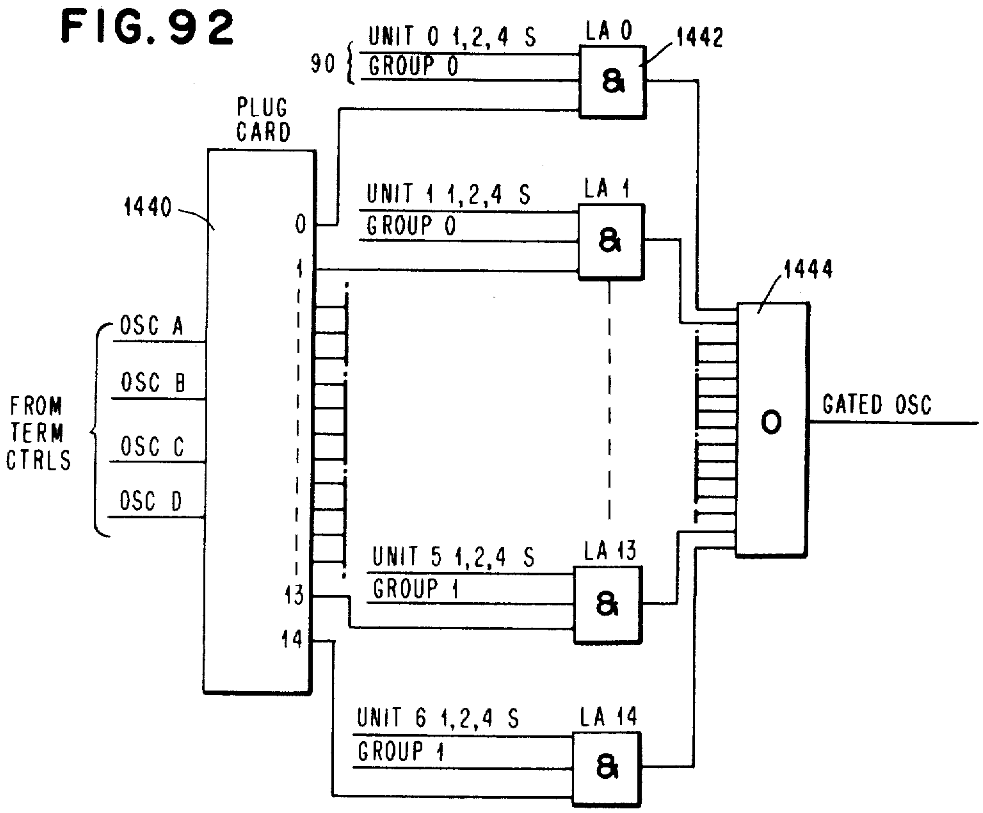
Figure 93:
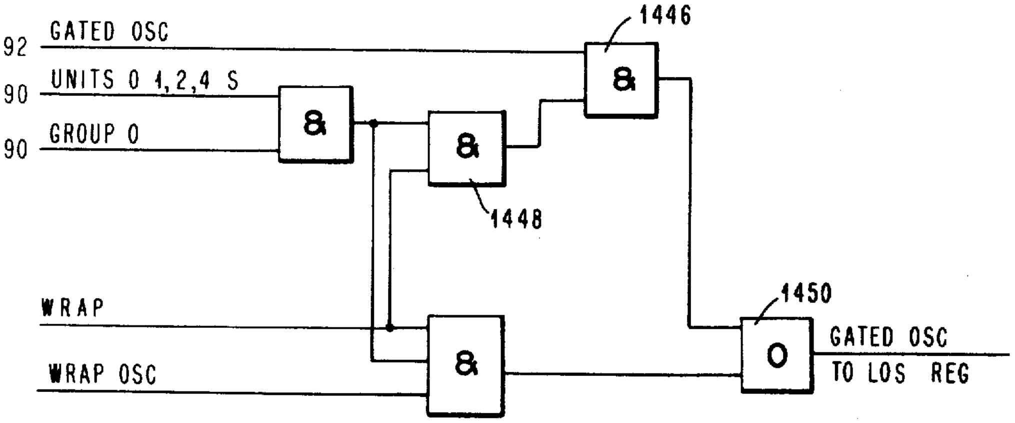

The "Unit" line and "Group 0" or "Group 1" lines are combined in AND 1442 (FIG. 92) to select the correct line adapter as illustrated in the fourth column of the chart above.

6.2 *Access Register (S-Register)*

The S-Register is similar in operation to access registers R1 and R2, described in section 4.2.1, and provides access to the auxiliary sampling line.

The S-register positions are shown during the corresponding times that data are read from the S-line into the corresponding register position. Thus, the last oscillators sample (LOS) is read into the S-register at time TS3 and is read back into the delay line at time TS1; data bit is read into the S-register at time TS2 and is read back into the delay line at time TS1; etc.

The relative times for significant positions of registers R1 and R2 are illustrated to show the relative time positions available for data transfer between the S-line and the C-lines.

The only gate necessary to signal a "Matched Scan" is the coincident condition of the C-clock timing cycle C0 and the C-clock time T0 thru T7.

The S-line control logic is arranged so that line address servicing takes place during a matched scan cycle. Bit transfer between S and C-line can take place any time both registers are in the matched scan window, represented by the shaded area at the bottom of FIG. 9 for each of the line control words 0 thru 14.

6.3 *S-Line Control Word Format*

The fields of the S-line control word are defined below.

6.3.1 LOSC

This bit represents the sample of the line oscillator associated with the addressed communication line taken during a previous S-line revolution.

6.3.2 Strobe Count (4 bits)

This field contains a binary count which is able to count from 5 to 15 (11 counts). The bit sample is taken during receive at strobe count 15. The data bit is transferred to the selected line adapter at strobe count 15 during transmit operations. This field performs the bit sampling function performed by the strobe count field of the basic control unit (described in section 4.4.1).

6.3.3 Bit Service

This bit is used in conjunction with the data bit to control receive and transmit data operations in conjunction with the common controls.

6.3.4 Transmit/Receive

This bit is set by the common controls to place a communication line in transmit status. When the bit is not set, the communication line is in receive status.

6.3.5 Data Bit

This bit represents the data bit sampled at strobe count 15 during receive operations. It also represents the next bit to be transmitted at strobe count 15 during transmit operations.

VII. AUTOMATIC DIALING UNIT

7.1 *Function*

Referring now to FIG. 1, a novel communication switching apparatus is shown in combination with a data processing system, telephone data sets, and automatic calling unit (ACU). Each data set and each automatic calling unit is connected to a telephone line from the voice and dialing equipment of a telephone central office (not shown). Every office is part of a larger dial-telephone network to which a plurality of remote users (not shown) are connected.

Dial-telephone networks are, of course, well known and a general discussion thereof may be found in Electrical Communication, by A. L. Albert, chapters 10 and 11 (Third Edition, 1950, John Wiley & Sons, New York). The nature of the equipment at the remote user's location is unimportant to the understanding of the present invention. The equipment may include data sets, digital magnetic tape units, teleprinters, teletypewriters, punch card readers, card punches, or any of a wide variety of data processing peripheral equipment. Each telephone line in the telephone network may be terminated for digital-data purposes at a telephone data set. For example, data set type 103A manufactured by Western Electric Co. or its functional equivalent. Each automatic calling unit in association with a data set may be, for example, a Western Electric 801A Automatic calling unit or its equivalent. These devices are generally described in the literature, for instance, in IEEE Conference Paper CP 621462, "Automatic Calling for Switch Data Communication Services," presented Oct. 7–12, 1962 at the AIEE Fall General Meeting by D. W. Darling; and IEEE Conference Paper CE 621468, "An Automatic Calling Unit for Switch Data Communication Service," presented Oct. 7–12, 1962, at the AIEE Fall General Meeting by T. J. Germond and K. L. Meyer.

7.2 *Data Set*

Referring to FIG. 6, the communication switching apparatus permits the data processing system to communicate with remote users via the data sets (for data) and the automatic calling units ACU (for control information). The data sets are attached to specific line adapter circuits associated with the transmission control unit. Communication via the data set is accomplished in the same manner as communication via any of the other line adapters in the control unit. The control path for dialing a remote user via the telephone exchange is separate from the line adapter communication path.

7.3 *Data Set Line Adapter*

Each Data Set 1664 (FIG. 111) is connected to the same telephone line as its corresponding automatic calling unit 1668. The data set communicates with the computer via the transmission control unit data path comprising a line adapter (FIG. 110) and associated scanning circuitry. The line adapter contains two latches and four AND circuits. The first latch 1650 receives a bit from the common controls. At the next change of state of line oscillator for that speed device, the bit is transferred via AND's 1652 and 1654, to the Transmit Line Latch 1651. Thus, although the data bit may have actually been read out of the recirculating memory at some prior time, it is not gated to the output line for transmission until the line oscillator changes. Thus, distortion is kept to an absolute minimum because it is not necessary to transmit the data bit while the line control word associated with the transmission line is stored in R1 and R2.

Figure 84:
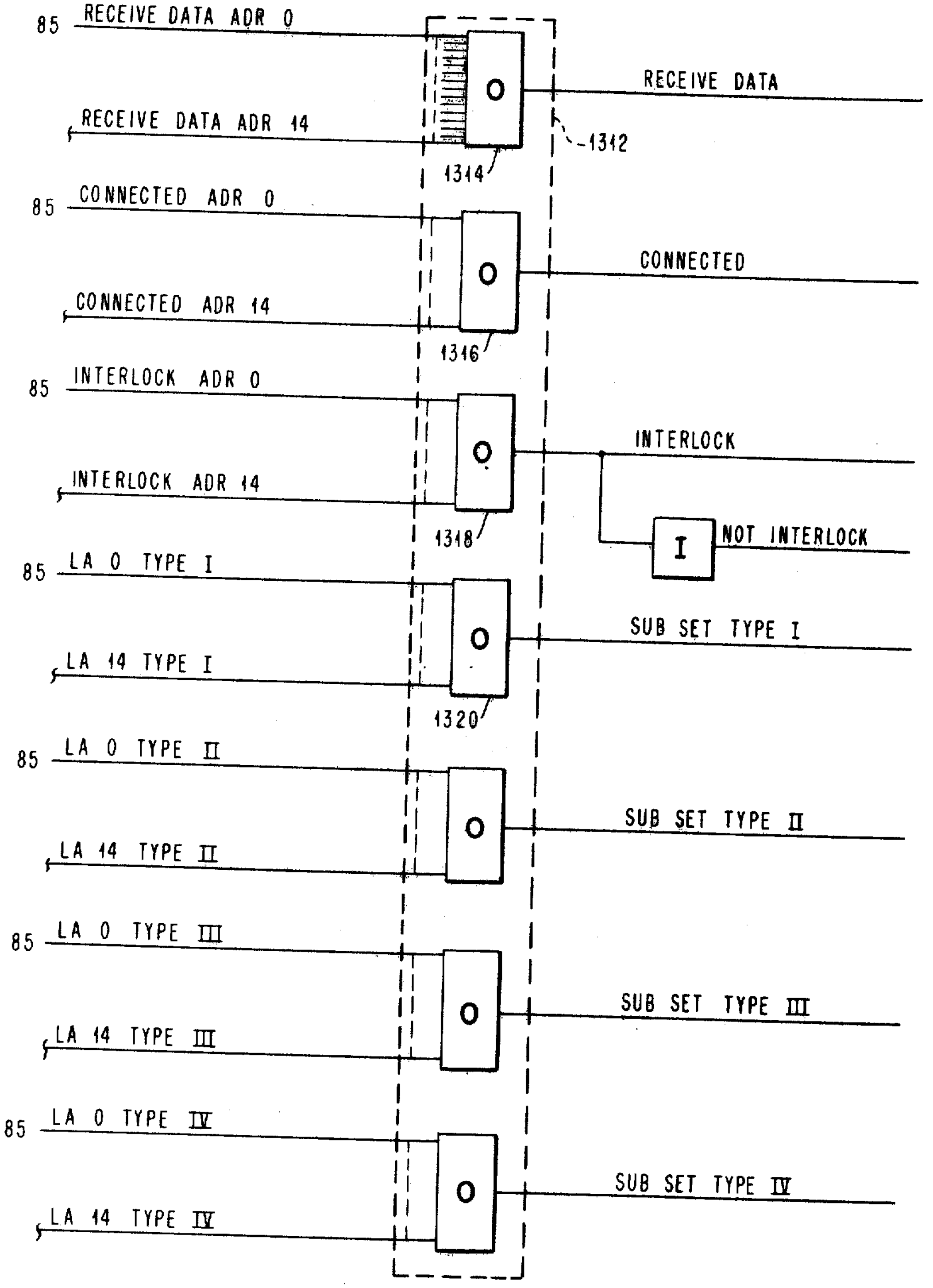

The AND circuits are used by common controls to gate the "Received Data," "Data Carrier Detector," and the "Data Set Ready" lines. The outputs of all the received data AND circuits for each data set are ORed together at a common OR circuit 1314 (FIG. 84), for all of the line adapters. The output of the other AND circuits are similarly ORed together. A latch 1660 (FIG. 110) is used to control the "Data Terminal Ready" lead which allows the call to be answered if it is on, and which causes the data set to be "On Hook" and remain "On Hook" when the latch is off.

Line Adapter 2 is selected by Line Address 0 and Group Address 2, which are decoded as shown in FIG. 53.

7.4 *Automatic Calling Unit (ACU)*

Figure 7:
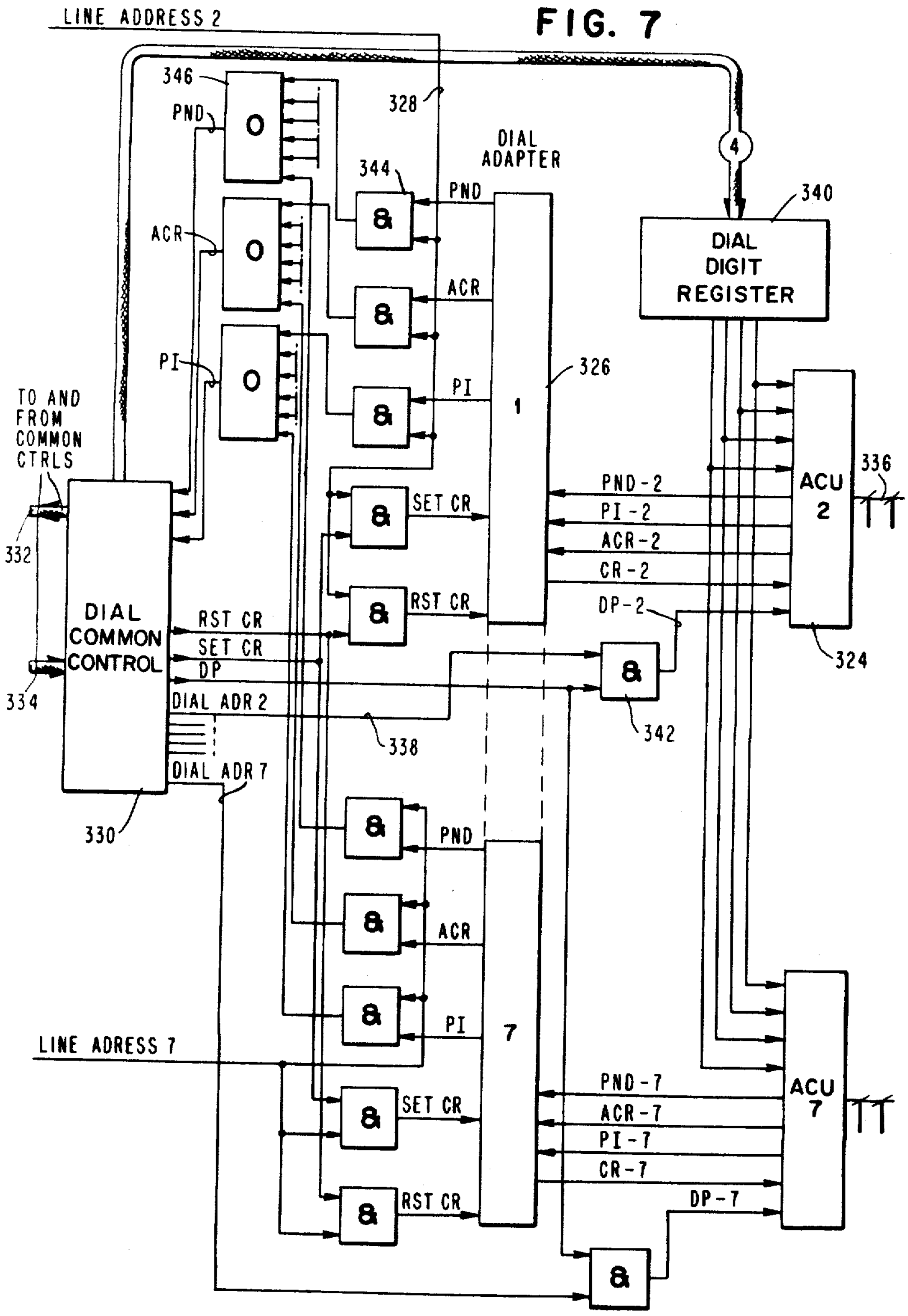
FIG. 7 is an overall block diagram of the automatic dialing unit portion of the system shown in FIG. 1.

Dialing is accomplished by the automatic calling unit ACU 324 (FIG. 7) associated with a particular addressed data set (not shown in FIG. 7). The ACU is attached to a Dial Adapter 326 which is addressed by Line Address Selection Means 328 in the same manner as the other line adapters. Thus whenever the line adapter associated with a data set is selected by line address scanning, the dial adapter associated with the automatic calling unit paired with that data set is also selected by the same address line. A plurality of line adapters communicate with Dial Common Controls 330 which are attached to the common control of the transmission control unit via cables 332, 334.

7.5 *Dial Adapter*

The data channels may each convey information destined for, or receive information from, a separate remote user. The information is placed onto a telephone line via a data set after a connection has been established between a data channel and a single remote user via the automatic calling unit associated with the data set. The automatic calling unit is supplied with information necessary to complete a connection between a remote user and a data channel via the dial common controls and a Dial Adapter 326.

In the embodiment shown in FIG. 7, the control unit services six lines 336 and dial connections on a time shared basis. Each attached line requires a dial adapter between the common carrier Automatic Dialing Unit 326 and the Transmission Control Unit. The following lines and abbreviations comprise the interface leads between the common carrier automatic calling unit and the dial adapter.

CR—Call Request
DP—Digit Present
Digit Lead 1
Digit Lead 2
Digit Lead 3
Digit Lead 4
PND—Present Next Digit
ACR—Abandon Call and Retry
PI—Power Indication

7.6 *Sequence Field*

The sequence field of the line control word is coded as follows for the automatic dialing operation:

Sequence 0—Reset
Sequence 1—Dialing
Sequence 2—Stop
Sequence 3—Prepare End Sequence
Sequence 4—End Sequence Initially the line control words are recirculating in the memory C1, C2 (FIG. 4) and the sequence field is set to zero. Upon detection of a dial command in the command field of a line control word, the Dial Common Controls 330 set the sequence field seq. 1 and turn on "Busy" which indicates that a dialing operation is in progress. The computer then transfers dial digits to the data buffer area of the line control. From the LCW the dial digits are sent to Dial Digit Register 340. When all of the dial digits have been sent, the computer signals stop by turning on Sequence 2 in the sequence field. When the dial common controls recognize that stop sequence is set, the dial common controls set "Prepare End" Sequence 3. At the same time the dial common controls drop the busy line making the common controls available to another line control word recirculating in memory. Thus, dial digits may be sent to another automatic calling unit while the end sequence is being carried out by the first line control word.

The common controls monitor the automatic calling unit lines for error during the end sequence. When the connection between the telephone line and the data set is completed, the dial common controls reset the sequence field to zero, thus making this line control word available for another command.

7.7 *Error Conditions*

In prior systems for establishing automatic dialing, the central computer could monitor only one of all of the possible automatic calling units. By practicing the invention, a line control word is associated with each automatic calling unit and data set. The transmission control unit monitors each automatic calling unit and data set on every revolution of the recirculating memory, independent of the computer program. Error conditions can now be detected and defined in a more finite manner. The following error conditions are detected.

7.7.1 Not operational

This error condition means that this particular line is not available for dialing because of power failure in the automatic calling unit indicated by the energization of the PI lead.

7.7.2 Receiving

This indicates that the line is not available for dialing because it has not been disconnected following the previous message. This is indicated by PND lead being energized at the beginning of a dial sequence.

7.7.3 Timeout

This error condition indicates that the automatic calling unit has timed out because the next digit was not presented within the alloted time, or that a connection was not made.

7.7.4 Equipment Check

The CR latch in each dial adapter is checked to make sure that it did in fact turn on after a set signal was energized and that it turned off after it was reset. A failure of this operation will cause the equipment check bit in the addressed line control word to be turned on.

7.8 *Automatic Dialing*

Initially when the dial common controls are free to perform dial operations, the line control words recirculating in the recirculating memory C1, C2 (FIG. 4) are examined for a dial command. At this point the sequence field is in reset condition. When a dial command is issued by the computer channel it is accepted by the interface controls and placed in the command field of the addressed line control word. The dial command may be queued in the recirculating memory for a duration of time depending on the dial activity. Receipt of the dial command turns on the enable latch of the addressed line adapter. The dial command is decoded and since the sequence field is reset this line address from the control unit binary clock is checked for validity. "Command Reject" is set in the sense field and "End" is set in the status field if the particular address is not valid.

If the address is valid, it is routed from the control unit binary counter (FIG. 2) into a dial address register in Dial Common Controls 330 and the addressed dial adapter is selected via Dial Address Line 338. If the PI lead of the addressed ACU is off, "Intervention Required" is set in the sense field of the addressed line control word. If PND lead is on, the "Receiving" bit of the sense field is set. Either error condition causes "End" to be set in the status field of the line control word. Thus the connection of this call is not completed because of the error condition.

If PI is on and PND is off, the call request latch of the dial adapter is set. If this latch fails to turn on, "Equipment Check" is set in the sense field and the dial command is terminated.

If none of the foregoing error checks occur, "Character Service" and "Dial" sequence 1 are set in the addressed line control word. The presence of character service causes the first dial digit to be fetched from the multiplexor channel in the same manner as any other type of output data. This dial digit is placed in the data buffer of the addressed line control word. "Character Service" is reset when the digit is stored into data buffer. The contents of data buffer are transferred to the Dial Digit Register 340 (FIG. 7) the next time the addressed line control word is read from the recirculating memory. The automatic calling unit responds by raising the PND lead requesting the first dial digit. At this point the dial digit register contents are gated to the digit leads of the automatic calling unit. The DP lead is raised to signal the ACU that the digit leads are valid. "Character Service" is set in the addressed line control word when the dial digit is transferred from data buffer to the dial digit register. The next digit is then obtained from the multiplexor channel and placed in the data buffer of the addressed line control word. The automatic calling unit drops PND when it has sampled the digit leads. In response, the DP lead is dropped by the dial adapter.

This process continues until all digits have been transferred from the channel to the transmission control unit. At this point the channel sets "Stop" Sequence 2 in response to a dial digit request. The dial controls are now free to handle the dialing of another line.

During each line scan of the recirculating memory, The "ACR" lead of the addressed ACU and the "Data Set Ready" lead of the data set are monitored. If the ACR turns on the "Timeout" bit is set in the line control word sense field and the dial command is terminated with "Channel End, Device End, and Unit Check" signalled as unit status. If the "Data Set Ready" lead turns on, the dial command is terminated with a normal end and connection has been established between the data set and the selected line adapter. After a connection has been made, the CR lead to the automatic calling unit is turned off, the dial command is terminated and the line control word is available to service the data communication line via the associated data set.

Thus, the serial data field is used to handle the transfer of digital data through the data set to the remote unit user. If the connection cannot be completed, the ACR signal will cause the timeout bit in the line control word to be set, thus freeing the line control word to make it available to try again.

When a call is to be terminated it is necessary to turn off the "Data Terminal Ready" lead to the data set to perform a disconnect. This is accomplished by issuing a disable command.

The dial operation has the ability to present dialing digits to only one out of the possible six lines shown. However, the equipment does have the ability to monitor the progress of all of the calls for every revolution of the recirculating memory. The dial command thus has a definite ending point. Either the connection will be established and the "Data Set Ready" lead will rise from the data set or the automatic calling unit will timeout and the ACR lead will be energized. In either case, the stored program in the central processing unit is relieved of performing a timeout as part of the monitoring procedure for establishing a connection.

7.9 *Automatic Answering Operation*

The "Data Terminal Ready" lead of the data-set-line-adapter-interface controls the automatic answering capability of the attached data set. When this lead is positive, the data set will automatically answer incoming calls. The "interlock" lead turns on when the answering is performed. Within the data set line adapter there is a latch 1660 which drives the "Data Terminal Ready" lead of the associated data set. This latch is set by an enable command and is reset by a disable command. Thus, when the latch is set, incoming calls are automatically answered by the data set. The storage and common controls continuously monitor the line control words and detect an answered call by the presence of "Data Set Ready" bit in the line control word. Data set ready and enable commands are sufficient conditions for recognizing that an incoming call has been answered. The storage and common controls section set "End" at the end of an answering procedure.

Command chaining may be utilized when the call is answered via the "Channel End, Device End" status from the line control word. The command chained may be either a read or write command, to accept data or to poll the calling terminal, depending on the terminal type and the line control used. When the transmission is completed, a disable command is issued to terminate the call. This command resets the latch 1660 and thus drops the "Data Terminal Ready" line. Enable must be issued again to allow for further answering of calls.

VIII. DESCRIPTION OF DATA AND STATUS SERVICING

8.1 *Output Data Servicing*

Data servicing is initiated by the control unit after initial selection (i.e. after the issuance of a "Start I/O" instruction) has been completed and the addressed communication line has accepted a command. Assume the command is a "Write" command. A request for character service is sent when the data buffer becomes empty (i.e. when the contents have been transferred to the serial data field) within the line control word. The character service bit in the addressed line control word is set on. As the control words circulate in storage, the status of the input/output registers is checked each time a line control word is read out of storage into R1 and R2. If the I/O register is not busy, the address of the line control word demanding character service is loaded into Unit Address Register 1 (UAR 1). The interface controls now attempt to gain the selection of the multiplexor channel. The interface controls energize "Operational In" and "Address In," in response to which the channel signals "Command Out." Following this, "Service In" is energized by the control unit. The next byte of data is placed on "Bus Out" by the channel with "Service Out" raised to end the transaction. The data byte is now transferred from the multiplexor channel into the I/O register and the control unit drops "Operational In." UAR 1 still contains the address of the line control word requiring the byte now in the input/output register. When the line control word corresponding to the address stored in UAR 1 is read out of storage, the I/O register contents are transferred to the data buffer portion of the line control word. Character service is reset within this line control word and both the I/O register and UAR 1 are reset completing the output data servicing cycle.

8.2 *Input Data Servicing*

An input data servicing cycle is similar to the cycle taken for output data. The direction of flow of data byte is reversed. The character service bit is set in a particular line control word. When this line control word is available at R1 and R2 its address is loaded into UAR 1 and the data byte is placed in the I/O register. In this case, character service is reset as soon as the data buffer is emptied into the I/O register. The interface controls then gain selection of the multiplexor channel. In response to "Operational In" and "Address In," the channel signals "Proceed," the I/O register is gated onto "Bus In" and "Service In" is raised. "Service Out" from the channel ends the sequence and the control unit drops "Operational In" and resets both the I/O register and UAR 1.

8.3 *Stop Sequence*

During either input or output data servicing the channel could respond with a stop sequence to thereby terminate the present command. This is accomplished by providing the control unit with a signal on the "Command Out" line in lieu of a signal on the "Service Out" line. Data is not transferred under these circumstances. In fact, during an input data servicing cycle the data byte is lost. This may happen, for example when an overflow condition of the message block allocated within the processor memory exists. The address stored in UAR 1 locates the line control word within the recirculating delay line that must be stopped. When the corresponding line control word is read from storage, the "Prepare End" sequence is set within the sequence field of this addressed line control word. After certain control functions are performed the addressed line presents interrupt conditions to the multiplexor channel.

8.4 *Status Servicing*

Status servicing is very similar to input data servicing. Status servicing commences at the termination of control unit commands. The "End of Sequence" bit is set and this combined with valid status information within the status byte of the line control word initiates status servicing. The status byte is loaded into the I/O register and the LCW address is loaded into the UAR 1. "Suppress Out" line must be up for status servicing. When the status loaded into the I/O register is accepted by the channel, the channel signals "Service Out" in response to the status byte. The interface controls remain busy to data and/or status servicing from other line control words recirculating in memory until the line control word identified by the address stored in UAR 1 is read from storage and the status byte in that line control word is reset. At this time, both the I/O register and UAR 1 are reset and made available for use by another line control word.

8.4.1 Status Conditions During Initial Selection

The following status conditions can be presented to the channel during initial selection.

8.4.1.1 All Zeros

In response to "Start I/O," this indicates that a command has been accepted.

8.4.1.2 Busy, Status Modifier, Control Unit End

These indicate that the control unit is busy.

8.4.1.3 Unit Check

This response to "Start I/O" indicates that the command issued to the control unit cannot be executed.

8.4.1.4 Status Modifier

This is an unconditional response to "Test I/O."

8.4.1.5 Channel End and Device End

This is an unconditional response to the "I/O No-op" command.

8.4.2 Status Conditions at End of Command Execution

The following status conditions may be presented to the channel at the end of a control unit command execution:

8.4.2.1 Channel End and Device End

This indicates that the present command has been brought to a normal end and the unit is free to accept another command.

8.4.2.2 Channel End, Device End, and Unit Exception

This indicates that the present command has been brought to a successful conclusion and EOT (end of transmission) has been received. EOT may be either an end of transmission character or a "No Response" to a poll.

8.4.2.3 Channel End, Device End, Unit Exception, and Unit Check

This indicates that the present command has been ended by unusual conditions and EOT has been received. A sense command must be issued to the address to further define the unusual conditions.

8.4.2.4 Channel End, Device End, and Unit Check

This indicates that the present command has been ended by unusual conditions. A sense of command must be issued to the address to further define the unusual conditions.

8.4.3 Sense Command to Further Define Status 8.4.3.1 Sense Byte

The byte transferred to the multiplexor channel during the sense operation is defined below in the proper relation with "Bus In" lines 0–7. The byte is assembled from the sense field bit positions within the addressed line control word.

| Bus in Bit Position | Sense Field Bit | Defined in Section |
|---|---|---|
| 0 | Command Reject | 4.4.8 |
| 1 | Intervention Required | 4.4.9 |
| 2 | Bus Out Parity Check | 4.4.5 |
| 3 | Equipment Check | 4.4.4 |
| 4 | Data Check | 4.4.23 |
| 5 | Overrun | 4.4.7 |
| 6 | Receiving | 4.4.16 |
| 7 | Timeout | 4.4.6 |

IX. FUNCTIONAL DESCRIPTION OF TRANSMIT OPERATION 9.1 *Write Command*

The transmit operation is commenced after initial selection (section 3.3) has been obtained via a start I/O instruction (section 3.4.1), by issuing a "Write" command. The channel sends an address on "Bus Out" and raises the "Address Out" line which indicates that the central processing unit (CPU) wishes to select a particular transmission line serviced by this control unit. A decoder across "Bus Out" indicates whether this address is serviceable by this control unit. If it is a valid address then the interface controls gate the address to Unit Address Register 2 (108 in FIG. 2). The control unit responds with this same address gated over "Bus In" as a check to make sure that the proper transmission line has been selected. Next the channel issues a "Write" command on "Bus Out" and raises "Command Out." This causes the interface controls to gate this command into the Command Register 112. The interface controls place a status byte on "Bus In" and responds with a "Status In" signal. The status byte indicates what the status of the control unit is. If, for example, the command was accepted, all zeros are placed on "Bus In." The channel responds with "Service Out" and the command cycle is complete. The address of one of the communication lines is now in Address Register 2 and a write command is in the command register. The control unit compares UAR 2 with the binary portion of the clock in Compare 116. When a compare is reached "LCW Selected" line is energized. This selects the proper control word in the recirculating memory. Command Controls 122 now load the contents of Command Register 112 into R1. The outputs of R1 and R2 going to command control enables command controls to examine the addressed line control word before it starts the command. A new command is unacceptable, for example, if the line receiving this command is already executing another command. One line control word cannot execute two commands at once. If command controls decide that the command is acceptable it loads the command into the line control word stored in C2. After the command is loaded, the command register and UAR 2 are reset.

In response to the write command, common controls initiate the write operation in the addressed line control word. Part of the initiating procedure is to transmit one full character of all marks. This is accomplished in response to all zeros in the sequence field, which inhibits the transmission of space bits. Common controls turn on "Character Service" bit which is examined by interface controls. "Character Service" tells Interface Controls 100 to, whenever it is able, fetch a character from the computer for this addressed line. Service Controls 200 (FIG. 3) monitor the recirculating storage via registers R1 and R2. One of the signals fed into service controls from R1 and R2 is "Character Service" bit which turns on character service trigger. This trigger on causes the clock contents to be gated to UAR 1. UAR 1 is now loaded with the LCW address requesting character service.

9.2 *Output Data Servicing*

Interface controls monitor the interface for "Selecet Out." Upon energization of "Select Out" by the channel, the control unit signals "Operational In," gates the address in UAR 1 to the channel via "Bus In," and energizes "Address In." The channel responds and acknowledges this signal by energizing "Command Out," which means to proceed. The control unit then turns on "Service In." The channel knows that the control unit is executing a write command so it places a character on "Bus Out" and responds with "Service Out." "Service Out" causes "Bus Out" to be gated to the I/O register. The I/O register now contains the character to be transmitted.

Address Register 1 still contains the address of the line that requested character service. The Compare Circuit 182 (FIG. 3) compares the address in UAR 1 with the binary portion of the clock. When they compare, the line control word that originally made the service request is accessible via R1 and R2. The I/O Register 170 (FIG. 3) is now gated by means of Service Controls 200 to R2 which contains the 8 bit data buffer field. Once the character has been loaded into the data buffer, UAR 1, the I/O Register, and the character service bit in the addressed LCW are reset. Now these registers are available for use by some other line in the control unit. The controls for start of service are free to monitor the line control words for requests of other transmission lines (such as character service, end of status).

9.3 *Sampling of Data*

The existence of the write command in the line control word causes the strobe count field of that line control word to be set to a count of eight. The strobe count field advances after every line oscillator change. The terminal controls control which line oscillator will be associated with this particular line control word. The combination of strobe count 15 and an oscillator change causes a start bit to be transmitted, provided the bit count field is equal to zero. The first character sent at the beginning of a transmit operation is one full character of stop bits. The transmission of this first character is indicated by the fact that the sequence field is reset to zero. At each subsequent strobe time (strobe count of 15 combined with a line oscillator change) the following occurs. The serial data field is shifted forward one bit position and a data bit is gated from the serial data field to the data buffer field of the addressed line control word. The serial data field is shifted before gating the bit to the line adapter. Shifting is inhibited at first data bit time (when bit count equals one) to allow for transmitting a start bit. The terminal control energized by TC 1 and TC 2 bits stored in the addressed LCW provides the gate which selects the serial data field bit position from which bits are transferred to the line adapter. After transmitting a data bit, the bit count is incremented by one and the strobe count field is set to five. The data sampling process continues until the associated terminal control signals stop time to the common controls. Stop time is detected by the terminal controls when the bit count equals a certain number of code elements which is a function of the terminal type associated with the line control word address.

At stop time, the following occurs. A mark is transferred to the selected line adapter. If the sequence field is reset, character service bit is set and the sequence field is set to "Data" if character service is already "ON" (indicating that the data buffer does not yet have the next character to be transmitted from the channel) the bit count field is not reset nor is it advanced by one. This procedure will cause the next bit transferred to be another stop bit. If character service was reset and the sequence field was not reset, the data buffer is transferred to the serial data field and the bit count field is set to zero. The character service bit is then set causing the next bit to be a start bit. The write operation is terminated if "Data Set Ready" or "Data Carrier Detector" are off. "Not Operational" is set in the sense field and "END" is set in the status field.

9.4 *Transmit Echo Check*

An echo check is provided during a transmit operation to check the transmitted data. Since the serial data field is shifted before gating the data bit to the line adapter, the data bit currently being transmitted on a communication line is present in the serial data field until the next strobe time. At strobe count ten the common controls sample the received-data line (on the communication line/line adapter interface) and compares it with the transmit-data latch of the selected line adapter. These comparisons are also made at stop and end times. If this check fails, data-check bit is set in the sense field of the associated line control word. Equipment check is set in the sense field if the transmit-data latch fails to compare with the appropriate serial data field bit position which depends on the character length. Equipment check and echo check will cause immediate termination of the current operation.

9.5 *Write Marks*

If the data buffer positions 0 and 1 are set to logical one (mark) the common controls will send a mark in place of normal space as a start bit unless this is inhibited by the associated terminal control.

9.6 *Transmitted Distortion*

Each line adapter (FIG. 85) double buffers each transmitted data bit. The data bit is first placed into a Transmit Buffer Latch 1322. The output of the transmit buffer latch is gated to a Line Latch 1328 at a line oscillator change by AND's 1324, 1326. A line oscillator change may not occur while the address line control word is in register R1, R2. Thus, the bit is not transmitted immediately to the communication line when it is transferred from the line control word to the line adapter, which results in substantially reduced distortion.

9.7 *Auto Wrap*

This check function is initiated by issuing an auto wrap command to the communication line on which trouble is suspected. The output of the line to which auto wrap command was issued is then electronically connected to the input of line address zero. A "Read" command must be issued to line zero before the auto wrap is started, if the computer channel desires to accept the information so received. The computer may then make a character by character comparison of the received data with the sent data as a check on the transmit/receive data paths. Line zero is not reserved as only a test line but may be used for ordinary transmit or receive operations when it is not being used in the autowrap process.

Since line zero is used with all wrap around operations, the proper terminal controls must be gated to control received data on line zero. Line zero may be of a different type from the wrapped line. To correct for this the TC 1 and TC 2 bit fields of the line to which the auto wrap command was issued is stored in a set of latches and a wrap latch is set. Now when line zero is read out of the recirculating memory, wrap latch being on will cause the terminal control field of line control word zero to be overriden by the stored terminal control address which corresponds to the wrapped line. Thus, line zero operates as if it were the same kind of communication line as the line being tested.

A complete check of common controls as well as the terminal controls of the line being tested, is made. Receive operations as well are checked since a common terminal control (the terminal control of the line being wrapped) performs the receive control. Output data from the unit issuing the auto wrap command may be blocked from actually going onto the communication line by issuing a disable command to the line adapter before issuing the auto wrap command.

9.8 *Ending Transmit Operation*

The channel signals the end of message by responding with "Address Out" instead of "Service Out" in response to "Service In." (I.e. Halt I/O instruction, section 3.4.2.) A stop signal is stored in the interface controls. The stop signal is fed to the common controls to cause the addressed LCW to finish the transmit operation. The LCW sends out the character in the data buffer field and follows it with a longitudinal redundancy check (LRC) character. Common controls then turn on the "End Bit" in the addressed line control word. Controls for start of service recognize that "End" has been turned on and Load Address Register 1 with the LCW address from the clock. In the I/O register the bit that corresponds to end in the status byte is turned off. Service controls now signal status without looking for data, by gaining selection of the interface. The contents of Address Register 1 are gated to "Bus In." The status byte, which indicates "Proceed" instead of "Service" is loaded into the I/O register. The channel energizes "Suppress Out" for status servicing and indicates receipt of the status byte by signalling "Service Out." The interface controls remain busy to data and/or status servicing from other LCW's recirculating in memory until the LCW identified by the address stored in UAR 1 is read from storage. The status byte in that LCW is then reset. The common controls also reset the command and any other bit fields that require changing to make ready for a new operation.

X. FUNCTIONAL DESCRIPTION OF RECEIVE OPERATION 10.1 *Read command*

The receive operation is initiated after initial selection by issuing a "Read" command. The channel sends an address on "Bus Out" and raises the "Address Out" line which indicates that this address information wishes to select a particular transmission line serviced by this control unit. The decoded output of "Bus Out" indicates whether this address is serviceable by the control unit. If it is a valid address then the interface controls gate the address to UAR 2 (108 in FIG. 2). The control unit responds with this same address gated over "Bus In" as a check to make sure that the proper transmission line has been selected. Next, the channel issues a "Read" command on "Bus Out" and raises "Command Out." This causes the Interface Controls 100 to gate this command into the command register. The interface controls place a status byte on "Bus In" and respond with a "Status In" signal. The status byte indicates what the status of the control unit is. Since the command is accepted, all zeros are placed on "Bus In." The channel responds with "Service Out" and the command cycle is complete.

The address of one of the terminals is now in UAR 2 and a read command is in the command register. The control unit compares UAR 2 with the binary portion of the clock in Compare 116 to select the proper control word in the recirculating memory. When a compare is made, command controls load the command register contents into R1. If command controls decide that the command is acceptable, it loads the command into the line control word. At this point in time, since the command is loaded, command register and address register 2 are reset. This clears this portion of the interface controls and allows the controls unit to accept another command. The control unit may be selected again, some other address signalled, and another command commenced. If the channel attempts to select the control unit while the command register is still busy, the control unit will automatically signal control unit busy.

10.2 *Sampling of data*

In response to the read command, common controls initiate the read operation in the addressed line control word. The strobe count field is initially in a reset state or a line timeout may be in process. If either of these conditions exist in the line control word, the line control word is in a receive monitoring condition. Upon the detection of space status on the receive data line of the line adapter 276 (FIG. 6) associated with this line control word, the line timeout is terminated, if in process, and the strobe count field of the addressed line control word is set to 10.

The receiving bit within the line control word is set upon the receipt of the space signal. The last oscillator sample (LOSC) bit is set equal to the last level of the line oscillator. The strobe count field is advanced each time there is an oscillator change. Line oscillator changes are detected by a difference between the logical values of the LOSC bit and the actual value of the line oscillator, when the LOSC bit is read from the recirculating memory. Each time such a difference is detected, the LOSC bit is updated to agree with the line oscillator after the strobe count is incremented. The strobe count advances to sample time, which is the coincidence of strobe count 16 and an oscillator change. At sample time, if the receive data line is still in space condition, a true start bit has been received. If, however, the receive data line is in marking condition, a false start indication has been received and the strobe count is reset. The receiving bit is also reset to indicate that no previous data has been received.

Assuming that a true start bit has been detected, the serial data field is reset in preparation to receive a character. The sequence field is set to "Receiving" (010) to thus start a data cycle. The strobe counter continues to increment on oscillator changes counting from five to fifteen and again starting over again at five. At sample time the receive-data line is gated into the low order position of the serial data field after the field has been shifted forward one position. The bit count is incremented by one and the strobe count is set back to five. The data cycle continues in this manner until the associated terminal control signals "Stop Time" to the common control. A stop time occurs by the coincidence of sample time and a bit count equal to N, where N is a number of bits determined by the terminal control section which indicates the length of a full character in the code used by that terminal. For example, N may be equal to eight bits. At stop time the serial-data field is transferred to the data-buffer field portion of the line control word stored in memory C2. Character service bit is now set. If another bit is received while character service bit is on, overrun is set in the sense field. If the receive data line of the selected line adapter is not in a marking condition, data check is set in the sense field indicating that a faulty stop bit has been received.

If the receive data line of the selected line adapter is not marking and the serial data field contains all zeros, "Intervention Required" is set in the sense field and "End" is set in the status field.

On a data set interface, if "Data Set Ready" or "Data Carrier Detector" leads are down, the receive operation is terminated. "Intervention Required" is set in the sense field, and "End" is set if the command field contains a read command. Finally, the bit count and the strobe count are reset.

10.3 *Ending a receive operation* (*line timeout*)

The common controls provide a 20 second timeout between data characters during a receive operation provided that a read or a search command has been accepted by the line control word. The line timeout mechanism utilizes the combined strobe count and bit count fields of the line control word as a binary counter.

At stop time during a receive operation, the "Time" bit in the line control word (C2) is set, signifying that a timeout is in process. The strobe count and bit count fields are reset. The time bit being on causes the timeout oscillator to be compared with the LOSC. The strobe count/bit count field is incremented on every unequal compare between the LOSC bit and the timeout oscillator, in the same manner that the strobe count is incremented during a receive operation. In the embodiment shown, the timeout oscillator has a frequency of five cycles per second giving timing changes every one-hundred milliseconds. Thus the 20 second period elapses when the combined strobe/bit count field reaches a binary count of 192.

The timeout process is interrupted when a start bit is received and is restarted at the following stop time or when a false start is detected. Should the timeout elapse before a start bit is received, the read or search command is terminated, the "Timeout" bit is set in the sense field, and the "End" bit is set in the status field.

Shorter timeouts may be provided by certain terminal controls. The same timeout mechanism is used for the shorter timeout, however the terminal control then determines the limit which the strobe count/bit count field is allowed to reach.

XI. DETAILED DESCRIPTION OF TRANSMISSION CONTROL UNIT

11.1 *Initial selection*

Figure 10A:
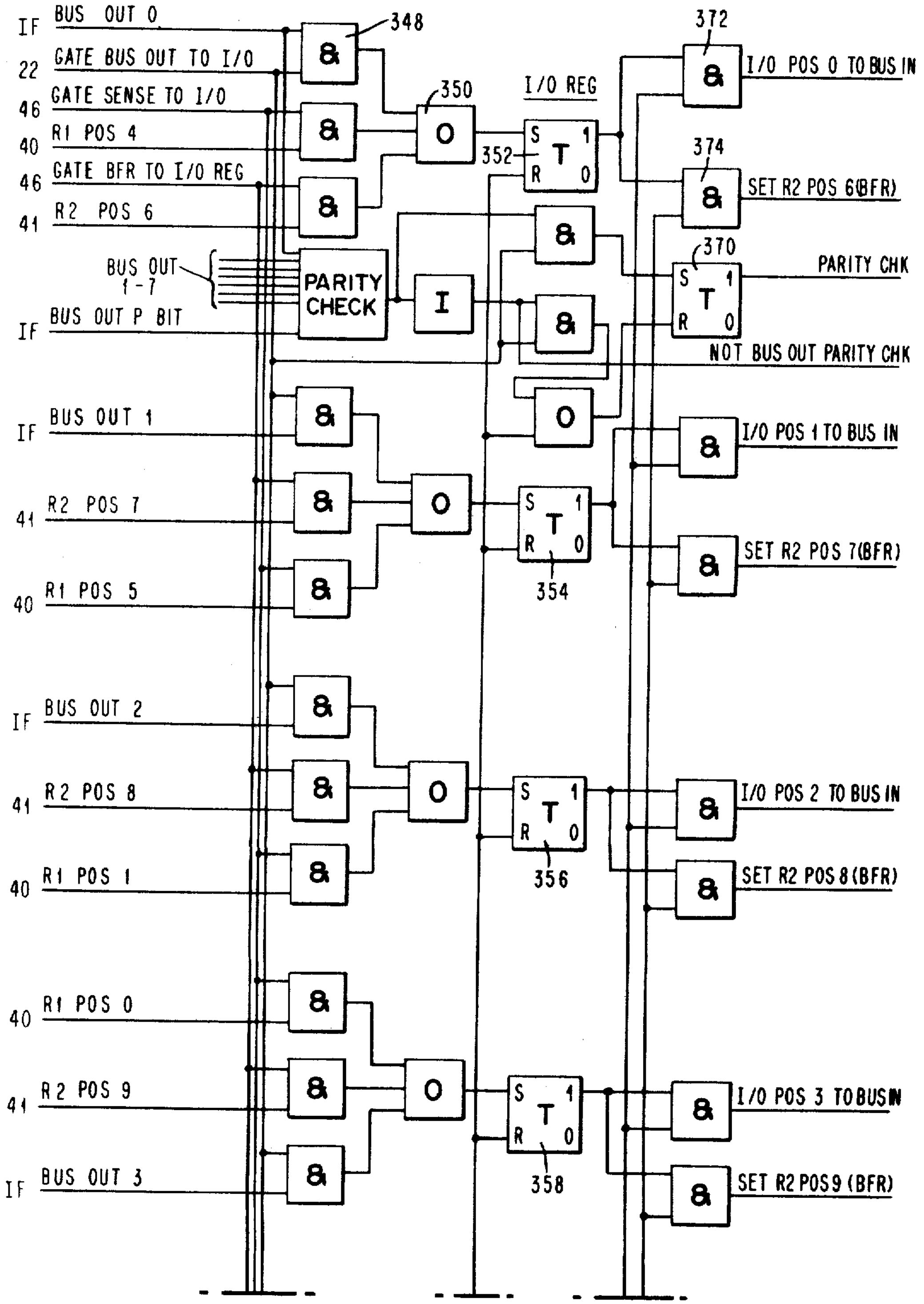
Figure 10B:
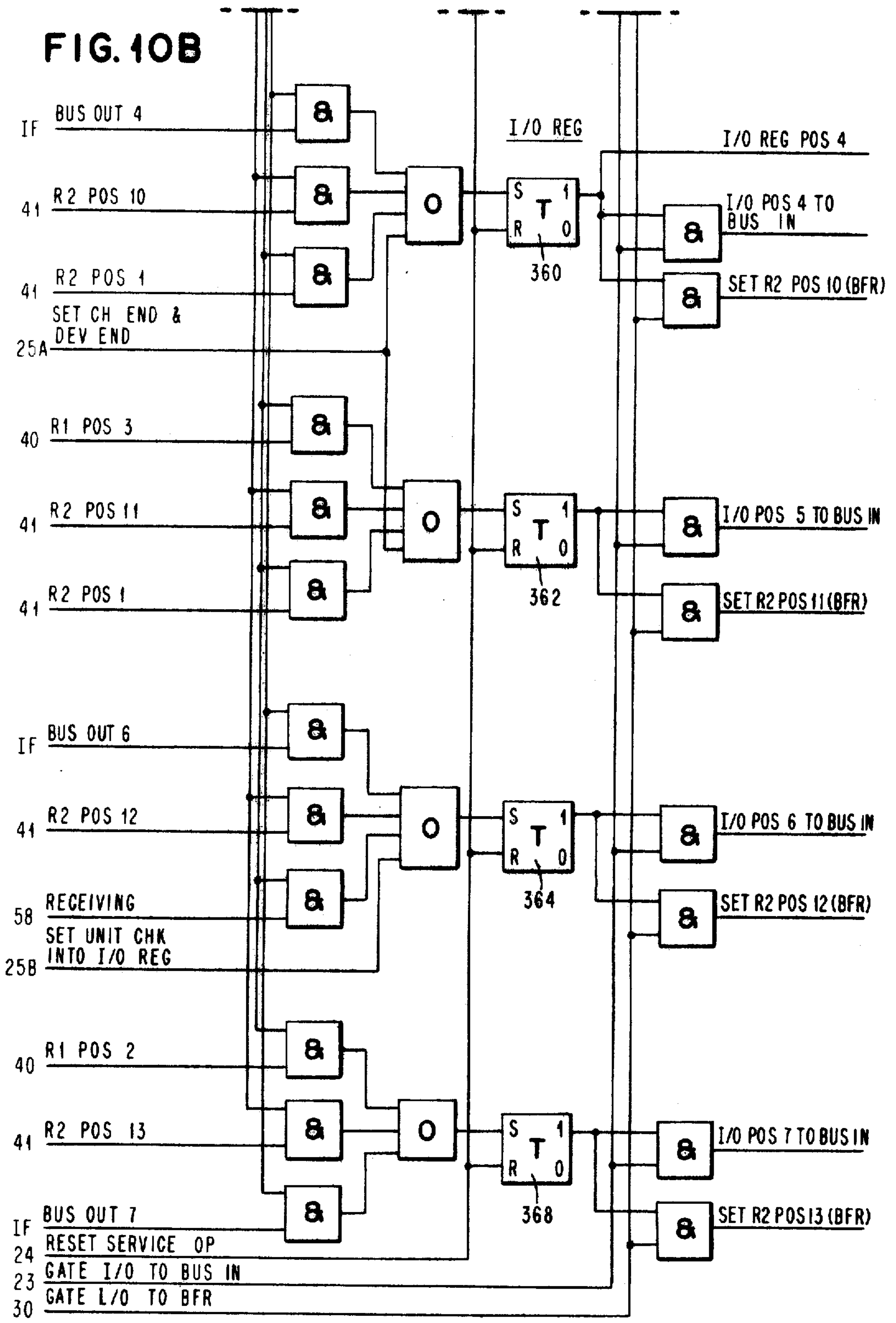
Figure 17:
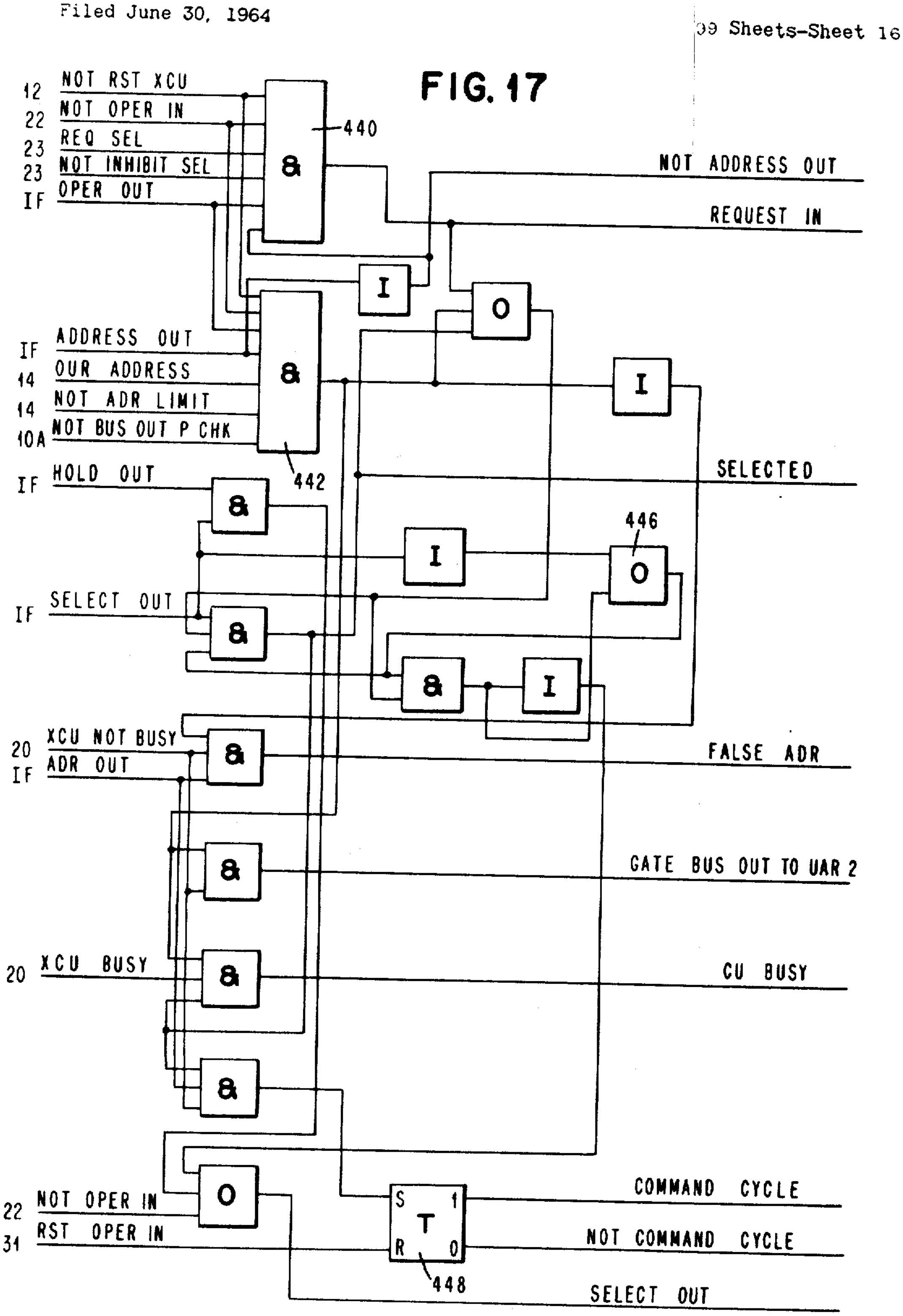

In order for the central processing unit (CPU) to select a communication line serviced by the control unit, address information is placed on "Bus Out 0–7" (FIGS. 10A and B). The "Address Out" line (FIG. 17) is then raised. The "Address Out" line gates AND Circuit 442 (FIG. 17) composed of several signals among which is "Our Address," "Not Address Limit," and "Not Bus Out Parity Check." When the AND circuit function is met, and provided the control unit is not "Busy," "Bus Out" is gated to Address Register 2 by the line "Gate Bus Out To UAR 2" on FIG. 17. Parity is checked on "Bus Out" (FIG. 10A). Since the parity tree has some inherent delay, Address Register 2 is held reset by the AND Circuit 442 (FIG. 17) whose inputs are "Not Our Address," "Not Operational In," "Address Out," and "XCU Not Busy." By the time "Select Out" is generated by the channel, the address on "Bus In" should be stable. The output of the parity tree (FIG. 10A) should also be stable and a decision is made to load the address on "Bus Out" to Address Register 2 or to hold the address register reset via "False Address" line (FIG. 17).

Figure 14:
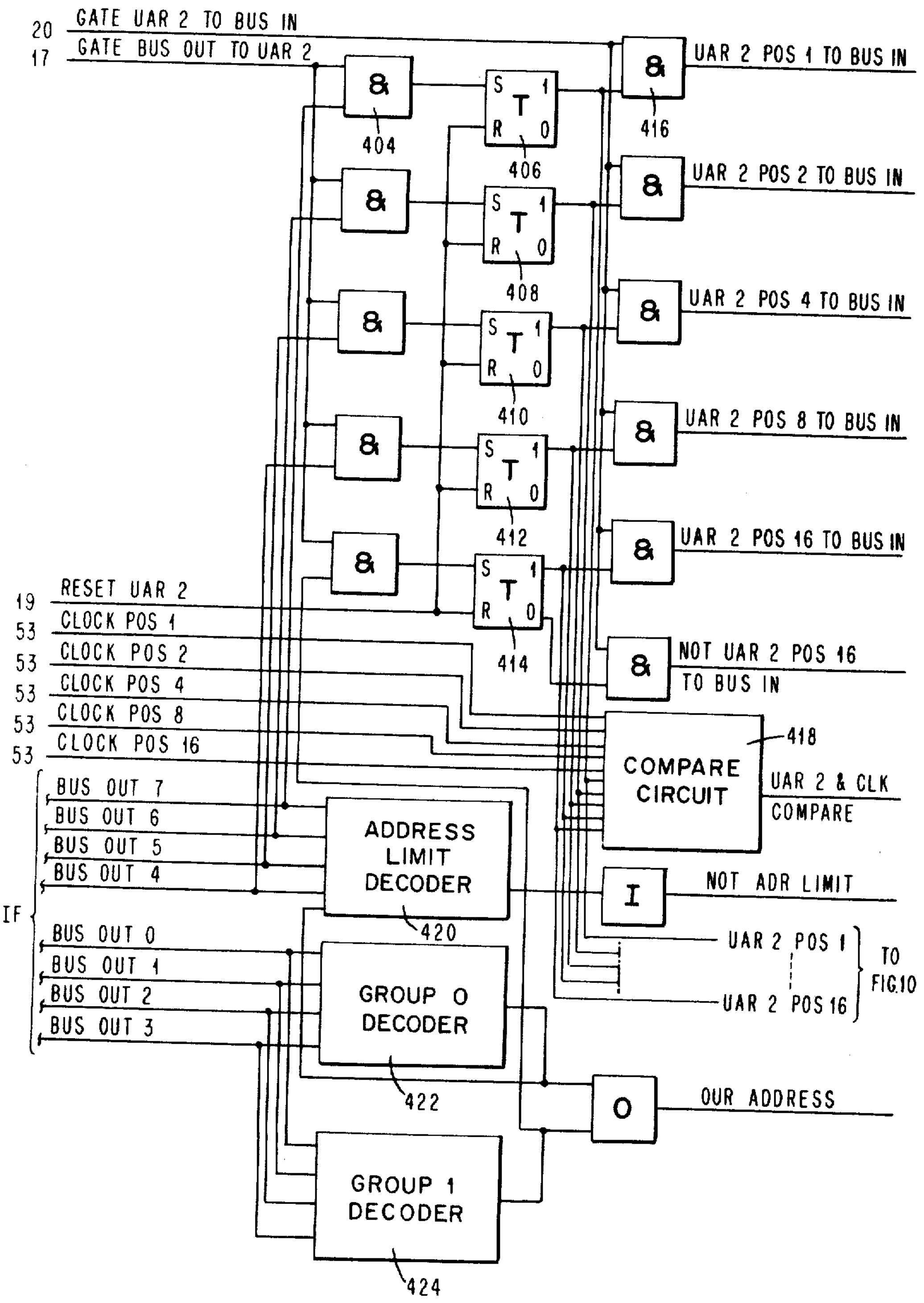
Figure 22:
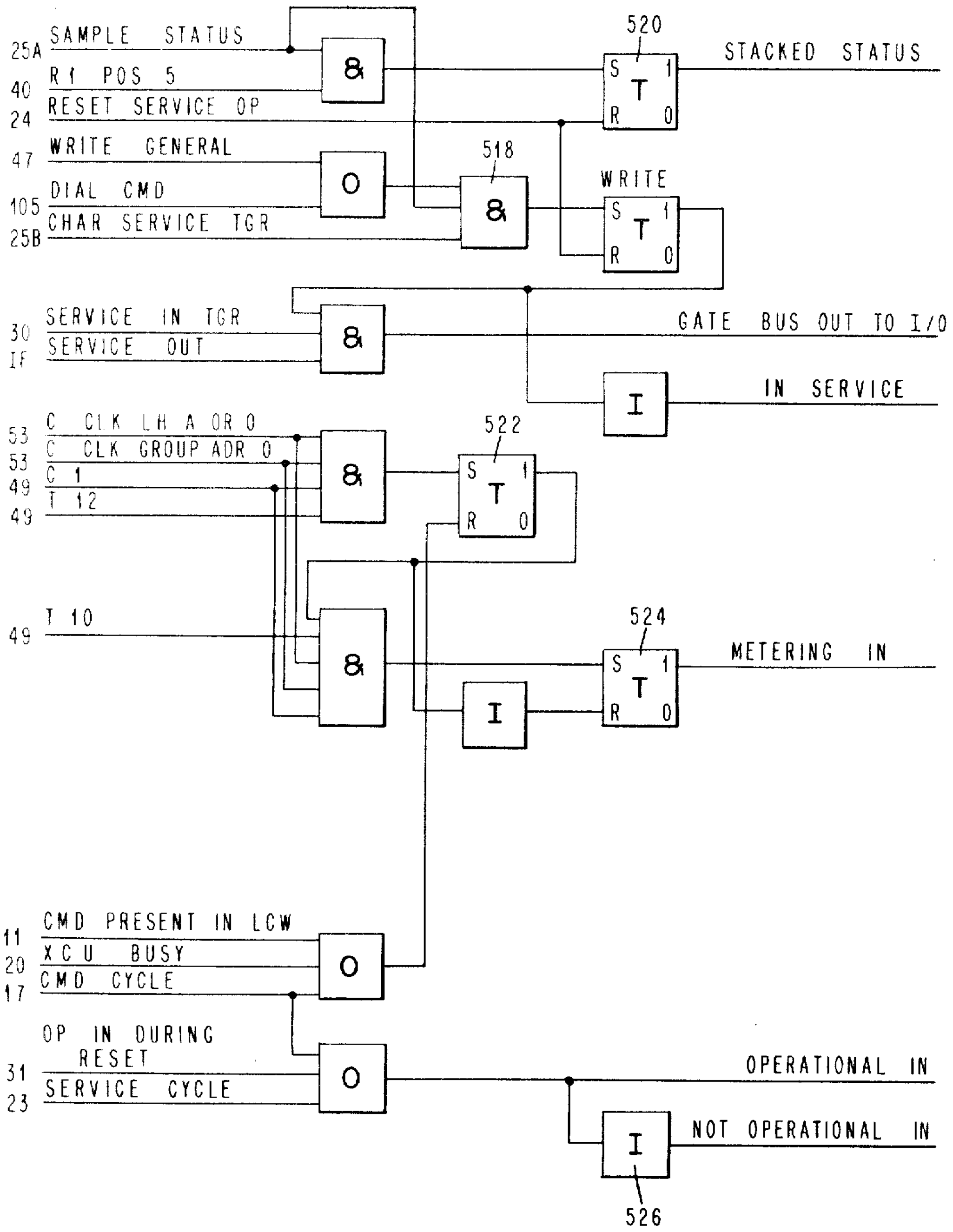
Figure 23:
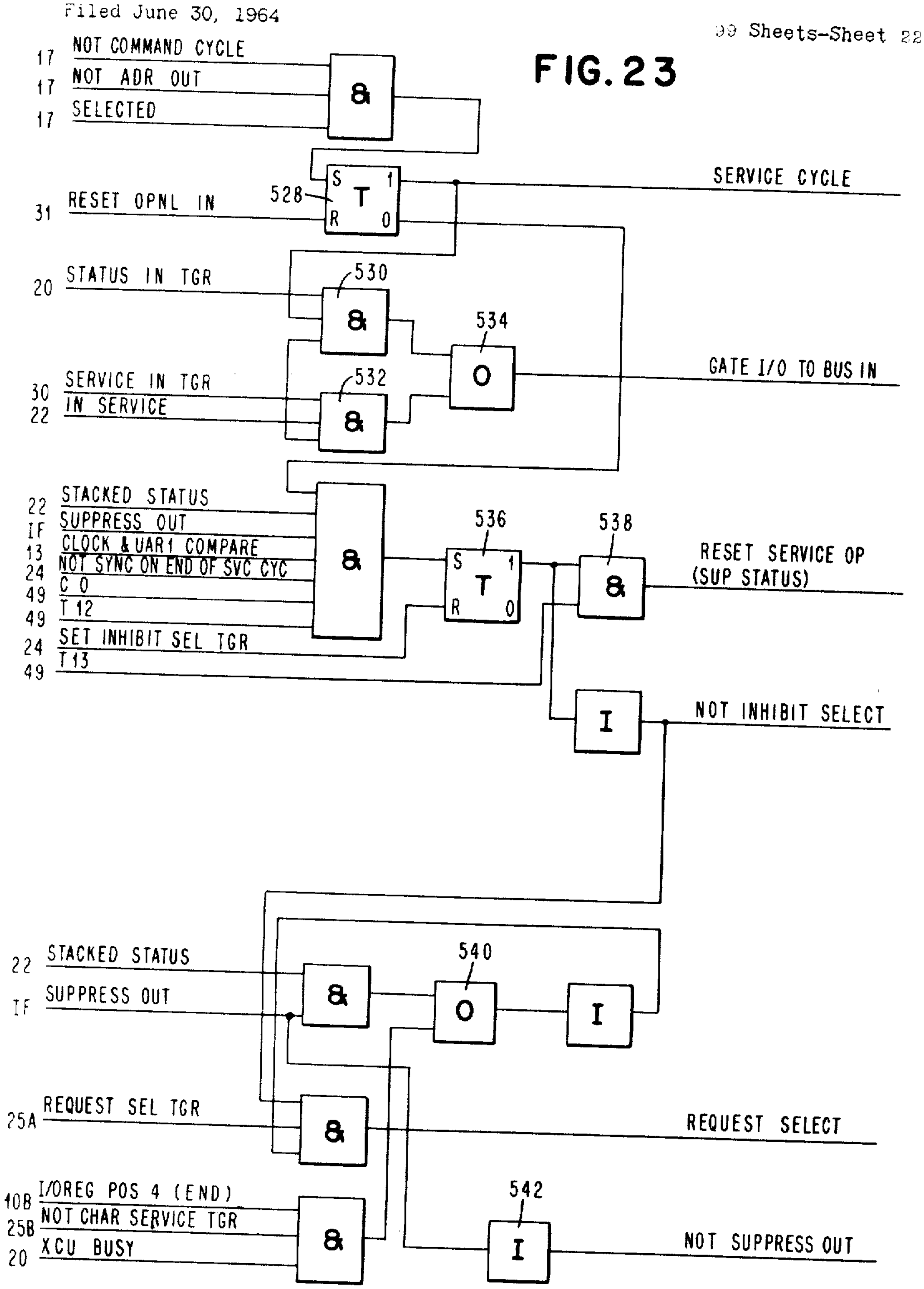
Figure 24:
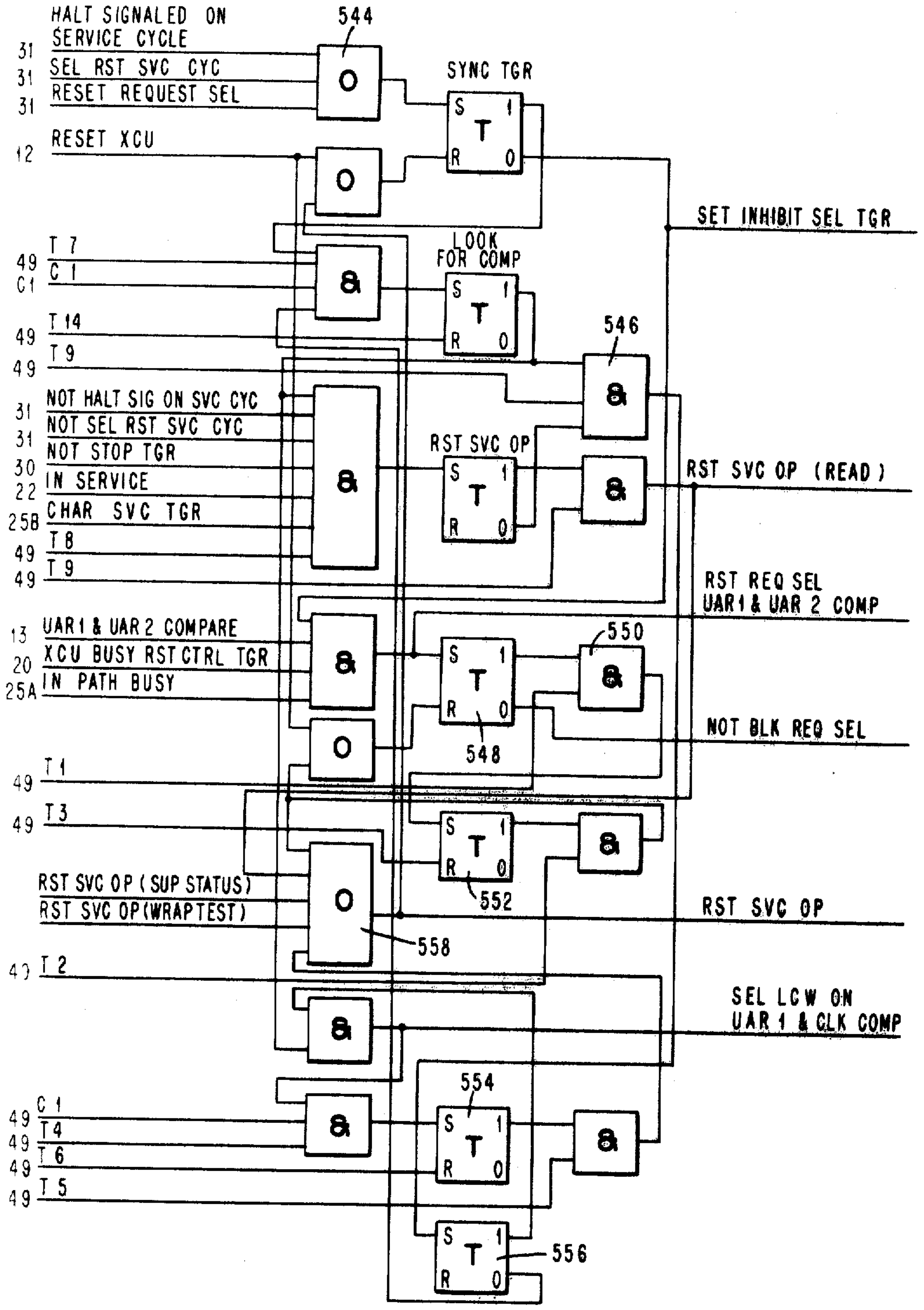

Whether or not the address on "Bus Out" is valid is determined by the "Address Limit Decoder," "Group 0 Decoder," and the "Group 1 Decoder" (FIG. 14). The decoder examines the address on "Bus Out" in two segments. The four high order bits, bits 0, 1, 2, and 3, define the group address. For a 15 line transmission control unit, only group address is assigned. Internally the group address is assigned by means of Plug Boards 422, 424, FIG. 14. The four low order bits, bits 4, 5, 6, and 7, signify which line attached to the transmission control unit is being addressed. These "Line Addresses" are assigned sequentially starting from all zeros up to 1110. If not all 15 lines are used in the control unit, an Address Limit Decoder 420 (FIG. 14) determines which lines are unused. The line called "Not Address Limit" (FIG. 14) indicates that the address bit configuration in the four low order positions is one that has been assigned to this transmission control unit. The "Our Address" signal (FIG. 14) signifies that an assigned group address is detected. In FIG. 17 "Our Address," "Not Address Limit," "Address Out," and "Not Bus Out Parity Check" present, energize AND 442. The output of AND 442 through an OR causes "Selected" to go positive. The fact that the control unit is selected and that the operation was initiated by the generation of "Address Out" causes the Command Cycle Trigger 448 to go on (FIG. 17). The command cycle trigger is one condition through an OR which causes the control unit to respond with "Operational In" (FIG. 22). The response "Operational In" causes the channel to drop "Address Out" which in turn causes the control unit to turn on "Address In." "Address In" is generated by the AND circuit (FIG. 20) whose inputs are "Not Address Out," "Command Cycle Trigger" (this is the trigger that just turned on), and "Not Command Out Delayed Tgr" and whose output is "Gate UAR 2 To Bus In." The address in UAR 2 is now gated to "Bus In" in FIG. 14 by the signal "Gate UAR 2 to Bus In."

Figure 18:
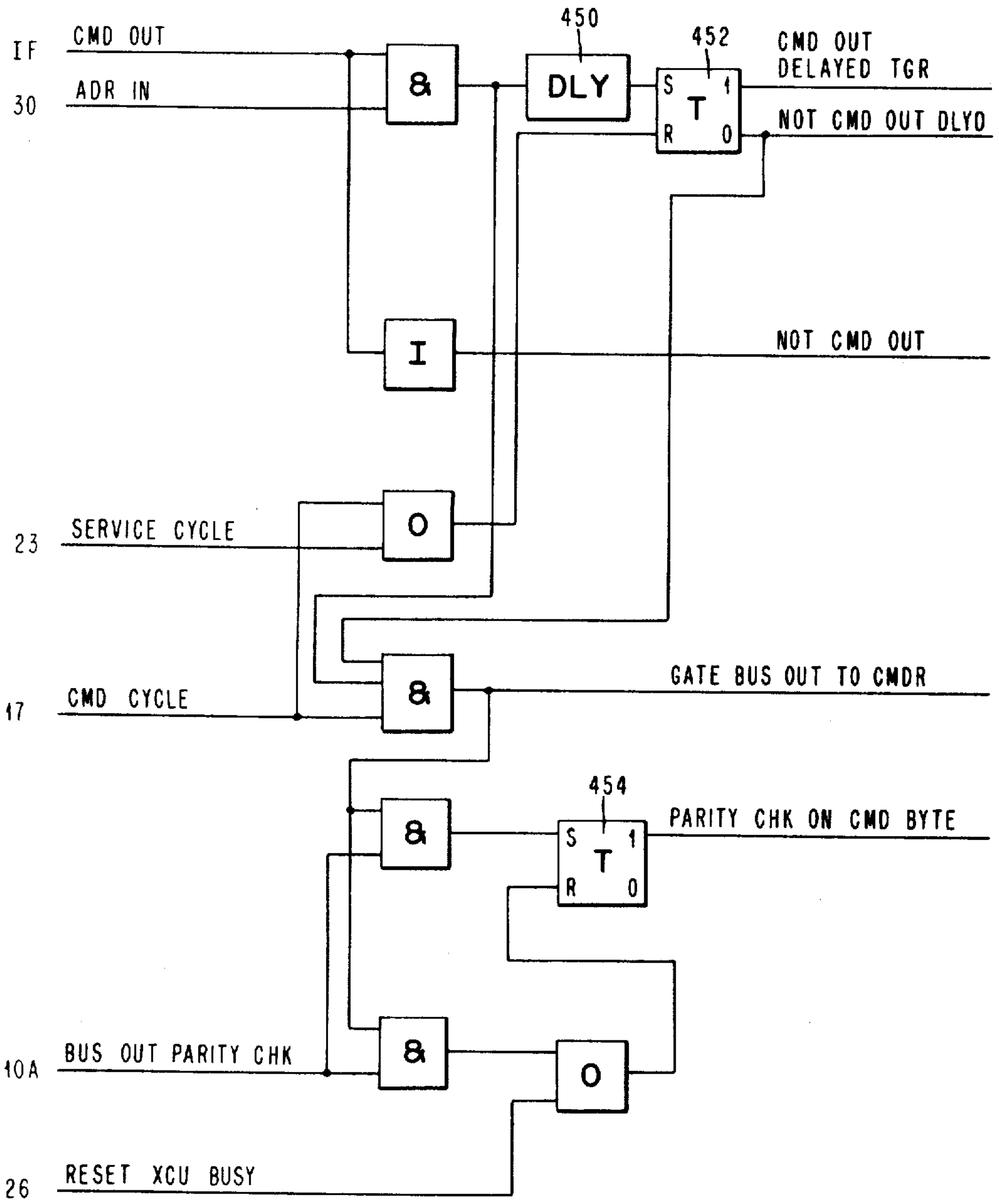
Figure 19:
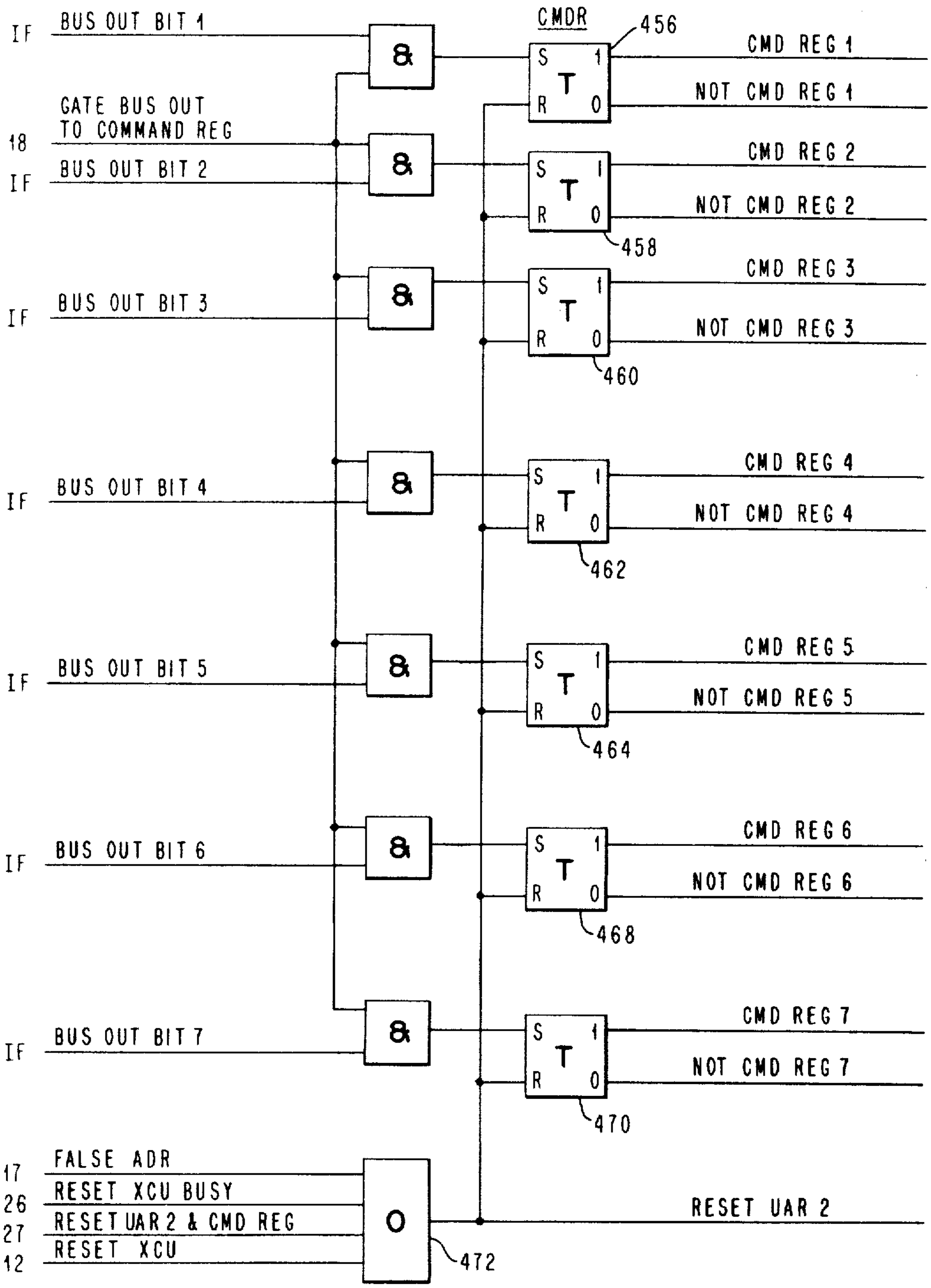

"Address In" causes the channel to respond with "Command Out." FIG. 18 shows "Command Out" and "Address In" turning on the "Command Out Delayed" trigger after a Delay 450. Before the trigger is turned on, the output of the AND circuit whose inputs are "Command Cycle," "Not Command Out Delayed," and "Command Out" and "Address In" gates "Bus Out" to the Command Register (FIG. 19).

At the same time the command on "Bus Out" is being gated to the "Command Register," parity on "Bus Out" is checked. The line "Gate Bus Out to CMDR" is ANDed with bus out parity check (FIG. 18), and should there be a parity check, the parity check trigger 454 shown in FIG. 18 is turned on.

Figure 29A:
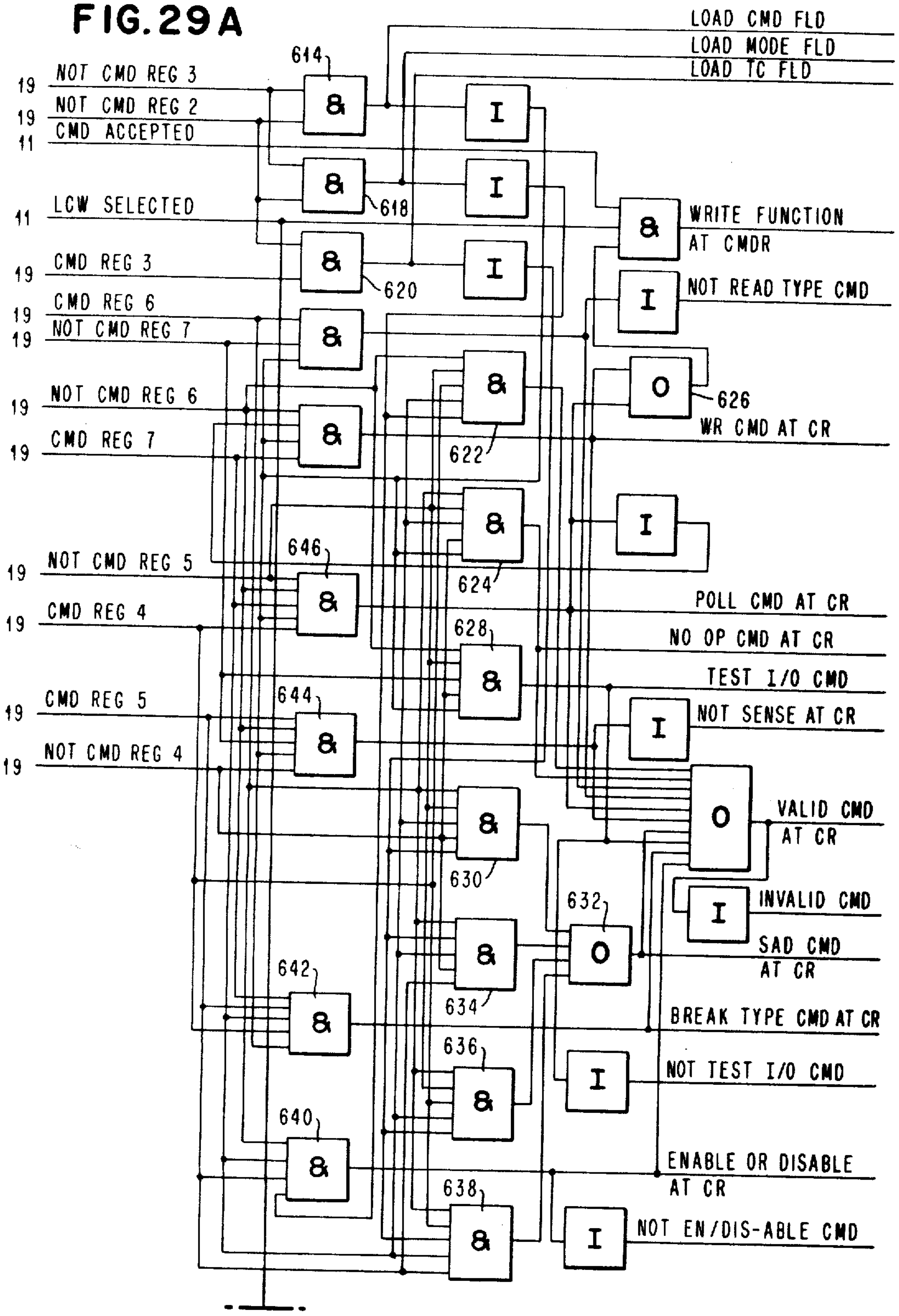
Figure 29B:
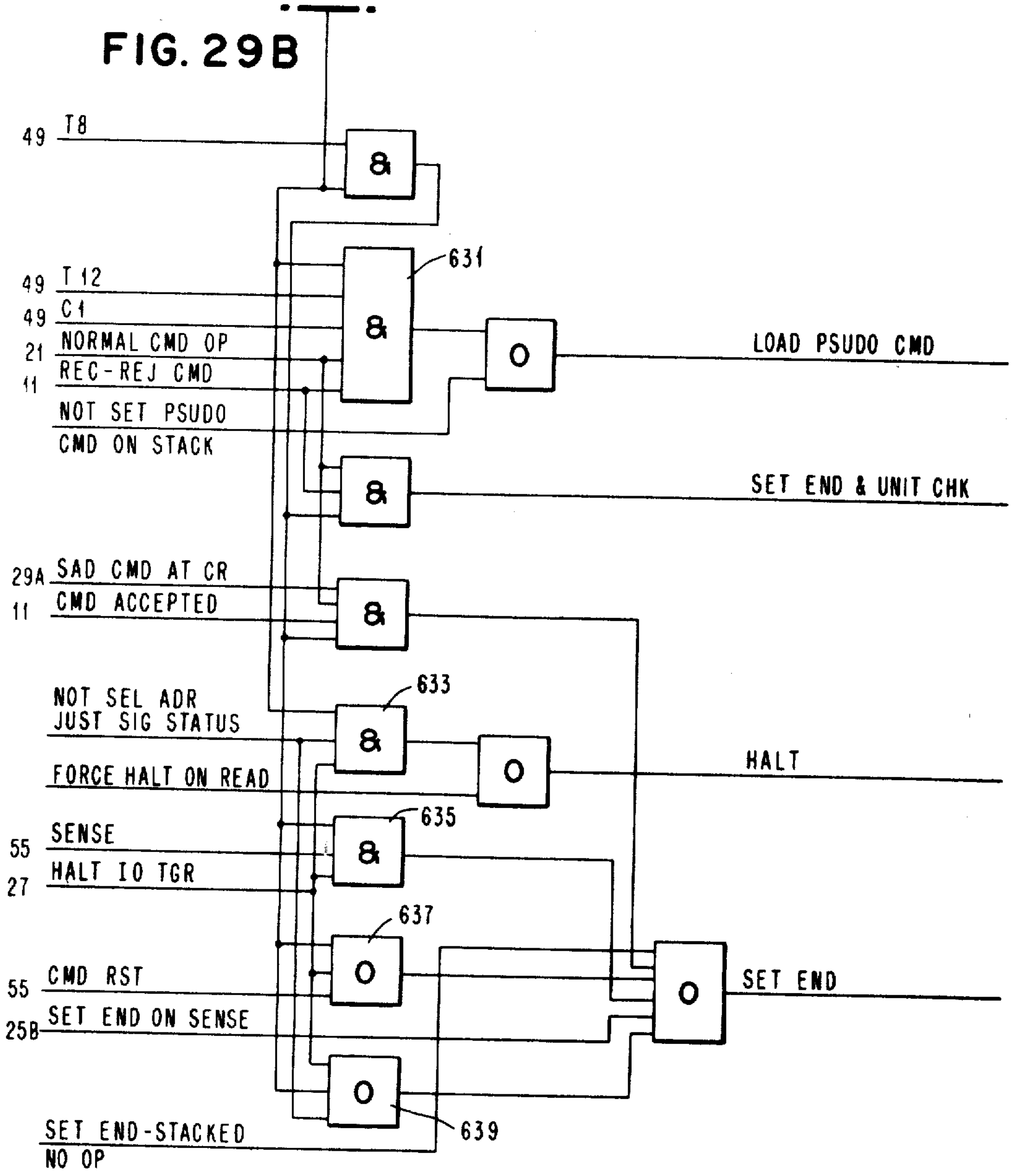

The output of the command register goes to a decoder shown in FIG. 29A which determines if the command issued is valid, i.e., one that can be executed by the transmission control unit.

11.1.1 Status signalled

Figure 20:
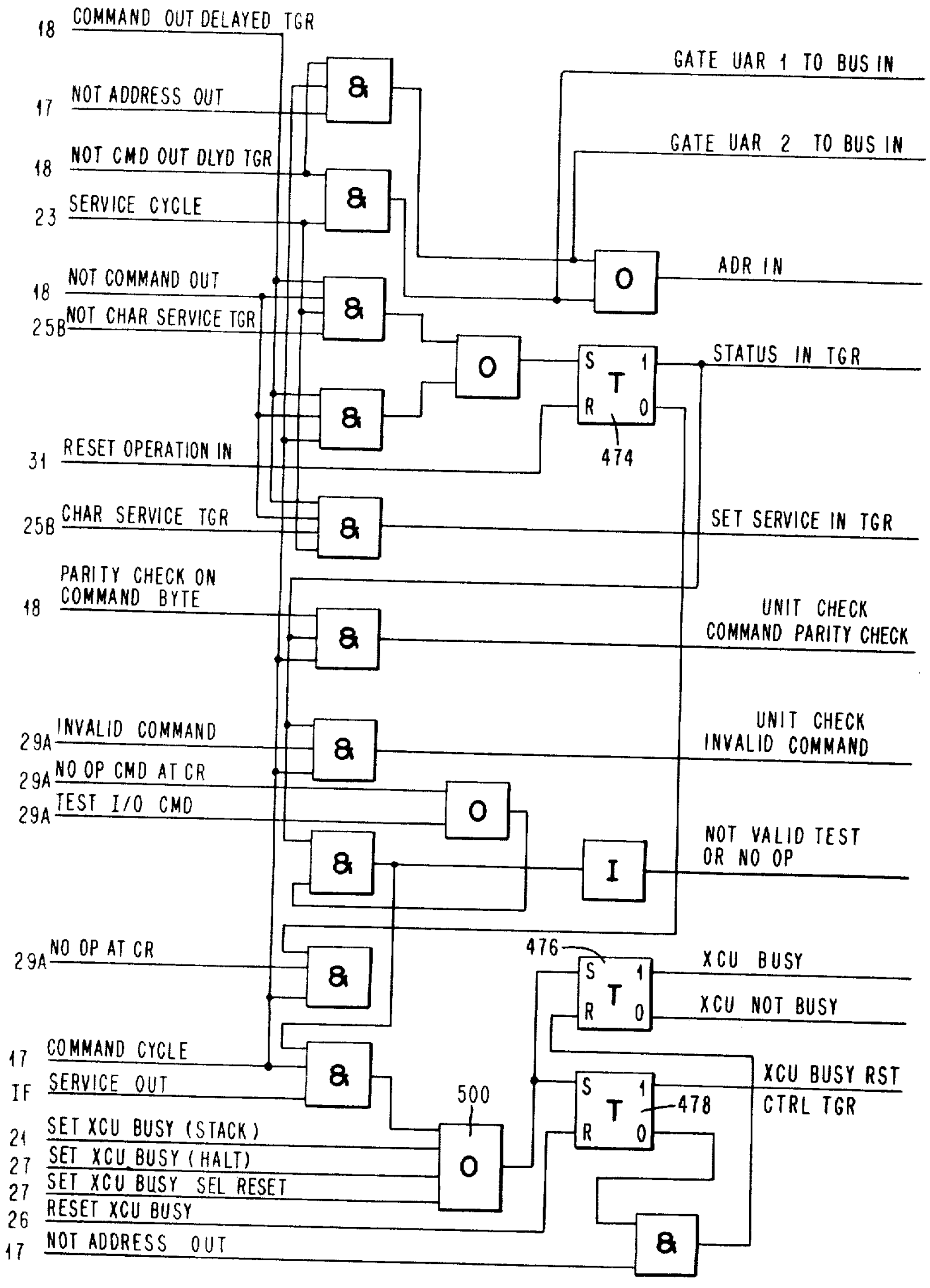
Figure 21:
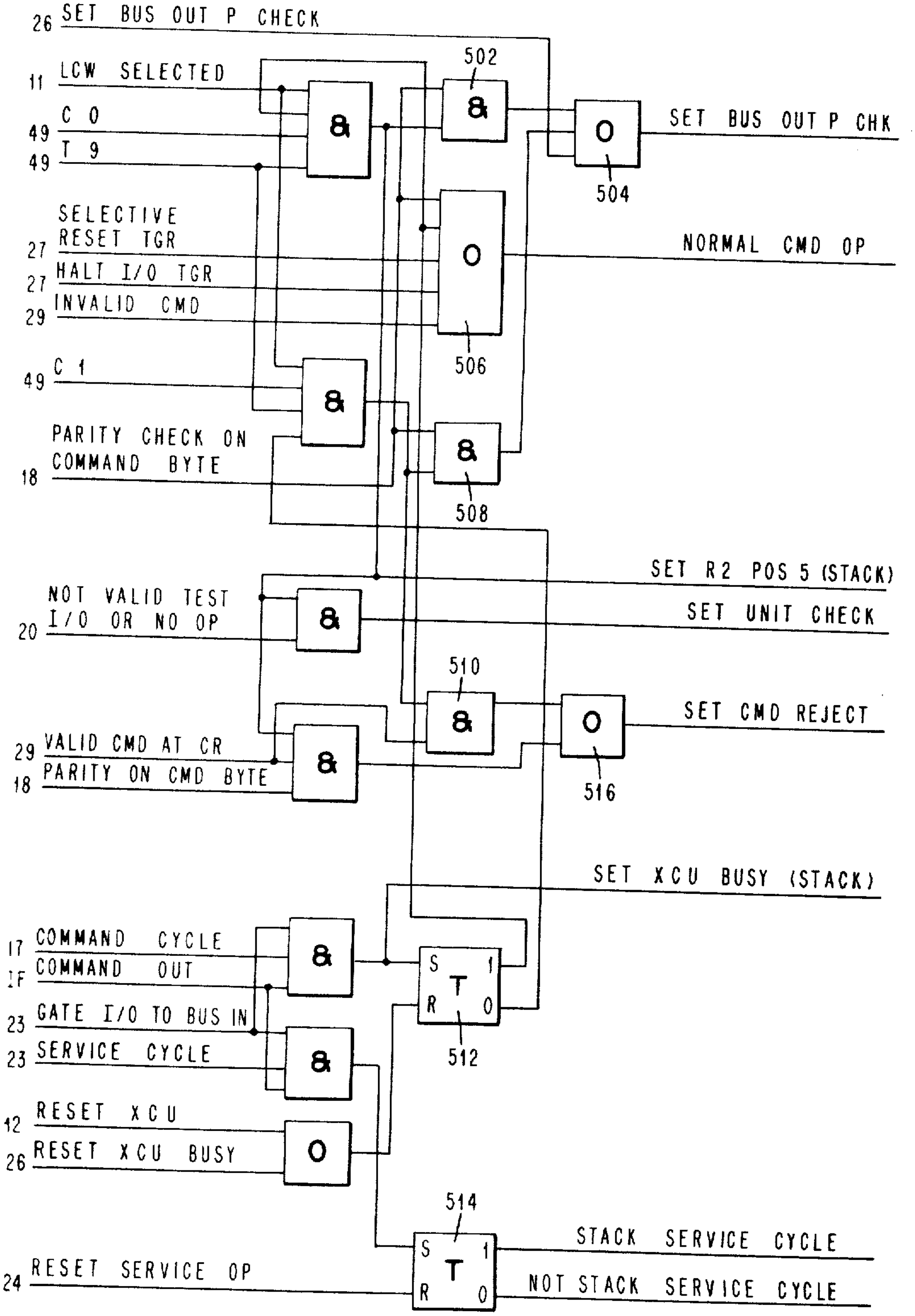
Figure 30:
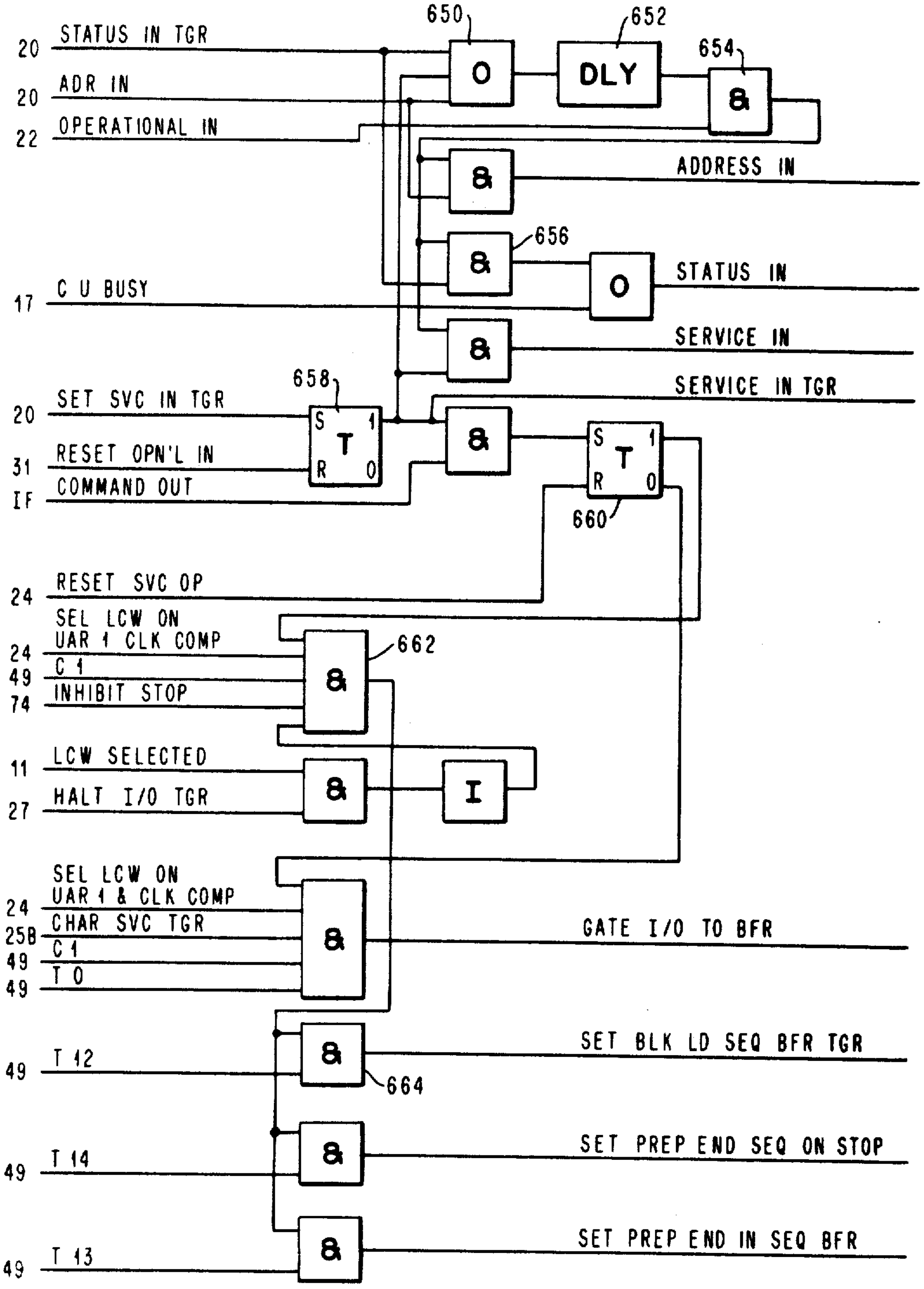

When the "Command Out Delayed" trigger finally turns on, "Address In" falls (FIG. 20). The fall of "Address In" causes the channel to drop "Command Out" (FIG. 18) which in turn causes the control unit to signal "Status In." The "Status In" trigger 474 (FIG. 20) is turned on by the AND circuit whose inputs are "Command Cycle," "Not Command Out," and "Command Out Delayed." "Status In" is generated and sent to the channel (FIG. 30) after being delayed by delay 652 (FIG. 30).

Figure 15:
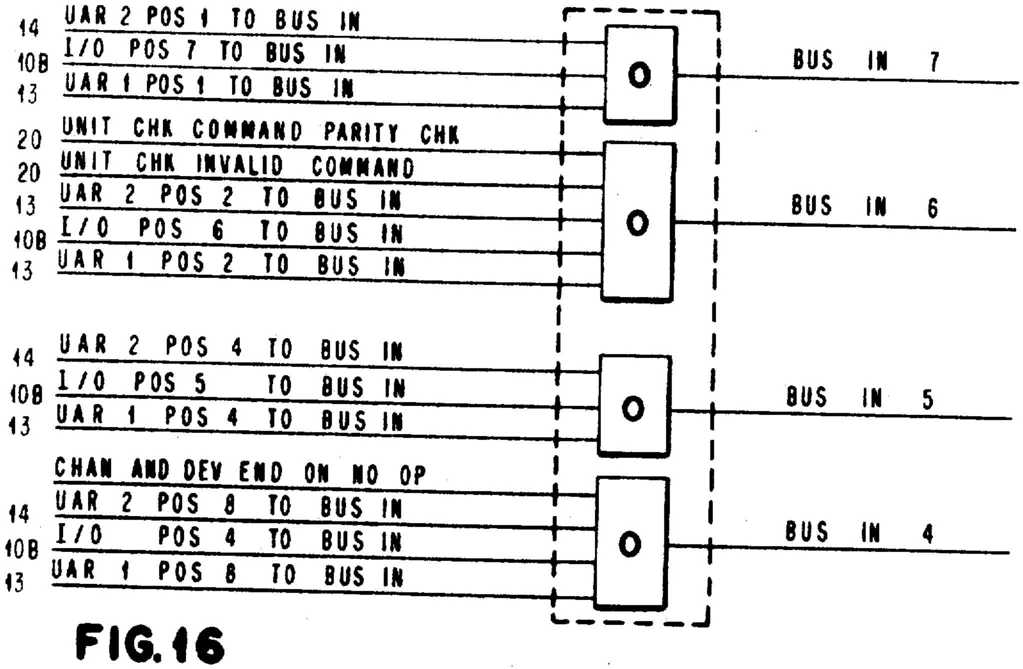
Figure 16:
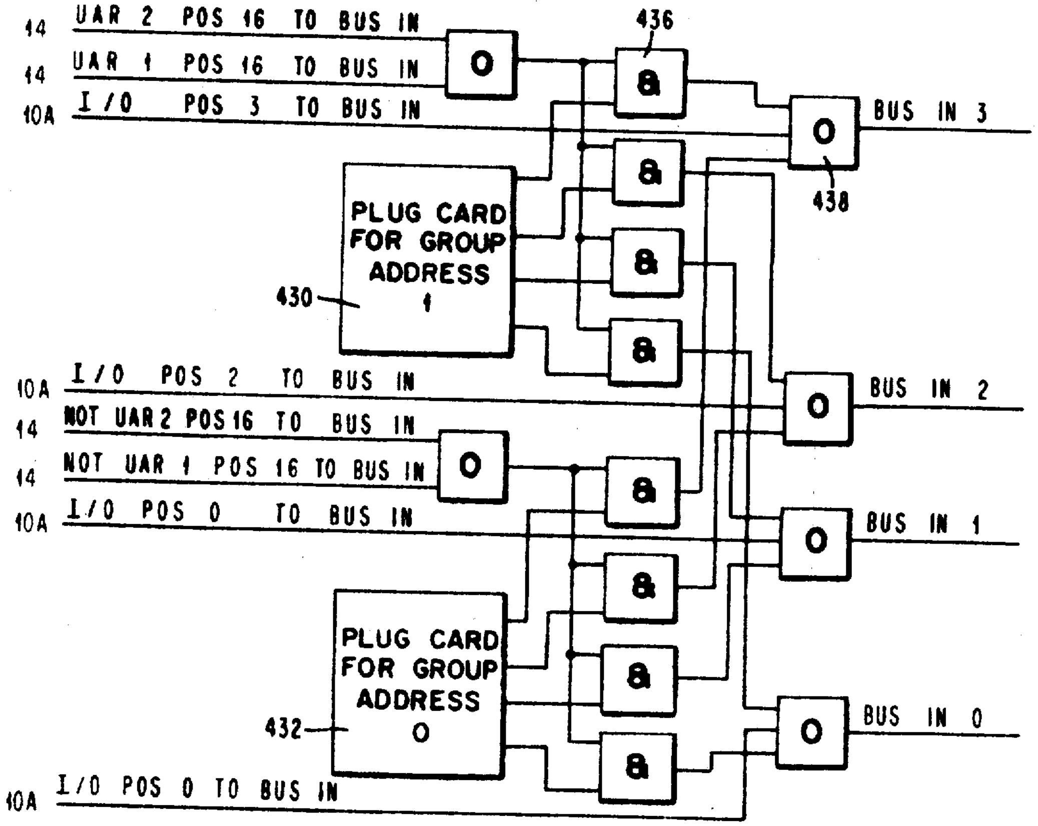

The status byte on "Bus In" is all zeros if nothing unusual has happened so far. If, for instance, parity check was detected on command byte, the parity check trigger would be on (FIG. 18) and would generate the signal "Unit Check On Bus In." "Unit Check Command Parity Check" is shown generated in FIG. 20 and is the output of an AND circuit whose inputs are "Parity Check on Command Byte," "Command Cycle," and "Status In Trigger." Unit check is placed on Bus In 6 via an OR shown in FIG. 15. "Unit Check" is also signalled if a valid command cannot be decoded by the decoder shown in FIG. 29A.

For the normal case, all zeros are generated on "Bus In" and the channel responds with "Service Out" (FIG. 31) which causes the "Status In" trigger to be reset via "Reset Operational In" and "Operational In" to be dropped. The signalling of "Service Out" completes the initial selection sequence.

11.2 *Command cycle*

The interface controls now have an address in Address Register 2 and a command stored in the command register. The detection of "Service Out" turns on the XCU Busy Trigger 476 (FIG. 20). The "XCU Busy Trigger" output causes a search to begin for the line control word associated with UAR 2. The proper LCW is located when the inputs to the AND circuit 376, "XCU Busy," UAR 2 and "Clock Compare," and timing pulses C1 and T9, (FIG. 11), coincide turning on trigger 378. At T10 time "LCW Selected" trigger 380 is turned on.

The "Busy" trigger in addition to causing a search for the proper line control word also causes "Control Unit Busy" to be signalled via the status byte if initial selection is attempted again. The status bits signalled are "Control Unit Busy," and "Status Modifier." This informs the channel to try initial selection again at a later time.

For a normal command cycle the following occurs. First, the command field in the LCW is tested by the OR circuit shown in FIG. 11, which examines R2 positions 4, 5, 6, and 7. The OR circuit determines whether or not any bit in the command field is on. Since a new command is being initiated, the command field should be reset and the command present in the LCW trigger 384 will remain off if the field is reset. This test being completed, the contents of the command register (positions 4, 5, 6, and 7) are loaded into the command field.

11.2.1 Write command

Figure 11:
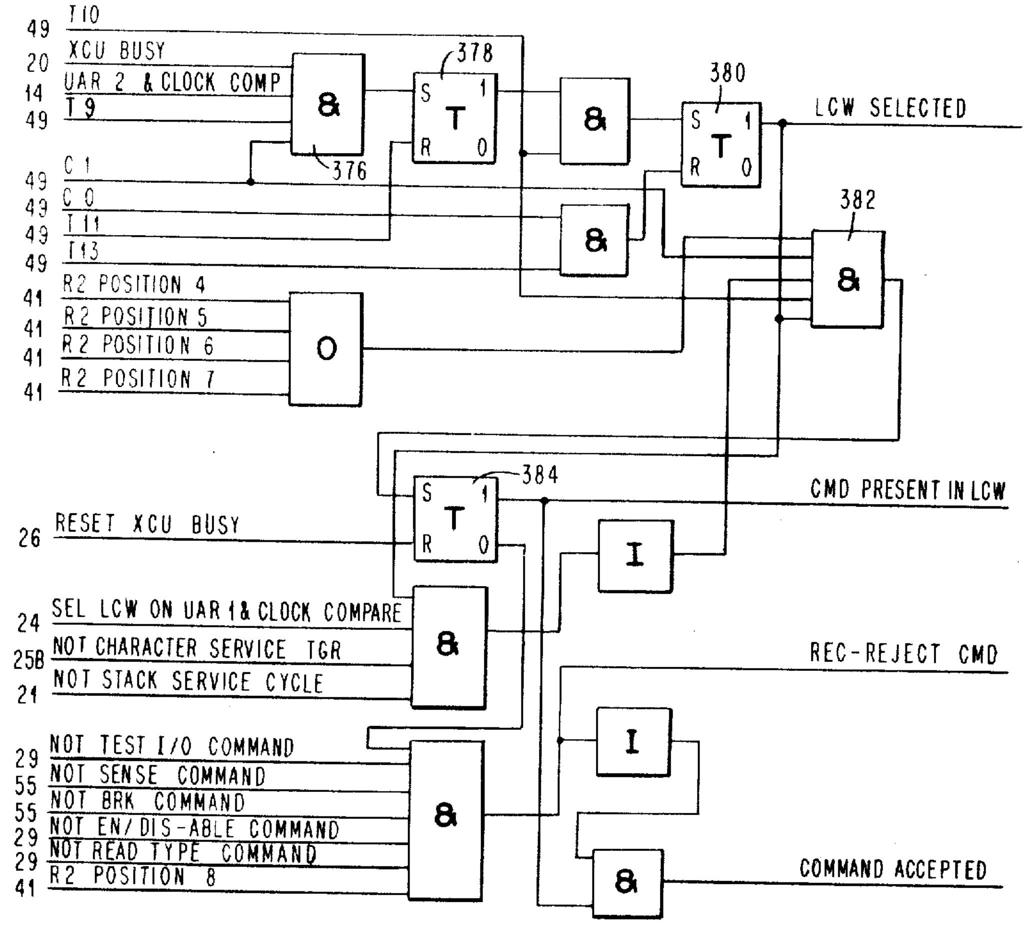
Figure 12:
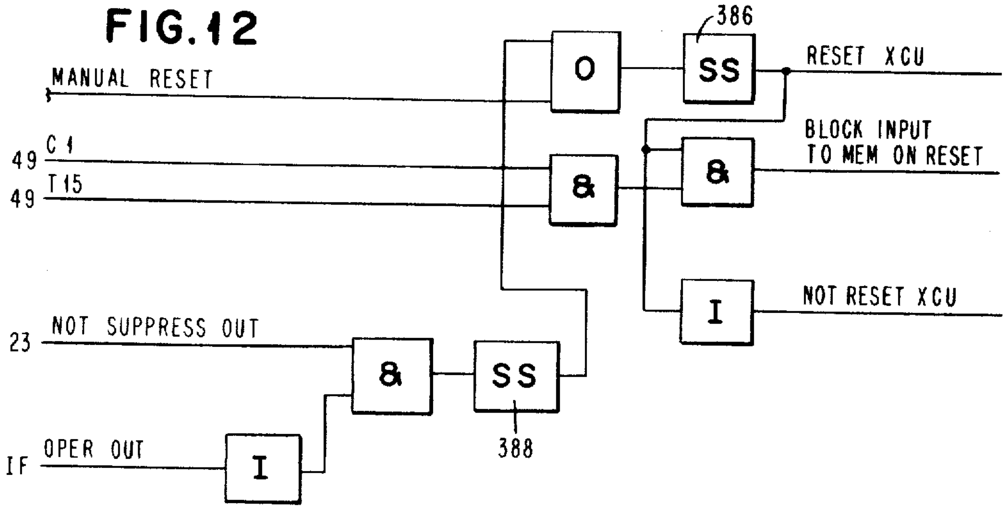
Figure 13:
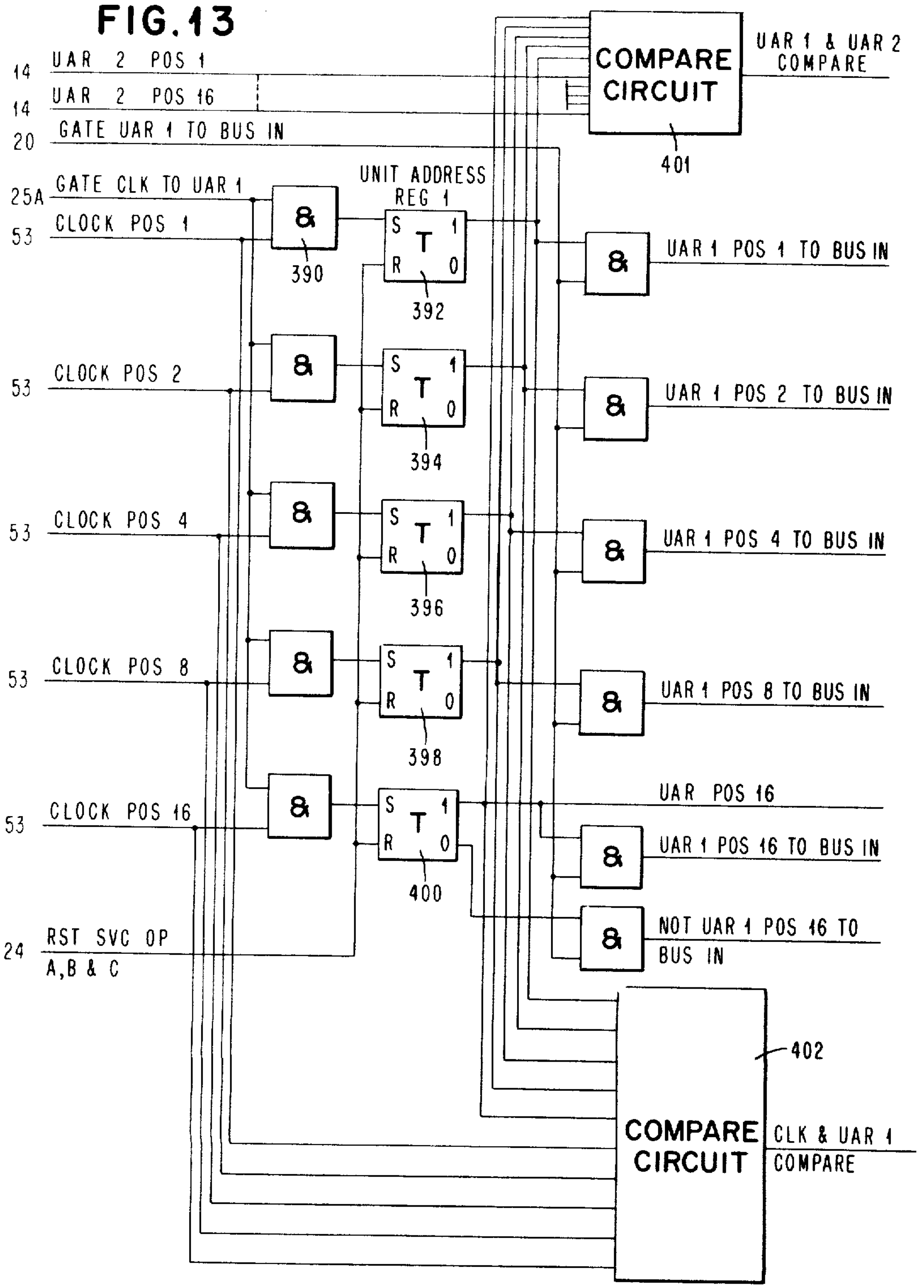
Figure 26:
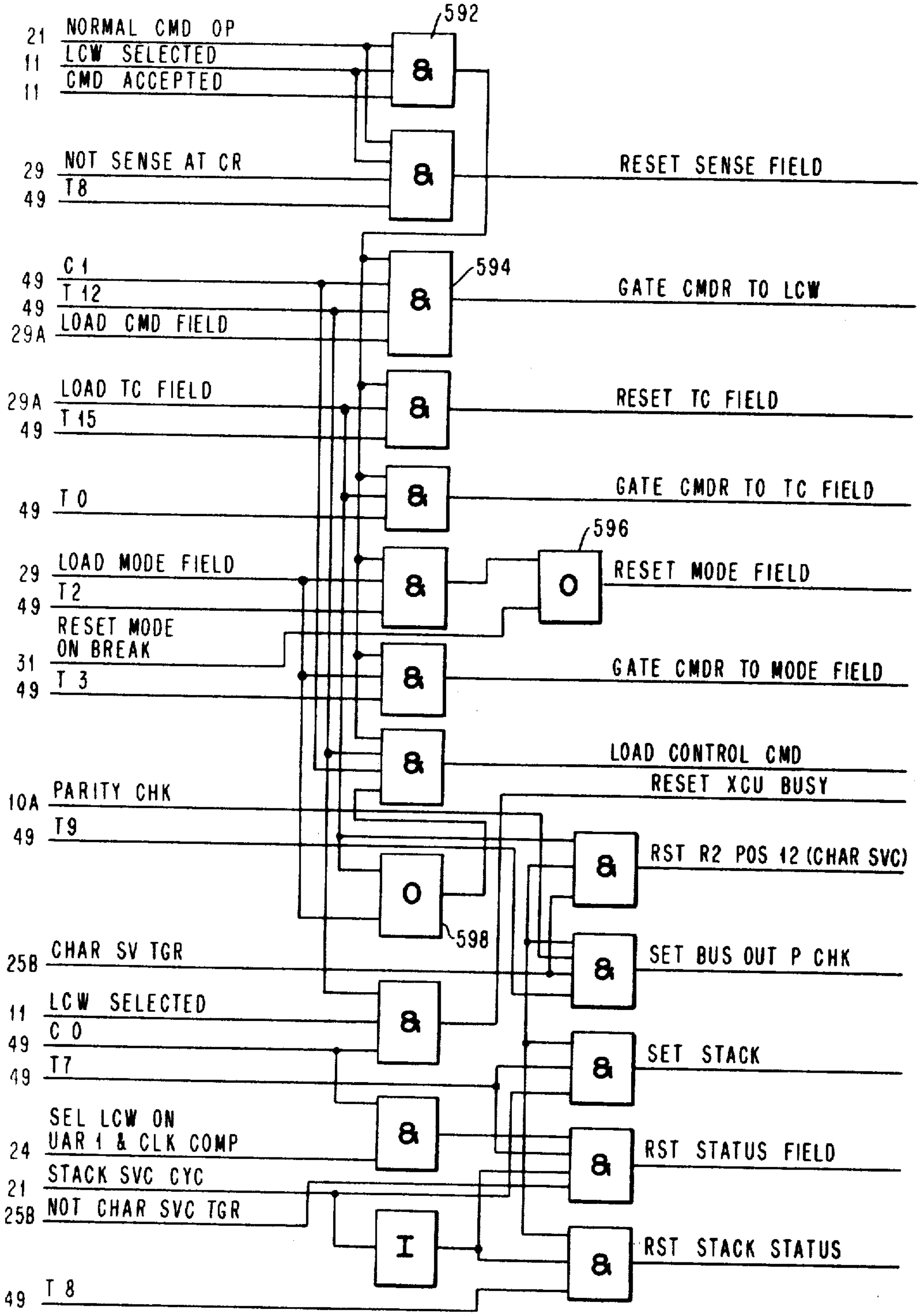
Figure 27:
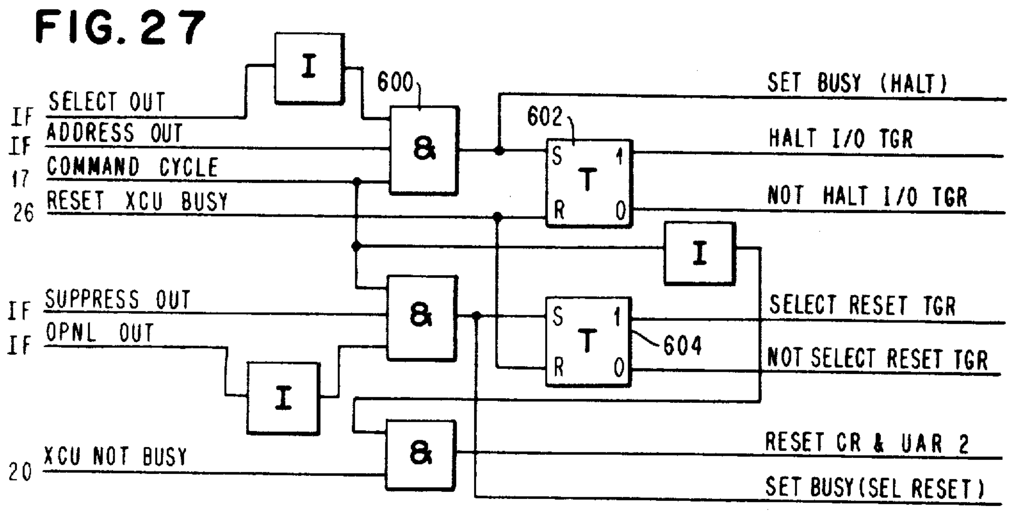
Figure 28:
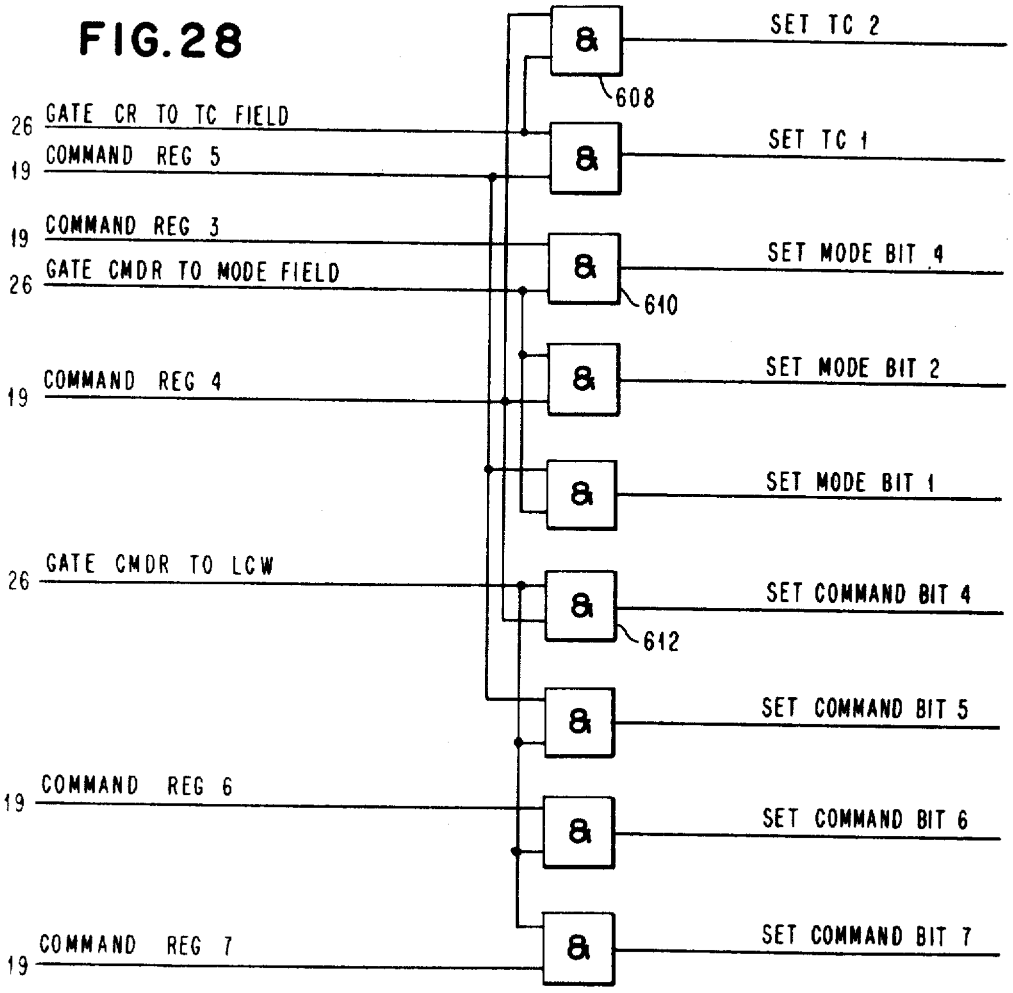

Referring to FIG. 11, if the command issued is a "Write" command, another check is made on the contents of the LCW. A write command should never be issued if the line addressed is currently receiving information. Therefore, a check is made to see if the bit "Receiving" (R2, Pos 8) in the LCW is off. If this bit is off, then the "Write" command will be accepted. "Command Accepted" is one of the conditions necessary at AND 592 (FIG. 26) to cause the output "Gate CMDR to LCW" from AND 594. The detailed gating of the command register to the command field is shown in FIG. 28.

11.2.2 Gating command register to mode field or TC field

Control type commands cause the mode field to be set. In that case, the AND 618 circuit in FIG. 29A generates a signal called "Load Mode Field." The output of the AND circuit 618 goes to FIG. 26 where "Gate CMDR to Mode Field" is generated. If the command received and stored in the command register is one of the "SAD-" commands, the interface controls will load the TC field. The actual gating of command register TC field also is shown in FIG. 28.

11.2.3 Ending of command cycle

In addition to loading the new command into the LCW, the interface controls reset the sense field should the command be other than a sense command, and the sequence field is reset in preparation of starting the new command.

Once the new command has been initiated, the busy trigger is reset. FIG. 20 shows the XCU busy trigger and the reset busy trigger. Both of these triggers were turned on at the same time. The "Reset Busy" trigger is reset by coincidence of "LCW Selected" and timing pulse COT 12 which occurs after all the functions of loading the command field (resetting the sequence field, etc.) have been completed (see FIG. 26). The reset busy trigger off condition indicates that any time after this point is a proper time to reset XCU busy. Since the XCU busy trigger is used to indicate that the XCU is currently tied up in loading a command into the LCW it cannot be reset whenever the "Address Out" line is on. When "Address Out" is down and the reset busy trigger is off, the XCU busy trigger will go off. In this manner the signalling of XCU busy is insured to be clean.

Now that XCU busy has been turned off, the control unit is available for a new selection sequence, i.e., the generation of address out, select out, etc. The control unit has now completed a cycle by which, (1) the control unit was selected, (2) a command was loaded into the command register, (3) an address was loaded into UAR 2, (4) a proper line control word was selected, (5) the command was loaded into the LCW command field, and (6) after various other control operations the busy trigger was turned off allowing a new selection sequence to start.

Once the interface controls have loaded a command into the LCW and the busy trigger has been reset, the job of the interface controls is complete. The common controls now examine the LCW every time it is accessed to determine whether or not a command is present, and at what stage of executing command the control unit stands. The description of what happens in the interface controls is common for all commands. The common controls, however, take the various commands and go through different processes of executing each one.

11.3 *Transmit operation*

11.3.1 Transmission of All Marks (Sequence 0-Reset)

The Initiate Transmit Trigger 842 (FIG. 47) is turned on by a write function decoded at the command register. The turning on of initiate transmit starts a strobe count, resets the data buffer in the line control word, and generates a line "Initiate Transmit" from AND 846 at COT 3 Time. The initiate transmit line resets the receive bit in the line control word and forces a mark level to be transmitted at the line adapter (FIG. 85) via OR 1048 and OR 1052 in FIG. 63B.

Figure 47:
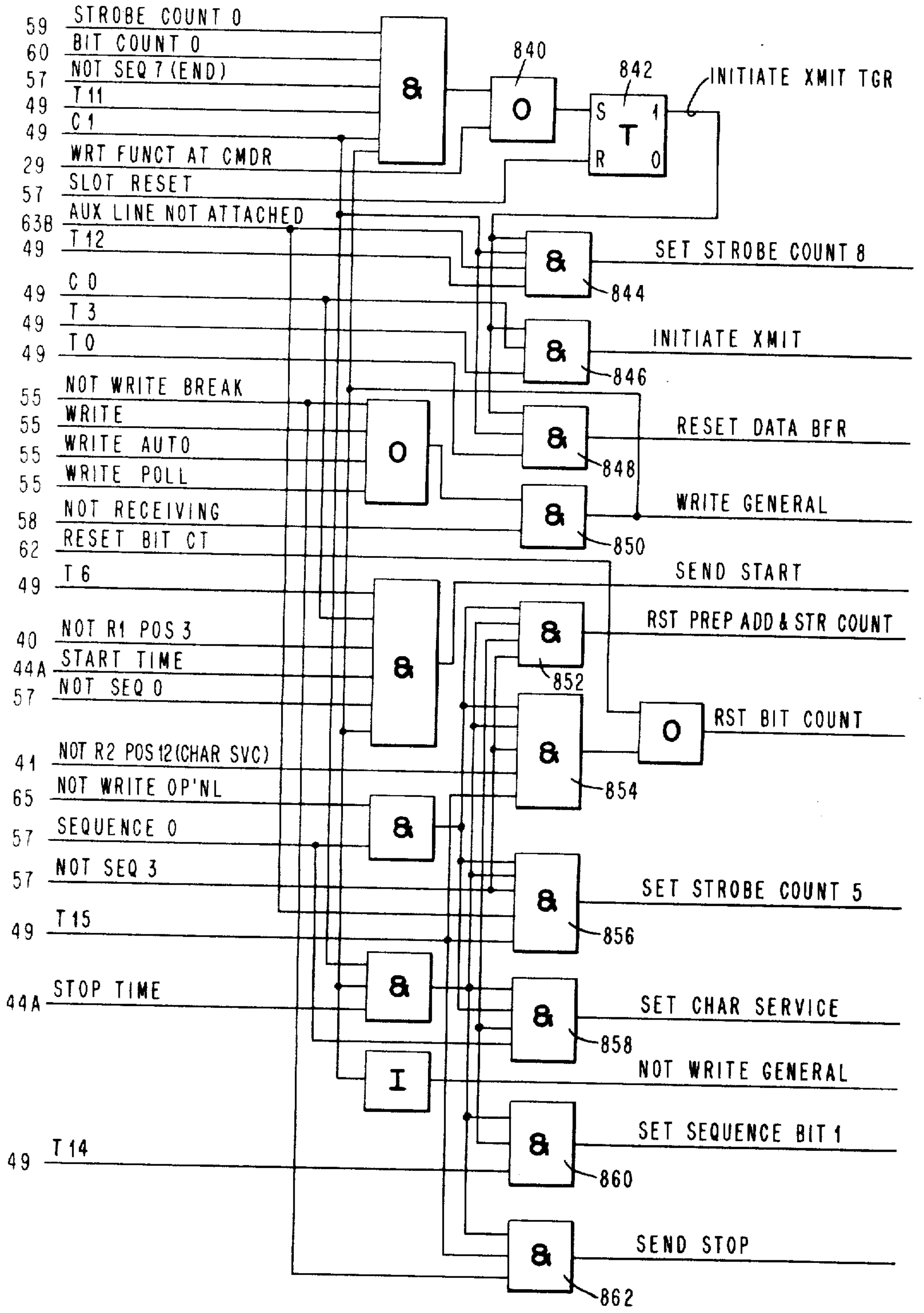

"Initiate Transmit" sets the strobe count field to 8 via AND 844 in FIG. 47. Once the strobe count has been set to other than 0 it increments each detection by Exclusive OR 912 (FIG. 51) of the difference between the present oscillator and the last oscillator sample stored in the line control word.

Figure 50:
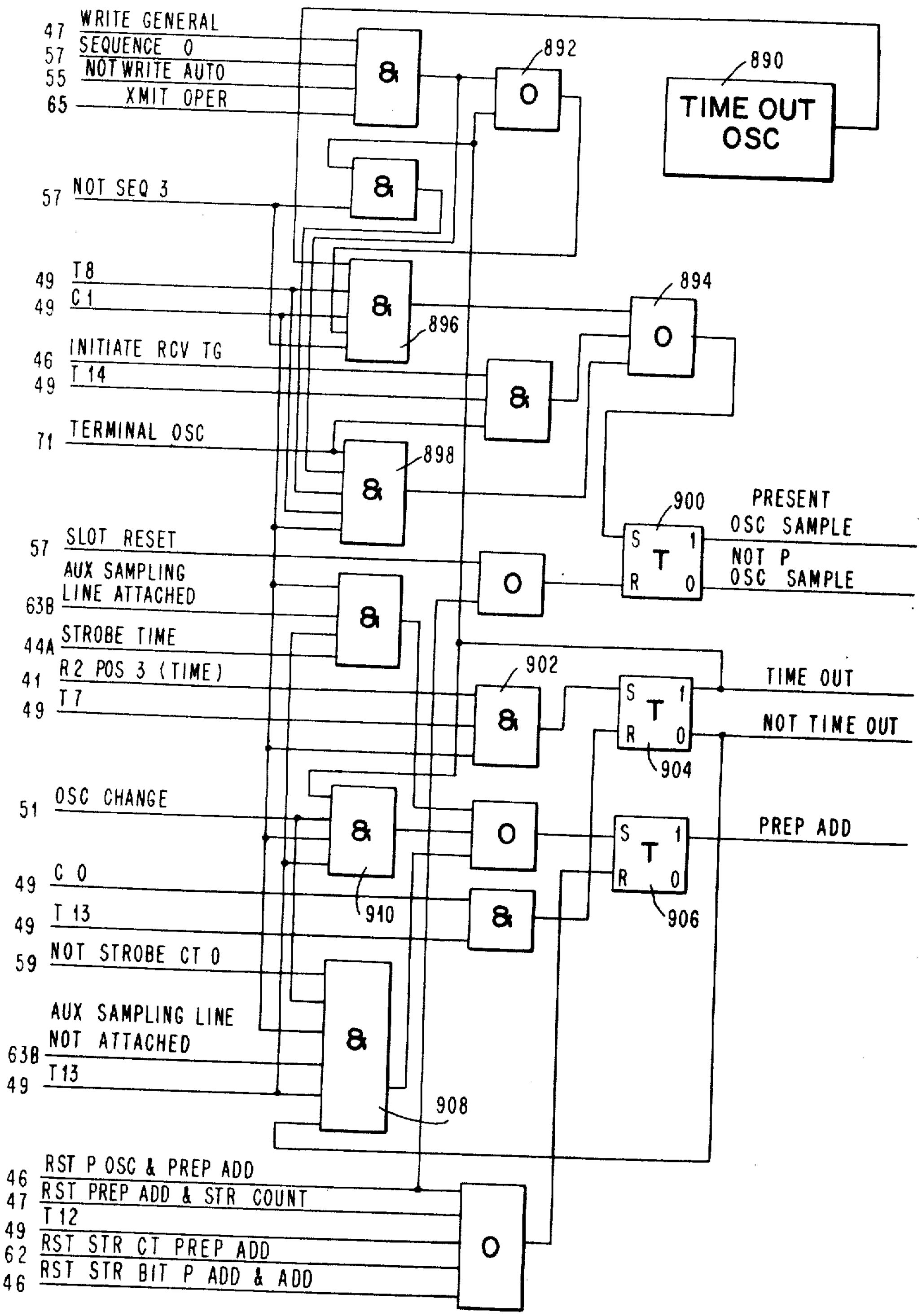
Figure 65:
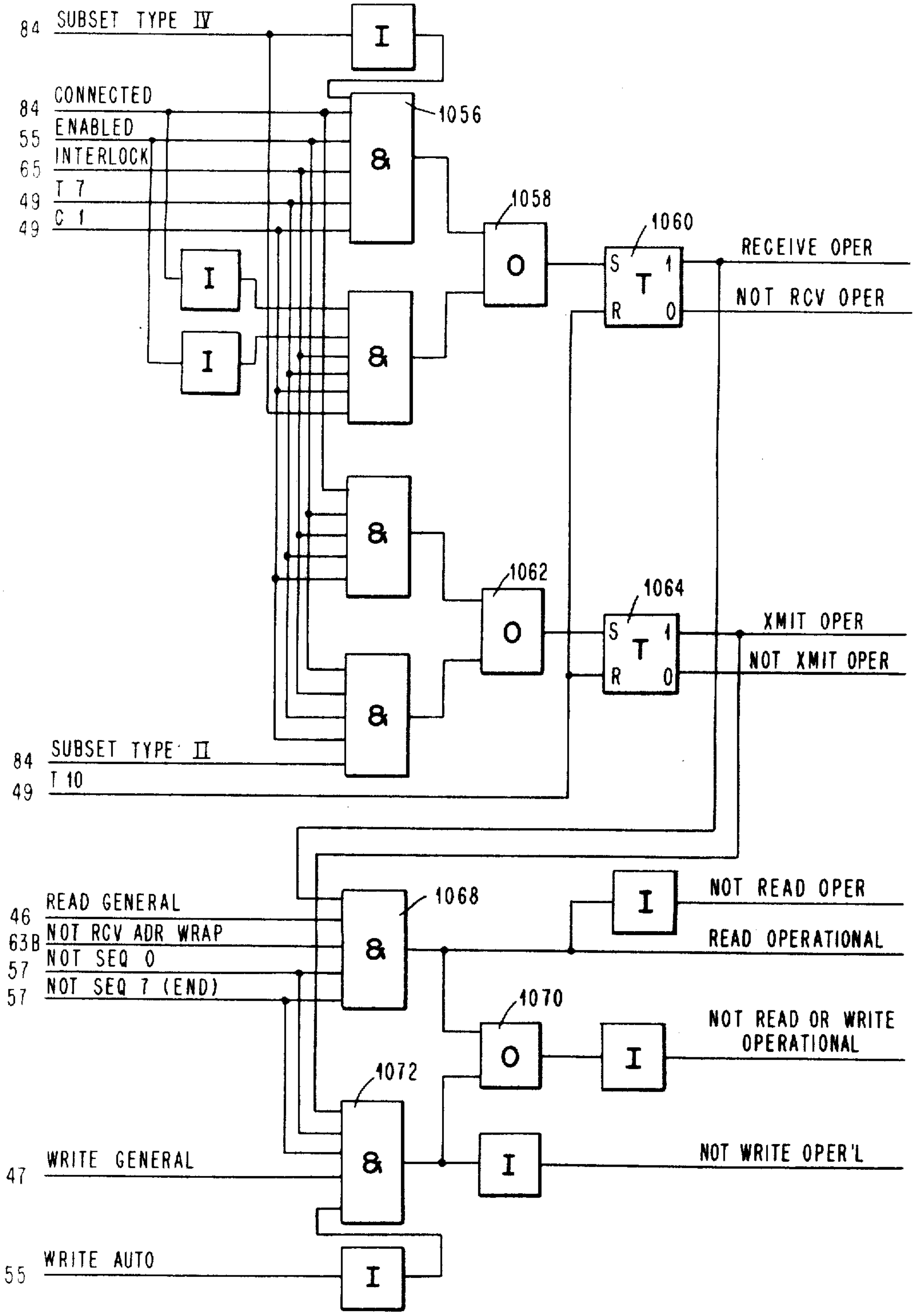

In FIG. 65, "Connected," "Enabled," and "Interlock" turn on "Transmit Operation," trigger 1064, provided the terminal is operational. The fact that the terminal is operational gates the terminal oscillator via AND 898 (FIG. 50).

Once the initiate transmit trigger has been set, no request for character service is given until stop time. In FIG. 63B the initial character sent out is a mark character. This occurs because during an initiate transmit operation, the fact that the sequence field is set to zero inhibits the sending of any data, which in effect forces a mark condition for a full character time. Thus, in FIG. 63B "Initiate Transmit" energizes the mark OR 1048 which sets a mark in the line adapter (FIG. 85) via OR 1052.

Figures 44A, 44B:
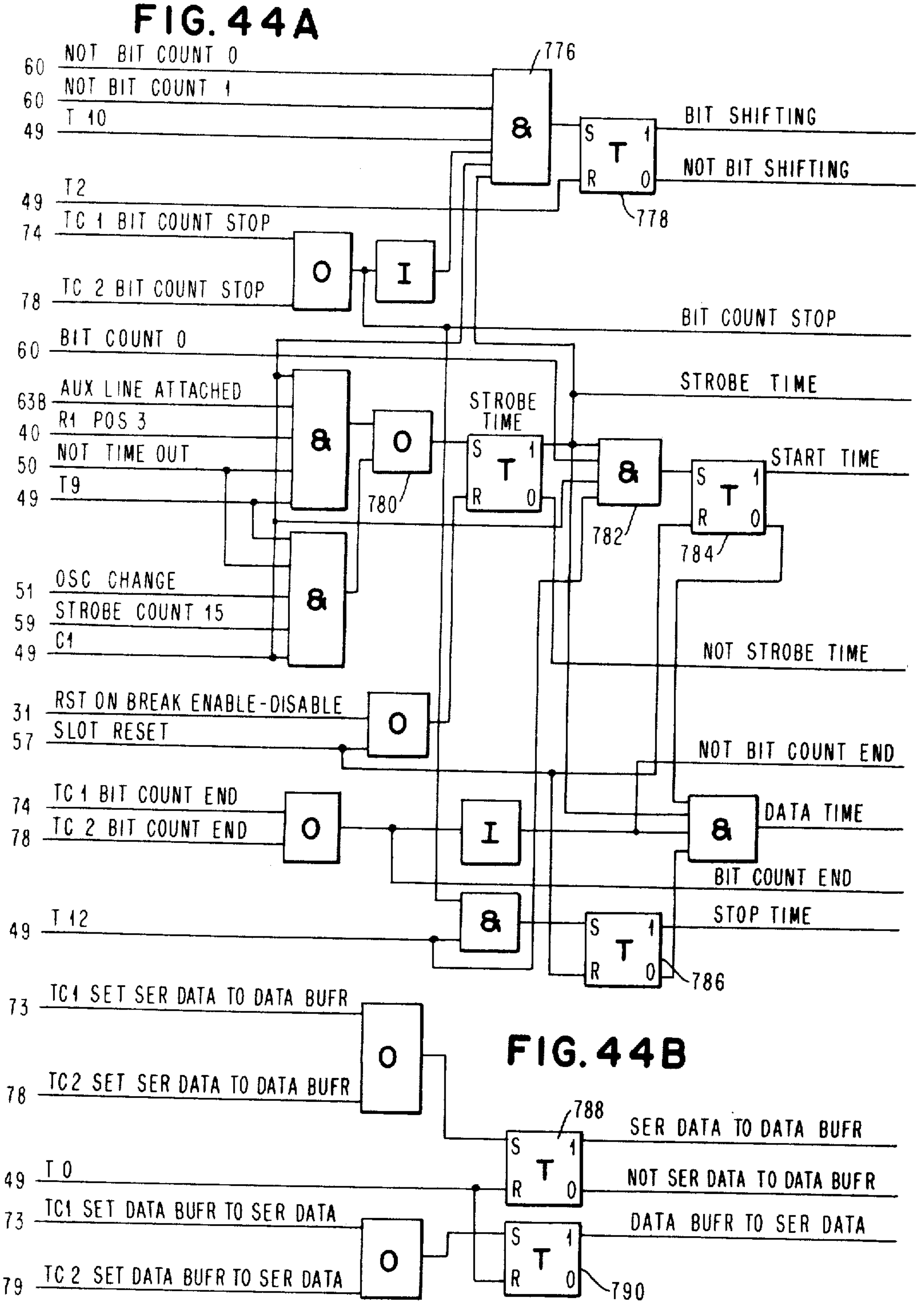
Figure 45:
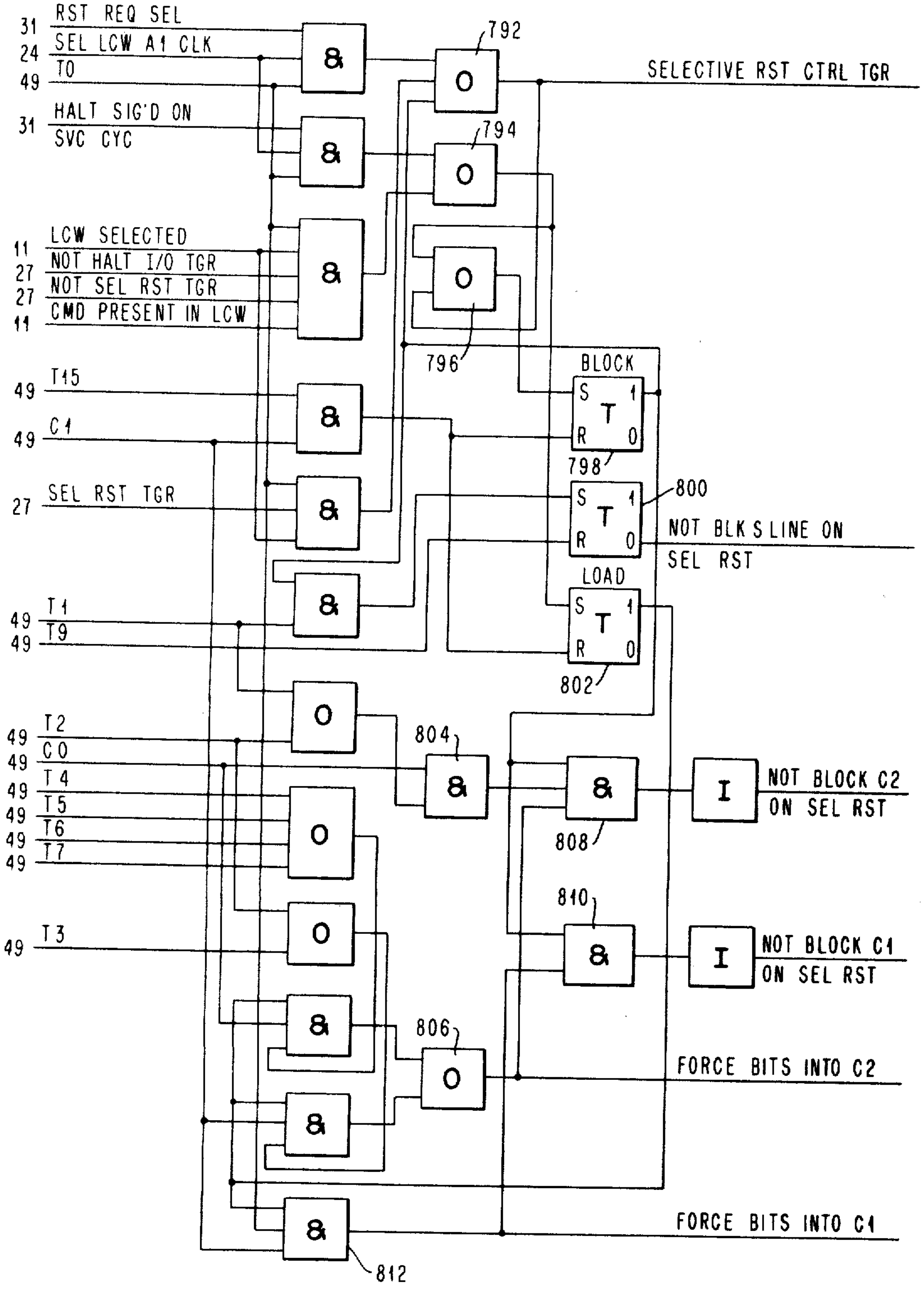
Figure 46:
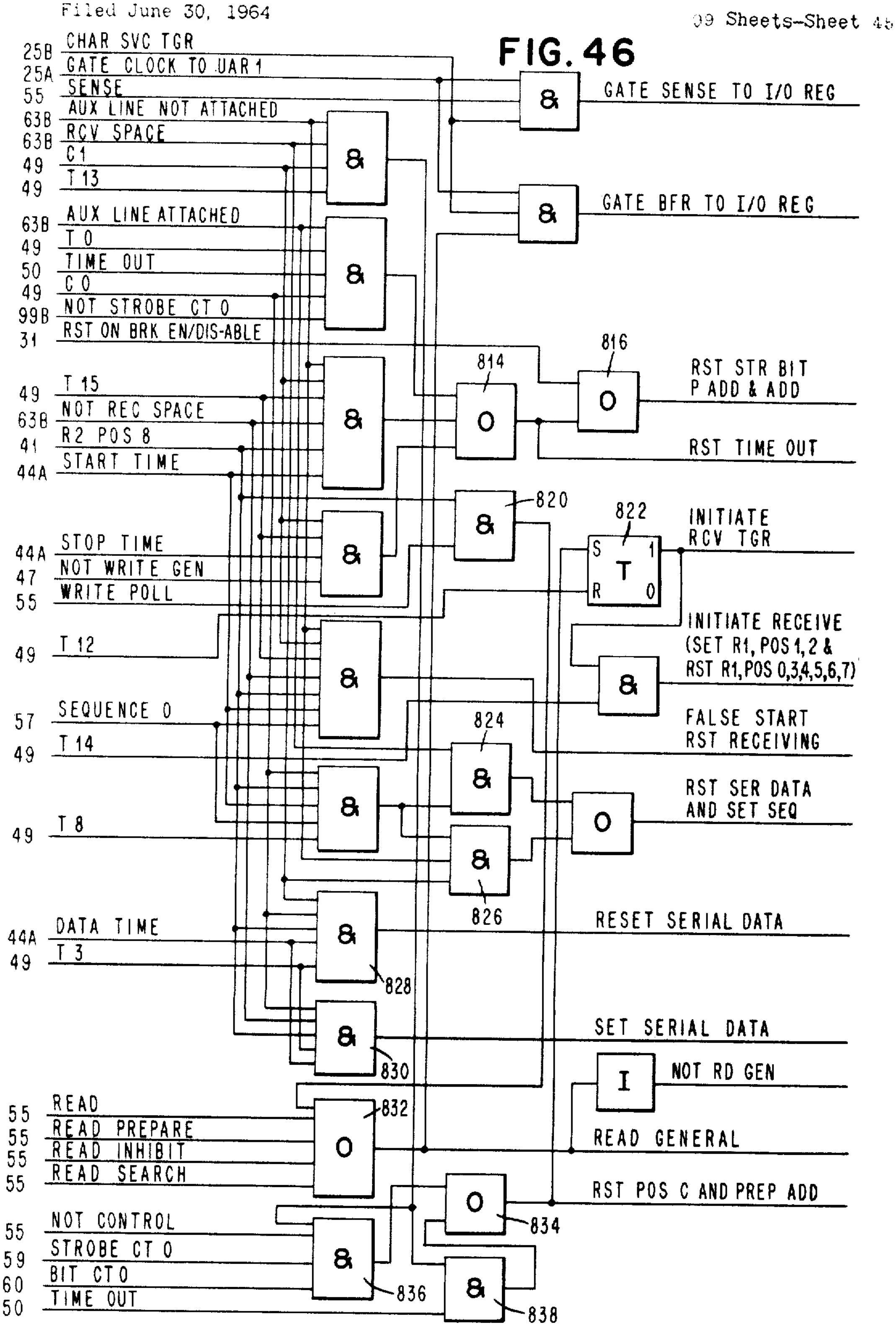

The Stop Time Trigger 786 in FIG. 44A is turned on when the terminal control signals "Bit Count Stop." If the condition "Not Operational In" exists at stop time, the transmit operation is terminated. At the stop time following the all marks character, "Character Service" bit in the line control word is turned on, the sequence field is stepped from zero to one (Data Sequence), and a stop bit is transmitted. At stop time, the strobe count is 15 and is incremented to strobe count 5 by resetting the strobe count field, resetting the Prep Add Trigger 906 (FIG. 50) and forcing strobe count 5. Also at this time the bit count field is reset to 0.

11.3.2 Transmission of First Character (Sequence 1—Data)

The control unit is now in sequence 1 which is the data sequence.

Figure 25A:
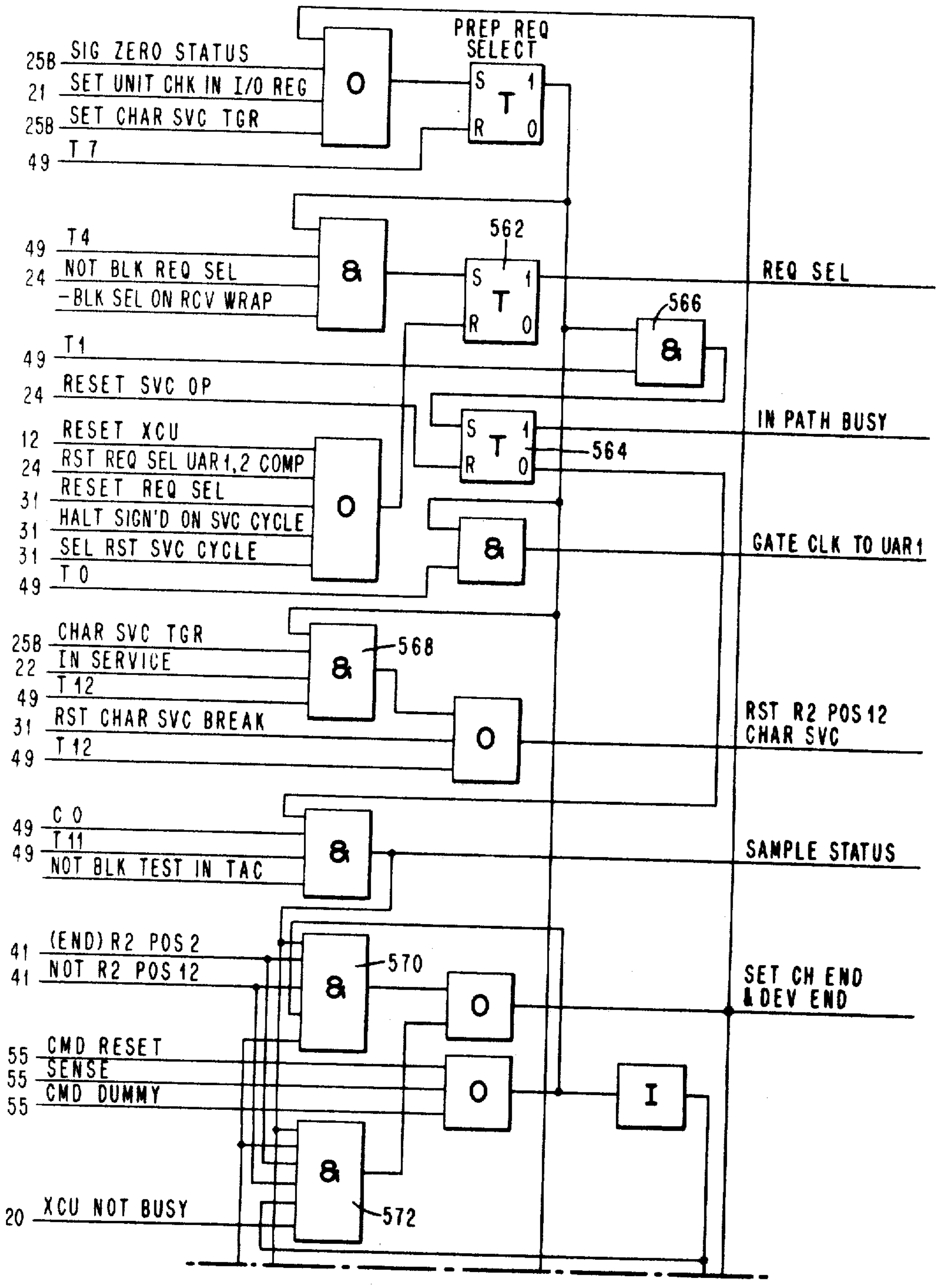
Figure 25B:
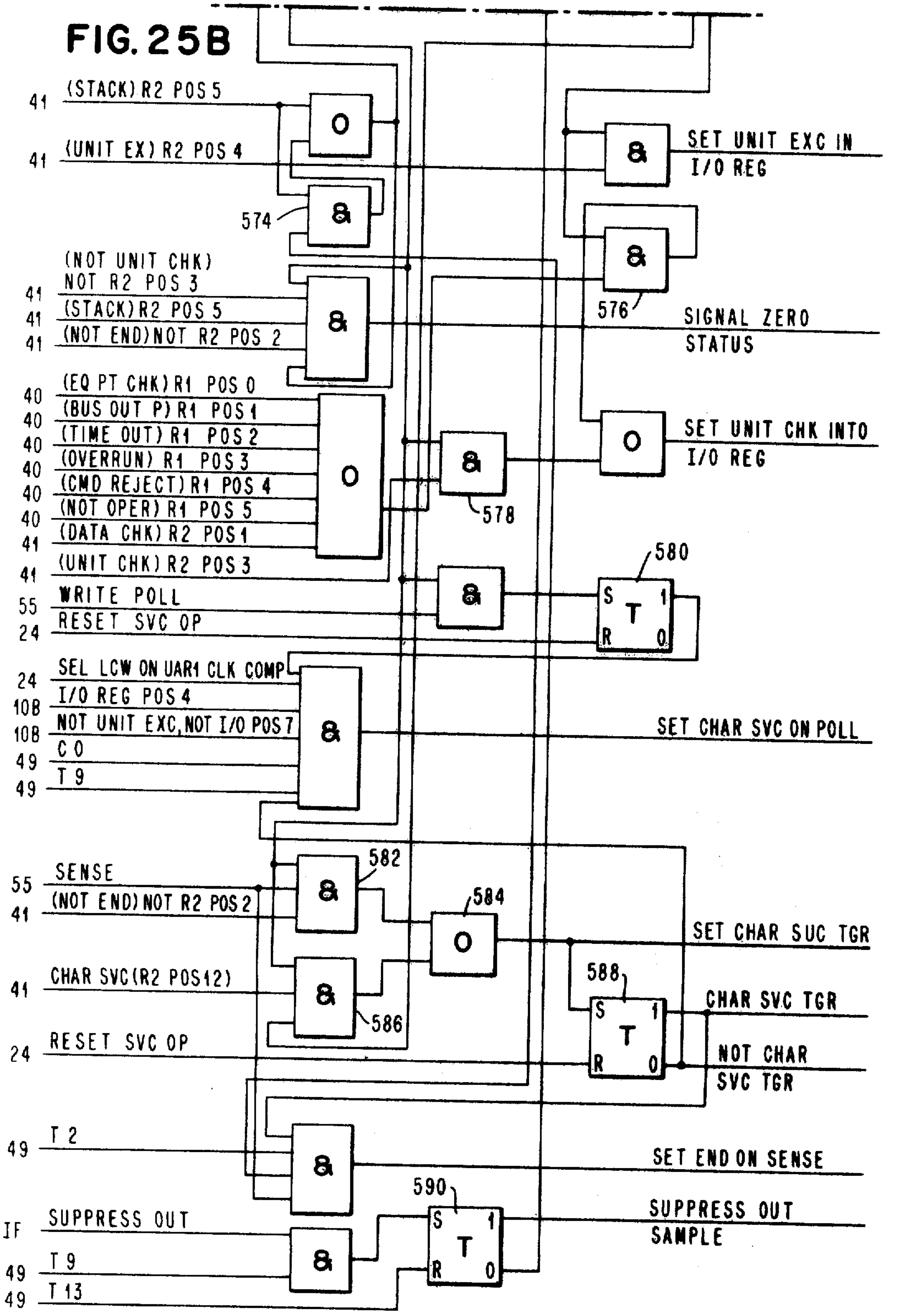

During the first character stop time, character service is set which inhibits the reset of bit count. The strobe count increments to 15 and if a marking condition is sampled and if "Character Service" is still on, the reset of bit count is inhibited. The fact that character service is still on means that the data buffer has not yet received the character from the computer. As the control words circulate in storage, the status of the input/output register is checked each time a line control word is read out of storage into R1 and R2. Character Service (R2 Position 12) is gated to the character service trigger via AND 582 and OR 584 in FIG. 25B. The output of OR 584 sets character service trigger on and turns on the Prep Request Select Trigger in FIG. 25A, the output of which causes the output "Gate Clock to UAR 1." Thus, the address of the line control word demanding character service is loaded into the unit address register 1. The interface controls now attempt to gain selection of the multiplexor channel. The interface controls energize "Operational In" and "Address In" in response to which the channel signals "Command Out." Following this "Service In" is energized by the control unit. The next byte of data is placed on "Bus Out" by the channel, with "Service Out" raised to end the transaction. The data byte is transferred from the channel into the I/O register and control unit drops "Operational In."

Figure 73:
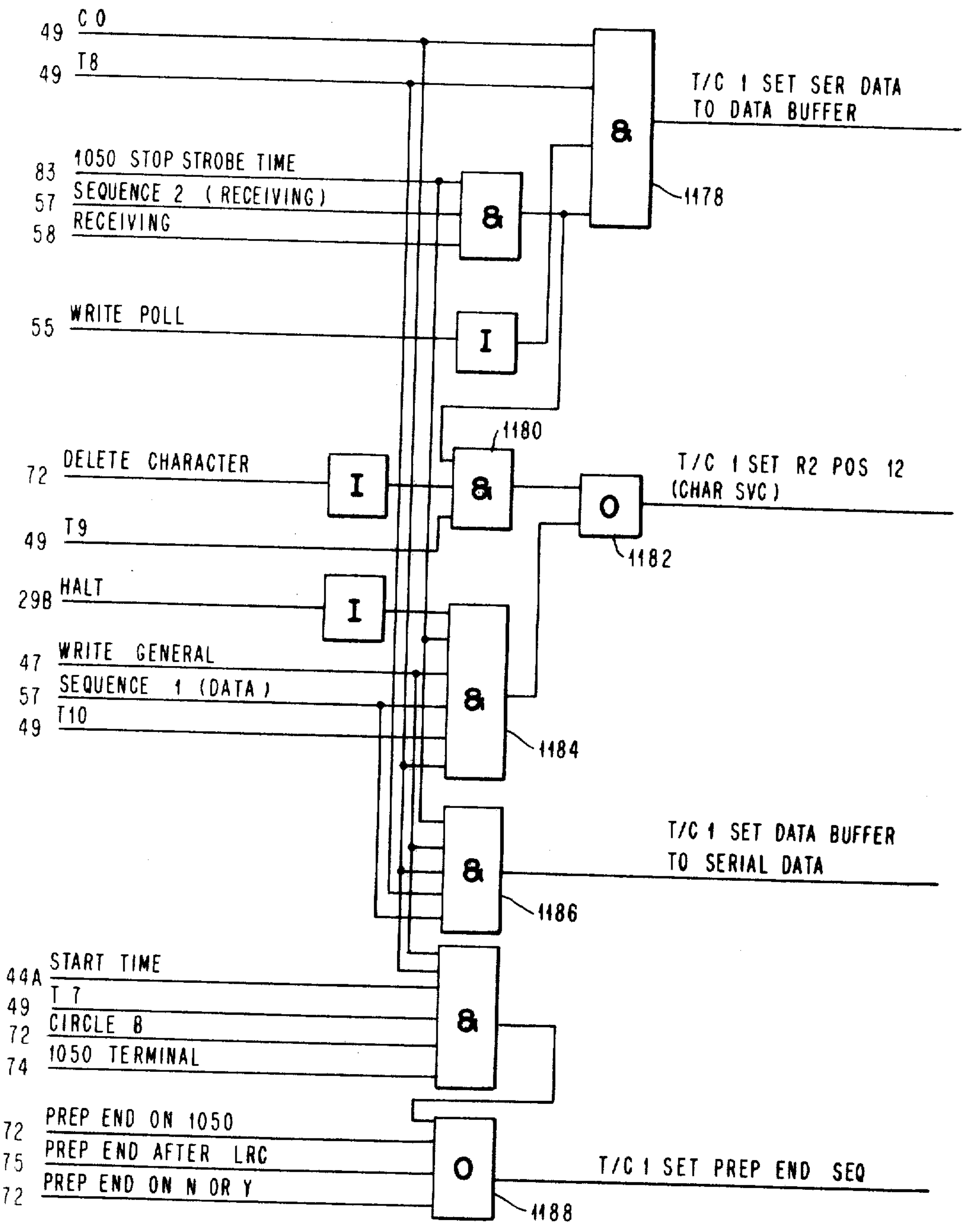

When the line control word corresponding to the address storage UAR 1 is read out of storage the I/O register contents are transferred to the data buffer portion of the line control word. Character service is now reset within the line control word and both the I/O register and UAR 1 are reset to complete the output data servicing cycle. At this point, the bit count is reset, the strobe count is set to 5, and the data is transferred to the data buffer to the serial data field of the line control word. The data is transferred from the data buffer to the serial data field under control of a signal from the terminal controls. Thus, in FIG. 73 at 1050 Stop Strobe Time the coincidence of 1050 Stop Strobe Time, Write General, Sequence 1, and COT 8 time causes an output "TC 1 Set Data Buffer to Serial Data." This turns on trigger 790 in FIG. 44B and energizes the line "Data Buffer to Serial Data." Data buffer to serial data line in FIG. 42 causes the output of delay line C2 shift cell 2 to be gated to the OR 718, the AND 720, and into the C1 delay line. Referring to FIG. 8, the data buffer (in C2) and the serial data field (in C1) are arranged so that they line up when serial data is written into memory. A simple gating scheme (FIG. 42) gates the data buffer directly into the serial data field. This is accomplished by setting trigger 790 (FIG. 44B) on, which in FIG. 42 gates C2 shift cell 2 to the input of C1.

The bits are transmitted directly from the serial data field, either from R1 Position 8, 9, or 11 depending on whether the bit character length is an 8 bit, 7 bit, or 5 bit character. The serial data field is shifted forward one position each time the bit count is incremented by 1 to make the next data bit available at this output. The data bit is gated from the serial data field in FIG. 63B by the coincidence of the output of OR 1038 (FIG. 63A) which, when positive, signals a space signal from the serial data position chosen by the 5, 8, or 7 bit character. The output of OR 1038 causes an output from either OR 1050 or 1052 to send space or a mark to the line adapter.

The initiate transmit trigger is turned on only once during a transmit operation. After the first all marks character has been transmitted, the terminal controls determine at stop time whether or not character service will be set. For example, if a shift character is required, the terminal controls do not request a new character from the interface. The terminal controls insert the shift character onto the output line. Under these conditions character service is not set, therefore character is set only once by the common controls and this is done during the first transmit initiate procedure. With a write type command in the line control word the control unit will transmit data at every data time.

11.3.3 Sampling of Transmitted Data

Figure 74:
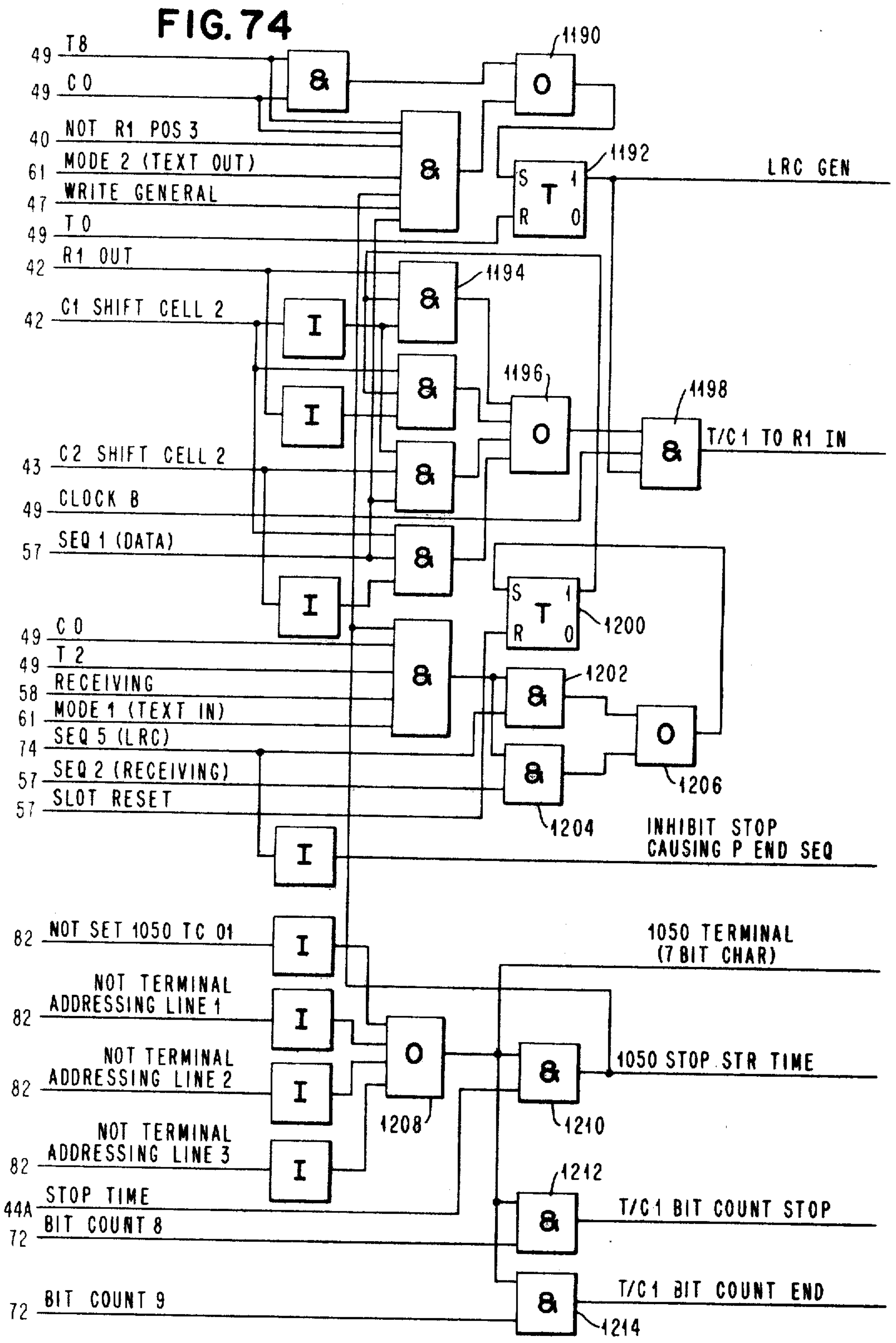
Figure 75:
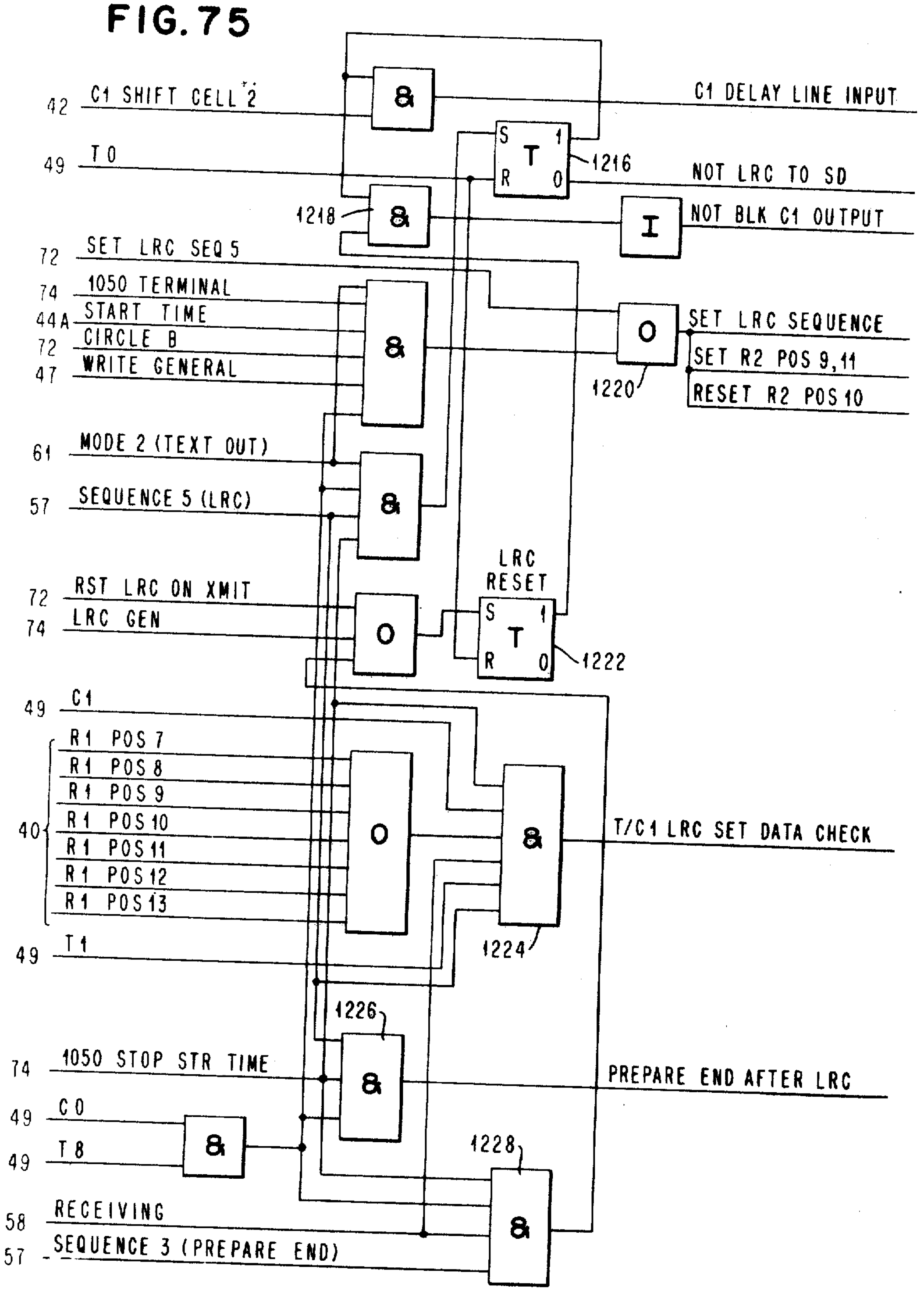
Figure 76:
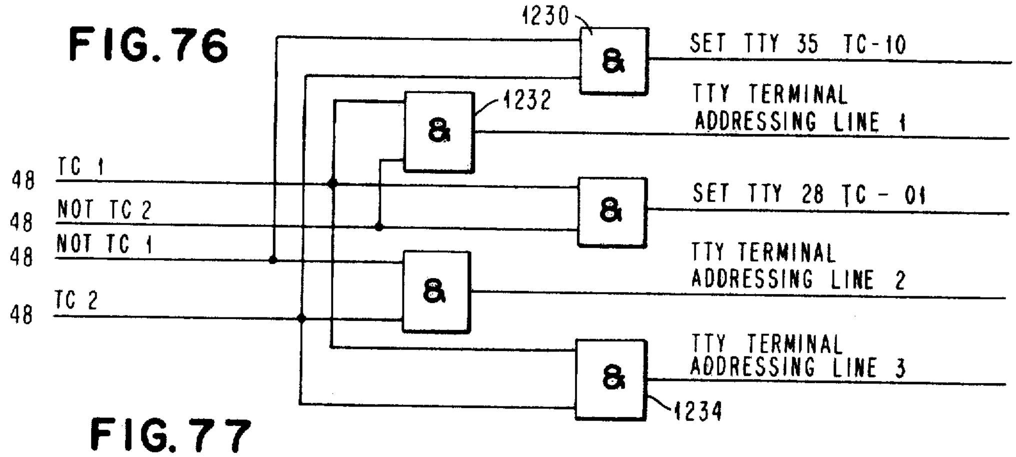

At each strobe time the condition of start, stop, or data time is determined. Strobe time is the AND function of "Strobe Count 15" and an oscillator change (FIG. 44A). Strobe time trigger is turned on by OR 780. Start time is turned on by the coincidence of "Strobe Time" bit count zero by AND 782 (FIG. 44A). Stop Time Trigger 786 is turned on by the coincidence of "Strobe Time" and "Bit Count Stop" which is indicated by the particular terminal control attached (e.g. FIG. 74). This function is variable depending upon which terminal is presently addressed.

Data time is the coincidence of "Strobe Time," "Not Start Time," and "Not Stop Time," at every data time the proper bit is removed from the serial data field and transmitted from the line adapter. Data time energizes AND 1034 (FIG. 63A) which energizes one leg of AND 1036. If a 5 bit character is called for by terminal control, R1

Position 11 is gated via AND 1036 to OR 1048 (FIG. 63B) and thence to the line adapter.

Prior to data time, the serial data field is shifted forward from the high numbered data field to the low numbered data field. Bit shifting is done as the serial data field is read from the delay line. If a strobe time is indicated, and it is not start time, stop time, or first data bit time, the serial data field is shifted as the field is loaded into the bit line control word. This is accomplished by turning on Bit Shifting Trigger 788 (FIG. 44A) at strobe time if bit count is not a 0 or a 1. The bit shifting is accomplished by taking a bit in the delay line which is one bit time early and loading it into the register R1. Thus the output of C1 shift cell 1 is directed to R1 instead of C1 shift cell 2 (trigger 732 and 738 in FIG. 42). So in effect, instead of loading serial data bit 0 into R1 Position 8, serial data bit 1 is loaded into R1 Position 8 and so on for the rest of the data bit positions. The data field is now shifted one bit and located in the R1 register. At data time, the proper bit is sampled and sent to the line adapter. This operation continues until stop time when "Bit Count End" turns on trigger 786 (FIG. 44A).

At stop time the serial data field is not shifted because it is degated by "Bit Count Stop." Data bits are not transmitted to the line adapter but a stop bit (mark) is sent to the line adapter. The "Send Stop" line in FIG. 47 is energized by "Stop Time." The "Send Stop" line energizes OR 1048 (FIG. 63B) to thereby send a mark to the line adapter.

The strobe and bit count fields continue to be incremented throughout the transmit operation.

11.3.4 Sampling of Transmitted Data With Auxiliary Sampling Line Attached

The auxiliary sampling line is attached to the basic transmission control unit by means of switch 1040 (FIG. 63B). With the switch in the "+" position, the auxiliary sampling line is attached.

Figure 94:
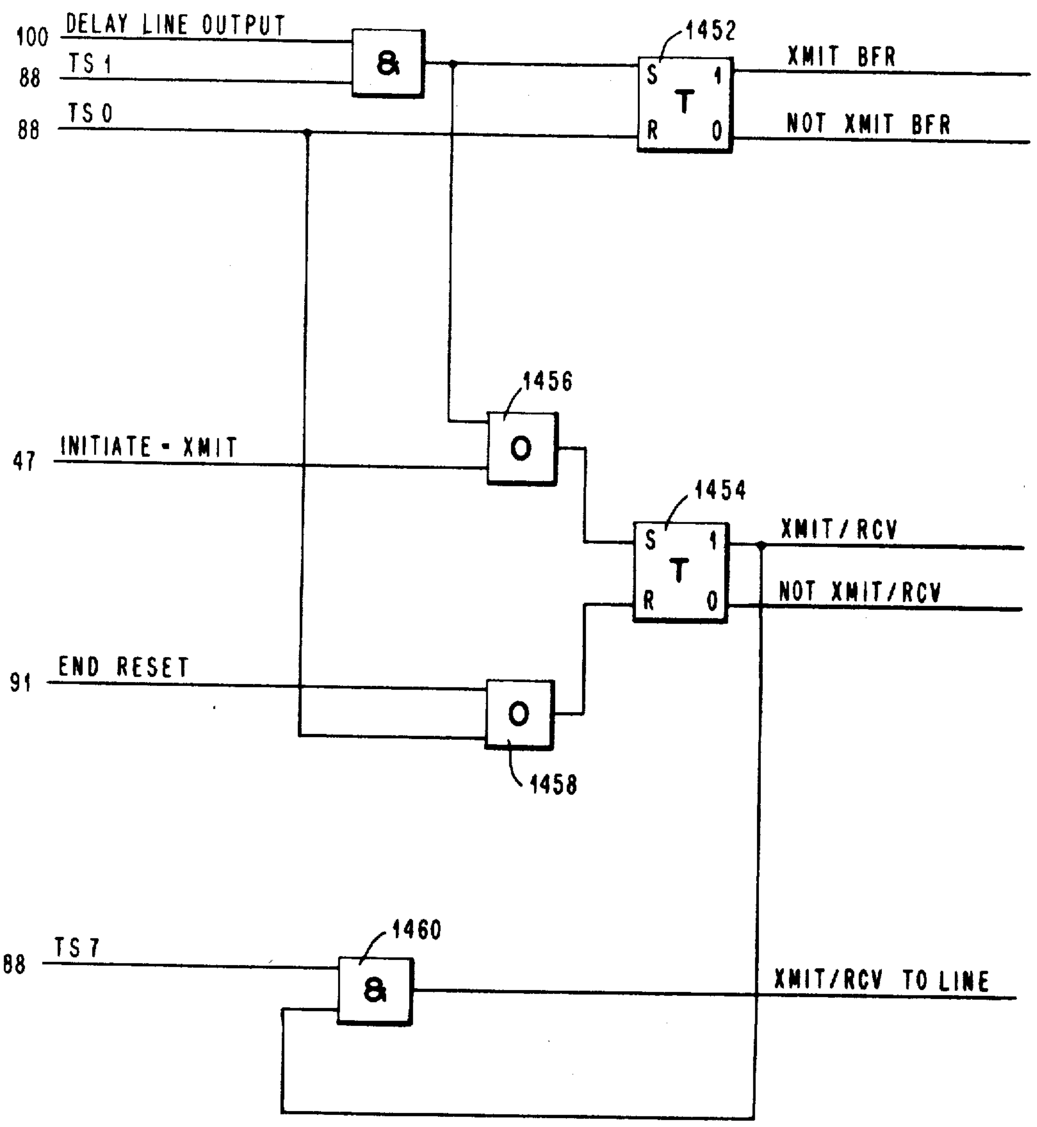
Figure 100:
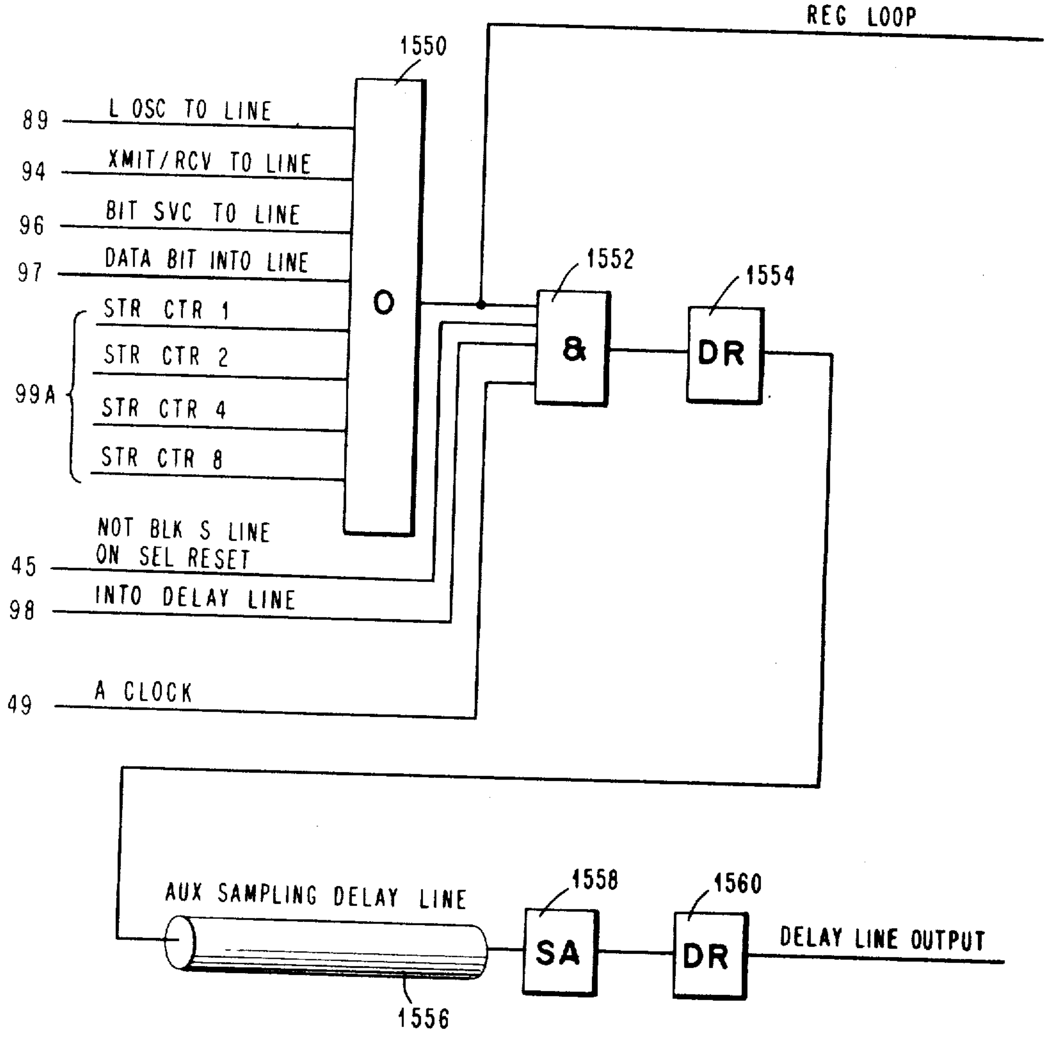

When a write function is decoded at the command register, the initiate transmit trigger 842 (FIG. 47) is turned on. Coincidence of the initiate transmit trigger and COT 3 at AND circuit 876 causes the initiate transmit line to go positive. This line in FIG. 94 turns on the transmit/receive trigger which is gated at TS7 time via AND 1460 into the auxiliary sampling delay line (FIG. 100) via OR 1550, AND 1552, and Driver 1554 (FIG. 100).

Figure 97:
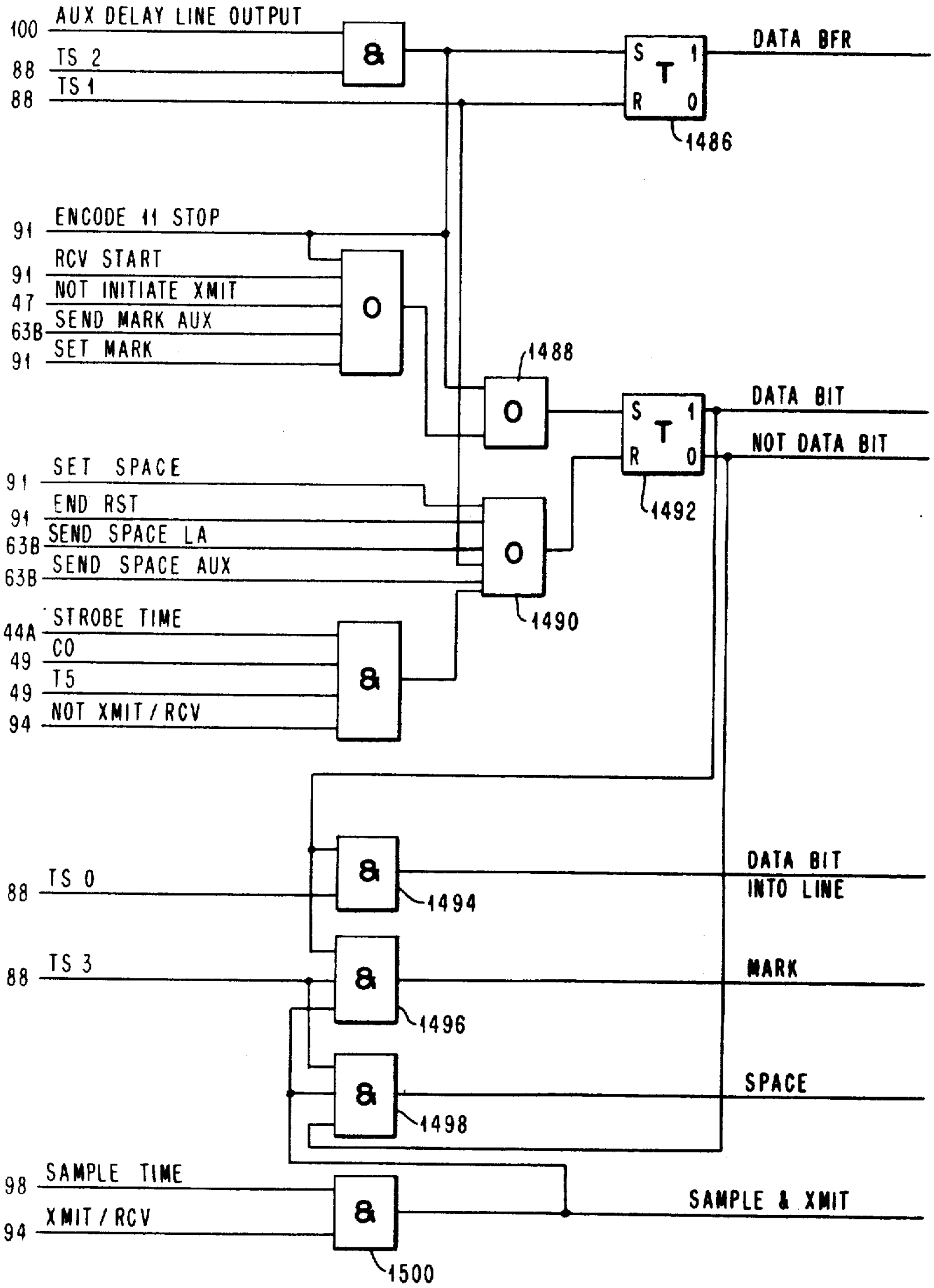
Figure 98:
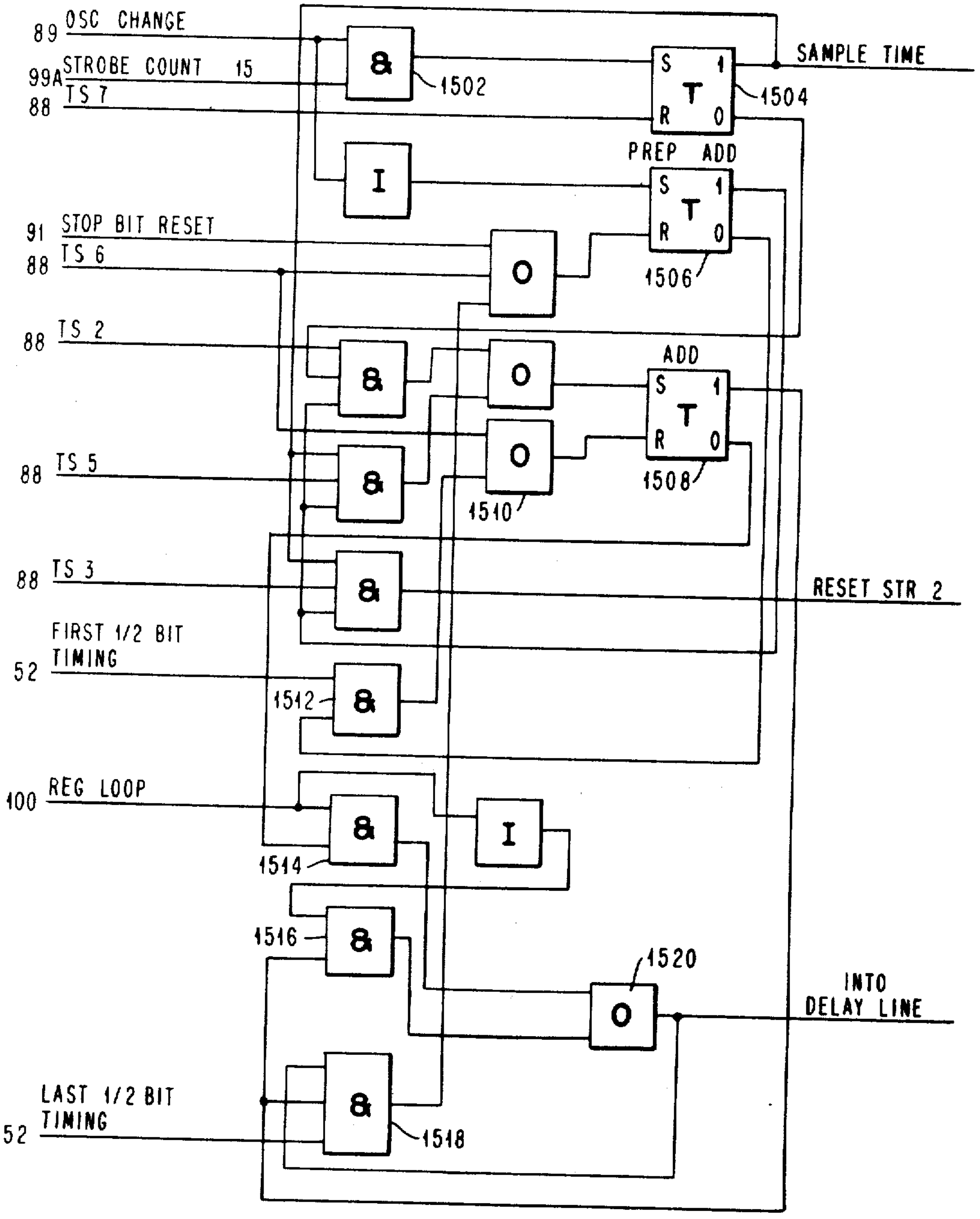
Figure 99A:
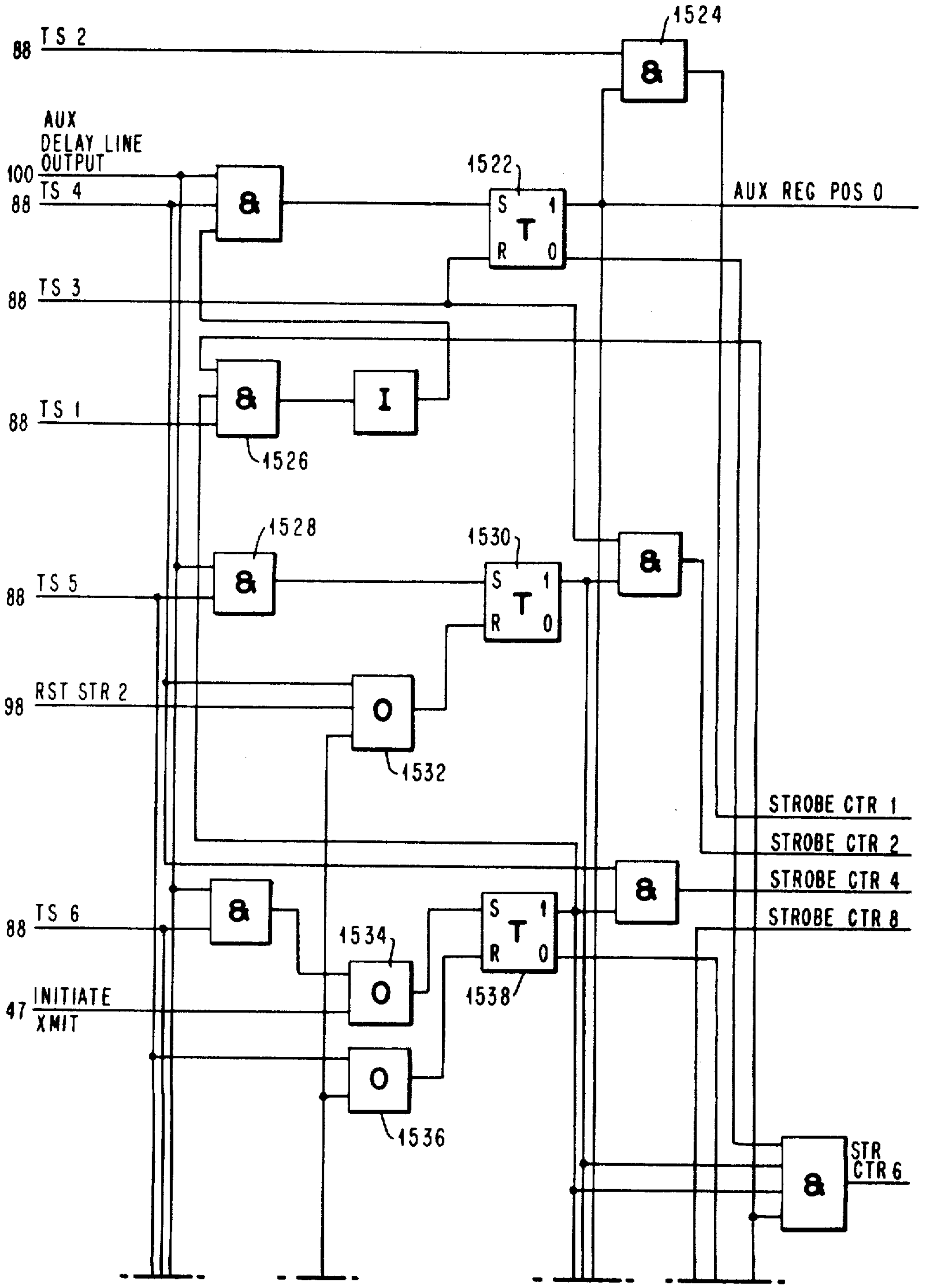

The initiate transmit line also turns on strobe counter 4, trigger 1538 in FIG. 99A. Strobe count now is other than 0 and the field will increment. The write command is read into the command field of the addressed line control word and marks are loaded into the serial data field of the same line control word. The auxiliary sampling line strobe count field advances on every oscillator change. Auxiliary strobe count 15 and oscillator change energize AND 1502 (FIG. 98) to turn on the Sample Time Trigger 1504. At sample time, the fact that transmit/receive trigger is on, causes an output "Sample And Transmit" from AND 1500 (FIG. 97) which samples the output of data bit trigger 1492. If data bit trigger is on, the "Sample and Transmit" line causes a mark out of AND 1496. If the data bit trigger is off, the "Sample and Transmit" line line causes a space out of AND circuit 1498. In FIG. 63B, the space signal is sent to the line adapter via OR 1050 and the mark signal is sent to the line adapter via OR 1052. The "Auxiliary Line Attached" signal, degates the output of OR 1048 to inhibit the sending of mark or space signals via the normal control unit data path.

Figure 95:
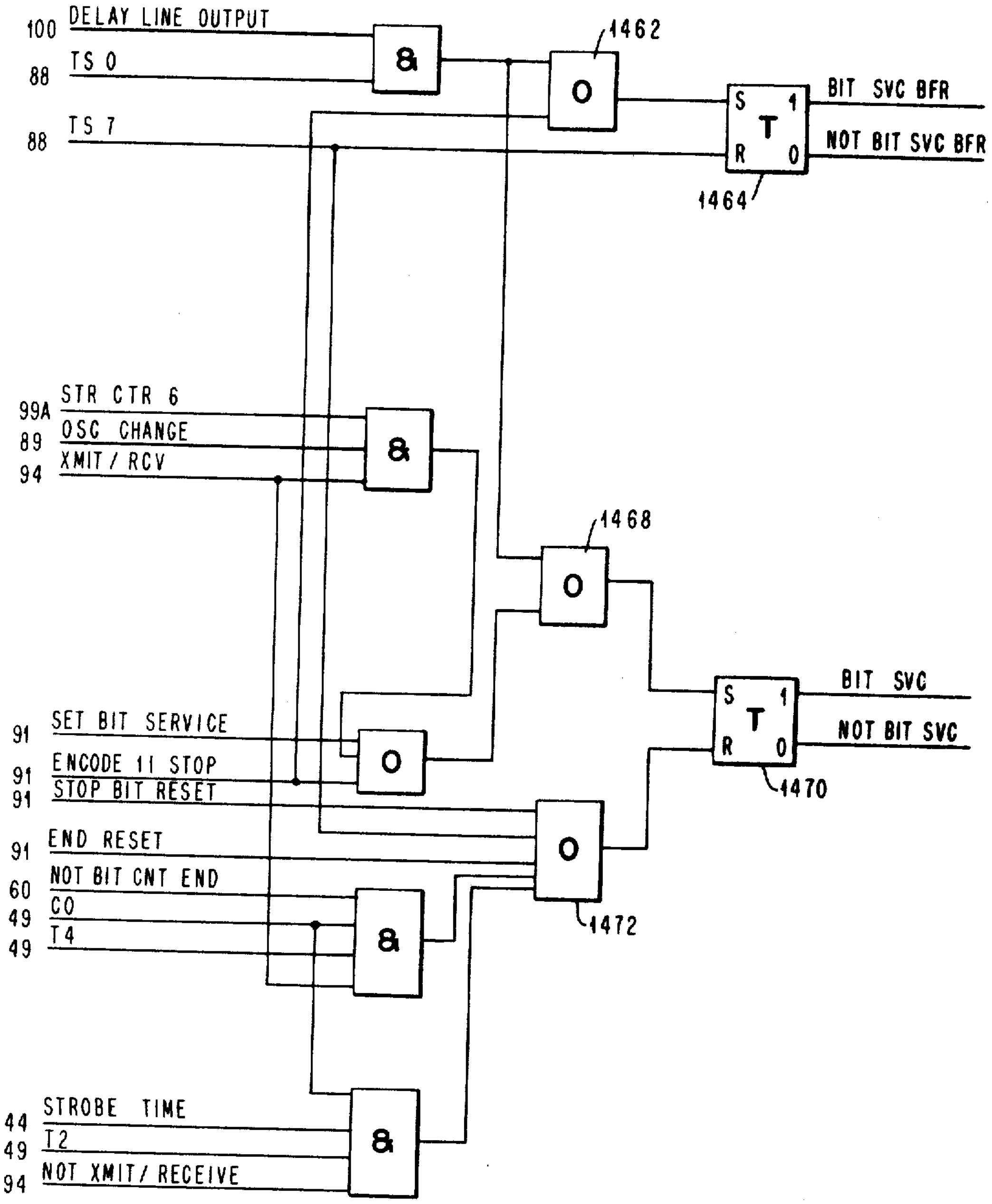
Figure 96:
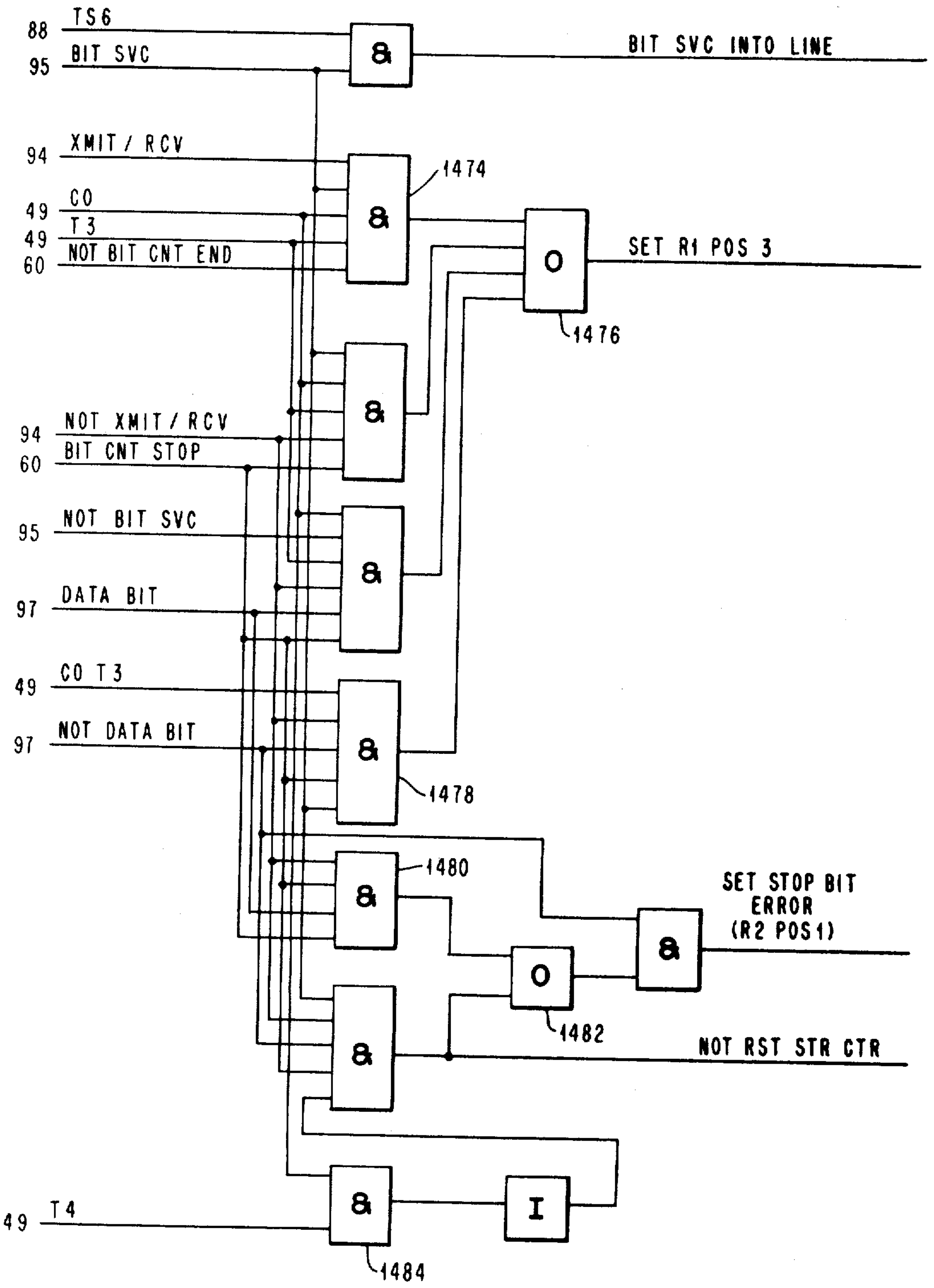

On the next oscillator change, the Prep Add trigger 1506 (FIG. 98) turns on and in coincidence with "Sample Time" and TX 3 causes an output "Reset STR 2" which effectively sets the strobe counter to 5. On strobe count 6, "Bit Service" is set (FIG. 95). During the next matched scan, the following sequence occurs. "Bit Service" on causes the common controls to perform an echo check by comparing the data bit with the transmit data latch of the line adapter. The bit position 8 of the strobe count field in the addressed line control word is turned on via AND 1474 in FIG. 96 which ANDs the output of bit service trigger, the "Transmit/Receive Trigger" and "Not Bit Count End." The AND output energizes OR 1476 the output of which sets R1 Position 3, which corresponds to strobe count 8 in the addressed LCW. Bit service trigger 1464 (FIG. 95) is then turned off at TS7 time.

During the next matched scan, the next bit to be transmitted is set into the data bit position of the S-line from the serial data field of the addressed line control word. This is accomplished by forcing a strobe time operation within the common controls by turning on the strobe time trigger via OR 780 (FIG. 44A) when the auxiliary line is attached and there is a bit in R1 Position 3 (LCW strobe count 8). The forcing of strobe time causes the bits to be transferred one at a time into the S-line by shifting the serial data field in the same manner as during a transmit operation when the auxiliary line is not attached.

The bits are transferred one at a time to the S-line until the last bit of the character to be transmitted is reached. The S-line has no means to distinguish between a start, data, or stop bit. At each matched scan, when strobe count 8 (R1 Position 3) in the LCW is on and the "Auxiliary Line Attached" line is positive, the following occurs. Serial data is shifted forward one position in the serial data field. The data bit is gated from the serial data field to the data bit position in the S-line control word. This is accomplished in FIG. 63B by the coincidence of the output of OR 1038 (FIG. 63A) when positive signals a space signal from the serial data position chosen by a 5-bit, 7-bit, or 8-bit character. The output of OR 1038 is ANDed with "Auxiliary Line Attached" in FIG. 63B to cause an output "Send Space Aux." The output "Send Space Aux" energizes OR 490 (FIG. 97) to reset data bit trigger 1494 to thereby set a space condition therein. A mark is sent in a similar manner if there is a data bit in either R1 positions 8, 9, or 11 (serial data) when energized by the proper bit character length. For example, a five bit character energizes the output of OR 1036 in FIG. 63A to cause an output from the mark OR 1048 in FIG. 63B. The output of OR 1048 is ANDed with auxiliary line attached to cause an output "Send Mark Aux." In FIG. 97, "Send Mark Aux" energizes OR 1488 to set data bit trigger 1492.

The serial data field is shifted forward one position each time the bit count is incremented by one. This process of incrementing the bit count continues each time a data bit is transmitted until the associated terminal control signals "Stop Time" to the common controls section. Stop time is detected by the terminal control when the bit count stored in the line control word equals the number of bits in a coded character corresponding to the selected terminal. For example, for terminal control type 1 (FIG. 72), a bit count decoder 1176 decodes the bit count positions of R1 (Positions 4, 5, 6, and 7) which correspond to the bit count field stored in the line control word. The output, bit count 8, is ANDed in AND 1212 (FIG. 74) to generate the line "TC 1 Bit Count Stop."

At stop time, the following occurs. A mark is transferred to the auxiliary sampling line. If the sequence field in the line control word is zero, "Bit Count Stop" line is generated (FIG. 44A), and a mark (stop bit) is transferred to the S-line. "Character Service" bit is set if the sequence field is set to data. If character service was not reset (indicating that the data buffer does not yet have the next character to be transmitted from the channel) the bit count is not reset as long as it is advanced by one. This causes the next bit to be transmitted to also be a stop bit. If character service is reset and the sequence field is not zero, the data bit buffer is transferred to the serial data field, and the bit count is reset to zero. At the same time "Character Service" is turned on in the line control word. This causes the next bit to be transmitted to be a stop bit. Other functions performed by the common controls independent of the S-line do not need repeating here.

Figure 91:
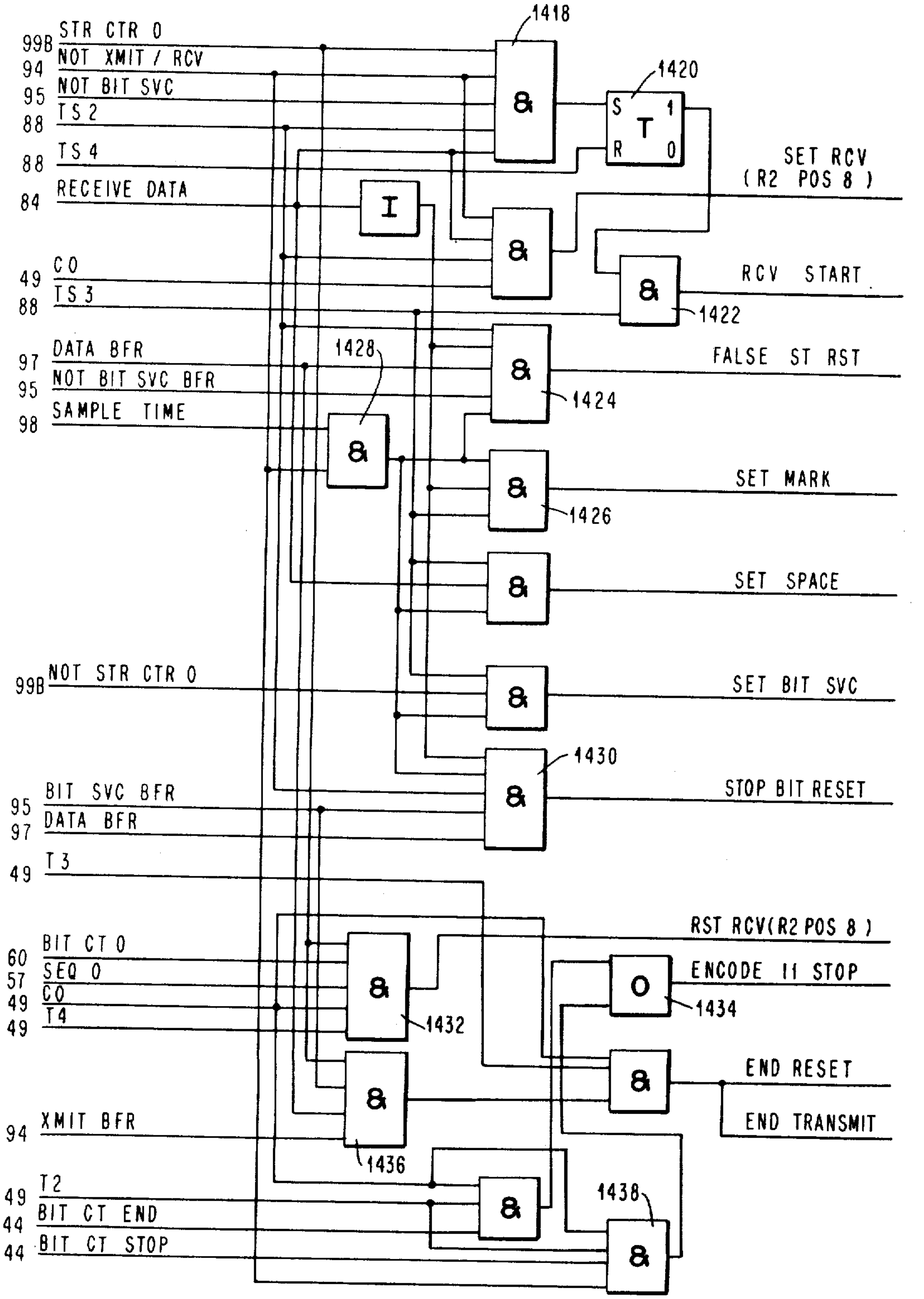

The sampling process continues until a matched scan occurs and the common controls detect a "Prepare End" sequence set in the line control word by the terminal controls. At stop time, a mark is sent to the S-line control word. The next time the auxiliary sampling line sets strobe count 8 in the line control word, the common controls again set "Data Bit" to mark and signal "Bit Count End." The S-line controls set "Bit Service" on. At sample time the strobe counter is reset and at the next matched scan the S-line signals "End Transmit." This is accomplished by the AND condition of "Bit Count End" in FIG. 91 which causes an output from OR 1434 "Encode 11 Stop." "Encode 11 Stop" turns on the data buffer trigger 1486 (FIG. 97) and the data bit trigger 1492. It also turns on the bit service buffer 1464 (FIG. 95) and the bit service trigger 1470. At the next matched scan the S-line signals "End Transmit" (FIG. 91) to inform the control unit that the last bit has been sent. "Bit Service," "Data Bit," and "Transmit Receive Bit" are reset to end the operation. This is accomplished in FIG. 91 by the coincidence of "Strobe Counter Zero," "Bit Service Buffer," "Data Buffer," and "Transmit Buffer" at the AND circuit 1436. The output of the AND circuit energizes another AND circuit the output of which is "End Reset." End reset energizes OR 1472 (FIG. 95) to reset bit service trigger 1470. "End Reset" also energizes OR 1458 (FIG. 94) to reset the transmit/receive trigger. The "End Transmit" line is also generated by the AND circuit which generates "End Reset." The "End Transmit" line turns on End trigger 1020 (FIG. 62) which causes an end operation.

11.3.5 End Transmit (Sequence 3—Prep End)

The computer signals end of message by responding "Address Out" instead of "Service Out" in response to "Service In" (section 3.4.2). When this is detected the interface controls force the prep end sequence into the line control word sequence field (sequence 3).

Figure 62:
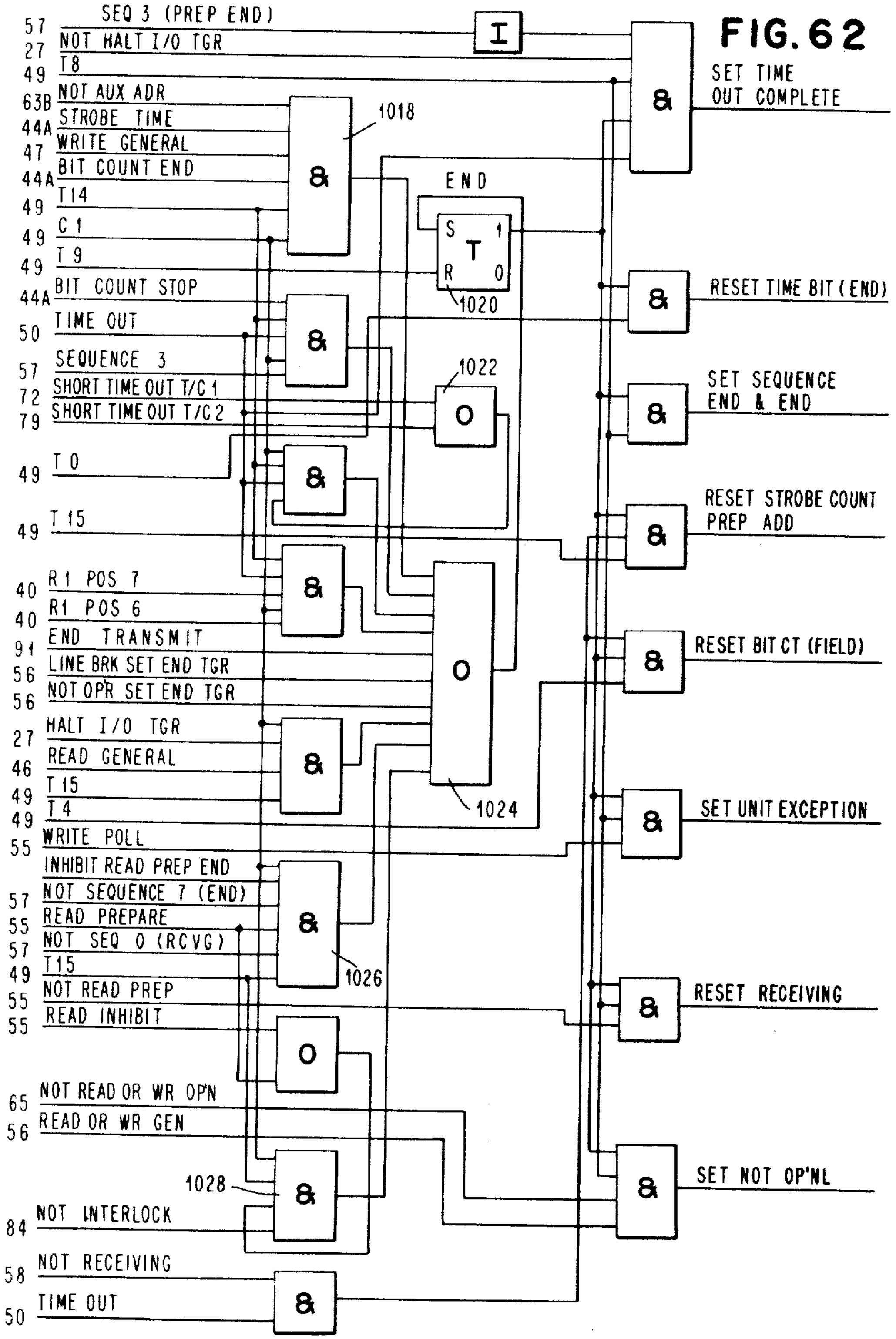

The fact that the prep end sequence is set, stop time inhibits the reset of bit count. The normal incrementing is now done and effectively the character has been overrun. At the next strobe time the fact that the bit count has overrun and past the normal stop time indicates bit count end. In FIG. 62 "Bit Count End," "Strobe Time," and a "Write General" cause an output from AND 1018 which sets the end trigger 1020. The end trigger is a general ending condition. In this case it happens to be the end of a transmit operation. The conditions set during the ending operation are: setting time out complete if a timeout operation is in process; setting of sequence end; setting the end bit; resetting of the strobe count and bit count field; setting of unit exception (which is done only if a write poll type operation is being ended); and the resetting of "receive" and the setting of "not operational." "Not operational" is set only if the ending condition is caused by the fact that the addressed subset had gone nonoperational.

Figure 51:
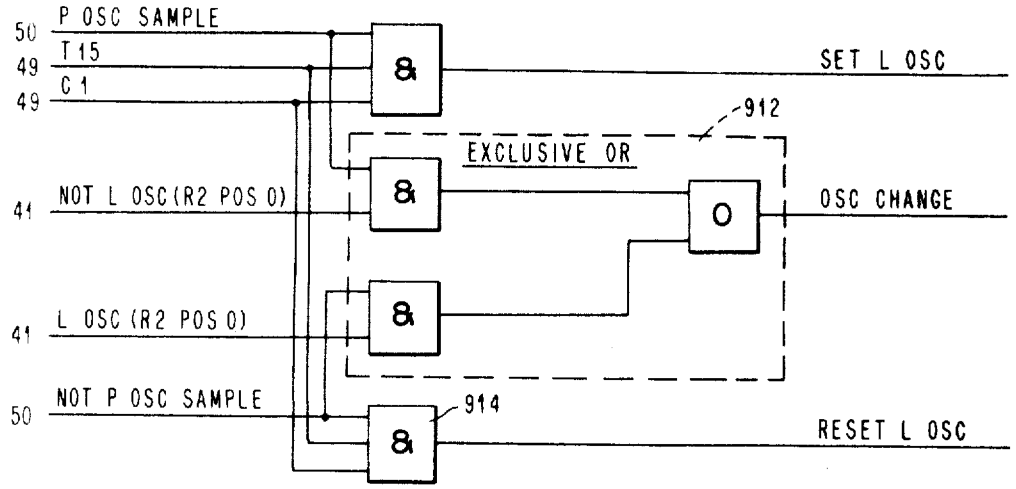
Figure 52:
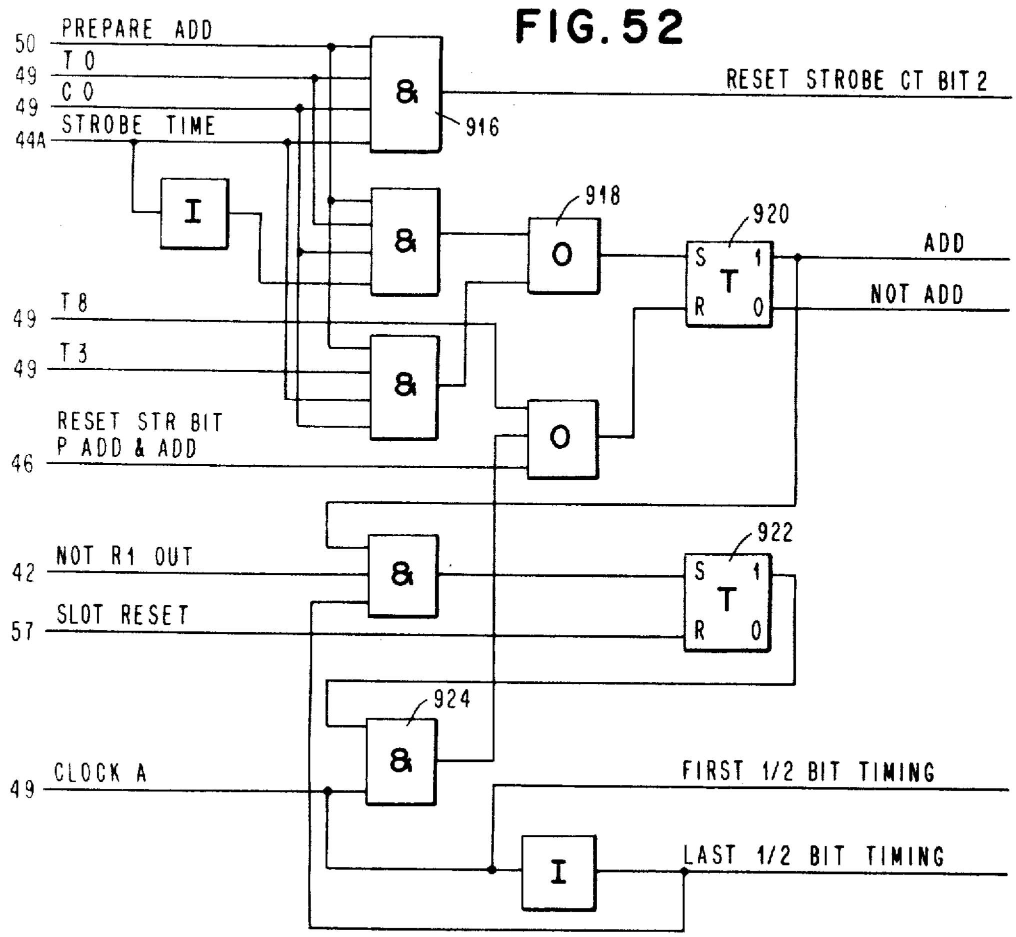

Once the strobe count has been initiated, it continues to be incremented by one each time an oscillator change is detected and continues to count from 5 thru 15 and around again. The fact that the strobe count field is now reset at the end operation inhibits any further incrementing of this field. This is indicated in FIG. 51 by the setting of prep-add. Prep-add is set only upon detection of a strobe time, or an oscillator change and timeout condition or a special initiating condition in the receive operation. Once the "Sequence End" and the "End" bit has been set in the LCW, the operation is complete. Common controls service the end bit and terminate the operation. Upon the servicing of "End" the LCW is completely reset with the exception of the sense information and the operation is complete.

11.4 *Receive Operation*

11.4.1 Sampling of Received Data

The bit sampling process is similar to sampling transmitted data, only the direction of data flow is reversed. The functional description of a receive operation in Section X should suffice to allow a person skilled in the art to understand the detailed operation of sampling received data.

11.4.2 Sampling of Received Data with Auxiliary Sampling Line Attached

The S-line control word is in a receive monitoring condition when the strobe counter is reset and the "transmit/receive" bit is off. If the line control word contains a "Read" or a "Search" command stored in C1, a line timeout is in process. If a space is detected on the "Receive Data" line of the selected line adapter the strobe count field in the S-line is set to 10 and the data bit field is turned on. The strobe count field in the address line control word stored in C1 is not used for bit sampling when the auxiliary sampling logic is attached to the basic control unit. At the next matched scan, the receiving bit in the line control word is turned on. This is accomplished in FIG. 91 by the coincidence of "Not Transmit/Receive," "Receive Data," and COT 2 time. The coincidence of these signals produces an output "Set Receive (R2 Position 8)" which sets the receiving bit in the line control word (C2).

Figure 99B:
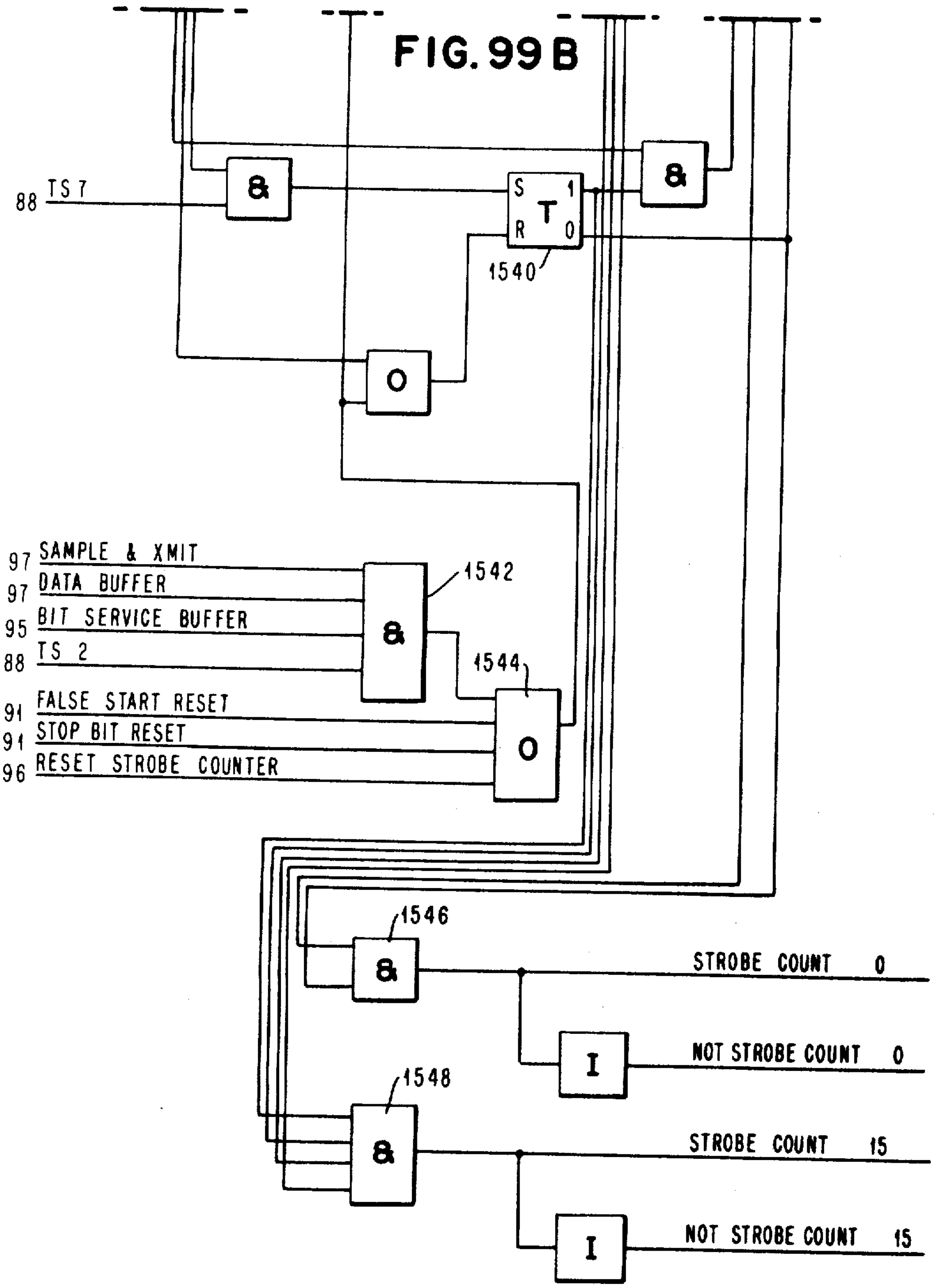

Each oscillator change detected by the difference between the last oscillator sample and the present oscillator level advances the strobe counter in the S-line. When the strobe count reaches 15 the sample time trigger is turned on. If the receive data line is still in a space condition at sample time a true start bit has been detected. This is accomplished in AND circuit 1424 which samples the "Receive Data" line for a space condition. If the "Receive Data" line is marking at sample time, the output "False Start Reset" is generated which in FIG. 99B resets the strobe counter to zero.

If a true start bit is detected, the "Data Bit" field is reset, the "Bit Service" field is set on and the auxiliary line strobe count is set to 5. At the next matched scan the fact that bit service is on and data bit is reset instructs the S-line control word to set the strobe count to 8 within the line control word memory C1 and to reset bit service. During the next matched scan, strobe count 8 bit on and the fact that "Auxiliary Line Attached" is energized causes the bit count in the line control word stored in C1 to increment. The data bit is gated to the serial data field and the sequence field is set to "Receiving."

If the "Receive Data" line is a mark at sample time instead of a space, a false start condition is detected. Strobe count is reset within the S line control word and on the next matched scan the "Receiving Bit" in the line control word stored in C2 is reset if the sequence field is zero. The line timeout is begun provided a read or search command is present in the command field.

Assuming that a true start bit is detected, the auxiliary line strobe counter advances on each oscillator change. When the strobe count reaches 15 (sample time) the "Receive Data" line is sampled into the data bit field of the S line control word. The auxiliary register position 0 is gated via AND 1044 in FIG. 63B by the "Auxiliary Line Attached" input being positive. Therefore the data path from FIG. 84 through the OR circuit 1314 via the receive data line is now directed through AND circuit 1426 (FIG. 91) the output of which is "Set Mark." "Set Mark" (FIG. 97) sets the data bit trigger to a one. If the "Received Data" bit is a space, the "Set Space" lead is energized through OR 1490 to set the data bit trigger to a space condition.

The bit sampling cycle continues in this manner until a matched scan occurs and "Bit Count Stop" signal is energized. This line is energized by the terminal control associated with a particular line being scanned. The next bit received should be a stop bit. In order to store this condition, the S line sets both the data bits and the bit service field to 1. At sample time, if "Receive Data" is mark, bit service and strobe count are reset. If "Receive Data" is space, data bit and strobe count are reset. At the next matched scan if data bit is set, bit service is reset and "Bit Count Stop" is raised. The serial data is transferred to the data buffer and "Character Service" is set on in the line control word. If character service had already set on, overrun is set in the sense field and the line control word C1 bit count is reset. The S line control word is again in a receive monitoring condition.

If at sample time, bit service is on, data bit is reset, and bit stop is on, stop bit error is signalled causing the common controls to set data check within the sense field of a line control word C2. The other remaining control functions performed by the common controls independent of the presence of the auxiliary sampling line are described elsewhere.

11.4.3 End Receive Operation

Figure 66:
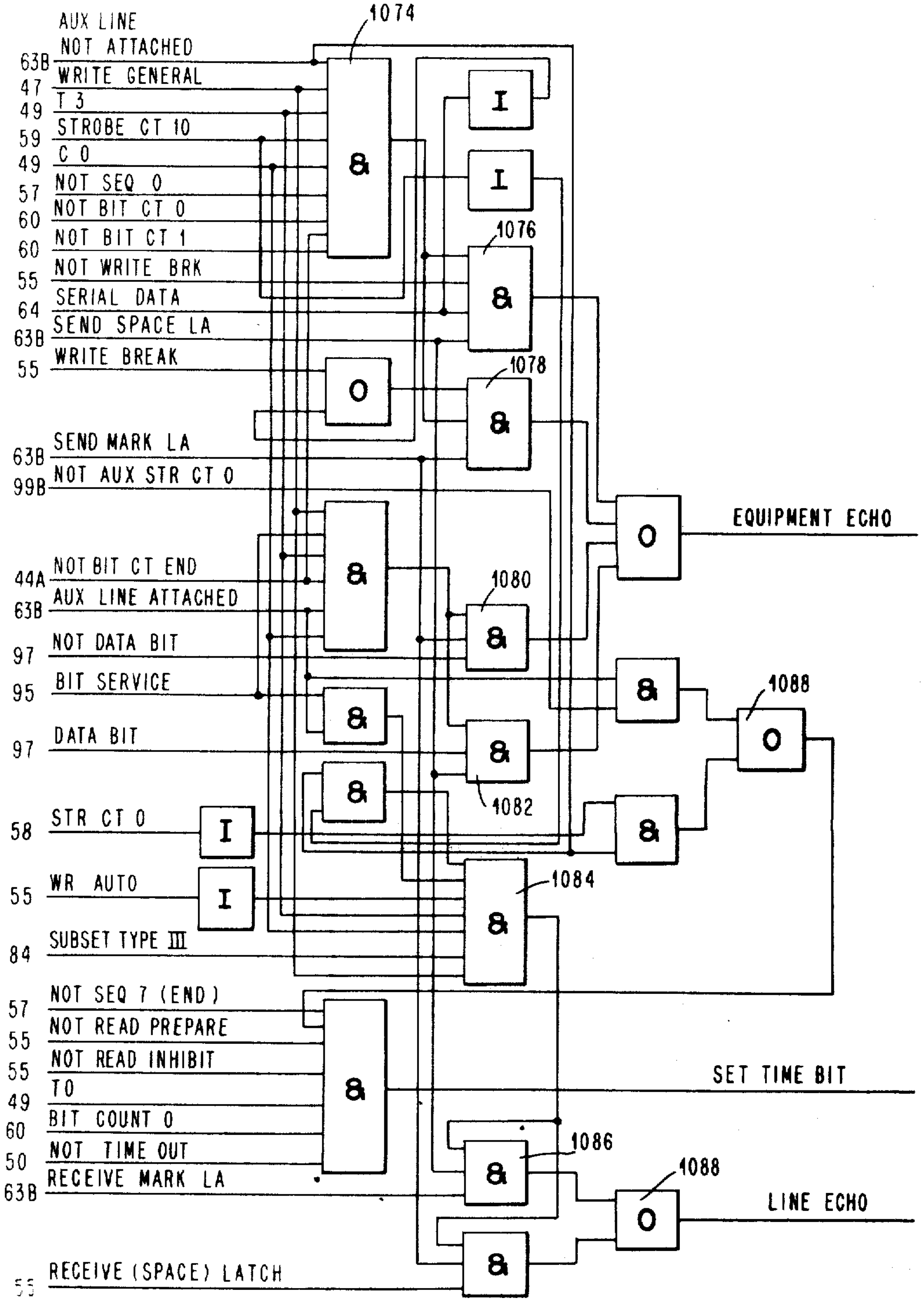

The receive operation is ended if no data are received for a specified period of time. The timeout oscillator 890 (FIG. 50) is gated to step the strobe count and bit count fields (as a timeout counter) via AND 896 if the time out trigger 904 is on. Timeout trigger is turned on if R1 Pos. 3 (Time bit) is on. The time bit is set (FIG. 66) at stop time during the receive operation. If no more data is received, the timeout counter times out, sets "End" and "Timeout" bits in the LCW and the operation is ended by the common controls.

11.5 *Operations Performed by Terminal Controls*

11.5.1 Sequencing and Character Recognition

There are many conditions for ending an operation. On any one of these conditions detected by the terminal controls, the terminal controls set "prep end sequence." The common controls take the prep end sequence and terminate the operation. Regardless of which terminal control sets the prep end sequence, this is handled in a common functional way independent of which terminal control initiates the end.

The sequence bits are controlled by the terminal control section. The common controls use the sequence 0 to indicate a first character operation. From then on, after the sequence has been set from 0 to 1, the sequence field is changed by the terminal controls. For instance, when a circle B is detected in a transmit direction, the terminal control T/C 1 inserts the LRC character into the serial data field and the common controls transmit this character. Upon the setting of the prep end sequence, common controls now take the prep end sequence and execute the end operation.

LRC generation and echo checking is a function of a particular terminal. If the terminal requires LRC operation (e.g. T/C 1) the terminal control is completely responsible for such operation up to the level where the rest of the operation is common to all terminals. For instance, once the LRC character is inserted into the serial data field, the common controls transmit this character as any normal data character.

Figure 72:
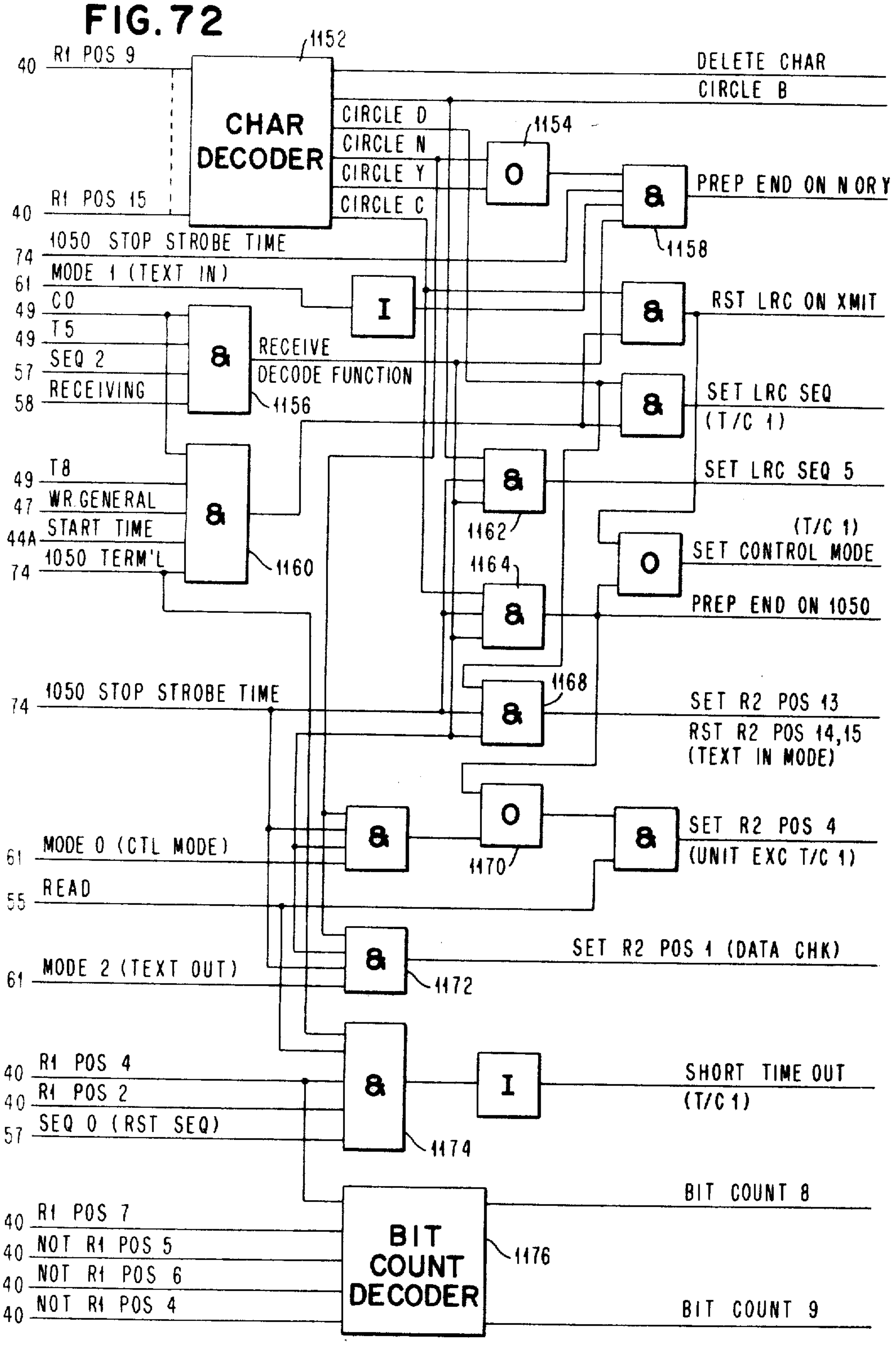

Another function of the terminal control is the detection of a delete character (FIG. 72). In the receive operation, if the terminal control T/C 1 decodes a delete character, it inhibits the setting of "character service." This in effect discards this character from the message.

The selection of the proper low-speed line oscillator is also a function of the particular terminal but in this case the proper controls (TC 1 and TC 2 bit field) of such selection are located in the LCW. Therefore, the terminal controls are not responsible for this selection.

In terminal control 2 (T/C 2) characters as "V or M" must be decoded (Decoder 1284 FIG. 81) by the terminal control T/C 2. Also such characters as shift characters are decoded. The decode of a shift character in the receive direction indicates that the sixth bit in the data character which is presented to the interface must be changed to indicate the proper shift. The five bit shift character is now discarded. The next five bit data character received is sent to the interface along with the proper sixth shift bit.

In the transmit direction the terminal control must indicate when a shift character must be sent out on the communication line. This is indicated by the detection of a change in the shift bit from the interface. Once this shift bit is indicated, the terminal control T/C 2 inhibits the requesting of another data character and inserts a proper five bit shift character to be transmitted previous to the last data character received from the interface. The mode *field* bits are used to keep track of which shift the present transmit operation is in.

11.5.2 Longitudinal Redundancy Check (LRC)

An eight bit LRC field is provided in the LCW, which is common to all terminal addresses. If a particular terminal utilizes LRC operation, this field is used, otherwise it is not. In the transmit direction the LRC is generated only when the control is in the proper mode. This is indicated by circle D decoded by character decoder 1152 (FIG. 72). Circle D indicates that the message is now in the data mode and LRC must be generated. At each stop time the data buffer is serially transferred to the serial data field. This is accomplished by setting trigger 790 (FIG. 44a) which inhibits the serial data stream from the R1 register and inserts in its place the data buffer stream which is normally loaded into the R2 register. At the proper time (T0) this operation is terminated and the normal R1, R2 serial read-out, read-in is continued. During stop time for T/C 1 as the data buffer is being serially loaded back into C1 and LRC is generated with the LRC field in a serial fashion. The normal LRC field is inhibited from being loaded into R1 and in its place the serially generated Exclusive OR of the LRC field (*R1 out FIG. 74*) and the data buffer field (C2 Shift Cell 2, FIG. 74) is loaded into the R1 register via AND 1198. The updating of the last LRC field and the next character has been completed. Once the last character has been transmitted, the LRC character is transmitted on the communication line. The LRC field is shifted serially into the serial data field where the common controls transmit this character in the normal fashion. The LRC-to-serial-data shift is done in a serial fashion and is accomplished by effectively by-passing the R1 register. Normally, the LRC field is loaded serially into the R1 register as the serial data field is being written back into the C1 line. The LRC field is now gated into the C1 line in place the serial data and an LRC to serial data shift has been accomplished.

In the receive direction, the operation is similar. An LRC of all data is updated and checked against the LRC character as sent by the terminal. In the receive operation again at stop time the LRC is generated. As serial data is being serially loaded into the R2 register an Exclusive OR of it and the LRC field is loaded into the R1 register LRC field in place of the normal LRC field. When the message has finally been completed, the last character, which is the LRC character, is checked for errors against the updated LRC character in the common controls.

11.6 *Auto Wrap Operation*

Figure 55:
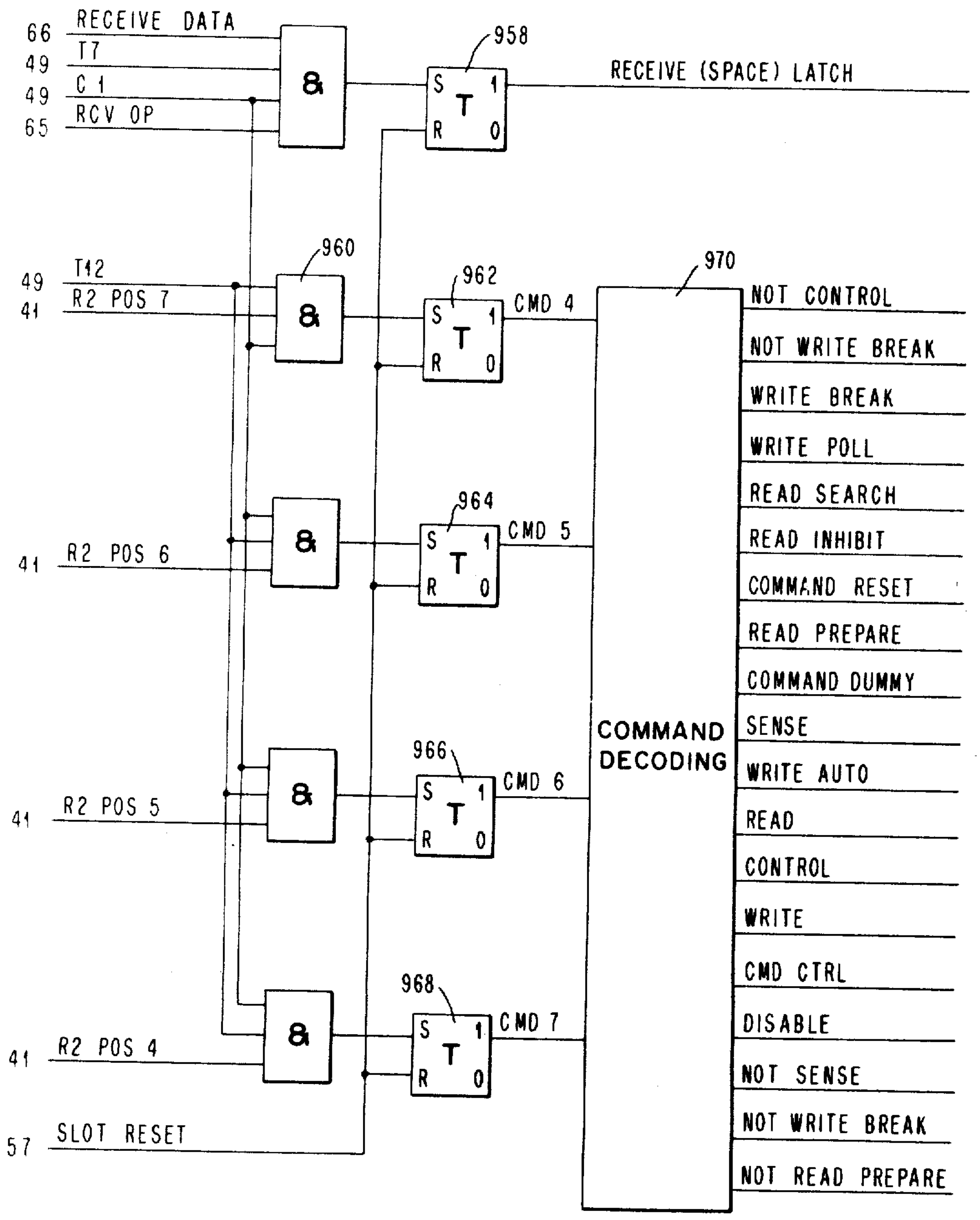
Figure 56:
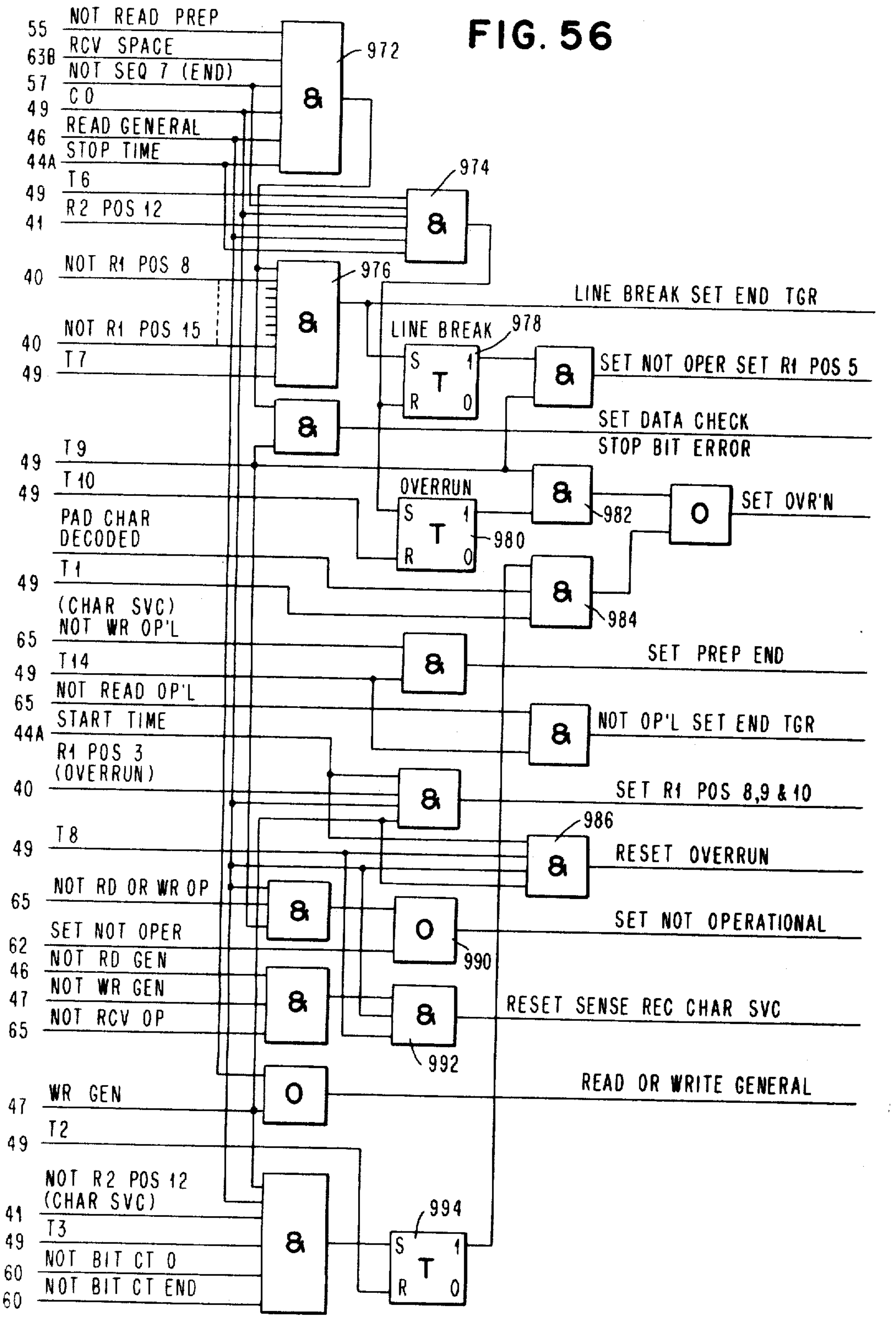
Figure 57:
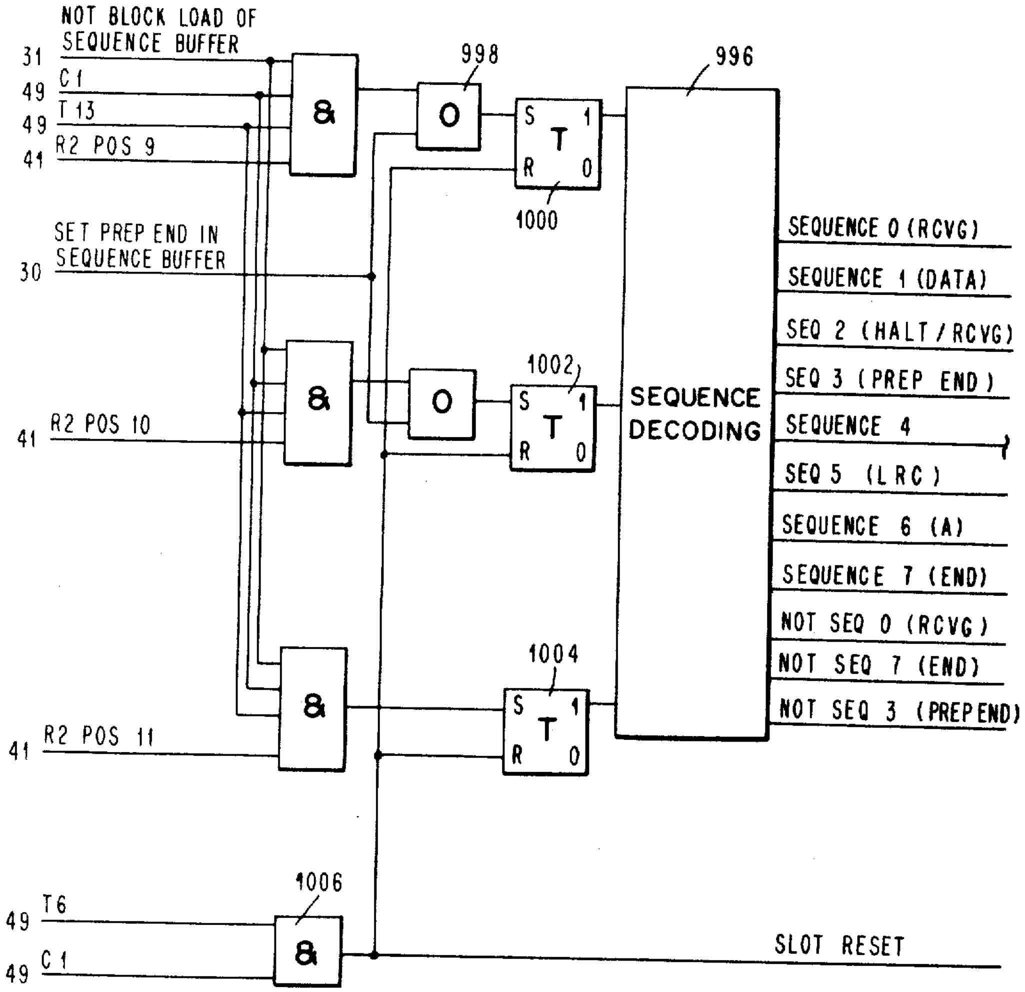

A wraparound test operation is utilized to determine the source of errors on a communication line. The wrap function is initiated by issuing a write auto command (FIG. 55). The output of the line to which the write auto command was issued is connected or "wrapped" to the input of line address zero. Wrap around is accomplished within the control unit to avoid line termination mismatches existing because line zero is not necessarily the same type of line as the line being tested. The execution of the "write auto" command causes a send operation on the unit address being tested and a receive operation on the line zero. A read command is issued to line zero before the write auto command is started if the computer desires to accept the information received. Thus, the computer must be sure that normal operations on line zero have been completed before issuing the write auto command.

Since line zero is used with all wrap around operations, the proper terminal control must be gated during line zero scan time. The selection of the proper terminal control is accomplished by coding the TC field in line address zero. The TC field in line address zero is coded the same as the TC field in the line to which the write auto command has been issued in order that the receive operation will be using a terminal control which is the same as the terminal control which is transmitting the data.

Figure 48:
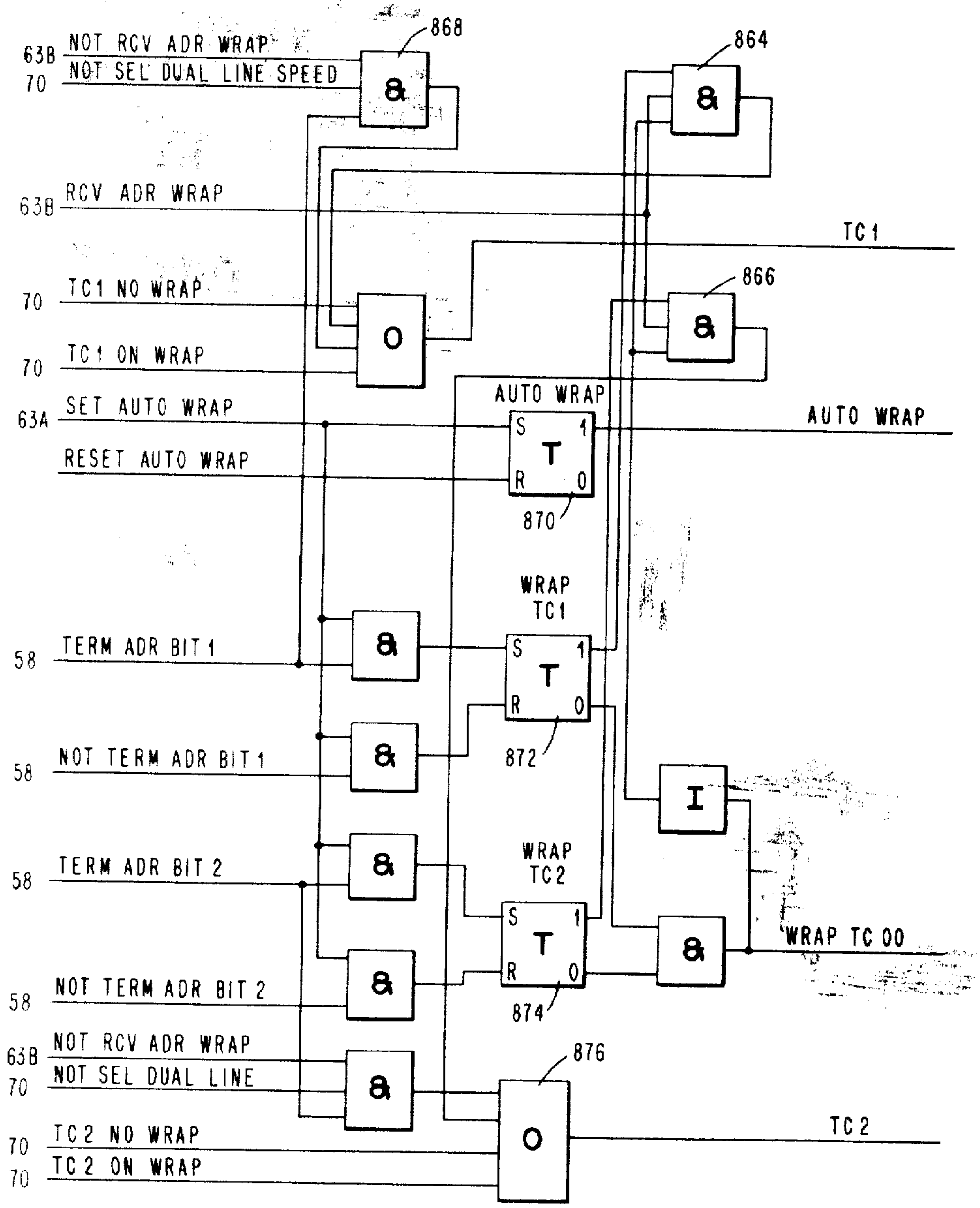
Figure 63A:
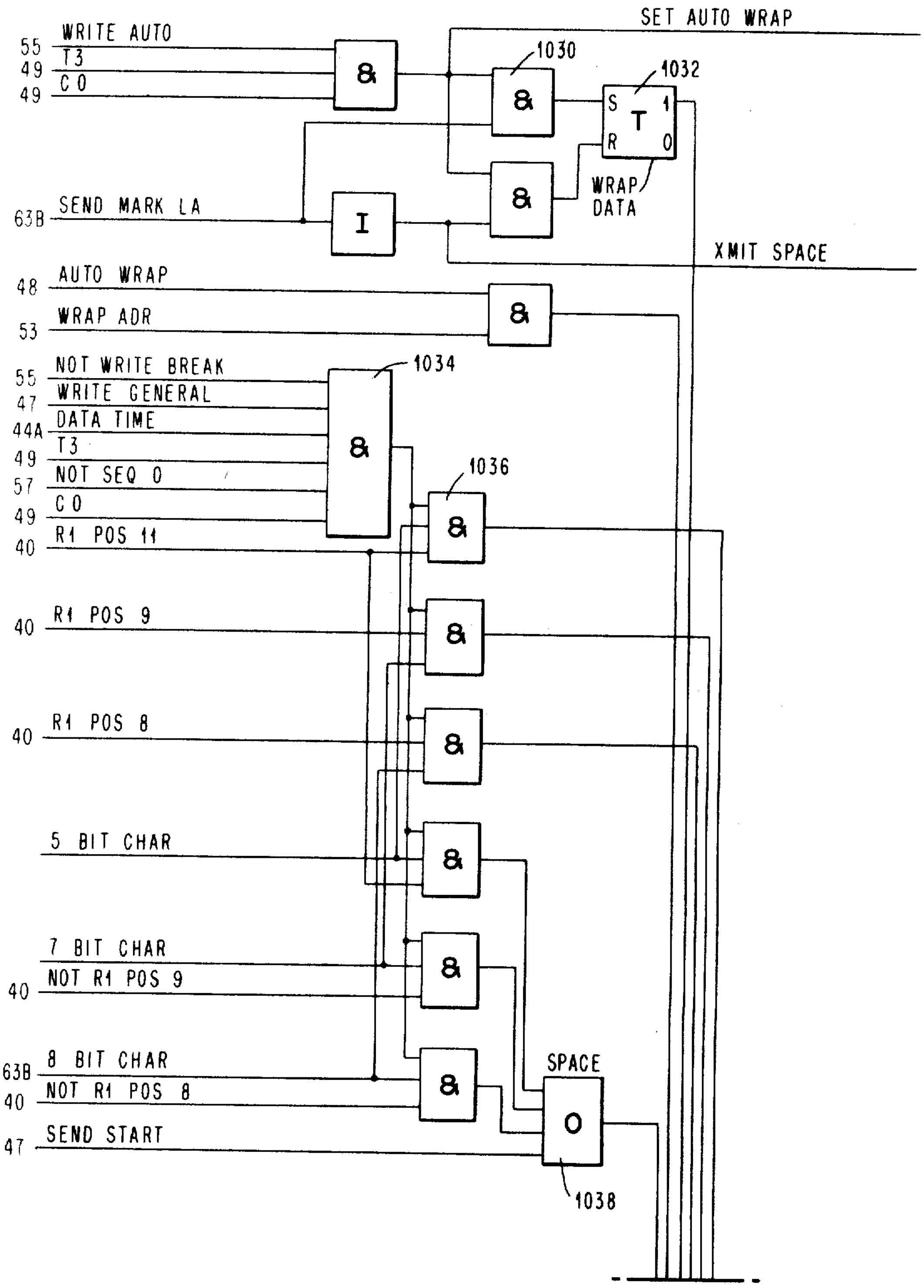
Figures 63B, 64:
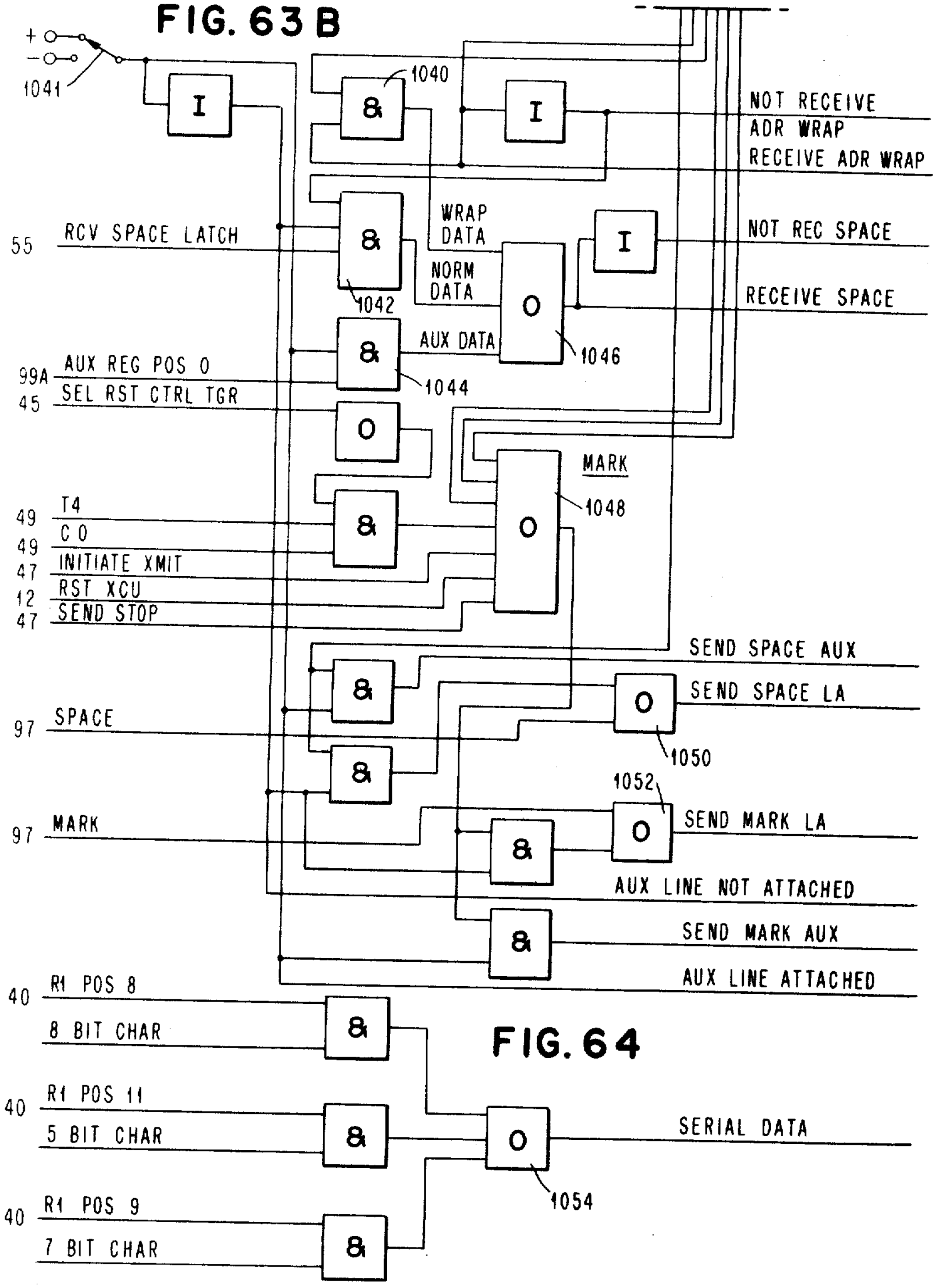

In FIG. 63A the write auto command causes an output "set auto wrap." Set auto wrap gates the "send mark LA" line via AND circuit 1030 into the wrap data trigger 1032. The "set auto wrap" line also turns on the auto wrap trigger 870 (FIG. 48). The "set auto wrap" line gates terminal address bit one and the terminal bit two into the wrap TC 1 and wrap TC 2 triggers 872 and 874.

Figure 58:
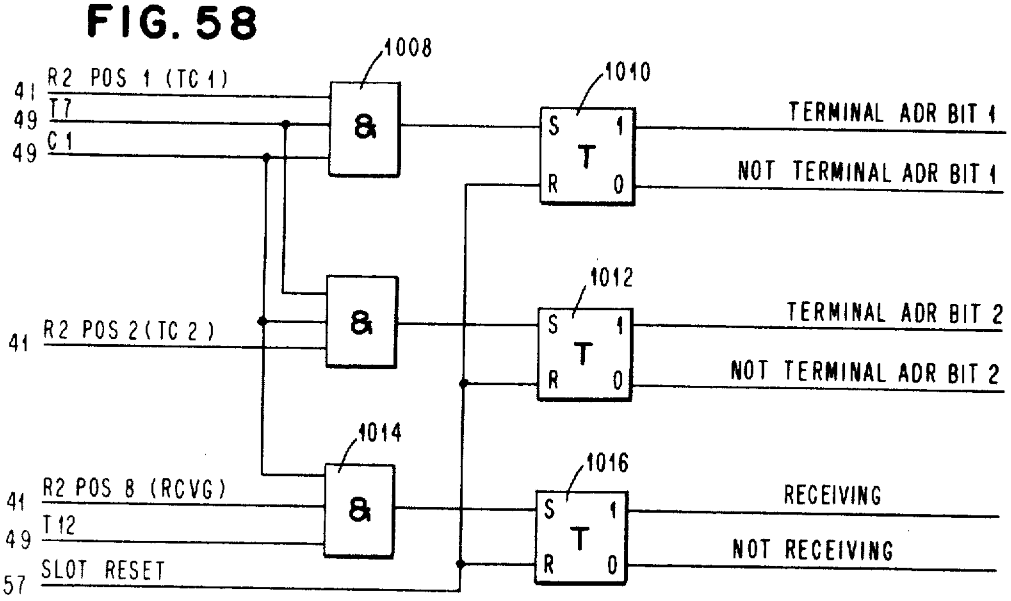
Figure 59:
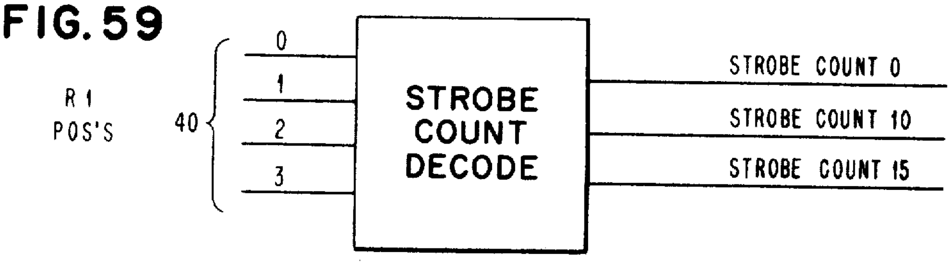
Figure 60:
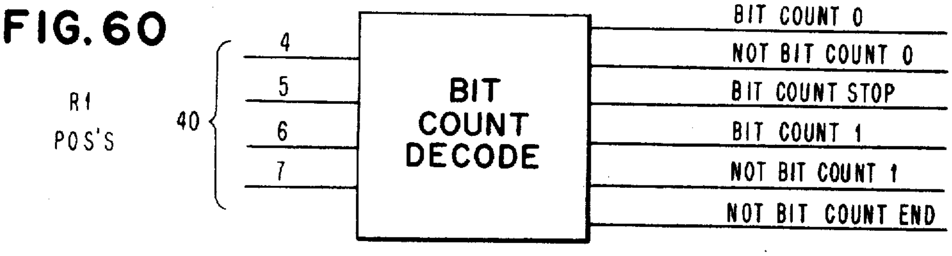
Figure 61:
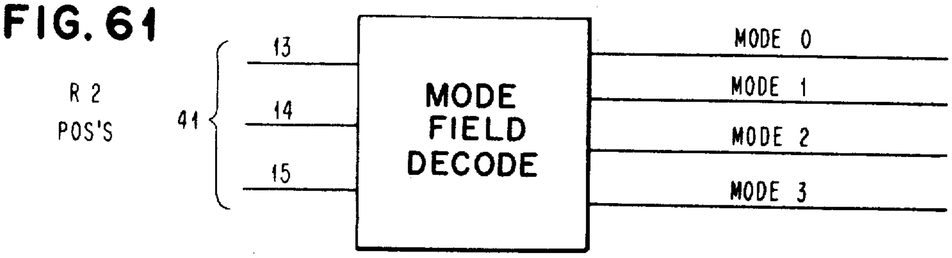

In FIG. 58, R2 position 1, which is TC bit 1 and R2 position 2 which is a TC bit 2 are gated into registers 1010 and 1012. The output of these registers, "terminal address bit one" and "terminal address bit two" are gated via "set auto wrap" to the wrap TC 1 and wrap TC 2 triggers in FIG. 48.

When the line into which the write auto instruction has been loaded is read out of the recirculating memory, the TC 1 and TC 2 bits are gated into terminal address registers 1010 and 1012 in FIG. 58. The set auto wrap line FIG. 48 sets the contents of the terminal address register into the wrap TC 1 and wrap TC 2 register FIG. 48. At line zero time, that is when line address zero is read from the recirculating memory, the fact that the auto wrap trigger 870 (FIG. 48) is on causes the TC field of line zero line control word to be superseded by the stored TC field address in the wrap TC 1 and wrap TC 2 triggers. Thus, line zero operates as if it were the same kind of communication line as the line being tested.

"Auto wrap" and "wrap address" in FIG. 63A generate "not receive address wrap" and "receive address wrap" (FIG. 63B). Wrap address is the address of the line adapter zero and is generated by the line address zero and group address zero ANDed in AND 940 in FIG. 53. Thus in FIG. 48 when "receive address wrap" line is energized (when line control word zero is read out of the memory) AND circuits 864 and 866 are energized. The energization of these AND circuits causes the terminal address stored in FIGURES 870 and 872 to override the terminal address bit stored in the terminal address bit register on FIG. 48. For example, in AND 868 "not receive address wrap" inhibits terminal address bit one from going through the OR circuit which is energized by the output of AND circuit 868.

Thus line zero operates as if it were the same kind of communication line as the line being tested. In this way complete check of the storage and common controls as well as the general control of the line to which the write auto instruction was issued may be made. The receive operation is checked as well since a common terminal control controls the receive operation.

Transmission of data from the line adapter associated with the terminal being tested may be inhibited by issuing a disable command to the line adapter before issuing the auto wrap command.

The send mark LA line for OR circuit 1052 in FIG. 63B is set into the wrap data trigger 1032 in FIG. 63A. If an auto wrap command has been issued, when receive address wrap line is energized (when line address zero is read from the recirculating memory) the AND circuit 1040 is energized so that the wrap data trigger output is gated through OR 1046 to the receive space line of a line adapter zero thus completing the wrap operation.

11.7 *Automatic dialing operation*

A dial operation is initiated by issuing a dial command to the Transmission Control Unit. This is accomplished by issuing "Command Control" (FIG. 55) and setting the mode field to "dial" (sec. 4.4.19). The control command is accepted by the interface and placed in the command field of an addressed line control word. The mode field is set to "dial." (Initial selection of the interface is more fully discussed in section 3.3) The dial command may be queued in the recirculating memory for a duration of time depending on the dial activity. The dial command is decoded in FIG. 105 by the ANDed output of "command control," "R2 position 13," "not R2 position 14" and "R2 position 15," which are mode field positions. Upon the coincidence of those inputs, the output "dial command" is energized.

The following sequences are defined for dial operation:

Seq 0—Reset
Seq 1—Dialing
Seq 2—Stop
Seq 3—Prepare end

11.7.1 Sequence 0—Reset

Figure 101:
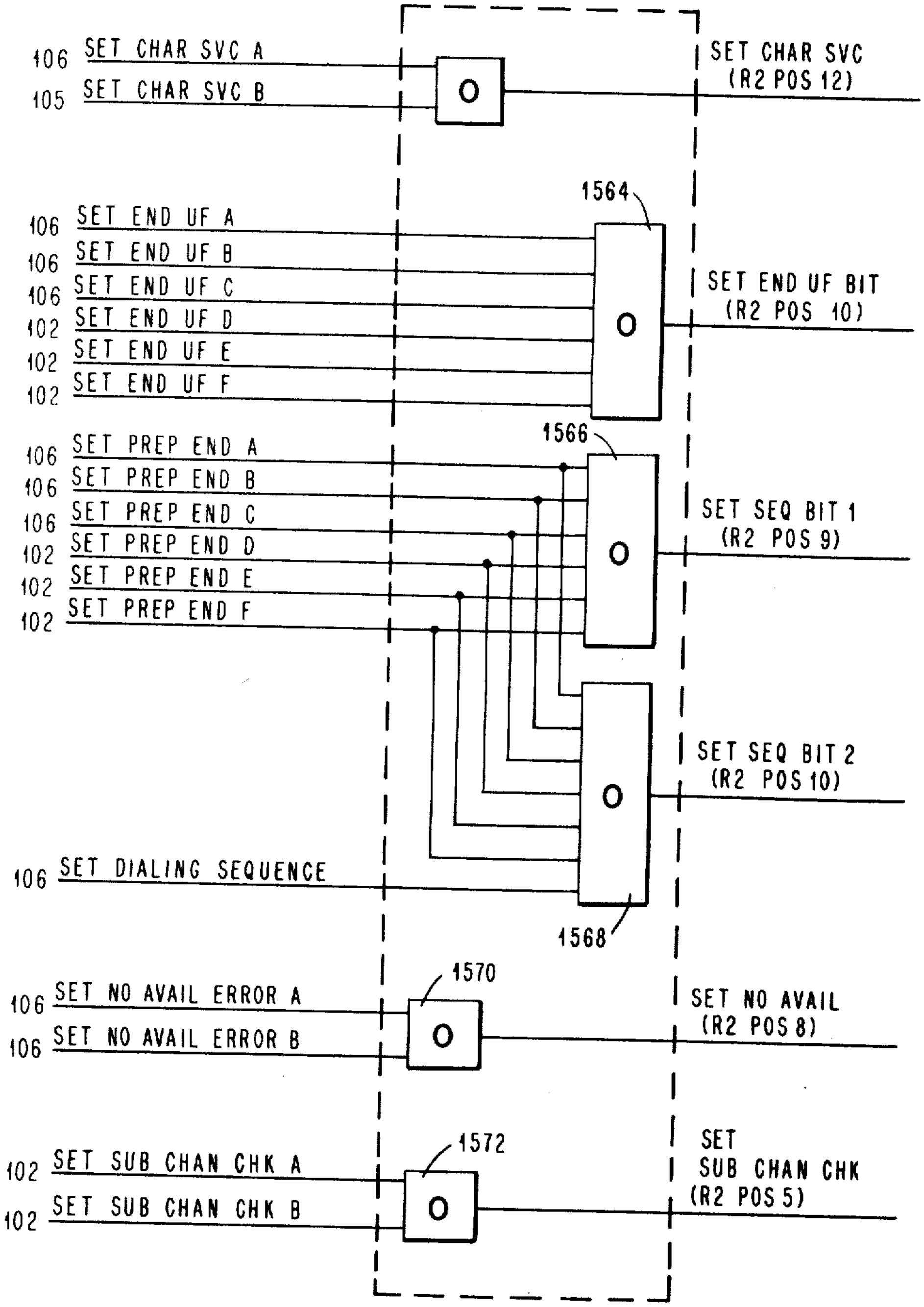
Figure 110:
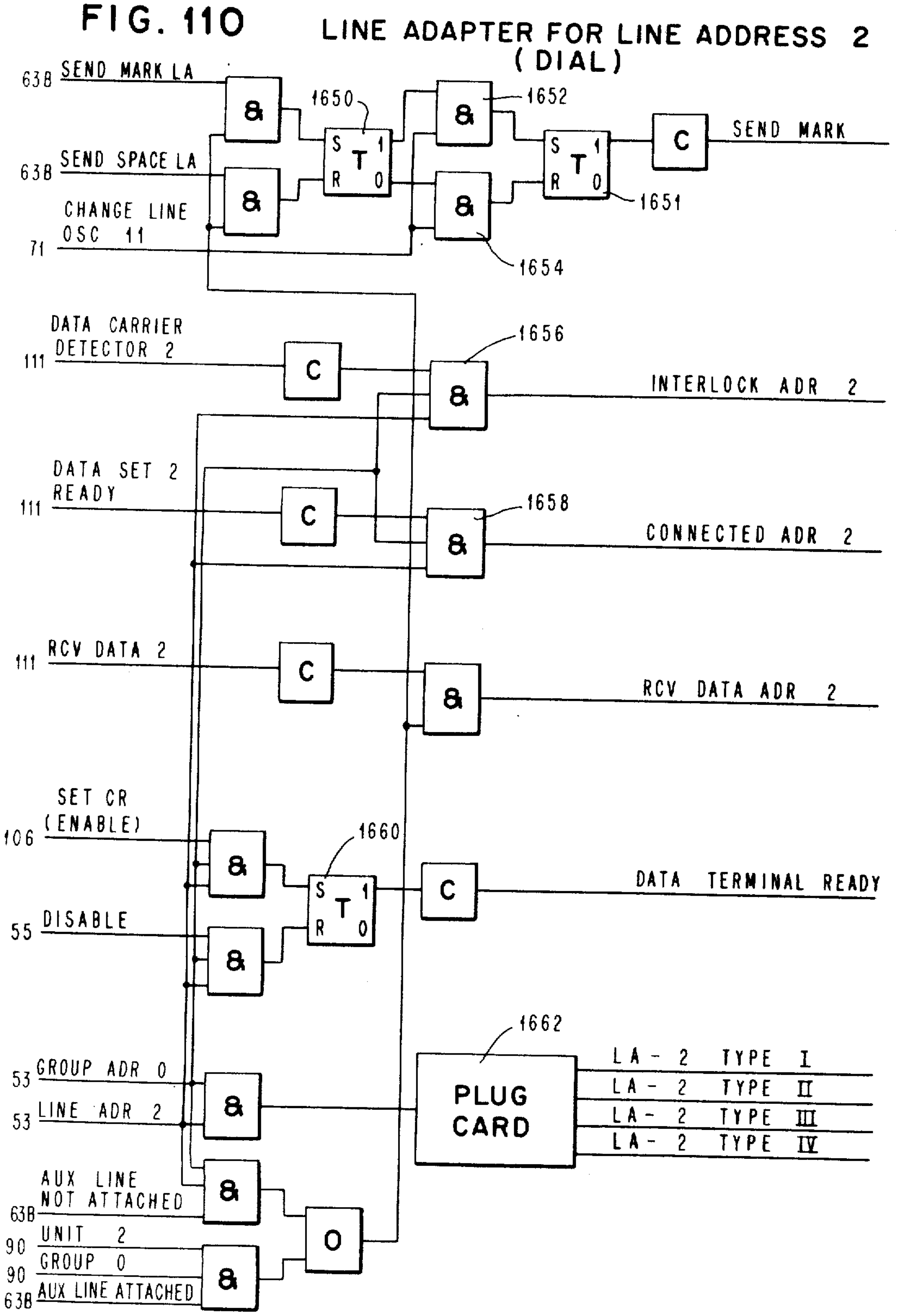

The rise of the "dial command" line and the coincidence of "not dial busy" and "sequence 0" (FIG. 106) causes the "gate address into address register" line to be energized. At time COT7 coincidence at the AND circuit 1618 (FIG. 106) of "gate address into address register" and not interlock or PND causes an output which through the OR 1620 sets the DS (digit sent) trigger 1622 on. The output of AND 1618 also sets CR (call request) trigger 1644 (FIG. 108), character service bit and "dialing sequence 1" (FIG. 101) and turns on the enable latch 1660 (FIG. 110).

11.7.2 Sequence 1—Dialing

Figure 106:
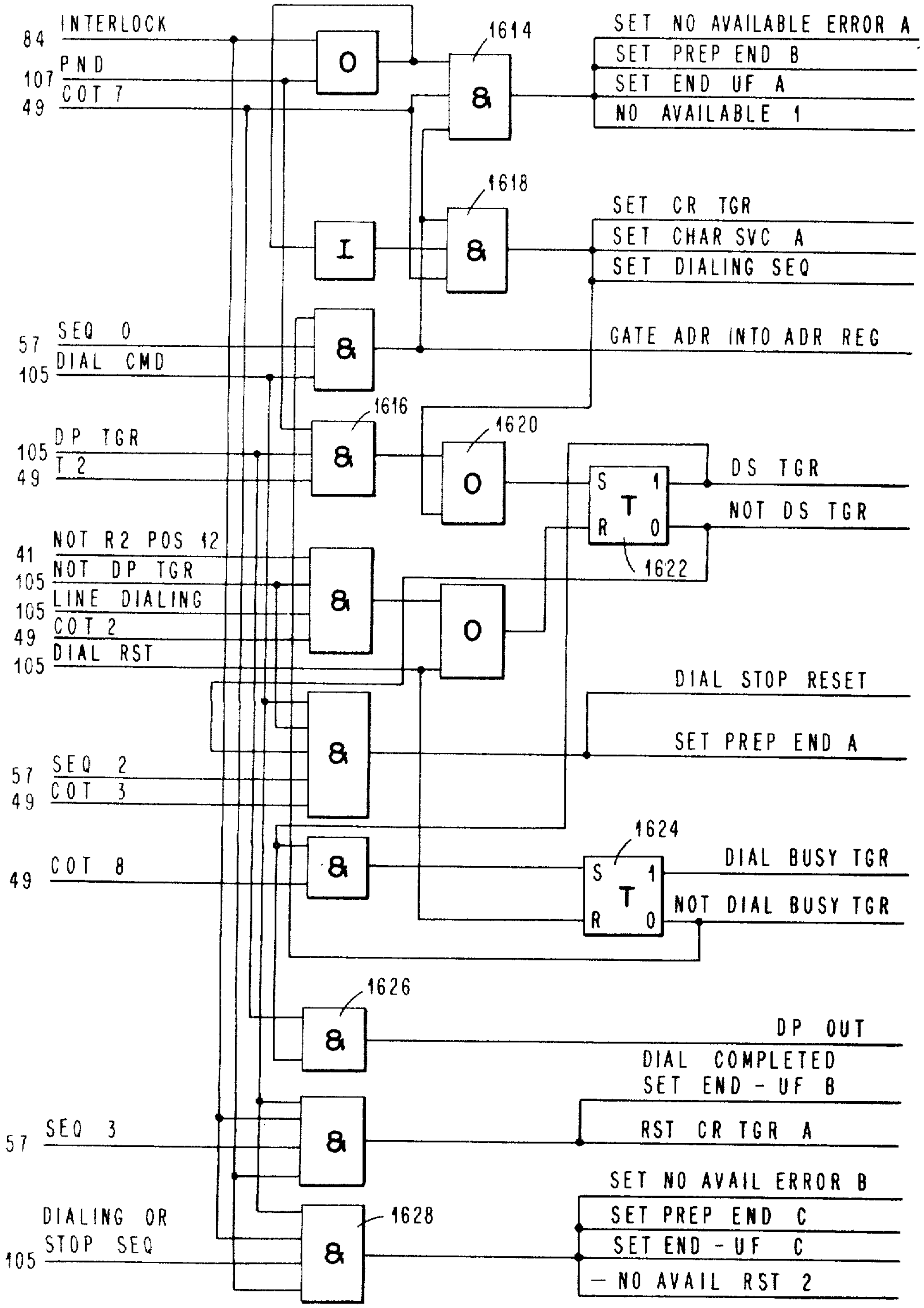
Figure 107:
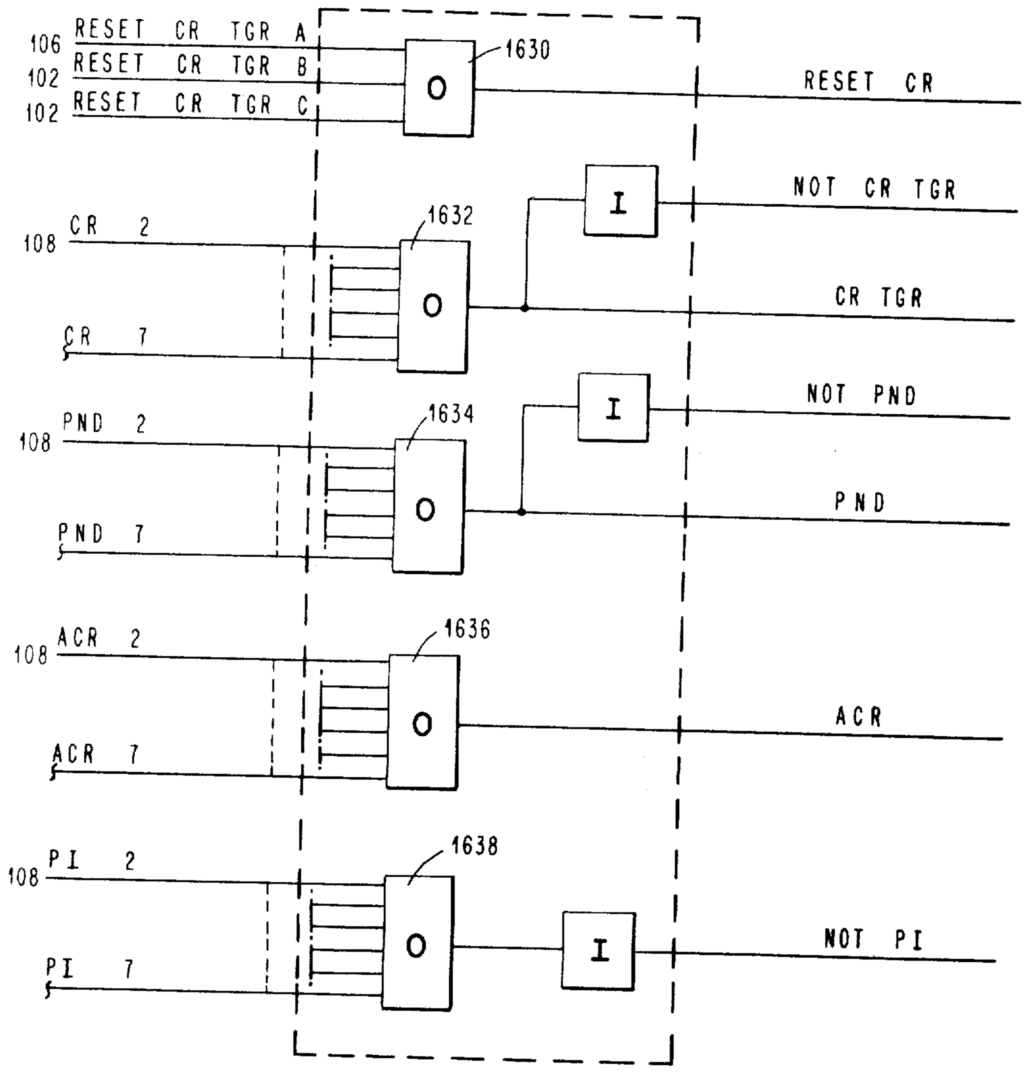

If the address is valid, it is routed from the control unit binary clock into the Dial Address Register (FIG. 102) via the energization of "gate address into address register" (FIG. 106). If the power indication (PI) lead (FIG. 108), of the addressed automatic calling unit (ACU) is not energized, "intervention required" is set in the sense field of the addressed line control word. This indicates that the automatic calling unit is not functioning properly. Further, if the PND lead from the automatic calling unit (FIG. 111) is on, the "receiving" bit of the sense field is turned on to indicate "no avail" error. Thus, in FIG. 106 the energization of the PND lead energizes the output of the OR which energizes the output of AND 1614 at COT 7 causing an output "set end UF A." The energization of this lead on FIG. 101 causes an output from OR 1564 to set END bit (R2 POS 2). Thus the connection of the call will not be completed because of one or these two error conditions. Coincidence of DS trigger on and COT 8 (FIG. 106) turns on Dial Busy trigger 1624.

In the absence of error conditions, at this point the CR, Dial Busy and DS triggers are on, "dialing sequence 1" is set in the sequence field, "character service" is set on in the LCW, and the LCW address is in the Dial Address register. If the CR trigger fails to turn on, "equipment check" is set in the sense field and the dial command is terminated. This is accomplished in FIG. 102 by coincidence of "not CR Trigger," "dialing or stop sequence," COT 6 time, and the presence of "dial command" at AND 1580. If CR does turn on, the ACU will respond to CR by raising the PND lead.

The presence of "character service" in the line control word causes the first dial digit to be fetched from the multiplexor channel in the same manner as any other type of output data. The dial digit is placed in the data buffer field of the addressed line control word. "Character service" is reset after the digit has been stored in data buffer. The next time the addressed line control word is read from the recirculating memory, DS (FIG. 106) is turned off at COT 2 time and the coincidence of NOT R2 POS 12 (not character service) NOT DP trigger and "line dialing"; the Dial Digit register is reset at COT 8 time and the contents of the data buffer are transferred to the dial digit register (FIG. 103) at time CIT 0. The transfer of the dial digit from register R2 Positions 10–12 (data buffer) is accomplished at CIT 0 time via the AND gates 1594 in FIG. 104. A third leg of the AND gates will allow the transfer of a digit upon the coincidence of "not DP," "not DS," and "dial busy" triggers.

Figures 103, 104:
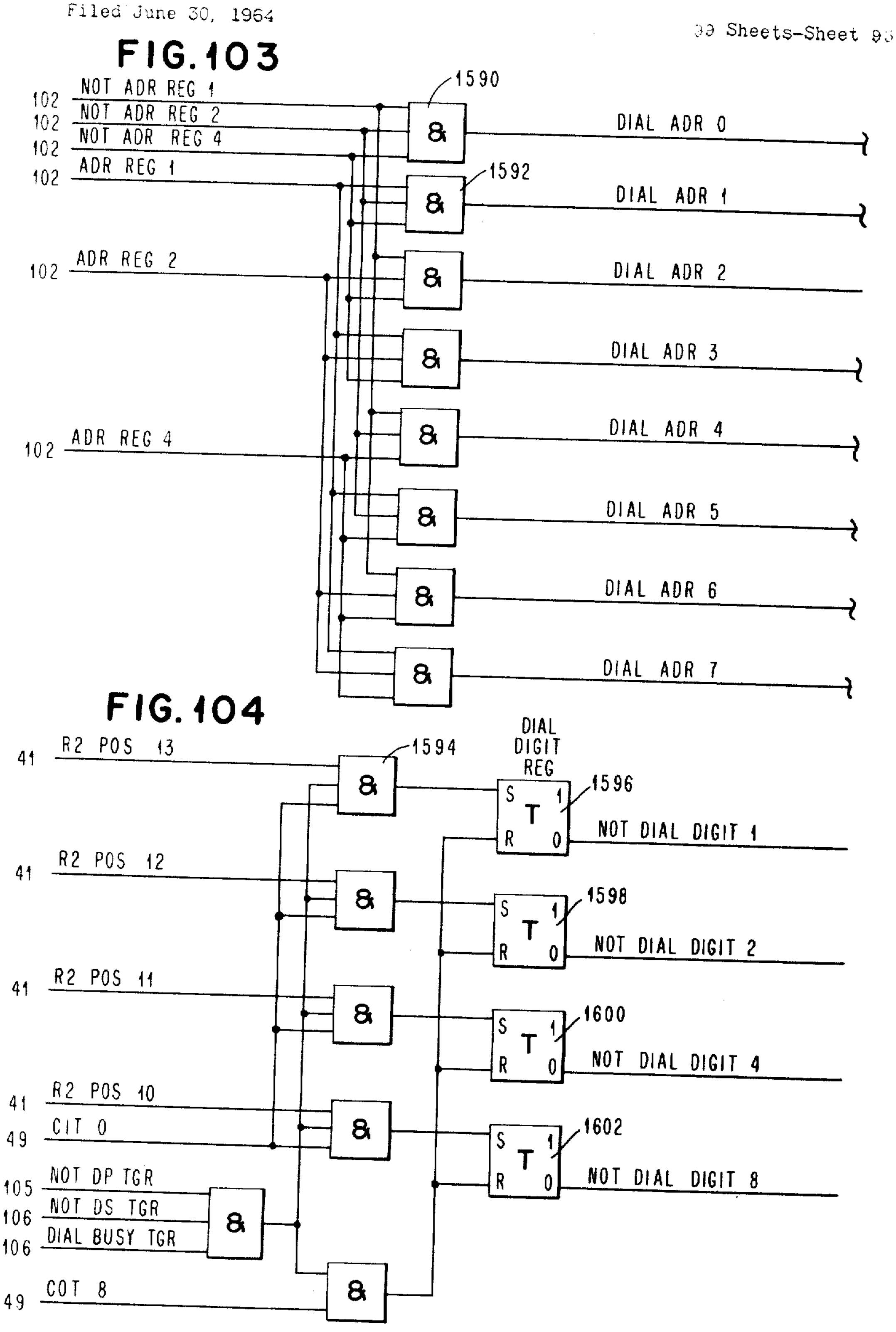
Figure 105:
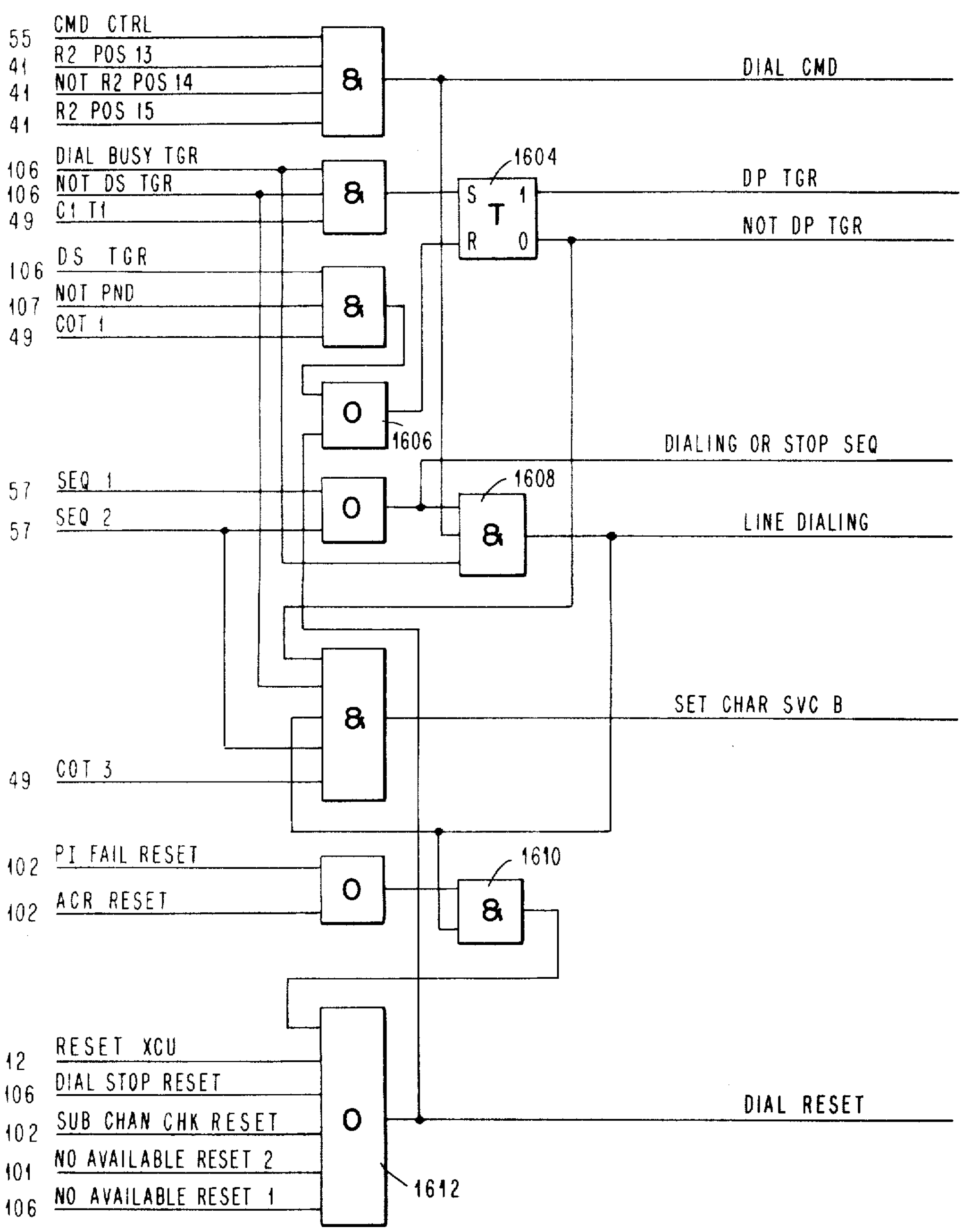

Coincidence CIT 1 time, "dial busy" and "not DS" turn on the DP (digit present) trigger 1604 (FIG. 105). In FIG. 103, dial address 2 is decoded, assuming that address was stored in the address register. The DP trigger is gated to the DP lead of the ACU (FIG. 111) by coincidence of "dial address 2" and "DP out" at AND 1640. "DP out" is generated by coincidence of DP and DS at AND 1626 in FIG. 106.

Figure 108:
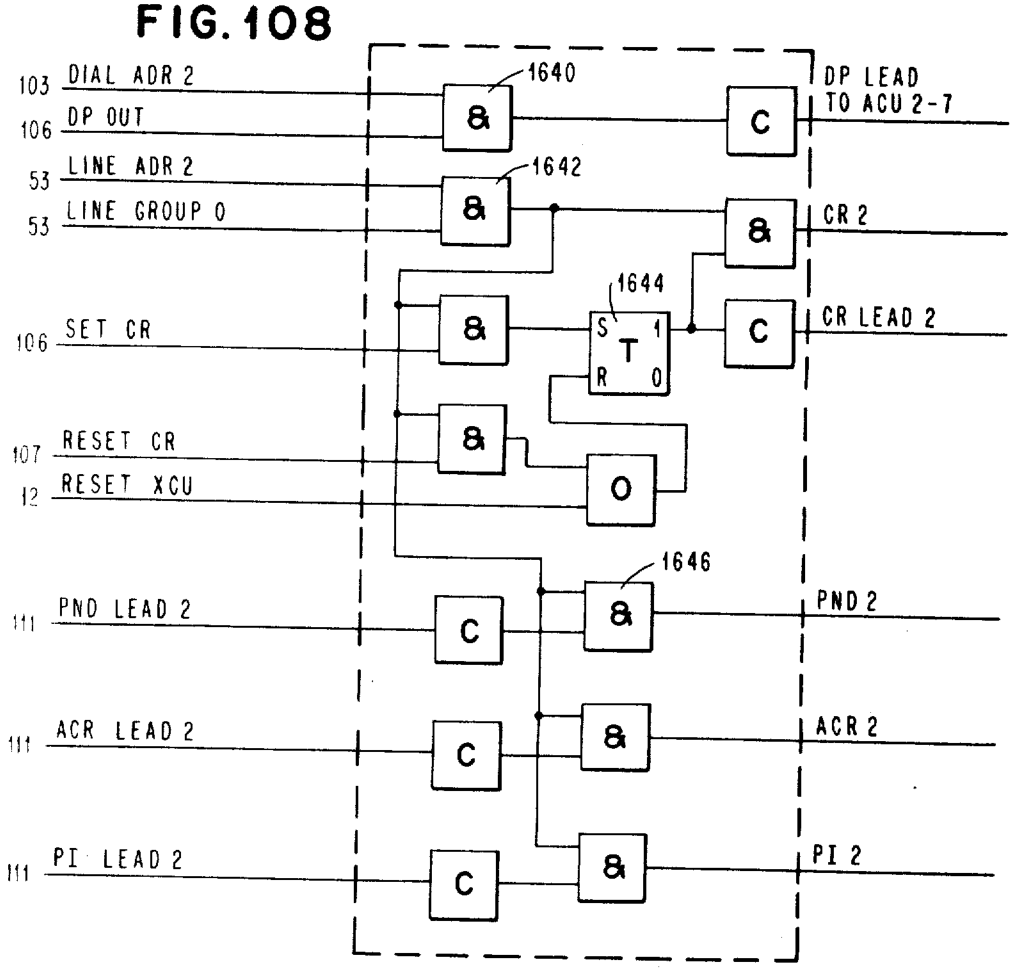
Figure 109:
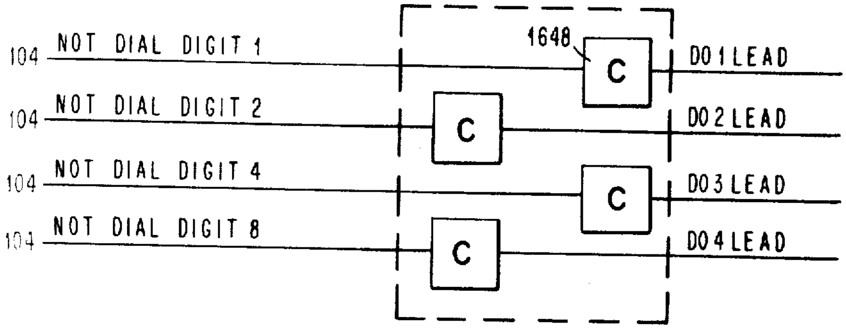

The Automatic calling unit drops the PND line after it has sampled the digit leads in FIG. 108 which are connected to the dial digit register. In response the DP lead is dropped by the dial adapter (FIG. 108). This is accomplished by turning off the DP trigger at COT 1 time (FIG. 105) and the DS trigger at COT 2 time (FIG. 106). The AND condition at AND 1626 shown in FIG. 106 is satisfied only if the DP trigger and the DS trigger are on. Either one of the triggers going off causes "DP out" lead to the ACU to fall. At COT 7 "character service" is again set (AND 1618 FIG. 106) and the next digit transfer commences.

11.7.3. Sequence 2—Stop

The process of transferring digits from the channel to the recirculating delay line and then to the ACU continues until all digits have been transferred. At this point the channel signals "stop" in response to "character service" bit, and turns off the character service bit. Stop is indicated by the interface controls setting stop sequence (Sequence 2) in the address line control word. Sequence 2 causes an output from an OR circuit (FIG. 105) indicating "dialing or stop sequence." The AND condition of "dial command," "dial busy trigger," and "dialing or stop sequence" causes an output from AND 1608 "line dialing." The coincidence of "Not R2 POS 12" (not character service bit), "Not DP trigger" and "line dialing" at COT 2 time causes an output from the AND FIG. 106 via the OR to reset the DS trigger 1622.

"Dial stop reset" is now generated (FIG. 106) by the fact that DS and DP are off, stop sequence 2 is present, and COT 2 time. Dial stop reset via OR 1612 (FIG. 105) causes "dial busy" trigger 1624 (FIG. 106) to be reset.

COT 9 time in coincidence with "not dial busy trigger" causes an output from an AND (FIG. 102) to reset the Dial Address Register. Further, the coincidence of "dialing or stop sequence" and "not call request trigger" at COT 6 time causes an output from AND 1580 (FIG. 102) to generate set prepare end F, which sets sequence 3. Sequence 3 is set (FIG. 101) by the output of "set prepare end F" which energizes OR circuits 1566, 1568 to generate signals "set sequence bit 1" and "set sequence bit 2." This sets sequence 3 in binary code in R2 positions 9 and 10. The dial controls are now free to handle the dialing of another line, by another LCW address.

11.7.4. Sequence 3—Prepare end

During each succeeding line scan of the recirculating memory, the "Abandon Call and Retry" (ACR) lead of the addressed automatic calling unit and the "data set ready lead" of the data set are monitored. If the ACR turns on, this is an error condition, the "time out bit" is set in the line control word sense field and the dial command is terminated with "channel end, device end, and unit check" signalled in the unit status byte. R2 POS 0 is set via OR 1564 to signal "end unit freed."

Figure 102:
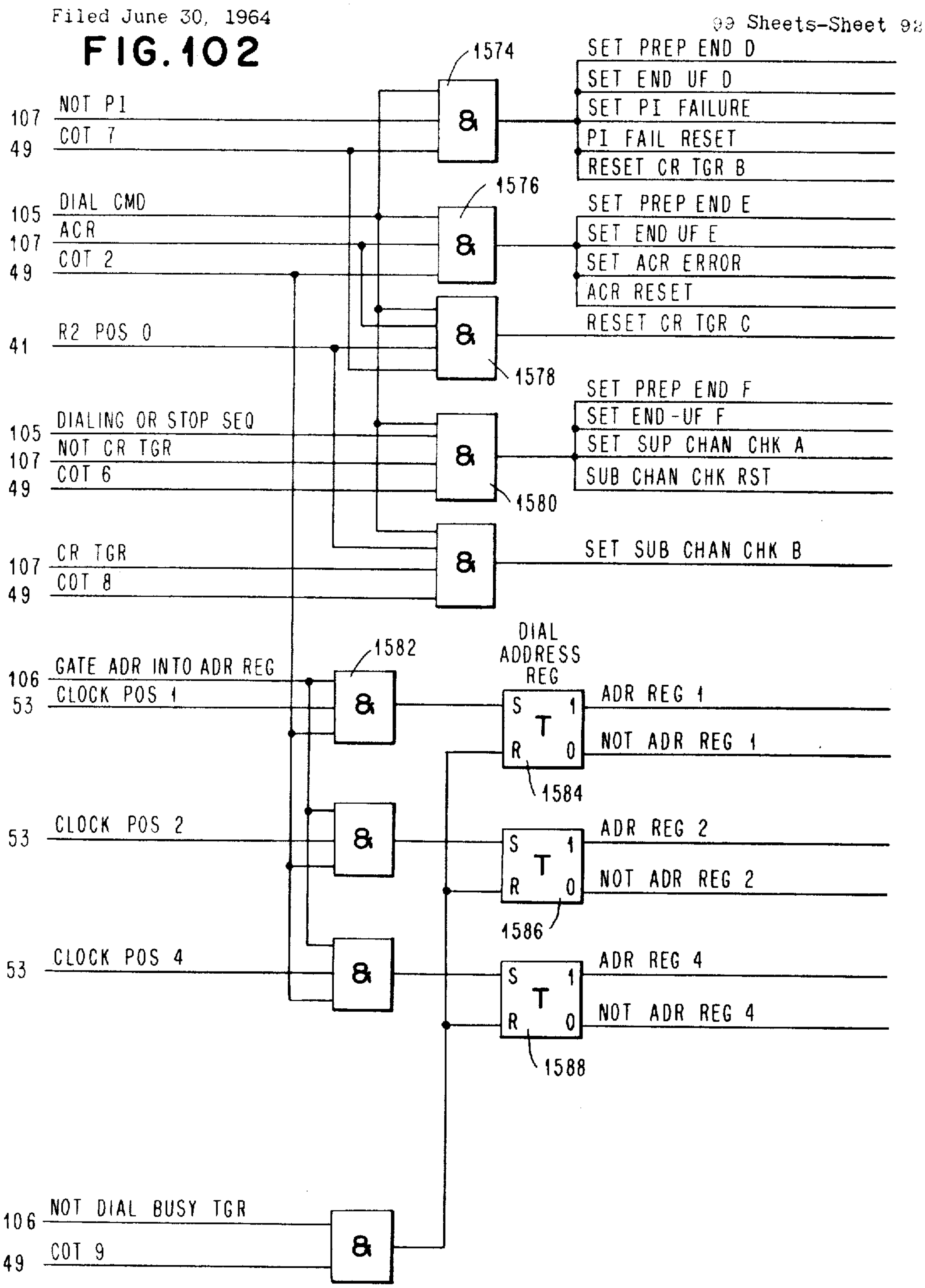

The abandon call and retry (ACR) lead is shown in FIG. 102 and is sampled by the AND condition of "dial command" and COT 2 time at AND 1576. If ACR line is energized an output from the AND 1576 occurs which energizes "set prepare end E" which sets sequence 3 "prepare end" (assuming sequence 3 is not already set by the conclusion of digit transfer described above). The ACR error causes a dial reset (FIG. 105) via the ACR reset lead at the OR circuit through AND 1610 if in dialing sequence. The energization of the ACR lead also causes the resetting of the CR trigger via "reset CR trigger C" line FIG. 102.

11.7.5 End of Dial Operation

Assume that an ACR error does not occur. When the "data set ready" lead (FIG. 111) from the data set 1664 is energized this indicates that the connection has been completed. The "data set ready" lead goes to the dial line adapter FIG. 110 where it is ANDed with the group address 0 and line address 2 to select this line address 2. This causes energization of the "connected" line of address 2 (output of AND 1658). "Connected" line (FIG. 110) energizes OR 1316 (FIG. 84), the output of which energizes one leg of AND 1056 (FIG. 65). The receive trigger is turned on at CLT 7 time to start the receive operation. The receiving bit in the address LCW is turned on to indicate that this address is ready to receive data.

Figure 31:
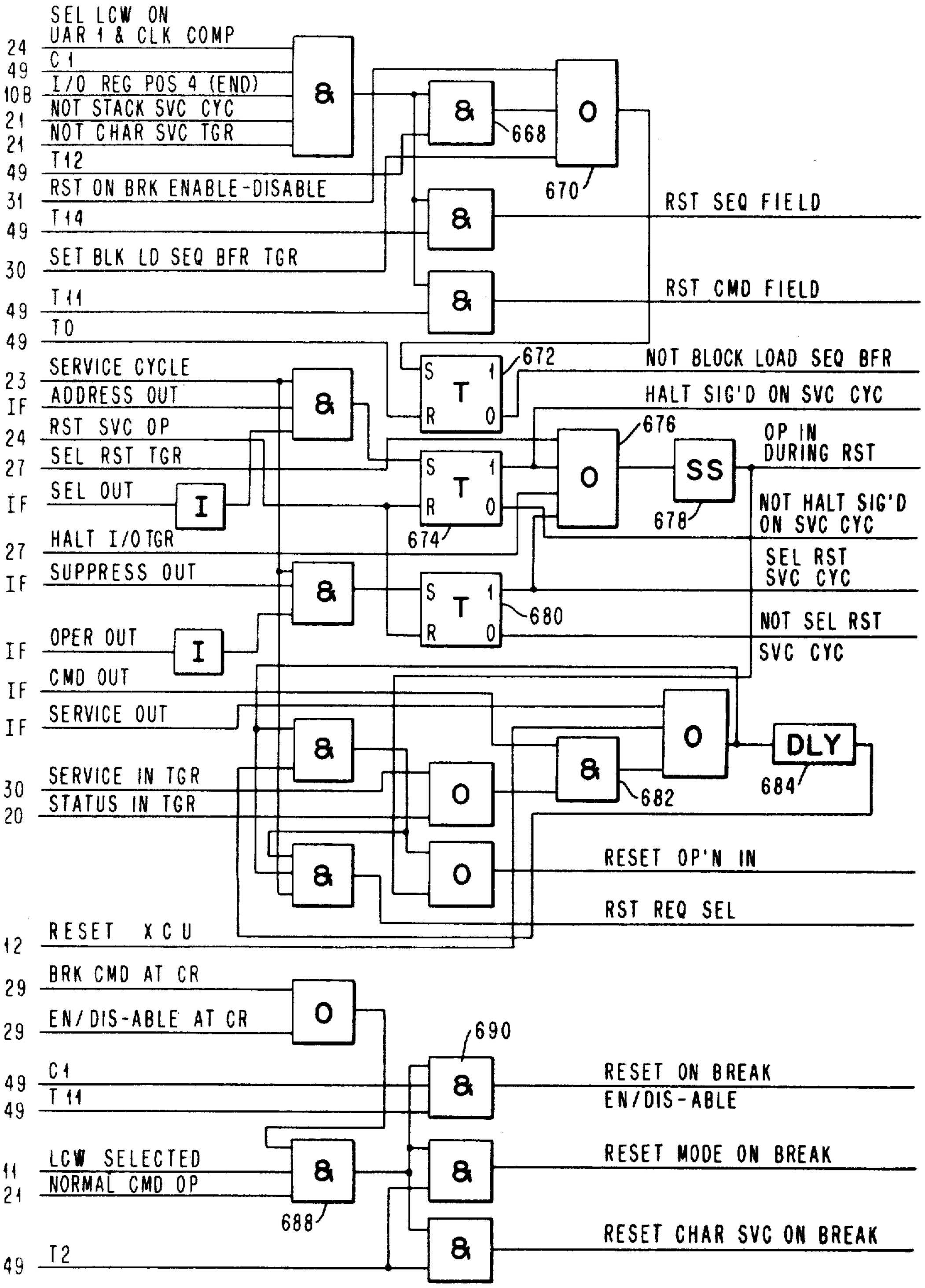

The "end" bit in data buffer POS 4 is turned via "set end unit freed" (FIG. 101) and the sequence field is reset to sequence 0 via the control logic in FIG. 31.

Figure 111:
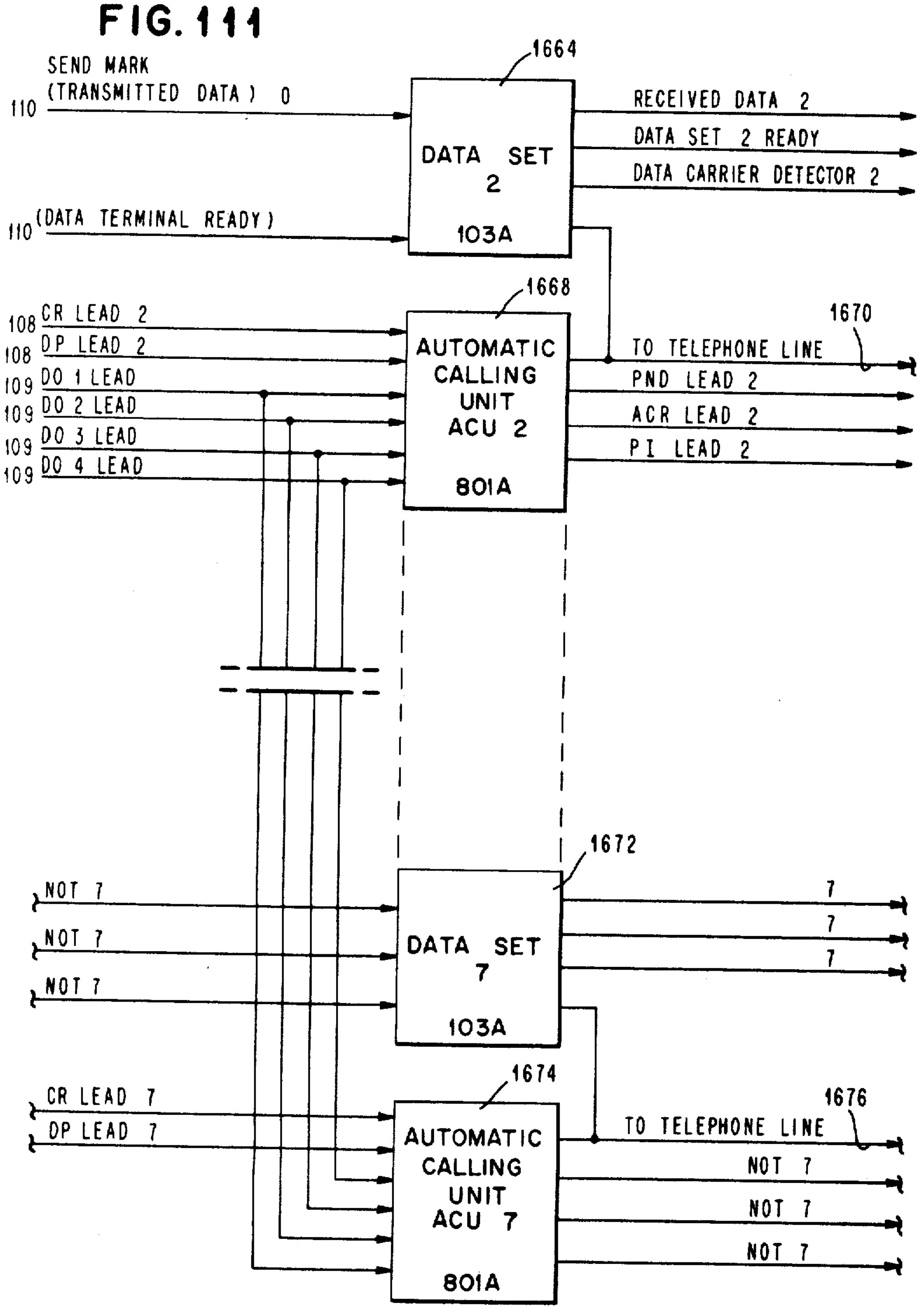

The data communication path is now complete between the remote terminal and the transmission control unit via the data set FIG. 111. At the completion of data communication with the remote terminal via the selected line adapter and the data set, the call is terminated by issuing a "disable" command (FIG. 55). The disable command turns off the enable latch 1660, thus dropping the "data terminal ready" lead (FIG. 110). This de-energizes the data set in FIG. 111.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for controlling a plurality of switching means which automatically establish communication paths in response to dial digits and which include control lines for signalling that a connection has been established comprising:

means for sequentially scanning the control lines of all of the plurality of switching means;

data transmission control means connected to said scanning means for providing data transfer along paths established by said switching means; and dial control means connected to said data transmission control means for establishing a dial digit transfer path between one of said switching means and said data transmission control means;

whereby said scanning means in conjunction with said data transmission control means monitor the control lines of all of the plurality of switching means while said data transmission control means transfers dial digits to said one of said switching means via said dial digit transfer path.

2. The combination according to claim 1 including means in said dial control means for indicating to said data transmission control means that a dial digit transfer path is established, and means in said data transmission control means responsive to said indicating means for effecting the transfer of dial digits via the established path in response to requests for such digits from said one of said switching means.

3. A communication switching system comprising:

a plurality of switching means for receiving and transmitting dial digits to a utilization device which establishes communication paths in response to said dial digits, each switching means assigned a particular address;

a recirculating data store having a plurality of line control words stored therein, each assigned a particular address corresponding to said switching means, each line control word having at least a command field;

means for scanning said switching means in synchronism with said recirculating data store; and dial control means responsive to a dial command in the command field of a particular line control word for establishing a dial digit transfer path between the switching means corresponding to the particular line control word address and the recirculating data store.

4. The combination according to claim 3 including a sequence field in said line control word and means in said dial control means for changing the sequence field to a dialing sequence.

5. The combination according to claim 4 including a data field in said line control word and common control means responsive to a dialing sequence in said line control word for transferring dial digits to the data field of the line control word in which the dialing sequence is stored.

6. The combination according to claim 3 including means for indicating that a dial digit transfer path is established and for initiating the transfer of dial digits from said data field to said switching means corresponding to said particular line control word.

7. The combination according to claim 5 including means in said common controls for changing the sequence field to a stop sequence after all dial digits necessary to establish a switching connection have been transferred.

8. The combination according to claim 7 including means in said dial controls responsive to a stop sequence in said sequence field for disconnecting the dial digit transfer path.

9. The combination according to claim 8 including means in said dial controls for changing the sequence field to an end sequence concurrently with disconnecting the dial digit transfer path, and means responsive to said end sequence for monitoring said switching means for control signals.

10. The combination according to claim 9 including means in dial common controls responsive to said switching means for changing said sequence field to a reset sequence in response to a control signal indicating that a communication path has been established.

11. Switching apparatus for establishing a data path between remote communication terminals and a transmission control unit of the type in which a plurality of line adapters are scanned by a recirculating memory in which a plurality of line control words having at least a command field, a data field, and a sequence field are stored; and having common control means for performing control functions common to all line adapters, comprising:

common dial control means including means for decoding a dial command in one of said line control words;

means responsive to said decoded dial command for changing said sequence field from a first (reset) sequence to a second (dialing) sequence, and means for indicating to said common controls that the dial common controls are busy;

means for storing the address of the line control word in which the dial command is stored;

means responsive to said stored address for energizing a dial digit transfer path between said recirculating memory and an automatic dialing unit corresponding to said line control word;

means for transferring dial digits from said line control word to said automatic dialing unit including means for changing said sequence field from the second sequence to a third (stop) sequence after all digits have been transferred, and means in said dial common controls responsive to said third sequence (stop) stored in said line control word for setting a fourth sequence (end) therein at the completion of transferring the last received dial digit, and for indicating that the dial common controls are no longer busy.

References Cited

UNITED STATES PATENTS

| | | | |
|---|---|---|---|
| 2,576,189 | 11/1951 | Oliver | 179—90.2 |
| 2,870,258 | 1/1959 | Cooper | 340—150 |
| 2,924,666 | 2/1960 | Brooks et al. | 340—172.5 |
| 3,061,192 | 10/1962 | Terzian | 340—172.5 |
| 3,200,192 | 8/1965 | Auwaerter | 340—172.5 |
| 3,274,346 | 9/1966 | Silber | 179—90.2 |
| 3,293,605 | 12/1966 | Moore | 340—150 |

PAUL J. HENON, *Acting Primary Examiner.*

G. D. SHAW, *Assistant Examiner.*